(12) United States Patent
Bernstein et al.

(10) Patent No.: US 9,778,771 B2
(45) Date of Patent: Oct. 3, 2017

(54) DEVICE, METHOD, AND GRAPHICAL USER INTERFACE FOR TRANSITIONING BETWEEN TOUCH INPUT TO DISPLAY OUTPUT RELATIONSHIPS

(71) Applicant: Apple Inc., Cupertino, CA (US)

(72) Inventors: Jeffrey Traer Bernstein, San Francisco, CA (US); Julian Missig, Redwood City, CA (US); Avi E. Cieplinski, San Francisco, CA (US); David J. Hart, San Francisco, CA (US); B. Michael Victor, Castro Valley, CA (US)

(73) Assignee: APPLE INC., Cupertino, CA (US)

( * ) Notice: Subject to any disclaimer, the term of this patent is extended or adjusted under 35 U.S.C. 154(b) by 153 days.

(21) Appl. No.: 14/608,942

(22) Filed: Jan. 29, 2015

(65) Prior Publication Data

US 2015/0138155 A1    May 21, 2015

Related U.S. Application Data

(63) Continuation of application No. PCT/US2013/069483, filed on Nov. 11, 2013.

(Continued)

(51) Int. Cl.
*G06F 3/044* (2006.01)
*G06F 3/041* (2006.01)
*G06F 3/0488* (2013.01)

(52) U.S. Cl.
CPC ............ *G06F 3/0412* (2013.01); *G06F 3/044* (2013.01); *G06F 3/0414* (2013.01);
(Continued)

(58) Field of Classification Search
CPC .... G06F 3/0412; G06F 3/0488; G06F 3/0414; G06F 3/044; G06F 2203/04808; G06F 2203/04105; G06F 2203/04106
See application file for complete search history.

(56) References Cited

U.S. PATENT DOCUMENTS

| 4,674,044 A | 6/1987 | Kalmus et al. |
| 4,750,135 A | 6/1988 | Boilen |

(Continued)

FOREIGN PATENT DOCUMENTS

| CN | 1658150 | 8/2005 |
| CN | 1661556 | 8/2005 |

(Continued)

OTHER PUBLICATIONS

Bautisa, "Microsoft Mathematics Tutorial 7—The Ink Input", <URL:http://mathandmultimedia.com/2012/05/23/microsoft-math-tutorial-7-ink>, May 23, 2012, 3 pages.

(Continued)

*Primary Examiner* — Andrew Sasinowski
(74) *Attorney, Agent, or Firm* — Morgan, Lewis & Bockius LLP

(57) ABSTRACT

An electronic device with a touch-sensitive surface, a display, and one or more sensors to detect intensity of contacts, detects a contact, determines a location and intensity of the contact on the touch-sensitive surface, and displays a response, the response being based at least in part on an input-output mapping of intensity to response at the contact location. The input-output mapping including a first input-output relationship between intensity and response over a first range of intensity values, a second input-output relationship between intensity and response over a second range of intensity values, and a transitional intensity value where the first range of intensity values meets or overlaps the second range of intensity values. At the transitional intensity value, the first input-output relationship has a first rate of change, the second input-output relationship has a second rate of change, and the first rate is substantially the same as the second rate.

21 Claims, 74 Drawing Sheets

Related U.S. Application Data

(60) Provisional application No. 61/778,363, filed on Mar. 12, 2013, provisional application No. 61/747,278, filed on Dec. 29, 2012.

(52) U.S. Cl.
CPC .. *G06F 3/0488* (2013.01); *G06F 2203/04105* (2013.01); *G06F 2203/04106* (2013.01); *G06F 2203/04808* (2013.01)

(56) References Cited

U.S. PATENT DOCUMENTS

| | | |
|---|---|---|
| 4,903,201 A | 2/1990 | Wagner |
| 5,038,284 A | 8/1991 | Kramer |
| 5,077,665 A | 12/1991 | Silverman et al. |
| 5,101,353 A | 3/1992 | Lupien et al. |
| 5,136,501 A | 8/1992 | Silverman et al. |
| 5,270,922 A | 12/1993 | Higgins |
| 5,297,031 A | 3/1994 | Gutterman et al. |
| 5,297,032 A | 3/1994 | Trojan et al. |
| 5,374,787 A | 12/1994 | Miller et al. |
| 5,455,965 A | 10/1995 | Shaughnessy et al. |
| 5,463,722 A | 10/1995 | Venolia |
| 5,510,813 A | 4/1996 | Makinwa et al. |
| 5,555,354 A | 9/1996 | Strasnick et al. |
| 5,559,301 A | 9/1996 | Bryan, Jr. et al. |
| 5,590,265 A | 12/1996 | Nakazawa |
| 5,627,914 A | 5/1997 | Pagallo |
| 5,689,651 A | 11/1997 | Lozman |
| 5,695,400 A | 12/1997 | Fennell, Jr. et al. |
| 5,710,896 A | 1/1998 | Seidl |
| 5,717,725 A | 2/1998 | Campana, Jr. |
| 5,719,796 A | 2/1998 | Chen |
| 5,727,165 A | 3/1998 | Ordish et al. |
| 5,774,877 A | 6/1998 | Patterson, Jr. et al. |
| 5,775,996 A | 7/1998 | Othmer et al. |
| 5,793,301 A | 8/1998 | Patterson, Jr. et al. |
| 5,793,360 A | 8/1998 | Fleck et al. |
| 5,793,377 A | 8/1998 | Moore |
| 5,797,002 A | 8/1998 | Patterson, Jr. et al. |
| 5,801,692 A | 9/1998 | Muzio et al. |
| 5,805,144 A | 9/1998 | Scholder et al. |
| 5,820,463 A | 10/1998 | O'Callaghan |
| 5,825,352 A | 10/1998 | Bisset et al. |
| 5,844,560 A | 12/1998 | Crutcher et al. |
| 5,845,266 A | 12/1998 | Lupien et al. |
| 5,872,922 A | 2/1999 | Hogan et al. |
| 5,880,733 A | 3/1999 | Horvitz et al. |
| 5,910,882 A | 6/1999 | Burrell |
| 5,915,245 A | 6/1999 | Patterson, Jr. et al. |
| 5,924,082 A | 7/1999 | Silverman et al. |
| 5,924,083 A | 7/1999 | Silverman et al. |
| 5,946,647 A | 8/1999 | Miller et al. |
| 5,946,667 A | 8/1999 | Tull, Jr. et al. |
| 5,953,708 A | 9/1999 | Midorikawa et al. |
| 5,963,923 A | 10/1999 | Garber |
| 6,002,397 A | 12/1999 | Jaaskelainen, Jr. |
| 6,012,046 A | 1/2000 | Lupien et al. |
| 6,014,643 A | 1/2000 | Minton |
| 6,031,989 A | 2/2000 | Cordell |
| 6,035,287 A | 3/2000 | Stallaert et al. |
| 6,072,488 A | 6/2000 | Mcfarland |
| 6,088,019 A | 7/2000 | Rosenberg |
| 6,088,027 A | 7/2000 | Konar et al. |
| 6,098,051 A | 8/2000 | Lupien et al. |
| 6,111,575 A | 8/2000 | Martinez et al. |
| 6,115,043 A | 9/2000 | Levine et al. |
| 6,131,087 A | 10/2000 | Luke et al. |
| 6,134,535 A | 10/2000 | Belzberg |
| 6,180,894 B1 | 1/2001 | Chao et al. |
| 6,195,647 B1 | 2/2001 | Martyn et al. |
| 6,208,329 B1 | 3/2001 | Ballare |
| 6,208,340 B1 | 3/2001 | Amin et al. |
| 6,219,034 B1 | 4/2001 | Elbing et al. |
| 6,227,743 B1 | 5/2001 | Robb |
| 6,229,542 B1 | 5/2001 | Miller |
| 6,243,080 B1 | 6/2001 | Molne |
| 6,247,000 B1 | 6/2001 | Hawkins et al. |
| 6,252,594 B1 | 6/2001 | Xia et al. |
| 6,266,684 B1 | 7/2001 | Kraus et al. |
| 6,272,474 B1 | 8/2001 | Garcia |
| 6,278,982 B1 | 8/2001 | Korhammer et al. |
| 6,282,521 B1 | 8/2001 | Howorka |
| 6,323,846 B1 | 11/2001 | Westerman et al. |
| 6,347,997 B1 | 2/2002 | Armstrong |
| 6,377,940 B2 | 4/2002 | Tilfors et al. |
| 6,396,523 B1 | 5/2002 | Segal et al. |
| 6,396,962 B1 | 5/2002 | Haffey et al. |
| 6,400,303 B2 | 6/2002 | Armstrong |
| 6,405,180 B2 | 6/2002 | Tilfors et al. |
| 6,408,282 B1 | 6/2002 | Buist |
| 6,411,998 B1 | 6/2002 | Bryant et al. |
| 6,429,846 B2 | 8/2002 | Rosenberg et al. |
| 6,448,977 B1 | 9/2002 | Braun et al. |
| 6,456,778 B2 | 9/2002 | Armstrong |
| 6,459,424 B1 | 10/2002 | Resman |
| 6,459,442 B1 | 10/2002 | Edwards et al. |
| 6,469,691 B1 | 10/2002 | Armstrong |
| 6,470,078 B1 | 10/2002 | Armstrong |
| 6,489,975 B1 | 12/2002 | Patil et al. |
| 6,504,527 B1 | 1/2003 | Armstrong |
| 6,512,761 B1 | 1/2003 | Schuster et al. |
| 6,532,000 B2 | 3/2003 | Armstrong |
| 6,551,357 B1 | 4/2003 | Madduri |
| 6,559,831 B1 | 5/2003 | Armstrong |
| 6,563,487 B2 | 5/2003 | Martin et al. |
| 6,567,102 B2 | 5/2003 | Kung |
| 6,570,557 B1 | 5/2003 | Westerman et al. |
| 6,583,798 B1 | 6/2003 | Hoek et al. |
| 6,590,568 B1 | 7/2003 | Astala et al. |
| 6,659,861 B1 | 12/2003 | Faris et al. |
| 6,661,438 B1 | 12/2003 | Shiraishi et al. |
| 6,670,952 B2 | 12/2003 | Jaeger et al. |
| 6,677,932 B1 | 1/2004 | Westerman |
| 6,735,307 B1 | 5/2004 | Volckers |
| 6,750,890 B1 | 6/2004 | Sugimoto |
| 6,772,132 B1 | 8/2004 | Kemp, II et al. |
| 6,822,635 B2 | 11/2004 | Shahoian et al. |
| 6,831,666 B1 | 12/2004 | Kreis |
| 6,891,551 B2 | 5/2005 | Keely et al. |
| 6,904,405 B2 | 6/2005 | Suominen |
| 6,906,697 B2 | 6/2005 | Rosenberg |
| 6,919,927 B1 | 7/2005 | Hyodo |
| 6,954,899 B1 | 10/2005 | Anderson |
| 7,036,088 B2 | 4/2006 | Tunney |
| 7,058,146 B2 | 6/2006 | Paulraj et al. |
| 7,114,091 B2 | 9/2006 | Vrancic |
| 7,134,093 B2 | 11/2006 | Etgen et al. |
| 7,138,983 B2 | 11/2006 | Wakai et al. |
| 7,159,189 B2 | 1/2007 | Weingart et al. |
| 7,259,752 B1 | 8/2007 | Simmons |
| 7,312,791 B2 | 12/2007 | Hoshino et al. |
| 7,346,855 B2 | 3/2008 | Hellyar et al. |
| 7,380,218 B2 | 5/2008 | Rundell |
| 7,411,575 B2 | 8/2008 | Hill et al. |
| 7,441,204 B2 | 10/2008 | Thomson et al. |
| 7,461,026 B2 | 12/2008 | Schluetter |
| 7,479,949 B2 | 1/2009 | Jobs et al. |
| 7,492,720 B2 | 2/2009 | Pruthi et al. |
| 7,532,206 B2 | 5/2009 | Morrison et al. |
| 7,533,352 B2 | 5/2009 | Chew et al. |
| 7,577,167 B2 | 8/2009 | Kikuchi et al. |
| 7,577,530 B2 | 8/2009 | Vignalou-Marche |
| 7,581,186 B2 | 8/2009 | Dowdy et al. |
| 7,614,008 B2 | 11/2009 | Ording |
| 7,619,616 B2 | 11/2009 | Rimas Ribikauskas et al. |
| 7,633,076 B2 | 12/2009 | Huppi et al. |
| 7,653,883 B2 | 1/2010 | Hotelling et al. |
| 7,656,413 B2 | 2/2010 | Khan et al. |
| 7,657,849 B2 | 2/2010 | Chaudhri et al. |
| 7,663,607 B2 | 2/2010 | Hotelling et al. |
| 7,673,255 B2 | 3/2010 | Schechter et al. |
| 7,680,513 B2 | 3/2010 | Haitani et al. |

(56) References Cited

U.S. PATENT DOCUMENTS

| | | |
|---|---|---|
| 7,683,889 B2 | 3/2010 | Rimas Ribikauskas et al. |
| 7,694,231 B2 | 4/2010 | Kocienda et al. |
| 7,694,236 B2 | 4/2010 | Gusmorino et al. |
| 7,739,604 B1 | 6/2010 | Lyons et al. |
| 7,743,348 B2 | 6/2010 | Robbins et al. |
| 7,752,115 B2 | 7/2010 | Schluetter |
| 7,757,185 B2 | 7/2010 | Paquette et al. |
| 7,760,187 B2 | 7/2010 | Kennedy |
| 7,787,026 B1 | 8/2010 | Flory et al. |
| 7,788,595 B2 | 8/2010 | Biwer et al. |
| 7,797,642 B1 | 9/2010 | Karam et al. |
| 7,801,796 B2 | 9/2010 | Friedman et al. |
| 7,801,950 B2 | 9/2010 | Eisenstadt et al. |
| 7,812,826 B2 | 10/2010 | Ording et al. |
| 7,817,568 B2 | 10/2010 | Paik et al. |
| 7,844,914 B2 | 11/2010 | Andre et al. |
| 7,880,728 B2 | 2/2011 | de los Reyes et al. |
| 7,890,862 B2 | 2/2011 | Kompe et al. |
| 7,903,090 B2 | 3/2011 | Soss et al. |
| 7,921,373 B2 | 4/2011 | Yamashita et al. |
| 7,952,566 B2 | 5/2011 | Poupyrev et al. |
| 7,956,847 B2 | 6/2011 | Christie |
| 7,957,762 B2 | 6/2011 | Herz et al. |
| 7,966,352 B2 | 6/2011 | Madan et al. |
| 7,973,778 B2 | 7/2011 | Chen |
| 8,001,189 B2 | 8/2011 | Nielsen et al. |
| 8,006,002 B2 | 8/2011 | Kalayjian et al. |
| 8,010,900 B2 | 8/2011 | Hart et al. |
| 8,020,028 B1 | 9/2011 | Lutter |
| 8,024,670 B1 | 9/2011 | Rahmation et al. |
| 8,040,142 B1 | 10/2011 | Bokma et al. |
| 8,046,712 B2 | 10/2011 | Landman et al. |
| 8,106,856 B2 | 1/2012 | Matas et al. |
| 8,125,440 B2 | 2/2012 | Guyot-Sionnest et al. |
| RE43,448 E | 6/2012 | Kimoto et al. |
| 8,209,628 B1 | 6/2012 | Davidson |
| 8,214,768 B2 | 7/2012 | Boule et al. |
| 8,239,784 B2 | 8/2012 | Hotelling et al. |
| 8,279,180 B2 | 10/2012 | Hotelling et al. |
| 8,363,020 B2 | 1/2013 | Li et al. |
| 8,381,135 B2 | 2/2013 | Hotelling et al. |
| 8,390,583 B2 | 3/2013 | Forutanpour et al. |
| 8,423,089 B2 | 4/2013 | Song et al. |
| 8,438,504 B2 | 5/2013 | Cranfill et al. |
| 8,446,376 B2 | 5/2013 | Levy et al. |
| 8,456,431 B2 | 6/2013 | Victor |
| 8,466,889 B2 | 6/2013 | Tong et al. |
| 8,479,122 B2 | 7/2013 | Hotelling et al. |
| 8,504,946 B2 | 8/2013 | Williamson et al. |
| 8,508,494 B2 | 8/2013 | Moore |
| 8,542,205 B1 | 9/2013 | Keller |
| 8,581,870 B2 | 11/2013 | Bokma et al. |
| 8,587,542 B2 | 11/2013 | Moore |
| 8,593,415 B2 | 11/2013 | Han et al. |
| 8,625,882 B2 | 1/2014 | Backlund et al. |
| 8,638,311 B2 | 1/2014 | Kang et al. |
| 8,665,227 B2 | 3/2014 | Gunawan |
| 8,669,945 B2 | 3/2014 | Coddington |
| 8,674,932 B2 | 3/2014 | Armstrong |
| 8,698,765 B1 | 4/2014 | Keller |
| 8,698,845 B2 | 4/2014 | Lemay |
| 8,717,305 B2 | 5/2014 | Williamson et al. |
| 8,743,069 B2 | 6/2014 | Morton et al. |
| 8,773,389 B1 | 7/2014 | Freed |
| 8,793,577 B2 | 7/2014 | Schellingerhout et al. |
| 8,799,816 B2 | 8/2014 | Wells et al. |
| 8,806,369 B2 | 8/2014 | Khoe et al. |
| 8,854,316 B2 | 10/2014 | Shenfield |
| 8,872,729 B2 | 10/2014 | Lyons et al. |
| 8,872,773 B2 | 10/2014 | Mak et al. |
| 8,875,044 B2 | 10/2014 | Ozawa et al. |
| 8,914,732 B2 | 12/2014 | Jun et al. |
| 8,952,987 B2 | 2/2015 | Momeyer et al. |
| 8,959,430 B1 | 2/2015 | Spivak et al. |
| 8,976,128 B2 | 3/2015 | Moore |
| 9,026,932 B1 | 5/2015 | Dixon |
| 9,030,419 B1 | 5/2015 | Freed |
| 9,030,436 B2 | 5/2015 | Ikeda |
| 9,058,186 B2 | 6/2015 | Chaudhri |
| 9,069,460 B2 | 6/2015 | Moore |
| 9,086,755 B2 | 7/2015 | Cho et al. |
| 9,092,058 B2 | 7/2015 | Kasahara et al. |
| 9,098,188 B2 | 8/2015 | Kim |
| 9,116,571 B2 | 8/2015 | Zeliff et al. |
| 9,122,364 B2 | 9/2015 | Kuwabara et al. |
| 9,148,618 B2 | 9/2015 | Matas et al. |
| 9,164,779 B2 | 10/2015 | Brakensiek et al. |
| 9,170,607 B2 | 10/2015 | Bose et al. |
| 9,218,105 B2 | 12/2015 | Mansson et al. |
| 9,244,562 B1 | 1/2016 | Rosenberg et al. |
| 9,244,576 B1 | 1/2016 | Vadagave et al. |
| 9,244,601 B2 | 1/2016 | Kim et al. |
| 9,246,487 B2 | 1/2016 | Casparian et al. |
| 9,262,002 B2 | 2/2016 | Momeyer et al. |
| 9,304,668 B2 | 4/2016 | Rezende et al. |
| 9,307,112 B2 | 4/2016 | Molgaard et al. |
| 9,349,552 B2 | 5/2016 | Huska et al. |
| 9,361,018 B2 | 6/2016 | Defazio et al. |
| 9,389,718 B1 | 7/2016 | Letourneur |
| 9,389,722 B2 | 7/2016 | Matsuki et al. |
| 9,400,581 B2 | 7/2016 | Bokma et al. |
| 9,405,367 B2 | 8/2016 | Jung et al. |
| 9,417,754 B2 | 8/2016 | Smith |
| 9,436,344 B2 | 9/2016 | Kuwabara et al. |
| 9,471,145 B2 | 10/2016 | Langlois et al. |
| 9,477,393 B2 | 10/2016 | Zambetti et al. |
| 9,542,013 B2 | 1/2017 | Dearman et al. |
| 9,600,114 B2 | 3/2017 | Milam et al. |
| 9,600,116 B2 | 3/2017 | Tao et al. |
| 2001/0024195 A1 | 9/2001 | Hayakawa et al. |
| 2001/0045965 A1 | 11/2001 | Orbanes et al. |
| 2002/0008691 A1 | 1/2002 | Hanajima et al. |
| 2002/0015024 A1 | 2/2002 | Westerman et al. |
| 2002/0015064 A1 | 2/2002 | Robotham et al. |
| 2002/0023038 A1 | 2/2002 | Fritsch et al. |
| 2002/0026321 A1 | 2/2002 | Faris et al. |
| 2002/0027957 A1 | 3/2002 | Paulraj et al. |
| 2002/0035534 A1 | 3/2002 | Buist et al. |
| 2002/0055899 A1 | 5/2002 | Williams |
| 2002/0073016 A1 | 6/2002 | Furbush et al. |
| 2002/0075289 A1 | 6/2002 | Hatori et al. |
| 2002/0077117 A1 | 6/2002 | Cloutier et al. |
| 2002/0107748 A1 | 8/2002 | Boies et al. |
| 2002/0109678 A1 | 8/2002 | Marmolin et al. |
| 2002/0120837 A1 | 8/2002 | Maxemchuk et al. |
| 2002/0138401 A1 | 9/2002 | Allen et al. |
| 2002/0140680 A1 | 10/2002 | Lu |
| 2002/0149609 A1 | 10/2002 | Suzuki et al. |
| 2002/0149630 A1 | 10/2002 | Kitainik et al. |
| 2002/0161687 A1 | 10/2002 | Serkin et al. |
| 2002/0161693 A1 | 10/2002 | Greenwalk |
| 2002/0178102 A1 | 11/2002 | Scheinberg et al. |
| 2002/0180763 A1 | 12/2002 | Kung |
| 2003/0001869 A1 | 1/2003 | Nissen |
| 2003/0074413 A1 | 4/2003 | Nielsen et al. |
| 2003/0086496 A1 | 5/2003 | Zhang et al. |
| 2003/0117440 A1 | 6/2003 | Hellyar et al. |
| 2003/0119562 A1 | 6/2003 | Kokubo |
| 2003/0151589 A1 | 8/2003 | Bensen et al. |
| 2003/0177154 A1 | 9/2003 | Vrancic |
| 2003/0184574 A1 | 10/2003 | Phillips et al. |
| 2003/0189647 A1 | 10/2003 | Kang |
| 2003/0206169 A1 | 11/2003 | Springer et al. |
| 2003/0222915 A1 | 12/2003 | Marion et al. |
| 2004/0021643 A1 | 2/2004 | Hoshino et al. |
| 2004/0025112 A1 | 2/2004 | Chasen et al. |
| 2004/0056849 A1 | 3/2004 | Lohbihler |
| 2004/0085328 A1 | 5/2004 | Maruyama et al. |
| 2004/0108995 A1 | 6/2004 | Hoshino et al. |
| 2004/0138849 A1 | 7/2004 | Schmidt et al. |
| 2004/0150631 A1 | 8/2004 | Fleck et al. |
| 2004/0150644 A1 | 8/2004 | Kincaid et al. |
| 2004/0155908 A1 | 8/2004 | Wagner |
| 2004/0174398 A1 | 9/2004 | Luke et al. |

(56) References Cited

U.S. PATENT DOCUMENTS

| | | |
|---|---|---|
| 2004/0174399 A1 | 9/2004 | Wu et al. |
| 2004/0219969 A1 | 11/2004 | Casey et al. |
| 2005/0012723 A1 | 1/2005 | Pallakoff |
| 2005/0022138 A1 | 1/2005 | Tunney |
| 2005/0073961 A1 | 4/2005 | Paik et al. |
| 2005/0110769 A1 | 5/2005 | DaCosta et al. |
| 2005/0125742 A1 | 6/2005 | Grotjohn et al. |
| 2005/0134578 A1 | 6/2005 | Chambers et al. |
| 2005/0177798 A1 | 8/2005 | Thomson et al. |
| 2005/0183017 A1 | 8/2005 | Cain |
| 2005/0183035 A1 | 8/2005 | Ringel et al. |
| 2005/0184973 A1 | 8/2005 | Lum et al. |
| 2005/0190059 A1 | 9/2005 | Wehrenberg |
| 2005/0190280 A1 | 9/2005 | Haas et al. |
| 2005/0204295 A1 | 9/2005 | Voorhees et al. |
| 2005/0223338 A1 | 10/2005 | Partanen |
| 2005/0229112 A1 | 10/2005 | Clay et al. |
| 2005/0289476 A1 | 12/2005 | Tokkonen |
| 2006/0017692 A1 | 1/2006 | Wehrenberg et al. |
| 2006/0022955 A1 | 2/2006 | Kennedy |
| 2006/0022956 A1 | 2/2006 | Lengeling et al. |
| 2006/0026535 A1 | 2/2006 | Hotelling et al. |
| 2006/0026536 A1 | 2/2006 | Hotelling et al. |
| 2006/0033724 A1 | 2/2006 | Chaudhri et al. |
| 2006/0036971 A1 | 2/2006 | Mendel et al. |
| 2006/0041846 A1 | 2/2006 | Masselle et al. |
| 2006/0055662 A1 | 3/2006 | Rimas-Ribikauskas et al. |
| 2006/0059436 A1 | 3/2006 | Nurmi |
| 2006/0067677 A1 | 3/2006 | Tokiwa et al. |
| 2006/0101347 A1 | 5/2006 | Runov et al. |
| 2006/0107226 A1 | 5/2006 | Matthews et al. |
| 2006/0109252 A1 | 5/2006 | Kolmykov-Zotov et al. |
| 2006/0109256 A1 | 5/2006 | Grant et al. |
| 2006/0119586 A1 | 6/2006 | Grant et al. |
| 2006/0132455 A1 | 6/2006 | Rimas-Ribikauskas et al. |
| 2006/0132456 A1 | 6/2006 | Anson |
| 2006/0132457 A1 | 6/2006 | Rimas-Ribikauskas et al. |
| 2006/0136834 A1 | 6/2006 | Cao et al. |
| 2006/0136845 A1 | 6/2006 | Rimas-Ribikauskas et al. |
| 2006/0161861 A1 | 7/2006 | Holecek et al. |
| 2006/0161868 A1 | 7/2006 | Van et al. |
| 2006/0197753 A1 | 9/2006 | Hotelling |
| 2006/0212812 A1 | 9/2006 | Simmons et al. |
| 2006/0213754 A1 | 9/2006 | Jarrett et al. |
| 2006/0224986 A1 | 10/2006 | Lindsay et al. |
| 2006/0233248 A1 | 10/2006 | Rynderman et al. |
| 2006/0242602 A1 | 10/2006 | Schechter et al. |
| 2006/0265653 A1 | 11/2006 | Paasonen et al. |
| 2006/0274042 A1 | 12/2006 | Krah et al. |
| 2006/0277469 A1 | 12/2006 | Chaudhri et al. |
| 2006/0282778 A1 | 12/2006 | Barsness et al. |
| 2006/0284858 A1 | 12/2006 | Rekimoto |
| 2006/0290681 A1 | 12/2006 | Ho et al. |
| 2007/0004451 A1 | 1/2007 | Anderson |
| 2007/0004461 A1 | 1/2007 | Bathina et al. |
| 2007/0024595 A1 | 2/2007 | Baker et al. |
| 2007/0024646 A1 | 2/2007 | Saarinen et al. |
| 2007/0070066 A1 | 3/2007 | Bakhash |
| 2007/0080953 A1 | 4/2007 | Lii |
| 2007/0113681 A1 | 5/2007 | Nishimura et al. |
| 2007/0115264 A1 | 5/2007 | Yu et al. |
| 2007/0120835 A1 | 5/2007 | Sato |
| 2007/0124699 A1 | 5/2007 | Michaels |
| 2007/0128899 A1 | 6/2007 | Mayer |
| 2007/0152980 A1 | 7/2007 | Kocienda et al. |
| 2007/0157089 A1 | 7/2007 | Van Os et al. |
| 2007/0168369 A1 | 7/2007 | Bruns |
| 2007/0168890 A1 | 7/2007 | Zhao et al. |
| 2007/0176904 A1 | 8/2007 | Russo |
| 2007/0186178 A1 | 8/2007 | Schiller |
| 2007/0220445 A1 | 9/2007 | Yach et al. |
| 2007/0222768 A1 | 9/2007 | Geurts et al. |
| 2007/0226327 A1 | 9/2007 | Redpath |
| 2007/0229455 A1 | 10/2007 | Martin et al. |
| 2007/0229464 A1 | 10/2007 | Hotelling et al. |
| 2007/0236450 A1 | 10/2007 | Colgate et al. |
| 2007/0236477 A1 | 10/2007 | Ryu et al. |
| 2007/0245241 A1 | 10/2007 | Bertram et al. |
| 2007/0245249 A1 | 10/2007 | Weisberg |
| 2007/0257821 A1 | 11/2007 | Son et al. |
| 2007/0262964 A1 | 11/2007 | Zotov et al. |
| 2007/0270182 A1 | 11/2007 | Gulliksson et al. |
| 2007/0294295 A1 | 12/2007 | Finkelstein et al. |
| 2007/0294639 A1 | 12/2007 | Van Berkel et al. |
| 2007/0296333 A1 | 12/2007 | Kim et al. |
| 2008/0001924 A1 | 1/2008 | dos los Reyes et al. |
| 2008/0024459 A1 | 1/2008 | Poupyrev et al. |
| 2008/0034306 A1 | 2/2008 | Ording |
| 2008/0036743 A1 | 2/2008 | Westerman et al. |
| 2008/0051989 A1 | 2/2008 | Welsh |
| 2008/0052945 A1 | 3/2008 | Matas et al. |
| 2008/0066010 A1 | 3/2008 | Brodersen et al. |
| 2008/0094367 A1 | 4/2008 | Van De Ven et al. |
| 2008/0094368 A1 | 4/2008 | Ording et al. |
| 2008/0106523 A1 | 5/2008 | Conrad |
| 2008/0109753 A1 | 5/2008 | Karstens |
| 2008/0136790 A1 | 6/2008 | Hio |
| 2008/0155415 A1 | 6/2008 | Yoon et al. |
| 2008/0165144 A1 | 7/2008 | Forstall et al. |
| 2008/0165152 A1 | 7/2008 | Forstall et al. |
| 2008/0168379 A1 | 7/2008 | Forstall et al. |
| 2008/0168395 A1 | 7/2008 | Ording et al. |
| 2008/0168401 A1 | 7/2008 | Boule et al. |
| 2008/0168403 A1 | 7/2008 | Westerman et al. |
| 2008/0202824 A1 | 8/2008 | Philipp et al. |
| 2008/0204424 A1 | 8/2008 | Jin et al. |
| 2008/0204427 A1 | 8/2008 | Heesemans et al. |
| 2008/0211959 A1 | 9/2008 | Balram et al. |
| 2008/0219493 A1 | 9/2008 | Tadmor |
| 2008/0222545 A1 | 9/2008 | Lemay et al. |
| 2008/0222569 A1 | 9/2008 | Champion et al. |
| 2008/0259046 A1 | 10/2008 | Carsanaro |
| 2008/0263452 A1 | 10/2008 | Tomkins |
| 2008/0270910 A1 | 10/2008 | Lukasik et al. |
| 2008/0284866 A1 | 11/2008 | Mizutani |
| 2008/0294984 A1 | 11/2008 | Ramsay et al. |
| 2008/0297475 A1 | 12/2008 | Woolf et al. |
| 2008/0303799 A1* | 12/2008 | Schwesig ............ G06F 3/0414 345/173 |
| 2008/0307335 A1 | 12/2008 | Chaudhri et al. |
| 2008/0307351 A1 | 12/2008 | Louch et al. |
| 2008/0307359 A1 | 12/2008 | Louch et al. |
| 2008/0307360 A1 | 12/2008 | Chaudhri et al. |
| 2008/0316183 A1 | 12/2008 | Westerman et al. |
| 2008/0317378 A1 | 12/2008 | Steinberg et al. |
| 2008/0320391 A1 | 12/2008 | Lemay et al. |
| 2008/0320419 A1 | 12/2008 | Matas et al. |
| 2009/0002392 A1 | 1/2009 | Hou et al. |
| 2009/0007017 A1 | 1/2009 | Anzures et al. |
| 2009/0036108 A1 | 2/2009 | Chou |
| 2009/0037846 A1 | 2/2009 | Spalink et al. |
| 2009/0046110 A1 | 2/2009 | Sadler et al. |
| 2009/0051667 A1 | 2/2009 | Park et al. |
| 2009/0058828 A1 | 3/2009 | Jiang et al. |
| 2009/0066668 A1 | 3/2009 | Kim et al. |
| 2009/0073118 A1 | 3/2009 | Yamaji et al. |
| 2009/0083665 A1 | 3/2009 | Anttila et al. |
| 2009/0085878 A1 | 4/2009 | Heubel et al. |
| 2009/0085881 A1 | 4/2009 | Keam |
| 2009/0085886 A1 | 4/2009 | Huang et al. |
| 2009/0094562 A1 | 4/2009 | Jeong et al. |
| 2009/0100343 A1 | 4/2009 | Lee et al. |
| 2009/0102804 A1 | 4/2009 | Wong et al. |
| 2009/0102805 A1 | 4/2009 | Meijer et al. |
| 2009/0140985 A1 | 6/2009 | Liu |
| 2009/0158198 A1 | 6/2009 | Hayter et al. |
| 2009/0160793 A1 | 6/2009 | Rekimoto |
| 2009/0160814 A1 | 6/2009 | Li et al. |
| 2009/0167507 A1 | 7/2009 | Maenpaa |
| 2009/0167508 A1 | 7/2009 | Fadell et al. |
| 2009/0167509 A1 | 7/2009 | Fadell et al. |
| 2009/0167704 A1 | 7/2009 | Terlizzi et al. |
| 2009/0167728 A1 | 7/2009 | Geaghan et al. |
| 2009/0169061 A1 | 7/2009 | Anderson et al. |

(56) References Cited

U.S. PATENT DOCUMENTS

| | | |
|---|---|---|
| 2009/0197635 A1 | 8/2009 | Kim et al. |
| 2009/0225037 A1 | 9/2009 | Williamson et al. |
| 2009/0237374 A1 | 9/2009 | Li et al. |
| 2009/0247112 A1 | 10/2009 | Lundy et al. |
| 2009/0256947 A1 | 10/2009 | Ciurea et al. |
| 2009/0267906 A1 | 10/2009 | Schroderus |
| 2009/0282360 A1 | 11/2009 | Park et al. |
| 2009/0293007 A1 | 11/2009 | Duarte et al. |
| 2009/0293009 A1 | 11/2009 | Meserth et al. |
| 2009/0303187 A1 | 12/2009 | Pallakoff |
| 2009/0307633 A1 | 12/2009 | Haughay, Jr. et al. |
| 2009/0322893 A1 | 12/2009 | Stallings et al. |
| 2010/0007926 A1 | 1/2010 | Imaizumi et al. |
| 2010/0011304 A1 | 1/2010 | Van Os |
| 2010/0013777 A1 | 1/2010 | Baudisch et al. |
| 2010/0017710 A1 | 1/2010 | Kim et al. |
| 2010/0023858 A1 | 1/2010 | Ryu et al. |
| 2010/0026640 A1 | 2/2010 | Kim et al. |
| 2010/0026647 A1 | 2/2010 | Abe et al. |
| 2010/0039446 A1 | 2/2010 | Hillis et al. |
| 2010/0044121 A1 | 2/2010 | Simon et al. |
| 2010/0057235 A1 | 3/2010 | Wang et al. |
| 2010/0058231 A1 | 3/2010 | Duarte et al. |
| 2010/0070908 A1 | 3/2010 | Mori et al. |
| 2010/0073329 A1 | 3/2010 | Raman et al. |
| 2010/0083116 A1 | 4/2010 | Akifusa et al. |
| 2010/0085302 A1 | 4/2010 | Fairweather et al. |
| 2010/0085314 A1 | 4/2010 | Kwok |
| 2010/0085317 A1 | 4/2010 | Park et al. |
| 2010/0088596 A1 | 4/2010 | Griffin et al. |
| 2010/0088628 A1 | 4/2010 | Flygh et al. |
| 2010/0090988 A1 | 4/2010 | Park |
| 2010/0125816 A1 | 5/2010 | Bezos |
| 2010/0127983 A1 | 5/2010 | Irani et al. |
| 2010/0128002 A1 | 5/2010 | Stacy et al. |
| 2010/0138776 A1 | 6/2010 | Korhonen |
| 2010/0148999 A1 | 6/2010 | Casparian et al. |
| 2010/0149096 A1 | 6/2010 | Migos et al. |
| 2010/0156812 A1 | 6/2010 | Stallings et al. |
| 2010/0156818 A1 | 6/2010 | Burrough et al. |
| 2010/0156823 A1 | 6/2010 | Paleczny et al. |
| 2010/0156825 A1 | 6/2010 | Sohn et al. |
| 2010/0175023 A1 | 7/2010 | Gatlin et al. |
| 2010/0180225 A1 | 7/2010 | Chiba et al. |
| 2010/0194693 A1 | 8/2010 | Selin et al. |
| 2010/0199227 A1 | 8/2010 | Xiao et al. |
| 2010/0211872 A1 | 8/2010 | Rolston et al. |
| 2010/0214257 A1 | 8/2010 | Wussler et al. |
| 2010/0225604 A1 | 9/2010 | Homma et al. |
| 2010/0228644 A1 | 9/2010 | Schluetter |
| 2010/0231534 A1 | 9/2010 | Chaudhri et al. |
| 2010/0235735 A1 | 9/2010 | Ording et al. |
| 2010/0235746 A1 | 9/2010 | Anzures |
| 2010/0251168 A1 | 9/2010 | Fujita et al. |
| 2010/0269039 A1 | 10/2010 | Pahlavan et al. |
| 2010/0271312 A1 | 10/2010 | Alameh et al. |
| 2010/0271500 A1 | 10/2010 | Park et al. |
| 2010/0289807 A1 | 11/2010 | Yu et al. |
| 2010/0299597 A1 | 11/2010 | Shin et al. |
| 2010/0302177 A1 | 12/2010 | Kim et al. |
| 2010/0302179 A1 | 12/2010 | Ahn et al. |
| 2010/0306702 A1 | 12/2010 | Warner |
| 2010/0308983 A1 | 12/2010 | Conte et al. |
| 2010/0309147 A1 | 12/2010 | Fleizach et al. |
| 2010/0313124 A1 | 12/2010 | Privault et al. |
| 2010/0313156 A1 | 12/2010 | Louch et al. |
| 2010/0313158 A1 | 12/2010 | Lee et al. |
| 2010/0313166 A1 | 12/2010 | Nakayama et al. |
| 2010/0315417 A1 | 12/2010 | Cho et al. |
| 2010/0315438 A1 | 12/2010 | Horodezky et al. |
| 2010/0321301 A1 | 12/2010 | Casparian et al. |
| 2010/0325578 A1 | 12/2010 | Mital et al. |
| 2011/0018695 A1 | 1/2011 | Bells et al. |
| 2011/0035662 A1 | 2/2011 | King et al. |
| 2011/0043652 A1 | 2/2011 | King et al. |
| 2011/0050588 A1 | 3/2011 | Li et al. |
| 2011/0050591 A1 | 3/2011 | Kim et al. |
| 2011/0050594 A1 | 3/2011 | Kim et al. |
| 2011/0050629 A1 | 3/2011 | Homma et al. |
| 2011/0050630 A1 | 3/2011 | Ikeda |
| 2011/0050653 A1 | 3/2011 | Miyazawa et al. |
| 2011/0054837 A1 | 3/2011 | Ikeda |
| 2011/0055135 A1 | 3/2011 | Dawson et al. |
| 2011/0057903 A1 | 3/2011 | Yamano et al. |
| 2011/0061029 A1 | 3/2011 | Yeh et al. |
| 2011/0063248 A1 | 3/2011 | Yoon |
| 2011/0069012 A1 | 3/2011 | Martensson |
| 2011/0069016 A1 | 3/2011 | Victor |
| 2011/0074697 A1 | 3/2011 | Rapp et al. |
| 2011/0080350 A1 | 4/2011 | Almalki et al. |
| 2011/0084910 A1 | 4/2011 | Almalki et al. |
| 2011/0087982 A1 | 4/2011 | McCann et al. |
| 2011/0087983 A1 | 4/2011 | Shim |
| 2011/0093815 A1 | 4/2011 | Gobeil |
| 2011/0093817 A1 | 4/2011 | Song et al. |
| 2011/0096174 A1 | 4/2011 | King et al. |
| 2011/0107272 A1 | 5/2011 | Aguilar |
| 2011/0115721 A1 | 5/2011 | Li et al. |
| 2011/0116716 A1 | 5/2011 | Kwon et al. |
| 2011/0122087 A1 | 5/2011 | Jang et al. |
| 2011/0141031 A1 | 6/2011 | McCullough et al. |
| 2011/0141052 A1 | 6/2011 | Bernstein et al. |
| 2011/0144777 A1 | 6/2011 | Firkins et al. |
| 2011/0145068 A1 | 6/2011 | King et al. |
| 2011/0145752 A1 | 6/2011 | Fagans |
| 2011/0145753 A1 | 6/2011 | Prakash |
| 2011/0145764 A1 | 6/2011 | Higuchi et al. |
| 2011/0149138 A1 | 6/2011 | Watkins et al. |
| 2011/0163971 A1 | 7/2011 | Wagner et al. |
| 2011/0164042 A1 | 7/2011 | Chaudhri |
| 2011/0167058 A1 | 7/2011 | Van Os |
| 2011/0167339 A1 | 7/2011 | Lemay |
| 2011/0167382 A1 | 7/2011 | Van Os |
| 2011/0169765 A1 | 7/2011 | Aono |
| 2011/0175830 A1 | 7/2011 | Miyazawa et al. |
| 2011/0179368 A1 | 7/2011 | King et al. |
| 2011/0179381 A1 | 7/2011 | King |
| 2011/0181538 A1 | 7/2011 | Aono |
| 2011/0185299 A1 | 7/2011 | Hinckley et al. |
| 2011/0185300 A1 | 7/2011 | Hinckley et al. |
| 2011/0185316 A1 | 7/2011 | Reid et al. |
| 2011/0193809 A1 | 8/2011 | Walley et al. |
| 2011/0193881 A1 | 8/2011 | Rydenhag |
| 2011/0201387 A1 | 8/2011 | Paek et al. |
| 2011/0202834 A1 | 8/2011 | Mandryk et al. |
| 2011/0202853 A1 | 8/2011 | Mujkic |
| 2011/0202872 A1 | 8/2011 | Park |
| 2011/0205163 A1 | 8/2011 | Hinckley et al. |
| 2011/0209088 A1 | 8/2011 | Hinckley et al. |
| 2011/0209093 A1 | 8/2011 | Hinckley et al. |
| 2011/0209099 A1 | 8/2011 | Hinckley et al. |
| 2011/0210931 A1 | 9/2011 | Shai |
| 2011/0215914 A1 | 9/2011 | Edwards |
| 2011/0221684 A1 | 9/2011 | Rydenhag |
| 2011/0221776 A1 | 9/2011 | Shimotani et al. |
| 2011/0231789 A1 | 9/2011 | Bukurak et al. |
| 2011/0238690 A1 | 9/2011 | Arrasvouri et al. |
| 2011/0239110 A1 | 9/2011 | Garrett et al. |
| 2011/0242029 A1 | 10/2011 | Kasahara et al. |
| 2011/0246877 A1 | 10/2011 | Kwak et al. |
| 2011/0248948 A1 | 10/2011 | Griffin et al. |
| 2011/0252357 A1 | 10/2011 | Chaudhri |
| 2011/0252362 A1 | 10/2011 | Cho et al. |
| 2011/0252376 A1 | 10/2011 | Chaudhri et al. |
| 2011/0258537 A1 | 10/2011 | Rives et al. |
| 2011/0258582 A1 | 10/2011 | Bang |
| 2011/0263298 A1 | 10/2011 | Park |
| 2011/0267530 A1 | 11/2011 | Chun |
| 2011/0279380 A1 | 11/2011 | Weber et al. |
| 2011/0279381 A1 | 11/2011 | Tong et al. |
| 2011/0279395 A1 | 11/2011 | Kuwabara et al. |
| 2011/0279852 A1 | 11/2011 | Oda et al. |
| 2011/0285656 A1 | 11/2011 | Yaksick et al. |
| 2011/0285659 A1 | 11/2011 | Kuwabara et al. |

(56) References Cited

U.S. PATENT DOCUMENTS

| | | |
|---|---|---|
| 2011/0291951 A1 | 12/2011 | Tong |
| 2011/0296333 A1 | 12/2011 | Bateman et al. |
| 2011/0296351 A1 | 12/2011 | Ewing, Jr. et al. |
| 2011/0304559 A1 | 12/2011 | Pasquero |
| 2011/0304577 A1 | 12/2011 | Brown et al. |
| 2011/0307778 A1 | 12/2011 | Tsai et al. |
| 2011/0310049 A1 | 12/2011 | Homma et al. |
| 2012/0011437 A1 | 1/2012 | James et al. |
| 2012/0013541 A1 | 1/2012 | Boka et al. |
| 2012/0013542 A1 | 1/2012 | Shenfield |
| 2012/0019448 A1 | 1/2012 | Pitkanen et al. |
| 2012/0026110 A1 | 2/2012 | Yamano |
| 2012/0036556 A1 | 2/2012 | LeBeau et al. |
| 2012/0038580 A1 | 2/2012 | Sasaki |
| 2012/0044153 A1 | 2/2012 | Arrasvouri et al. |
| 2012/0056837 A1 | 3/2012 | Park et al. |
| 2012/0056848 A1 | 3/2012 | Yamano et al. |
| 2012/0062564 A1 | 3/2012 | Miyashita et al. |
| 2012/0062604 A1 | 3/2012 | Lobo |
| 2012/0066630 A1 | 3/2012 | Kim et al. |
| 2012/0066648 A1 | 3/2012 | Rolleston et al. |
| 2012/0081375 A1 | 4/2012 | Robert et al. |
| 2012/0084689 A1 | 4/2012 | Ledet et al. |
| 2012/0089932 A1 | 4/2012 | Kano et al. |
| 2012/0089951 A1 | 4/2012 | Cassidy |
| 2012/0092355 A1 | 4/2012 | Yamamoto et al. |
| 2012/0096393 A1 | 4/2012 | Shim et al. |
| 2012/0098780 A1 | 4/2012 | Fujisawa et al. |
| 2012/0102437 A1 | 4/2012 | Worley et al. |
| 2012/0105358 A1 | 5/2012 | Momeyer et al. |
| 2012/0105367 A1 | 5/2012 | Son et al. |
| 2012/0106852 A1 | 5/2012 | Khawand et al. |
| 2012/0113023 A1 | 5/2012 | Koch et al. |
| 2012/0126962 A1 | 5/2012 | Ujii et al. |
| 2012/0131495 A1 | 5/2012 | Goossens et al. |
| 2012/0139864 A1 | 6/2012 | Sleeman et al. |
| 2012/0146945 A1 | 6/2012 | Miyazawa et al. |
| 2012/0147052 A1 | 6/2012 | Homma et al. |
| 2012/0154328 A1 | 6/2012 | Kono |
| 2012/0154329 A1 | 6/2012 | Shinozaki |
| 2012/0159380 A1 | 6/2012 | Kocienda et al. |
| 2012/0169646 A1 | 7/2012 | Berkes et al. |
| 2012/0176403 A1 | 7/2012 | Cha et al. |
| 2012/0179967 A1 | 7/2012 | Hayes |
| 2012/0182226 A1 | 7/2012 | Tuli |
| 2012/0183271 A1 | 7/2012 | Forutanpour et al. |
| 2012/0206393 A1 | 8/2012 | Hillis et al. |
| 2012/0216114 A1 | 8/2012 | Privault et al. |
| 2012/0216139 A1 | 8/2012 | Ording et al. |
| 2012/0216143 A1 | 8/2012 | Shiplacoff et al. |
| 2012/0218203 A1 | 8/2012 | Kanki |
| 2012/0218304 A1 | 8/2012 | Anzures et al. |
| 2012/0235912 A1 | 9/2012 | Laubach |
| 2012/0240044 A1 | 9/2012 | Johnson et al. |
| 2012/0249575 A1 | 10/2012 | Krolczyk et al. |
| 2012/0249853 A1 | 10/2012 | Krolczyk et al. |
| 2012/0256846 A1 | 10/2012 | Mak |
| 2012/0256847 A1 | 10/2012 | Mak et al. |
| 2012/0256857 A1 | 10/2012 | Mak |
| 2012/0257071 A1 | 10/2012 | Prentice |
| 2012/0260220 A1 | 10/2012 | Griffin |
| 2012/0274591 A1 | 11/2012 | Rimas-Ribikauskas et al. |
| 2012/0274662 A1 | 11/2012 | Kim et al. |
| 2012/0284673 A1 | 11/2012 | Lamb et al. |
| 2012/0293449 A1 | 11/2012 | Dietz |
| 2012/0293551 A1 | 11/2012 | Momeyer et al. |
| 2012/0299859 A1 | 11/2012 | Kinoshita |
| 2012/0304132 A1 | 11/2012 | Sareen et al. |
| 2012/0304133 A1 | 11/2012 | Nan et al. |
| 2012/0306748 A1 | 12/2012 | Fleizach et al. |
| 2012/0306764 A1 | 12/2012 | Kamibeppu |
| 2012/0306765 A1 | 12/2012 | Moore |
| 2012/0306766 A1 | 12/2012 | Moore |
| 2012/0306772 A1 | 12/2012 | Tan et al. |
| 2012/0306778 A1 | 12/2012 | Wheeldreyer et al. |
| 2012/0311429 A1 | 12/2012 | Decker et al. |
| 2012/0311437 A1 | 12/2012 | Weeldreyer et al. |
| 2012/0311498 A1 | 12/2012 | Kluttz et al. |
| 2013/0002561 A1 | 1/2013 | Wakasa |
| 2013/0016042 A1 | 1/2013 | Makinen et al. |
| 2013/0019158 A1 | 1/2013 | Watanabe |
| 2013/0019174 A1 | 1/2013 | Gil et al. |
| 2013/0044062 A1 | 2/2013 | Bose et al. |
| 2013/0047100 A1 | 2/2013 | Kroeger et al. |
| 2013/0050131 A1 | 2/2013 | Lee et al. |
| 2013/0061172 A1 | 3/2013 | Huang et al. |
| 2013/0063389 A1 | 3/2013 | Moore |
| 2013/0067383 A1 | 3/2013 | Kataoka et al. |
| 2013/0067513 A1 | 3/2013 | Takami |
| 2013/0077804 A1 | 3/2013 | Glebe et al. |
| 2013/0080923 A1 | 3/2013 | Anzures et al. |
| 2013/0082824 A1 | 4/2013 | Colley |
| 2013/0093691 A1 | 4/2013 | Moosavi |
| 2013/0097520 A1 | 4/2013 | Lewin et al. |
| 2013/0097521 A1 | 4/2013 | Lewin et al. |
| 2013/0097534 A1 | 4/2013 | Lewin et al. |
| 2013/0097539 A1 | 4/2013 | Mansson et al. |
| 2013/0097562 A1 | 4/2013 | Kermoian et al. |
| 2013/0106766 A1 | 5/2013 | Yilmaz et al. |
| 2013/0113720 A1 | 5/2013 | Van Eerd et al. |
| 2013/0120295 A1 | 5/2013 | Kim et al. |
| 2013/0135243 A1 | 5/2013 | Hirsch et al. |
| 2013/0135499 A1 | 5/2013 | Song |
| 2013/0141364 A1 | 6/2013 | Lynn et al. |
| 2013/0141396 A1 | 6/2013 | Lynn et al. |
| 2013/0145313 A1 | 6/2013 | Roh et al. |
| 2013/0154948 A1 | 6/2013 | Schediwy et al. |
| 2013/0154959 A1 | 6/2013 | Lindsay et al. |
| 2013/0155018 A1 | 6/2013 | Dagdeviren |
| 2013/0159893 A1 | 6/2013 | Lewin et al. |
| 2013/0162667 A1 | 6/2013 | Eskolin et al. |
| 2013/0169549 A1 | 7/2013 | Seymour et al. |
| 2013/0174094 A1 | 7/2013 | Heo et al. |
| 2013/0174179 A1 | 7/2013 | Park et al. |
| 2013/0179840 A1 | 7/2013 | Fisher et al. |
| 2013/0191791 A1 | 7/2013 | Rydenhag et al. |
| 2013/0198690 A1 | 8/2013 | Barsoum et al. |
| 2013/0212541 A1 | 8/2013 | Dolenc et al. |
| 2013/0222274 A1 | 8/2013 | Mori et al. |
| 2013/0222671 A1 | 8/2013 | Tseng et al. |
| 2013/0227450 A1 | 8/2013 | Na et al. |
| 2013/0232402 A1 | 9/2013 | Lu et al. |
| 2013/0232445 A1 | 9/2013 | Ording et al. |
| 2013/0234929 A1 | 9/2013 | Libin |
| 2013/0249814 A1 | 9/2013 | Zeng |
| 2013/0257793 A1 | 10/2013 | Zeliff et al. |
| 2013/0257817 A1 | 10/2013 | Yliaho |
| 2013/0265246 A1 | 10/2013 | Tae |
| 2013/0268875 A1 | 10/2013 | Han et al. |
| 2013/0278520 A1 | 10/2013 | Weng et al. |
| 2013/0325342 A1 | 12/2013 | Pylappan et al. |
| 2013/0326420 A1 | 12/2013 | Liu et al. |
| 2013/0326421 A1 | 12/2013 | Jo |
| 2013/0328770 A1 | 12/2013 | Parham |
| 2013/0332892 A1 | 12/2013 | Matsuki |
| 2013/0339909 A1 | 12/2013 | Ha |
| 2014/0002355 A1 | 1/2014 | Lee et al. |
| 2014/0002374 A1 | 1/2014 | Hunt et al. |
| 2014/0002386 A1 | 1/2014 | Rosenberg et al. |
| 2014/0026098 A1 | 1/2014 | Gilman |
| 2014/0028571 A1 | 1/2014 | St. Clair |
| 2014/0028601 A1 | 1/2014 | Moore |
| 2014/0049491 A1 | 2/2014 | Nagar et al. |
| 2014/0055367 A1 | 2/2014 | Dearman et al. |
| 2014/0055377 A1 | 2/2014 | Kim |
| 2014/0059485 A1 | 2/2014 | Lehrian et al. |
| 2014/0063316 A1 | 3/2014 | Lee et al. |
| 2014/0078343 A1 | 3/2014 | Dai et al. |
| 2014/0082536 A1 | 3/2014 | Costa et al. |
| 2014/0092025 A1 | 4/2014 | Pala et al. |
| 2014/0109016 A1 | 4/2014 | Ouyang et al. |
| 2014/0111456 A1 | 4/2014 | Kashiwa et al. |
| 2014/0111670 A1 | 4/2014 | Lord et al. |
| 2014/0139471 A1 | 5/2014 | Matsuki |

(56) References Cited

U.S. PATENT DOCUMENTS

| | | |
|---|---|---|
| 2014/0152581 A1 | 6/2014 | Case et al. |
| 2014/0157203 A1 | 6/2014 | Jeon et al. |
| 2014/0160063 A1 | 6/2014 | Yairi et al. |
| 2014/0160073 A1 | 6/2014 | Matsuki |
| 2014/0165006 A1 | 6/2014 | Chaudhri et al. |
| 2014/0168093 A1 | 6/2014 | Lawrence |
| 2014/0168153 A1 | 6/2014 | Deichmann et al. |
| 2014/0173517 A1 | 6/2014 | Chaudhri |
| 2014/0184526 A1 | 7/2014 | Cho |
| 2014/0210758 A1 | 7/2014 | Park et al. |
| 2014/0210798 A1 | 7/2014 | Wilson |
| 2014/0229888 A1 | 8/2014 | Ko et al. |
| 2014/0245202 A1 | 8/2014 | Yoon et al. |
| 2014/0267114 A1 | 9/2014 | Lisseman et al. |
| 2014/0267135 A1 | 9/2014 | Chhabra |
| 2014/0282084 A1 | 9/2014 | Murarka et al. |
| 2014/0282214 A1 | 9/2014 | Shirzadi et al. |
| 2014/0300569 A1 | 10/2014 | Matsuki |
| 2014/0304651 A1 | 10/2014 | Johansson et al. |
| 2014/0306897 A1 | 10/2014 | Cueto |
| 2014/0306899 A1 | 10/2014 | Hicks |
| 2014/0310638 A1 | 10/2014 | Lee et al. |
| 2014/0313130 A1 | 10/2014 | Yamano et al. |
| 2014/0333561 A1 | 11/2014 | Bull et al. |
| 2014/0344765 A1 | 11/2014 | Hicks et al. |
| 2014/0354845 A1 | 12/2014 | Molgaard et al. |
| 2014/0354850 A1 | 12/2014 | Kosaka et al. |
| 2014/0359528 A1 | 12/2014 | Murata |
| 2014/0380247 A1 | 12/2014 | Tecarro et al. |
| 2015/0015763 A1 | 1/2015 | Lee et al. |
| 2015/0020036 A1 | 1/2015 | Kim et al. |
| 2015/0026584 A1 | 1/2015 | Kobayakov et al. |
| 2015/0026592 A1 | 1/2015 | Mohammed et al. |
| 2015/0029149 A1 | 1/2015 | Andersson et al. |
| 2015/0033184 A1 | 1/2015 | Kim et al. |
| 2015/0046876 A1 | 2/2015 | Goldenberg |
| 2015/0058723 A1 | 2/2015 | Cieplinski et al. |
| 2015/0062052 A1 | 3/2015 | Bernstein et al. |
| 2015/0062068 A1 | 3/2015 | Shih et al. |
| 2015/0067495 A1 | 3/2015 | Bernstein et al. |
| 2015/0067496 A1 | 3/2015 | Missig et al. |
| 2015/0067497 A1 | 3/2015 | Cieplinski et al. |
| 2015/0067513 A1 | 3/2015 | Zambetti et al. |
| 2015/0067519 A1 | 3/2015 | Missig et al. |
| 2015/0067559 A1 | 3/2015 | Missig et al. |
| 2015/0067560 A1 | 3/2015 | Cieplinski et al. |
| 2015/0067563 A1 | 3/2015 | Bernstein et al. |
| 2015/0067596 A1 | 3/2015 | Brown et al. |
| 2015/0067601 A1 | 3/2015 | Bernstein et al. |
| 2015/0067602 A1 | 3/2015 | Bernstein et al. |
| 2015/0067605 A1 | 3/2015 | Zambetti et al. |
| 2015/0071547 A1 | 3/2015 | Keating et al. |
| 2015/0116205 A1 | 4/2015 | Westerman et al. |
| 2015/0121225 A1 | 4/2015 | Somasundaram et al. |
| 2015/0128092 A1 | 5/2015 | Lee et al. |
| 2015/0135109 A1 | 5/2015 | Zambetti et al. |
| 2015/0138126 A1 | 5/2015 | Westerman |
| 2015/0139605 A1 | 5/2015 | Wiklof |
| 2015/0143273 A1 | 5/2015 | Bernstein et al. |
| 2015/0149899 A1 | 5/2015 | Bernstein et al. |
| 2015/0149964 A1 | 5/2015 | Bernstein et al. |
| 2015/0149967 A1 | 5/2015 | Bernstein et al. |
| 2015/0153929 A1 | 6/2015 | Bernstein et al. |
| 2015/0160729 A1 | 6/2015 | Nakagawa |
| 2015/0205495 A1 | 7/2015 | Koide et al. |
| 2015/0234446 A1 | 8/2015 | Nathan et al. |
| 2015/0253866 A1 | 9/2015 | Amm et al. |
| 2015/0268813 A1 | 9/2015 | Bos |
| 2015/0321607 A1 | 11/2015 | Cho et al. |
| 2015/0332107 A1 | 11/2015 | Paniaras |
| 2015/0378519 A1 | 12/2015 | Brown et al. |
| 2015/0378982 A1 | 12/2015 | McKenzie et al. |
| 2015/0381931 A1 | 12/2015 | Uhma et al. |
| 2016/0004427 A1 | 1/2016 | Zambetti et al. |
| 2016/0004428 A1 | 1/2016 | Bernstein et al. |
| 2016/0004429 A1 | 1/2016 | Bernstein et al. |
| 2016/0004430 A1 | 1/2016 | Missig et al. |
| 2016/0004431 A1 | 1/2016 | Bernstein et al. |
| 2016/0004432 A1 | 1/2016 | Bernstein et al. |
| 2016/0011771 A1 | 1/2016 | Cieplinski |
| 2016/0019718 A1 | 1/2016 | Mukkamala et al. |
| 2016/0041750 A1 | 2/2016 | Cieplinski et al. |
| 2016/0048326 A1 | 2/2016 | Kim et al. |
| 2016/0062466 A1 | 3/2016 | Moussette et al. |
| 2016/0062619 A1 | 3/2016 | Reeve et al. |
| 2016/0070401 A1 | 3/2016 | Kim et al. |
| 2016/0132139 A1 | 5/2016 | Du et al. |
| 2016/0188181 A1 | 6/2016 | Smith |
| 2016/0210025 A1 | 7/2016 | Bernstein et al. |
| 2016/0224220 A1 | 8/2016 | Ganguly |
| 2016/0259412 A1 | 9/2016 | Flint et al. |
| 2016/0259413 A1 | 9/2016 | Anzures et al. |
| 2016/0259495 A1 | 9/2016 | Butcher et al. |
| 2016/0259496 A1 | 9/2016 | Butcher et al. |
| 2016/0259497 A1 | 9/2016 | Foss et al. |
| 2016/0259498 A1 | 9/2016 | Foss et al. |
| 2016/0259499 A1 | 9/2016 | Kocienda et al. |
| 2016/0259516 A1 | 9/2016 | Kudurshian et al. |
| 2016/0259517 A1 | 9/2016 | Butcher et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0259536 A1 | 9/2016 | Kudurshian et al. |
| 2016/0274686 A1 | 9/2016 | Ruiz et al. |
| 2016/0274728 A1 | 9/2016 | Luo et al. |
| 2016/0274761 A1 | 9/2016 | Ruiz et al. |
| 2016/0320906 A1 | 11/2016 | Bokma et al. |
| 2016/0357305 A1 | 12/2016 | Wells et al. |
| 2016/0357368 A1 | 12/2016 | Federighi et al. |
| 2016/0357389 A1 | 12/2016 | Dakin et al. |
| 2016/0357390 A1 | 12/2016 | Federighi et al. |
| 2016/0357404 A1 | 12/2016 | Alonso Ruiz et al. |
| 2016/0360116 A1 | 12/2016 | Penha et al. |
| 2017/0075520 A1 | 3/2017 | Bauer et al. |
| 2017/0075562 A1 | 3/2017 | Bauer et al. |
| 2017/0075563 A1 | 3/2017 | Bauer et al. |

FOREIGN PATENT DOCUMENTS

| | | |
|---|---|---|
| CN | 1808362 A | 7/2006 |
| CN | 1955906 | 5/2007 |
| CN | 101102573 | 1/2008 |
| CN | 201107762 | 8/2008 |
| CN | 101320303 A | 12/2008 |
| CN | 101593077 A | 12/2009 |
| CN | 101727268 | 6/2010 |
| CN | 101809526 A | 8/2010 |
| CN | 102004593 A | 4/2011 |
| CN | 102037435 | 4/2011 |
| CN | 102099776 | 6/2011 |
| CN | 102112946 A | 6/2011 |
| CN | 102160021 A | 8/2011 |
| CN | 102385478 A | 3/2012 |
| CN | 102438092 A | 5/2012 |
| CN | 102662573 A | 9/2012 |
| CN | 103097992 A | 5/2013 |
| DE | 100 59 906 A1 | 6/2002 |
| DE | 21 2009 000 073 | 2/2011 |
| DE | 20 2009 018 283 | 8/2011 |
| DE | 11 2009 001 276 | 1/2012 |
| DE | 11 2009 001 281 | 1/2012 |
| EP | 0 388 162 A2 | 3/1990 |
| EP | 0 859 307 A1 | 3/1998 |
| EP | 0 880 090 A2 | 11/1998 |
| EP | 1 028 583 A1 | 8/2000 |
| EP | 1 067 471 A1 | 1/2001 |
| EP | 1406150 A1 | 4/2004 |
| EP | 1 571 549 A2 | 2/2005 |
| EP | 1 562 105 A2 | 8/2005 |
| EP | 1 568 966 A2 | 8/2005 |
| EP | 1 640 855 A2 | 3/2006 |
| EP | 1 674 977 A2 | 6/2006 |
| EP | 1 882 902 A1 | 1/2008 |

(56) References Cited

FOREIGN PATENT DOCUMENTS

| | | |
|---|---|---|
| EP | 2 000 896 A2 | 12/2008 |
| EP | 2 017 701 A1 | 1/2009 |
| EP | 2 028 583 A2 | 2/2009 |
| EP | 2 141 574 A2 | 1/2010 |
| EP | 2 175 357 A1 | 4/2010 |
| EP | 2 196 893 A2 | 6/2010 |
| EP | 2 214 087 A1 | 8/2010 |
| EP | 2 226 715 A2 | 9/2010 |
| EP | 2 286 324 | 2/2011 |
| EP | 2 286 325 | 2/2011 |
| EP | 2 299 351 A2 | 3/2011 |
| EP | 2 302 496 A1 | 3/2011 |
| EP | 2 375 309 A1 | 10/2011 |
| EP | 2 375 314 A1 | 10/2011 |
| EP | 2 386 935 A1 | 11/2011 |
| EP | 2 407 868 A1 | 1/2012 |
| EP | 2 426 580 A2 | 3/2012 |
| EP | 2 447 818 A1 | 5/2012 |
| EP | 2 527 966 A2 | 11/2012 |
| EP | 2 530 677 A2 | 12/2012 |
| EP | 2 541 376 A1 | 1/2013 |
| EP | 2 555 500 A1 | 2/2013 |
| EP | 2 568 359 A2 | 3/2013 |
| EP | 2 615 535 A1 | 7/2013 |
| EP | 2 631 737 A1 | 8/2013 |
| EP | 2 674 846 A2 | 12/2013 |
| EP | 2 733 578 A2 | 5/2014 |
| EP | 2 808 764 A1 | 12/2014 |
| EP | 2 809 058 A1 | 12/2014 |
| EP | 2 813 938 A1 | 12/2014 |
| GB | 2 350 991 | 12/2000 |
| GB | 2 366 630 A | 3/2002 |
| GB | 2 402 105 A | 12/2004 |
| GB | 2 492 709 A | 11/2009 |
| GB | 2 473 389 A | 3/2011 |
| GB | 2 474 153 A | 4/2011 |
| JP | H07-151512 A | 6/1995 |
| JP | H08-227341 A | 9/1996 |
| JP | H09-330175 A | 12/1997 |
| JP | H11-203044 A | 7/1999 |
| JP | 2000-148348 A | 5/2000 |
| JP | 2001-202192 A | 7/2001 |
| JP | 2002-041023 A | 2/2002 |
| JP | 2002-149312 A | 5/2002 |
| JP | 2002-268867 A | 9/2002 |
| JP | 2002-286489 | 10/2002 |
| JP | 2003-084744 A | 3/2003 |
| JP | 2003-157131 A | 5/2003 |
| JP | 2003-186597 A | 7/2003 |
| JP | 2004-054861 A | 2/2004 |
| JP | 2004-062648 A | 2/2004 |
| JP | 2004-070492 A | 3/2004 |
| JP | 2004-086733 A | 3/2004 |
| JP | 2004-152169 A | 5/2004 |
| JP | 2005-031786 A | 2/2005 |
| JP | 2005-070777 A | 3/2005 |
| JP | 2005-092386 A | 4/2005 |
| JP | 2005-135106 A | 5/2005 |
| JP | 2005-157842 A | 6/2005 |
| JP | 2005-222553 A | 8/2005 |
| JP | 2005-309933 A | 11/2005 |
| JP | 2006-185443 A | 7/2006 |
| JP | 2007-116384 A | 5/2007 |
| JP | 2007-517462 A | 6/2007 |
| JP | 2007-264808 A | 10/2007 |
| JP | 2008-009759 A | 1/2008 |
| JP | 2008-015890 A | 1/2008 |
| JP | 2008-017373 A | 1/2008 |
| JP | 2008-033739 A | 2/2008 |
| JP | 2008-076818 A | 4/2008 |
| JP | 2008-076853 A | 4/2008 |
| JP | 2008-146453 A | 6/2008 |
| JP | 2008-537615 | 9/2008 |
| JP | 2008 305174 A | 12/2008 |
| JP | 2009-500761 | 1/2009 |
| JP | 2009-211704 A | 9/2009 |
| JP | 2009-217543 A | 9/2009 |
| JP | 2009-217815 A | 9/2009 |
| JP | 2010-009321 A | 1/2010 |
| JP | 2010-503130 A | 1/2010 |
| JP | 2010-055274 A | 3/2010 |
| JP | 2010-146507 A | 7/2010 |
| JP | 2010-152716 A | 7/2010 |
| JP | 2010-176174 A | 8/2010 |
| JP | 2010-176337 A | 8/2010 |
| JP | 2010-181934 A | 8/2010 |
| JP | 2010-541071 A | 12/2010 |
| JP | 2011-501307 A | 1/2011 |
| JP | 2011-048666 A | 3/2011 |
| JP | 2011-048686 A | 3/2011 |
| JP | 2011-048762 A | 3/2011 |
| JP | 2011-048832 A | 3/2011 |
| JP | 2011-053831 A | 3/2011 |
| JP | 2011-053973 A | 3/2011 |
| JP | 2011-059821 A | 3/2011 |
| JP | 2011-070342 A | 4/2011 |
| JP | 2011-100290 A | 5/2011 |
| JP | 2011-107823 A | 6/2011 |
| JP | 2011-123773 A | 6/2011 |
| JP | 2011-141868 A | 7/2011 |
| JP | 2011 192179 A | 9/2011 |
| JP | 2011-192215 A | 9/2011 |
| JP | 2011-242386 A | 12/2011 |
| JP | 2011-253556 A | 12/2011 |
| JP | 2011-257941 A | 12/2011 |
| JP | 2011-530101 A | 12/2011 |
| JP | 2012-027940 A | 2/2012 |
| JP | 2012-043266 A | 3/2012 |
| JP | 2012-043267 A | 3/2012 |
| JP | 2012-053754 | 3/2012 |
| JP | 2012-053926 A | 3/2012 |
| JP | 2012-073873 A | 4/2012 |
| JP | 2012-509605 A | 4/2012 |
| JP | 2012-093820 A | 5/2012 |
| JP | 2012-123564 A | 6/2012 |
| JP | 2012-128825 A | 7/2012 |
| JP | 2013-030050 A | 2/2013 |
| JP | 2013-058149 A | 3/2013 |
| JP | 2013-080521 A | 5/2013 |
| JP | 2013-529339 A | 7/2013 |
| JP | 2013-542488 A | 11/2013 |
| JP | 2014-130567 A | 7/2014 |
| JP | 2014-519109 A | 8/2014 |
| JP | 2015-153420 A | 8/2015 |
| KR | 2006-0071353 A | 6/2006 |
| KR | 2008-0045143 A | 4/2008 |
| KR | 2008-0054346 A | 6/2008 |
| KR | 2008-0078108 A | 8/2008 |
| KR | 2010-0010302 | 2/2010 |
| KR | 2010-0023637 | 3/2010 |
| KR | 2010-0034608 | 4/2010 |
| KR | 2010 0046087 | 6/2010 |
| KR | 2010 0133246 | 12/2010 |
| KR | 2011 0086501 A | 7/2011 |
| KR | 2013 0099647 A | 9/2013 |
| KR | 2014 0079110 A | 6/2014 |
| KR | 20150021977 A | 3/2015 |
| WO | WO 90/10910 A1 | 9/1990 |
| WO | WO 90/11571 A1 | 10/1990 |
| WO | WO 91/14231 A1 | 9/1991 |
| WO | WO 95/26005 A1 | 9/1995 |
| WO | WO 98/49639 A1 | 11/1998 |
| WO | WO 99/19821 A1 | 4/1999 |
| WO | WO 99/30259 A1 | 6/1999 |
| WO | WO 99/53424 A1 | 10/1999 |
| WO | WO 00/11587 A1 | 3/2000 |
| WO | WO 00/50974 A2 | 8/2000 |
| WO | WO 00/52619 A1 | 9/2000 |
| WO | WO 00/62187 A2 | 10/2000 |
| WO | WO 00/65510 A1 | 11/2000 |
| WO | WO 01/16830 A1 | 3/2001 |
| WO | WO 01/16852 A2 | 3/2001 |
| WO | WO 01/22263 A2 | 3/2001 |
| WO | WO 01/22315 A2 | 3/2001 |

(56) References Cited

FOREIGN PATENT DOCUMENTS

| | | |
|---|---|---|
| WO | WO 01/88808 A1 | 11/2001 |
| WO | WO 00/62187 A3 | 12/2001 |
| WO | WO 01/22263 A3 | 1/2002 |
| WO | WO 01/22315 A3 | 1/2002 |
| WO | WO 02/07032 A1 | 1/2002 |
| WO | WO 02/15461 A2 | 2/2002 |
| WO | WO 01/16852 A8 | 6/2002 |
| WO | WO 2005/106637 A2 | 11/2005 |
| WO | WO 2006/013485 A2 | 2/2006 |
| WO | WO 2006/042309 A1 | 4/2006 |
| WO | WO 2006/073020 A1 | 7/2006 |
| WO | WO 2007/121557 A1 | 11/2007 |
| WO | WO 2008/030976 A2 | 3/2008 |
| WO | WO 2008/064142 A2 | 5/2008 |
| WO | WO 2009/059062 A2 | 5/2009 |
| WO | WO 2009/143075 A2 | 11/2009 |
| WO | WO 2009/143076 A2 | 11/2009 |
| WO | WO 2009/143294 A2 | 11/2009 |
| WO | WO 2009/148781 A2 | 12/2009 |
| WO | WO 2009/155981 A1 | 12/2009 |
| WO | WO 2009/158549 A2 | 12/2009 |
| WO | WO 2010/013876 A1 | 2/2010 |
| WO | WO 2010/090010 A1 | 8/2010 |
| WO | WO 2011/024389 A1 | 3/2011 |
| WO | WO 2011/024465 A1 | 3/2011 |
| WO | WO 2011/093045 A1 | 8/2011 |
| WO | WO 2011/105009 A1 | 9/2011 |
| WO | WO 2011/114630 A1 | 9/2011 |
| WO | WO 2011/115187 A1 | 9/2011 |
| WO | WO 2011/121375 A1 | 10/2011 |
| WO | WO 2012/037664 | 3/2012 |
| WO | WO 2012/096804 A2 | 7/2012 |
| WO | WO 2012/114760 A1 | 8/2012 |
| WO | WO 2012/150540 A2 | 11/2012 |
| WO | WO 2013/169299 A1 | 11/2013 |
| WO | WO 2013/169849 A2 | 11/2013 |
| WO | WO 2013/169851 A2 | 11/2013 |
| WO | WO 2013/169853 A1 | 11/2013 |
| WO | WO 2013/169854 A2 | 11/2013 |
| WO | WO 2013/169870 A1 | 11/2013 |
| WO | WO 2013/169875 A2 | 11/2013 |
| WO | WO 2013/169877 A2 | 11/2013 |
| WO | WO 2013/169882 A2 | 11/2013 |
| WO | WO 2014/105275 A1 | 7/2014 |
| WO | WO 2014/105276 A1 | 7/2014 |
| WO | WO 2014/105277 A1 | 7/2014 |
| WO | WO 2014/105278 A1 | 7/2014 |
| WO | WO 2014/105279 A1 | 7/2014 |
| WO | WO 2014/129655 A1 | 8/2014 |
| WO | WO 2014/149473 A1 | 9/2014 |
| WO | WO 2014/200733 A1 | 12/2014 |
| WO | WO 2016/200584 A2 | 12/2016 |

OTHER PUBLICATIONS

Davidson, et al., "Extending 2D Object Arrangement with Pressure-Sensitive Layering Cues", Proceedings of the 21st Annual ACM Symposium on User Interface Software and Technology, Oct. 19, 2008, 4 pages.
Dinwiddie, et al., "Combined-User Interface for Computers, Television, Video Recorders, and Telephone, Etc", IP.Com Journal, Aug. 1, 1990, 3 Pages.
Forlines, et al., "Glimpse: a Novel Input Model for Multi-level Devices", Chi '05 Extended Abstracts on Human Factors in Computing Systems, Apr. 2, 2005, 4 pages.
Harrison, "Stylus-Based Interface with Full Mouse Emulation", IBM Technical Disclosure Bulletin, vol. 34, No. 10B, Mar. 1, 1992, 3 pages.
Kaaresoja, et al., "Snap-Crackle-Pop: Tactile Feedback for Mobile Touch Screens", Proceedings of Eurohaptics vol. 2006, Jul. 3, 2006, 2 pages.

Minsky, "Computational Haptics The *Sandpaper* System for Synthesizing Texture for a Force-Feedback Display," Massachusetts Institute of Technology, Jun. 1978, 217 pages.
O'Hara, et al., "Pressure-Sensitive Icons", IP.Com Journal, Jun. 1, 1990, 2 Pages.
Quinn, et al., "Zoofing! Faster List Selections with Pressure-Zoom-Flick-Scrolling", Proceedings of the 21st Annual Conference of the Australian Computer-Human Interaction Special Interest Group on Design, Nov. 23, 2009, ACM Press, vol. 411, 8 pages.
Rekimoto, et al., "PreSense: Interaction Techniques for Finger Sensing Input Devices", Proceedings of the 16th Annual ACM Symposium on User Interface Software and Technology, Nov. 30, 2003, 10 pages.
Rekimoto, et al., "PreSenseII: Bi-directional Touch and Pressure Sensing Interactions with Tactile Feedback", Conference on Human Factors in Computing Systems Archive, ACM, Apr. 22, 2006, 6 pages.
Song, et al., "Grips and Gestures on a Multi-Touch Pen," The ACM CHI Conference on Human Factors in Computing Systems, <URL:research.microsoft.com/pubs/.../gripsandgenstures%20mtpen-chi201>, May 7-12, 2011,10 pages.
International Search Report and Written Opinion dated May 26, 2014, received in International Application No. PCT/US2013/040053, which corresponds to U.S. Appl. No. 14/535,671, 32 pages.
International Preliminary Report on Patentability dated Nov. 20, 2014, received in International Application No. PCT/US2013/040053, which corresponds to U.S. Appl. No. 14/535,671, 26 pages.
Invitation to Pay Additional Fees dated Feb. 10, 2014, received in International Application No. PCT/US2013/069472, which corresponds to U.S. Appl. No. 14/608,895, 6 pages.
International Search Report and Written Opinion dated Apr. 7, 2014, received in International Application No. PCT/US2013/069472, which corresponds to U.S. Appl. No. 14/608,895, 24 pages.
International Search Report and Written Opinion dated Aug. 7, 2013, received in International Application No. PCT/US2013/040054, which corresponds to U.S. Appl. No. 14/536,235, 12 pages.
International Preliminary Report on Patentability dated Nov. 20, 2014, received in International Application No. PCT/US2013/040054, which corresponds to U.S. Appl. No. 14/536,235, 11 pages.
International Search Report and Written Opinion dated Aug. 7, 2013, received in International Application No. PCT/US2013/040056, which corresponds to U.S. Appl. No. 14/536,367, 12 pages.
International Preliminary Report on Patentability dated Nov. 20, 2014, received in International Application No. PCT/US2013/040056, which corresponds to U.S. Appl. No. 14/536,367, 11 pages.
International Search Report and Written Opinion dated Aug. 6, 2013, received in International Application No. PCT/US2013/040058, which corresponds to U.S. Appl. No. 14/536,426, 12 pages.
International Preliminary Report on Patentability dated Nov. 20, 2014, received in International Application No. PCT/US2013/040058, which corresponds to U.S. Appl. No. 14/536,426, 11 pages.
Invitation to Pay Additional Fees dated Sep. 25, 2013, received in International Application No. PCT/US2013/040061, which corresponds to U.S. Appl. No. 14/536,464, 6 pages.
International Search Report and Written Opinion dated Feb. 5, 2014, received in International Application No. PCT/US2013/040061, which corresponds to U.S. Appl. No. 14/536,464, 30 pages.
International Preliminary Report on Patentability dated Nov. 20, 2014, received in International Application No. PCT/US2013/040061, which corresponds to U.S. Appl. No. 14/536,464, 26 pages.
Invitation to Pay Additional Fees dated Oct. 8, 2013, received in International Application No. PCT/US2013/040067, which corresponds to U.S. Appl. No. 14/536,644, 8 pages.
International Search Report and Written Opinion dated May 8, 2014, received in International Application No. PCT/US2013/040067, which corresponds to U.S. Appl. No. 14/536,644, 45 pages.
International Preliminary Report on Patentability dated Nov. 20, 2014, received in International Application No. PCT/US2013/040067, which corresponds to U.S. Appl. No. 14/536,644, 36 pages.
International Search Report and Written Opinion dated Mar. 12, 2014, received in International Application No. PCT/US2013/069479, 14 pages.

(56) References Cited

OTHER PUBLICATIONS

International Search Report and Written Opinion dated Aug. 7, 2013, received in International Application No. PCT/US2013/040070, which corresponds to U.S. Appl. No. 14/535,646, 12 pages.
International Preliminary Report on Patentability dated Nov. 20, 2014, received in International Application No. PCT/US2013/040070, which corresponds to U.S. Appl. No. 14/535,646, 10 pages.
Invitation to Pay Additional Fees dated Oct. 28, 2013, received in International Application No. PCT/US2013/040072, which corresponds to U.S. Appl. No. 14/536,141, 7 pages.
International Search Report and Written Opinion dated Apr. 7, 2014, received in International Application No. PCT/US2013/040072, which corresponds to U.S. Appl. No. 14/536,141, 38 pages.
International Preliminary Report on Patentability dated Nov. 20, 2014, received in International Application No. PCT/US2013/040072, which corresponds to U.S. Appl. No. 14/536,141, 32 pages.
Invitation to Pay Additional Fees dated Feb. 14, 2014, received in International Application No. PCT/US2013/069483, 7 pages.
International Search Report and Written Opinion dated Apr. 7, 2014, received in International Application No. PCT/US2013/069483, 18 pages.
Invitation to Pay Additional Fees dated Oct. 28, 2013, received in International Application No. PCT/US2013/040087, which corresponds to U.S. Appl. No. 14/536,166, 8 pages.
International Search Report and Written Opinion dated Mar. 3, 2014, received in International Application No. PCT/US2013/040087, which corresponds to U.S. Appl. No. 14/536,166, 35 pages.
International Preliminary Report on Patentability dated Nov. 20, 2014, received in International Application No. PCT/2013/040087, which corresponds to U.S. Appl. No. 14/536,166, 29 pages.
International Search Report and Written Opinion dated Aug. 7, 2013, received in International Application No. PCT/US2013/040093, which corresponds to U.S. Appl. No. 14/536,203, 11 pages.
International Preliminary Report on Patentability dated Nov. 20, 2014, received in International Application No. PCT/2013040093, which corresponds to U.S. Appl. No. 14,536,203, 9 pages.
Invitation to Pay Additional Fees dated Apr. 17, 2014, received in International Application No. PCT/US2013/069484, 7 pages.
International Search Report and Written Opinion dated Jul. 9, 2014, received in International Application No. PCT/US2013/069484, 17 pages.
Invitation to Pay Additional Fees dated Sep. 25, 2013, received in International Application No. PCT/US2013/040098, which corresponds to U.S. Appl. No. 14/536,247, 8 pages.
International Search Report and Written Opinion dated Feb. 5, 2014, received in International Application No. PCT/US2013/040098, which corresponds to U.S. Appl. No. 14/536,247, 35 pages.
International Preliminary Report on Patentability dated Nov. 20, 2014, received in International Application No. PCT/2013/040098, which corresponds to U.S. Appl. No. 14/536,247, 27 pages.
Invitation to Pay Additional Fees dated Aug. 7, 2013, received in International Application No. PCT/US2013/040101, which corresponds to U.S. Application No. 14/536,267, 7 pages.
International Search Report and Written Opinion dated Jan. 27, 2014, received in International Application No. PCT/US2013/040101, 30 pages.
International Preliminary Report on Patentability dated Nov. 20, 2014, received in International Application No. PCT/2013/040101, which corresponds to U.S. Appl. No. 14/536,267, 24 pages.
Invitation to Pay Additional Fees dated Aug. 7, 2013, received in International Application No. PCT/US2013/040108, which corresponds to U.S. Appl. No. 14/536,291, 6 pages.
International Search Report and Written Opinion dated Jan. 8, 2014, received in International Application No. PCT/US2013/040108, 30 pages.
International Preliminary Report on Patentability dated Nov. 20, 2014, received in International Application No. PCT/2013/040108, which corresponds to U.S. Appl. No. 14/536,291, 25 pages.
Invitation to Pay Additional Fees dated Apr. 1, 2014, received in International Application No. PCT/US2013/069486, 7 pages.
International Search Report and Written Opinion dated Jun. 2, 2014, received in International Application No. PCT/US2013/069486, 7 pages.
International Search Report and Written Opinion dated Mar. 6, 2014, received in International Application No. PCT/US2013/069489, 12 pages.
International Search Report and Written Opinion dated Sep. 30, 2014, received in International Application No. PCT/US2014/047303, 10 pages.
Office Action, dated Aug. 27, 2015, received in Australian Patent Application No. 2013259614, which corresponds with U.S. Appl. No. 14/536,141, 4 pages.
Office Action, dated Aug. 10, 2015, received in Australian Patent Application No. 2013259637, which corresponds with U.S. Appl. No. 14/536,203, 3 pages.
Office Action, dated Aug. 18, 2015, received in Australian Patent Application No. 2013259642, which corresponds with U.S. Appl. No. 14/536,291, 3 pages.
Agarwal, "How to Copy and Paste Text on Windows Phone 8," Guiding Tech, http://web.archive.org/web20130709204246/http://www.guidingtech.com/20280/copy-paste-text-windows-phone-8/, Jul. 9, 2013, 10 pages.
Alzona, "Full Screen Maximization with RightZoom," http://www.brighhub.com/computing/mac-platform/articles/31024.aspx>, Mar. 31, 2009, 6 pages.
Apple Inc., "iPhone User Guide for iPhone and iPhone 3G," http://manuals.info.apple.com/en_US/iPhone_User_Guide.pdf, Jul. 11, 2008, 154 pages.
Ask.MetaFilter, "Enable Screen Resize?" ask. Metafilter.com, Jan. 29, 2006, http://ask.metafilter.com/31720/Enable-screen-resize, 4 pages.
Awduche et al., "Synchronized Broadcast in Cellular Networks," 2nd Telecommunications R&D Conference in Massachusetts, Mar. 1996, 12 pages.
Azundris, "A Fire in the Sky," http://web.archive.org/web/20140722062639/http://blog.azundrix.com/archives/168-A-fire-in-the-sky.html, Jul. 22, 2014, 8 pages.
CrackBerry Forums, Windows 8 Bezel Control and Gestures, http://wwwforums.crackberry.com/blackberry-playbook-f222/windows-8-bezel-control-gestures-705129/, Mar. 1, 2012, 8 pages.
Crook, "Microsoft Patenting Multi-Screen, Milti-Touch Gesures," http://techcrunch.com/2011/08/25/microsoft-awarded-patents-for-multi-screen-multi-touch-gestures/, Aug. 25, 2011, 8 pages.
cvil.ly—a design blog, Interesting Touch Interactions on Windows 8, http://cvil.ly/2011/06/04/interesting-touch-interactions-on-windows-8/, Jun. 4, 2011, 3 pages.
Deeter, "DigiStamp Signs Strategic Partnership with European Trust Center EuroSignCard to Safeguard Monetary Transactions in Financial Sector," http://proquest.umi.com/, Mar. 14, 2001, 2 pages.
Dilger, "Inside Apple's iPad: Multitasking," Appleinsider.com, <http://www.appleinsider.com/articles/10/02/18/inside_apples_ipad_multitasking.html>, Feb. 17, 2010, 3 pages.
Fahey, "The iPad Blows Up iPhone Apps Read Good," Kotaku http://kotaku.com/5458316/the-ipad-blows-up-iphone-apps-rel-good, Jan. 27, 2010, 3 pages.
Fehily, "Visual QuickStart Guide: Microsoft Windows 7," Peachpit Press, 9 pages.
Flowplayer, "Slowmotion: Flowplayer," https://web.archive.org/web/20150226191526/http://flash.flowplayer.org/plugins/streaming/slowmotion.html, Feb. 26, 2015, 4 pages.
Gorman, "Hands-On With Immersion HD Integrator Hi-Fi Haptics," http://www.engadget.com/2012/02/23/hands-on-with-immersion-hd-integrator-hi-fi-haptics/?utm_medium=referral&utm_source=pulsenews, Feb. 23, 2012, 10 pages.
Harris, "Windows 8 Consumer Preview: Product Demo," https://www.youtube.com/watch?feature=Lauer-embedded&v=jDYAQmQ-phX8, Feb. 28, 2012, 3 pages.
HTC, "HTC One (M7)," Wikipedia, the free encyclopedia, https://en.wikipedia.org/wiki/HTC_One_(M7), Mar. 2013, 20 pages.
HTC, "User Manual—PDA Phone—HTC_P3050 Touch," http://web.archive.org/web/20101228223033/http://www.comparecellular.com, Nov. 2, 2007, 154 pages.

(56) References Cited

OTHER PUBLICATIONS

IBM et al., "Pressure-Sensitive Icons", IBM, US, Jun. 1, 1990, 3 pages.
iCIMS Recruiting Software, "Blackberry Playbook Review," http://www.tested.com/tech.tablets/5749-blackberry-playbook-review/, 2015, 11 pages.
Jade et al., "Apple's iPhone 4.0 to Support Multitasking via Expose-like Interface," AppleInsider.com, Mar. 31, 2010, 4 pages.
Jade et al., "Apple's iPhone 4.0 Software to Deliver Multitasking Support," AppleSider.com, Mar. 11, 2010, 3 pages.
Kishore, "Make the OS X Maximize Button Work like Windows," http://www.switchingtomac.com/making-the-switch/make-the-os-x-maximize-buttom-work-like-windows/, May 5, 2009, 11 pages.
MacRumors, "Fit to Screen Button Poll for Mac / Windows Users," http://forums.macrumors.com/showthread.php?t=615215>, Dec. 11, 2008, 15 pages.
MacRumors, "Window, Fit to Screen?," http://forums.macrumors.com/showthread.php?t=439783>, Feb. 22, 2008, 5 pages.
McRitchie, "Internet Explorer Right-Click Menus," http://web.archive.org/web-201405020/http:/dmcritchie.mvps.org/ie/rightie6.htm, May 2, 2014, 10 pages.
MetaFilter Network Inc., "Enable Screen Resize?", http://ask.metafilter.com/31720/Enable-screen-resize>, Jan. 29, 2006, 4 pages.
Mick, "iPhone OS 4.0 Will Bring True Multitasking This Summer", Daily Tech, http:///www.dailytech.com/report+iphone+os+40+will+bring+true+multitasking+this+summer/article 17878.htm>, Mar. 11, 2010, 3 pages.
Moth, "Share Code—Write Code Once for Both Mobile and Desktop Apps," MSDN Magazine, Jul. 2007, http://msdn.microsoft.com/en-us/magazine/cc163387.aspx, 8 pages.
Newman, "Sprint's HTC EVO 4G: 5 Killer Features," pcworld, http://www.pcworld.com/article/192286/sprints_htc_evo_4g_5_killer_features.html, Mar. 24, 2010, 3 pages.
Nickinson, "Review: The New HTC Sense Interface on Android Phones," Android Central, Feb. 22, 2010, http://www.androidcentral.com/review-new-htc-sense-android-phone, 10 pages.
Nilsson, "Design Guidelines for Mobile Applications," SINTEF ICT, Jun. 2008, 73 pages.
Nilsson et al., "Design Patterns for User Interface for Mobile Applications," Advances in Engineering Software, Elsevier Science, Oxford, GB vol. 40, No. 12, Dec. 1, 2009, 11 pages.
Pallenberg, "Wow, the new iPad had gestures." https://plus.google.com/+SaschaPallenberg/posts/aaJtJogu8ac, Mar. 7, 2012, 2 pages.
Pradeep, "Android App Development—Microsoft Awarded With Patents on Gestures Supported on Windows 8," http://mspoweruser.com/microsoft-awarded-with-patents-on-gestures-supported-on-windows-8/, Aug. 25, 2011, 16 pages.
Reiger, "Effective Design for Multiple Screen Sizes," mobiForge, http://mobiforge.com/designing/story/effective-design-multiple-screen-sizes, Jan. 2009, 12 pages.
Robertson et al., "The Task Gallery: A 3D Window Manager," Redmond, WA, Sep. 12, 1999, 8 pages.
Savov, "HTC Enhances Sense with Leap and Friend Stream (updated with video)," Engadget, http://www.engadget.com/2010/02/16/htc-enhances-sense-with-leap-and-friend-stream/, Feb. 16, 2010, 4 pages.
Seffah et al., Multi-devices "Multiple" User Interfaces: Development Models and Research Opportunities, The Journal of Systems Software, www.sciencedirect.com, Dec. 25, 2003, 14 pages.
Siracusa, "Antacid Tablet," http://arstechnica.com/staff/2010/01/antacid-tablet/>, Jan. 1, 2010, 3 pages.
Sony, "Sony Xperia Z1", Wikipedia, the free encyclopedia, https://en.wikipedia.org/wiki/Sony_Xperia_Z1, Sep. 2013, 10 pages.
Tidwell, "Designing Interfaces," O'Reilly Media, Inc., USA, Nov. 2005, 348 pages.
Viana et al., "Xmobile: A MB-UID Environment for Semi-Automatic Generation of Adaptive Applications for Mobile Devices," The Journal of Systems and Software, www.sciencedirect.com, Jun. 9, 2007, 13 pages.
Windows, "Stupid Geek Tricks: Tile or Cascade Multiple Windows in Windows 7," How to Geek, Feb. 18, 2010, 3 pages.
YouTube, "Blackberry Playbook bezel interation," https://www.youtube.com/watch?v=YGkzFqnOwXI, Jan. 10, 2011, 2 pages.
Office Action, dated May 22, 2012, received in U.S. Appl. No. 12/888,381, 18 pages.
Final Office Action, dated Nov. 19, 2012, received in U.S. Appl. No. 12/888,381, 14 pages.
Office Action, dated Dec. 10, 2013, received in U.S. Appl. No. 12/888,381, 13 pages.
Notice of Allowance, dated Oct. 21, 2014, received in U.S. Appl. No. 12/888,381, 8 pages.
Notice of Allowance, dated Feb. 17, 2015, received in U.S. Appl. No. 12/888,381, 5 pages.
Notice of Allowance (corrected), dated Apr. 9, 2015, received in U.S. Appl. No. 12/888,381, 2 pages.
Office Action, dated Aug. 8, 2013, received in Australian Patent Application No. 2010350740, 3 pages.
Office Action, dated Aug. 28, 2012, received in Chinese Patent Application No. 201010602688.2, which corresponds with U.S. Appl. No. 12/888,381, 6 pages.
Office Action, dated May 24, 2013, received in Chinese Patent Application No. 201010602688.2, which corresponds with U.S. Appl. No. 12/888,381, 7 pages.
Office Action, dated Aug. 6, 2013, received in European Patent Application No. 10760867.1, which corresponds with U.S. Appl. No. 12/888,381, 4 pages.
Office Action, dated Dec. 6, 2013, received in Japanese Patent Application No. 2013-503722, which corresponds with U.S. Appl. No. 12/888,381, 2 pages.
Office Action, dated Nov. 29, 2013, received in Korean Patent Application No. 2012-7029281, which corresponds with U.S. Appl. No. 12/888,381, 4 pages.
Office Action, dated May 10, 2012, received in U.S. Appl. No. 12/888,382, 9 pages.
Final Office Action, dated Nov. 15, 2012, received in U.S. Appl. No. 12/888,382, 11 pages.
Office Action, dated Dec. 10, 2013, received in U.S. Appl. No. 12/888,382, 12 pages.
Notice of Allowance, dated Oct. 31, 2014, received in U.S. Appl. No. 12/888,382, 5 pages.
Notice of Allowance, dated Feb. 13, 2015, received in U.S. Appl. No. 12/888,382, 6 pages.
Office Action, dated May 17, 2012, received in U.S. Appl. No. 12/888,384, 15 pages.
Final Office Action, dated Nov. 7, 2012, received in U.S. Appl. No. 12/888,384, 14 pages.
Office Action, dated May 16, 2012, received in U.S. Appl. No. 12/888,386, 12 pages.
Final Office Action, dated Nov. 8, 2012, received in U.S. Appl. No. 12/888,386, 13 pages.
Office Action, dated Jan. 23, 2013, received in U.S. Appl. No. 12/888,389, 11 pages.
Final Office Action, dated Sep. 12, 2013, received in U.S. Appl. No. 12/888,389, 10 pages.
Notice of Allowance, dated Sep. 8, 2014, received in U.S. Appl. No. 12/888,389, 13 pages.
Notice of Allowance, dated Feb. 11, 2015, received in U.S. Appl. No. 12/888,389, 13 pages.
Notice of Allowance, dated Jun. 15, 2012, received in U.S. Appl. No. 12/888,391, 23 pages.
Office Action, dated Jun. 28, 2013, received in U.S. Appl. No. 13/077,524, 17 pages.
Office Action, dated Apr. 4, 2013, received in U.S. Appl. No. 12/789,426, 8 pages.
Office Action, dated Feb. 12, 2014, received in U.S. Appl. No. 13/077,524, 13 pages.
Notice of Allowance, dated May 27, 2015, received in U.S. Appl. No. 13/077,524, 9 pages.

(56) References Cited

OTHER PUBLICATIONS

Notice of Allowance, dated Sep. 15, 2015, received in U.S. Appl. No. 13/077,524, 9 pages.
Office Action, dated Mar. 19, 2013, received in U.S. Appl. No. 13/333,909, 18 pages.
Final Office Action, dated Dec. 5, 2013, received in U.S. Appl. No. 13/333,909, 24 pages.
Notice of Allowance, dated Mar. 31, 2014, received in U.S. Appl. No. 13/333,909. 20 pages.
Office Action, dated Dec. 18, 2015, received in Australian Patent Application No. 2013368440, which corresponds with U.S. Appl. No. 14/536,426, 3 pages.
Office Action, dated Apr. 5, 2016, received in Korean Patent Application No. 10-2015-7018851, which corresponds with U.S. Appl. No. 14/536,426, 7 pages.
Office Action, dated Dec. 17, 2015, received in U.S. Appl. No. 14/536,426, 28 pages.
Office Action, dated Nov. 18, 2015, received in Australian Patent Application No. 2015101231, which corresponds with U.S. Appl. No. 14/536,426, 3 pages.
Office Action, dated Mar. 4, 2016, received in Japanese Patent Application No. 2015-511644, which corresponds with U.S. Appl. No. 14/536,426, 3 pages.
Office Action, dated Feb. 1, 2016, received in Australian Patent Application No. 2013368441, which corresponds with U.S. Appl. No. 14/608,926, 3 pages.
Notice of Allowance, dated Mar. 30, 2016, received in Australian Patent Application No. 2013368441, which corresponds with U.S. Appl. No. 14/608,926, 1 page.
Office Action, dated Apr. 21, 2016, received in European Patent Application No. 13795392.3, which corresponds with U.S. Appl. No. 14/608,926, 6 pages.
Office Action, dated Mar. 14, 2016, received in Japanese Patent Application No. 2015-549392, which corresponds with U.S. Appl. No. 14/608,926, 4 pages.
Office Action, dated Nov. 12, 2015, received in European Patent Application No. 13724102.2, which corresponds with U.S. Appl. No. 14/536,646, 6 pages.
Office Action, dated Feb. 29, 2016, received in Japanese Patent Application No. 2015-511645, which corresponds with U.S. Appl. No. 14/536,646, 5 pages.
Office Action, dated Jan. 7, 2016, received in European Patent Application No. 13726053.5, which corresponds with U.S. Appl. No. 14/536,141, 10 pages.
Office Action, dated Feb. 29, 2016, received in Japanese Patent Application No. 2015-511646, which corresponds with U.S. Appl. No. 14/536,141, 3 pages.
Office Action, dated Jan. 29, 2016, received in Australian Patent Application No. 2013368443, which corresponds with U.S. Appl. No. 14/536,141, 3 pages.
Notice of Allowance, dated Mar. 11, 2016, received in Australian Patent Application No. 2013368443, which corresponds with U.S. Appl. No. 14/536,141, 2 pages.
Office Action, dated Apr. 5, 2016, received in Korean Patent Application No. 10-2015-7018448, which corresponds with U.S. Appl. No. 14/536,141, 6 pages.
Office Action, dated Nov. 11, 2015, received in European Patent Application No. 13724104.8, which corresponds with U.S. Appl. No. 14/536,203, 5 pages.
Office Action, dated Feb. 15, 2016, received in Japanese Patent Application No. 2015-511650, which corresponds with U.S. Appl. No. 14/536,203, 5 pages.
Office Action, dated Dec. 4, 2015, received in Korean Patent Application No. 2014-7034520, which corresponds with U.S. Appl. No. 14/536,203, 4 pages.
Office Action, dated Jan. 29, 2016, received in Japanese Patent Application No. 2015-511652, which corresponds with U.S. Appl. No. 14/536,267, 3 pages.
Office Action, dated Dec. 4, 2015, received in Korean Patent Application No. 2014-7034530, which corresponds with U.S. Appl. No. 14/536,267, 3 pages.
Office Action, dated Jan. 7, 2016, received in European Patent Application No. 13724107.1, which corresponds with U.S. Appl. No. 14/052,515, 11 pages.
Office Action, dated Nov. 23, 2015, received in U.S. Appl. No. 14/183,316, 17 pages.
Office Action, dated Jul. 7, 2015, received in U.S. Appl. No. 14/183,347, 14 pages.
Final Office Action, dated Dec. 18, 2015, received in U.S. Appl. No. 14/183,347, 6 pages.
Notice of Allowance, dated Apr. 6, 2016, received in U.S. Appl. No. 14/183,347, 7 pages.
Notice of Allowance (corrected), dated Apr. 19, 2016, received in U.S. Appl. No. 14/183,347, 3 pages.
Certificate of Grant, dated Apr. 7, 2016, received in Australian Patent Application No. 2016100293, which corresponds with U.S. Appl. No. 14/864,737, 1 page.
Office Action, dated Apr. 5, 2016, received in Danish Patent Application No. 201500577, which corresponds with U.S. Appl. No. 14/864,737, 7 pages.
Certificate of Grant, dated Mar. 24, 2016, received in Australian Patent Application No. 2016100254, which corresponds with U.S. Appl. No. 14/866,981, 1 page.
Office Action, dated Mar. 18, 2016, received in Danish Patent Application No. 201500575, which corresponds with U.S. Appl. No. 14/866,981, 9 pages.
Certificate of Grant, dated Mar. 24, 2016, received in Australian Patent Application No. 2016100251, which corresponds with U.S. Appl. No. 14/866,159, 1 page.
Office Action, dated Mar. 9, 2016, received in Danish Patent Application No. 201500574, which corresponds with U.S. Appl. No. 14/866,159, 11 pages.
Certificate of Grant, dated Mar. 24, 2016, received in Australian Patnet Application No. 2016100247, which corresponds with U.S. Appl. No. 14/868,078, 1 page.
Office Action, dated Mar. 30, 2016, received in Danish Patent Application No. 201500588, which corresponds with U.S. Appl. No. 14/868,078, 9 pages.
Office Action, Apr. 4, 2016, received in Danish Patent Application No. 201500582, which corresponds with U.S. Appl. No. 14,863,432, 10 pages.
Office Action, dated Mar. 22, 2016, received in Danish Patent Application No. 201500576, which corresponds with U.S. Appl. No. 14/866,989, 10 pages.
Office Action, dated Feb. 3, 2016, received in Danish Patent Application No. 201500592, which corresponds with U.S. Appl. No. 14/869,899, 9 pages.
Office Action, dated Mar. 18, 2016, received in Danish Patent Application No. 201500593, which corresponds with U.S. Appl. No. 14/866,992, 10 pages.
Office Action, dated Nov. 30, 2015, received in U.S. Appl. No. 14/845,217, 24 pages.
Final Office Action, dated Apr. 22, 2016, received in U.S. Appl. No. 14/845,217, 36 pages.
Office Action, dated Feb. 3, 2016, received in U.S. Appl. No. 14/856,517, 36 pages.
Office Action, dated Feb. 11, 2016, received in U.S. Appl. No. 14/856,519, 34 pages.
Office Action, dated Feb. 1, 2016, received in U.S. Appl. No. 14/857,645, 15 pages.
Office Action, dated Jan. 25, 2016, received in U.S. Appl. No. 14/864,580, 29 pages.
Office Action, dated Apr. 8, 2016, received in Danish Patent Application No. 201500584, which corresponds with U.S. Appl. No. 14/864,580, 9 pages.
Office Action, dated Apr. 19, 2016, received in U.S. Appl. No. 14/864,627, 9 pages.
Office Action, dated Apr. 8, 2016, received in Danish Patent Application No. 201500585, which corresponds with U.S. Appl. No. 14/864,627, 9 pages.

(56) References Cited

OTHER PUBLICATIONS

Office Action, dated Mar. 29, 2016, received in U.S. Appl. No. 14/866,361, 22 pages.
Certificate of Grant, dated Apr. 21, 2016, received in Australia Patent Application No. 2016100292, which corresponds with U.S. Appl. No. 14/866,361, 1 page.
Office Action, dated Apr. 7, 2016, received in Danish Patent Application No. 201500579, which corresponds with U.S. Appl. No. 14/866,361, 10 pages.
Office Action, dated Mar. 22, 2016, received in Danish Patent Application No. 201500587, which corresponds with U.S. Appl. No. 14/866,987, 8 pages.
Office Action, dated Apr. 1, 2016, received in Danish Patent Application No. 201500589, which corresponds with U.S. Appl. No. 14/866,989, 8 pages.
Office Action, dated Apr. 11, 2016, received in U.S. Appl. No. 14/871,236, 23 pages.
Office Action, dated Apr. 8, 2016, received in Danish Patent Application No. 201500595, which corresponds with U.S. Appl. No. 14/871,236, 12 pages.
Office Action, dated Apr. 6, 2016, received in Danish Patent Application No. 201500596, which corresponds with U.S. Appl. No. 14/870,882, 7 pages.
Office Action, dated Apr. 7, 2016, received in Danish Patent Application No. 201500597, which corresponds with U.S. Appl. No. 14/871,227, 7 pages.
Office Action, dated Apr. 18, 2016, received in Danish Patent Application No. 201500601, which corresponds with U.S. Appl. No. 14/871,336, 8 pages.
Notice of Allowance, dated Apr. 18, 2016, received in Danish Patent Application No. 201500600, which corresponds with U.S. Appl. No. 14/871,462, 7 pages.
Office Action, dated Apr. 29, 2016, received in U.S. Appl. No. 14/867,823, 28 pages.
Office Action, dated Mar. 18, 2016, received in Danish Patent Application No. 201500594, which corresponds with U.S. Appl. No. 14/867,823, 10 pages.
Office Action, dated Mar. 21, 2016, received in Danish Patent Application No. 201500598, which corresponds with U.S. Appl. No. 14/867,892, 9 pages.
Certificate of Grant, dated Mar. 24, 2016, received in Australian Patent Application No. 20161002253, which corresponds with U.S. Appl. No. 14/867,990, 1 page.
Office Action, dated Mar. 18, 2016, received in Danish Patent Application No. 201500581, which corresponds with U.S. Appl. No. 14/867,990, 9 pages.
International Search Report and Written Opinion, dated Dec. 10, 2010, received in International Patent Application No. PCT/US2010/050057, which corresponds with U.S. Appl. No. 12/888,381, 9 pages.
International Preliminary Report on Patentability, dated Oct. 9, 2012, received in International Patent Application No. PCT/US2010/050057, which corresponds with U.S. Appl. No. 12/888,381, 6 pages.
Extended European Search Report, dated Nov. 6, 2015, received in European Patent Application No. 15183980.0, which corresponds with U.S. Appl. No. 14/536,426, 7 pages.
International Preliminary Report on Patentability, dated Jun. 30, 2015, received in International Patent Application No. PCT/US2013/069479, which corresponds with U.S. Appl. No. 14/608,926, 11 pages.
International Search Report and Written Opinion, dated Apr. 25, 2016, received in International Patent Application No. PCT/US2016/018758, which corresponds with U.S. Appl. No. 14/866,159, 15 pages.
Office Action, dated Jul. 15, 2015, received in Australian Patent Application No. 2013259606, which corresponds with U.S. Appl. No. 14/536,426, 3 pages.
Office Action, dated Jul. 17, 2015, received in Australian Patent Application No. 2013259613, which corresponds with U.S. Appl. No. 14/536,646, 5 pages.
Office Action, dated Jul. 9, 2015, received in Australian Patent Application No. 2013259630, which corresponds with U.S. Appl. No. 14/536,203, 3 pages.
International Preliminary Report on Patentability, dated Jun. 30, 2015, received in International Patent Application No. PCT/US2013/069472, which corresponds with U.S. Appl. No. 14/608,895, 18 pages.
International Preliminary Report on Patentability, dated Jun. 30, 2015, received in International Application No. PCT/2013/069483, which corresponds to U.S. Appl. No. 14/608,942, 13 pages.
International Preliminary Report on Patentability, dated Jun. 30, 2015, received in International Patent Application No. PCT/US2013/069484, which corresponds with U.S. Appl. No. 14/608,965, 12 pages.
International Preliminary Report on Patentability, dated Jun. 30, 2015, received in International Patent Application No. PCT/US2013/069486, which corresponds with U.S. Appl. No. 14/608,985, 19 pages.
International Preliminary Report on Patentability, dated Jun. 30, 2015, received in International Patent Application No. PCT/US2013/069489, which corresponds with U.S. Appl. No. 14/609,006, 10 pages.
Certificate of Registration, dated Oct. 14, 2016, received in German Patent Application No. 202016000003234.9, which corresponds with U.S. Appl. No. 14/864,580, 3 pages.
Office Action (Search Report), dated Apr. 8, 2016, received in Danish Patent Application No. 201500584, which corresponds with U.S. Appl. No. 14/864,580, 9 pages.
Office Action, dated Oct. 7, 2016, received in Danish Patent Application No. 201500584, which corresponds with U.S. Appl. No. 14/864,580, 3 pages.
Notice of Allowance, dated Nov. 23, 2016, received in U.S. Appl. No. 14/864,601, 12 pages.
Office Action, dated Oct. 7, 2016, received in Danish Patent Application No. 201500585, which corresponds with U.S. Appl. No. 14/864,627, 3 pages.
Notice of Allowance, dated Jul. 19, 2016, received in U.S. Appl. No. 14/866,361, 8 pages.
Office Action, dated Jun. 10, 2016, received in Australian Patent Application No. 2016100292, which corresponds with U.S. Appl. No. 14/866,361, 4 pages.
Notice of Allowance/Grant, dated Jul. 1, 2016, received in Chinese Patent Application No. 201620251706.X, which corresponds with U.S. Appl. No. 14/866,361, 3 pages.
Letters Patent, dated Aug. 3, 2016, received in Chinese Patent Application No. 201620251706.X, which corresponds with U.S. Appl. No. 14/866,361, 3 pages.
Certificate of Registration, dated Jun. 24, 2016, received in German Patent Application No. 202016001819.2, which corresponds with U.S. Appl. No. 14/866,361, 3 pages.
Office Action, dated Oct. 28, 2016, received in Danish Patent Application No. 201500579, which corresponds with U.S. Appl. No. 14/866,361, 3 pages.
Patent, dated Aug. 8, 2016, received in Australian Patent Application No. 2016100649, which corresponds with U.S. Appl. No. 14/866,987, 1 page.
Office Action, dated Oct. 19, 2016, received in Chinese Patent Application No. 2016201470246.X, which corresponds with U.S. Appl. No. 14/866,987, 4 pages.
Intention to Grant, dated Jun. 10, 2016, received in Danish Patent Application No. 201500587, which corresponds with U.S. Appl. No. 14/866,987, 2 pages.
Notice of Allowance, dated Nov. 1, 2016, received in Danish Patent Application No. 201500587, which corresponds with U.S. Appl. No. 14/866,987, 2 pages.
Office Action and Search Report, dated Sep. 9, 2016, received in Danish Patent Application No. 201670463, which corresponds with U.S. Appl. No. 14/866,987, 7 pages.

(56) References Cited

OTHER PUBLICATIONS

Certificate of Exam, dated Jul. 21, 2016, received in Australian Patent Application No. 2016100652, which corresponds with U.S. Appl. No. 14/866,989, 1 page.
Intention to Grant, dated Jun. 10, 2016, received in Danish Patent Application No. 201500589, which corresponds with U.S. Appl. No. 14/866,989, 2 pages.
Notice of Allowance, dated Nov. 1, 2016, received in Danish Patent Application No. 201500589, which corresponds with U.S. Appl. No. 14/866,989, 2 pages.
Office Action, dated Jun. 28, 2016, received in U.S. Appl. No. 14/871,236, 21 pages.
Final Office Action, dated Nov. 4, 2016, received in U.S. Appl. No. 14/871,236, 24 pages.
Innovation (Unexamined) Patent, dated Aug. 25, 2016, received in Australian Patent Application No. 2016101433, which corresponds with U.S. Appl. No., 14/871,236, 1 page.
Office Action, dated Oct. 14, 2016, received in Australian Patent Application No. 2016101433, which corresponds with U.S. Appl. No. 14/871,236, 3 pages.
Office Action and Search Report, dated May 26, 2016, received in Danish Patent Application No. 201500595, which corresponds with U.S. Appl. No. 14/871,236, 14 pages.
Office Action and Additional Search Report, dated Sep. 30, 2016, received in Danish Patent Application No. 201500595, which corresponds with U.S. Appl. No. 14/871,236, 10 pages.
Innovation (Unexamined) Patent, dated Aug. 25, 2016, received in Australian Patent Application No. 2016101436, which corresponds with U.S. Appl. No. 14/871,236, 1 pages.
Office Action, dated Oct. 31, 2016, received in Australian Patent Application No. 2016101438, which corresponds with U.S. Appl. No. 14/871,236, 6 pages.
Office Action and Search Report, dated Jun. 9, 2016, received in Danish Patent Application No. 201500596, which corresponds with U.S. Appl. No. 14/870,882, 9 pages.
Office Action, dated Oct. 17, 2016, received in Australian Patent Application No. 2016203040, which corresponds with U.S. Appl. No. 14/871,227, 7 pages.
Office Action, dated Oct. 18, 2016, received in Australian Patent Application No. 2016101431, which corresponds with U.S. Appl. No. 14/871,227, 3 pages.
Grant, dated Jun. 21, 2016, received in Danish Patent Application No. 201500597, which corresponds with U.S. Appl. No. 14/871,227, 2 pages.
Patent, dated Sep. 26, 2016, received in Danish Patent Application No. 201500597, which corresponds with U.S. Appl. No. 14/871,227, 7 pages.
Office Action, dated Oct. 14, 2016, received in Australian Patent Application No. 2016101437, which corresponds with U.S. Appl. No. 14/871,336, 2 pages.
Office Action, dated Oct. 18, 2016, received in Australian Patent Application No. 201500601, which corresponds with U.S. Appl. No. 14/871,336, 3 pages.
Innovation Patent, dated Aug. 25, 2016, received in Australian Patent Application No. 2016101435, which corresponds with U.S. Appl. No. 14/871,462, 1 page.
Office Action, dated Oct. 4, 2016, received in Australian Patent Application No. 2016101435, which corresponds with U.S. Appl. No. 14/871,462, 3 pages.
Office Action, dated Oct. 4, 2016, received in Australian Patent Application No. 2016231505, which corresponds with U.S. Appl. No. 14/871,462, 3 pages.
Grant, dated Aug. 30, 2016, received in Danish Patent Application No. 201500600, which corresponds with U.S. Appl. No. 14/871,462, 2 pages.
Final Office Action, dated Sep. 28, 2016, received in U.S. Appl. No. 14/867,823, 31 pages.
Office Action, dated Sep. 7, 2016, received in Danish Patent Application No. 201500594, which corresponds with U.S. Appl. No. 14/867,823, 4 pages.

Office Action, dated May 10, 2016, received in U.S. Appl. No. 14/867,892, 28 pages.
Final Office Action, dated Nov. 2, 2016, received in U.S. Appl. No. 14/867,892, 48 pages.
Office Action, Sep. 14, 2016, received in Danish Patent Application No. 201500598, which corresponds with U.S. Appl. No. 14/867,892, 4 pages.
Office Action, dated May 23, 2016, received in Australian Patent Application No. 2016100253, which corresponds with U.S. Appl. No. 14/867,990, 5 pages.
Office Action, dated Jul. 5, 2016, received in Chinese Patent Application No. 201620176221.9, which corresponds with U.S. Appl. No. 14/867,990, 4 pages.
Office Action, dated Oct. 25, 2016, received in Chinese Patent Application No. 201620176221.9, which corresponds with U.S. Appl. No. 14/867,990, 7 pages.
Certificate of Registration, dated Jun. 16, 2016, received in German Patent No. 202016001489.8, which corresponds with U.S. Appl. No. 14/867,990, 3 pages.
Office Action, dated Sep. 26, 2016, received in Danish Patent Application No. 201500581, which corresponds with U.S. Appl. No. 14/867,990, 5 pages.
Office Action, dated Nov. 25, 2016, received in U.S. Appl. No. 15/081,771, 17 pages.
Office Action and Search Report, dated Oct. 17, 2016, received in Danish Patent Application No. 201670587, which corresponds with U.S. Appl. No. 15/231,745, 9 pages.
Office Action and Search Report, dated Oct. 12, 2016, received in Danish Patent Application No. 201670593, which corresponds with U.S. Appl. No. 15/231,745, 7 pages.
Office Action (Search Report), dated Nov. 10, 2016, received in Danish Patent Application No. 201670591, which corresponds with U.S. Appl. No. 15/231,745, 12 pages.
Office Action and Search Report, dated Oct. 26, 2016, received in Danish Patent Application No. 201670592, which corresponds with U.S. Appl. No. 15/231,745, 8 pages.
Extended European Search Report, dated Oct. 7, 2016, received in European Patent Application No. 16177863.4, which corresponds with U.S. Appl. No. 14/536,267, 12 pages.
International Search Report and Written Opinion, dated Oct. 14, 2016, received in International Patent Application No. PCT/US2016/020697, which corresponds with U.S. Appl. No. 14/866,981, 21 pages.
International Search Report and Written Opinion, dated Jul. 21, 2016, received in International Patent Application No. PCT/US2016/019913, which corresponds with U.S. Appl. No. 14/868,078, 16 pages.
International Search Report and Written Opinion, dated Oct. 31, 2016, received in International Patent Application No. PCT/US2016/033578, which corresponds with U.S. Appl. No. 14/863,432, 36 pages.
International Search Report and Written Opinion, dated Nov. 14, 2016, received in International Patent Application No. PCT/US2016/033541, which corresponds with U.S. Appl. No. 14/866,511, 29 pages.
International Search Report and Written Opinion, dated Aug. 29, 2016, received in International Patent Application No. PCT/US2016/021400, which corresponds with U.S. Appl. No. 14/869,899, 48 pages.
Anonymous, "Nokia 808 PureView screenshots", retrieved from Internet; no URL, Nov. 12, 2012, 8 pages.
Anonymous, "Nokia 808 PureView User Guide," http://download-fds.webapps.microsoft.com/supportFiles/phones/files/pdf_guides/devices/808/Nokia_808_UG_en_APAC.pdf, Jan. 1, 2012, 144 pages.
b-log—betriebsraum weblog, "Extremely Efficient Menu Selection: Marking Menus for the Flash Platform," http://www.betriebsraum.de/blog/2009/12/11/extremely-efficient-menu-selection-marking-for-the-flash-platform, Dec. 11, 2009, 9 pages.
Bolluyt, "5 Apple Watch Revelations from Apple's New WatchKit", http://www.cheatsheet.com/tecnology/5-apple-watch-revelations-from-apples-new-watchkit.html/?a=viewall, Nov. 22, 2014, 3 pages.

(56) References Cited

OTHER PUBLICATIONS

Clark, "Global Moxie, Touch Means a Renaissance for Radial Menus," http://globalmoxie.com/blog/radial-menus-for-touch-ui~print.shtml, Jul. 17, 2012, 7 pages.
Cohen, Cinemagraphs are Animated Gifs for Adults, http://www.tubefilter.com/2011/07/10/cinemagraph, Jul. 10, 2011, 3 pages.
Drinkwater, "Glossary: Pre/Post Alarm Image Buffer," http://www.networkwebcams.com/ip-camera-learning-center/2008/07/17/glossary-prepost-alarm-image-buffer/, Jul. 17, 2008, 1 page.
Farshad, "SageThumbs—Preview and Convert Pictures From Windows Context Menu", https://web.addictivetips.com/windows-tips/sagethumbs-preview-and-convert-photos-from-windows-context-menu, Aug. 8, 2011, 5 pages.
Fenlon, "The Case for Bezel Touch Gestures on Apple's iPad," http://www.tested.com/tech/tablets/3104-the case-for-bezel-touch-gestures-on-apples-ipad/, Nov. 2, 2011, 6 pages.
Flaherty, "Is Apple Watch's Pressure-Sensitive Screen a Bigger Deal Than the Gadget Itself?", http://www.wired.com/2014/09/apple-watchs-pressure-sensitive-screen-bigger-deal-gadget, Sep. 15, 2014, 3 pages.
Flixel, "Cinemagraph Pro for Mac", https://flixel.com/products/mac/cinemagraph-pro, 2014, 7 pages.
Gardner, "Recenz—Recent Apps in One Tap", You Tube, https://www.youtube.com/watch?v-qailSHRgsTo, May 15, 2015, 1 page.
iPodHacks 142: "Water Ripple Effects on the Home and Lock Screen: AquaBoard Cydia Tweak Review", YouTube, https://www.youtube.comwatch?v-Auu_uRaYHJs, Sep. 24, 2012, 3 pages.
Kaaresoja, "Snap-Crackle-Pop: Tactile Feedback for Mobile Touch Screens," Nokia Research Center, Helsinki, Finland, Proceedings of Eurohaptics vol. 2006, Jul. 3, 2006, 2 pages.
Kiener, "Force Touch on iPhone", https://www.youtube.com/watch?v=CEMmnsU5fC8, Aug. 4, 2015, 4 pages.
Kronfli, "HTC Zoe Comes to Google Play, Here's Everything You Need to Know," Know Your Mobile, http://www.knowyourmobile.com/htc/htc-one/19550/what-htc-zoe, Aug. 14, 2014, 5 pages.
Kumar, "How to Enable Ripple Effect on Lock Screen of Galaxy S2", YouTube, http, http://www.youtube.com/watch?v+B9-4M5abLXA, Feb. 12, 2013, 3 pages.
Kurdi, "XnView Shell Extension: A Powerful Image Utility Inside the Context Menu", http://www.freewaregenius.com/xnview-shell-extension-a-powerful-image-utility-inside-the-context-menu, Jul. 30, 2008, 4 pages.
Laurie, "The Power of the Right Click," http://vlaurie.com/right-click/customize-context-menu.html, 2002-2016, 3 pages.
Matthew, "How to Preview Photos and Images From Right-Click Context Menue in Windows [Tip]", https://dottech.org/159009/add-image-preview-in-windows-context-menu-tip, Jul. 4, 2014, 5 pages.
Microsoft, "Use Radial Menus to Display Commands in OneNote for Windows 8," https://support.office.com/en-us/article/Use-radial-menues-to-display-OneNote-commands-Od75f03f-cde7-493a-a8a0b2ed6f99fbe2, 2016, 5 pages.
Mitroff, "Google Android 5.0 Lollipop," http://www.cnet.com/products/google-android-5-0-lollipop, Mar. 12, 2015, 5 pages.
Mohr, "Do Not Disturb—The iPhone Feature You Should Be Using", http.www.wonderoftech.com/do-not-disturb-iphone, Jul. 14, 2014, 30 pages.
Nacca, "NiLS Lock Screen Notifications / Floating Panel—Review", https://www.youtube.com/watch?v=McT4QnS9TDY, Feb. 3, 2014, 4 pages.
Nikon, "Scene Recognition System and Advanced SRS," http://www.nikonusa.com/en.Learn-And-Explore/Article/ftlzi4rr/Scene-Recognition-System.html, Jul. 22, 2015, 2 pages.
Phonebuff, "How to Pair Bluetooth on the iPhone", https://www.youtube.com/watch?v=LudNwEar9A8, Feb. 8, 2012, 3 pages.
PoliceOne.com, "Coban Technologies Pre-Event Buffer & Fail Safe Feature," http://www.policeone.com/police-products/police-technology/mobile-computures/videos/5955587-COBAN-Technologies-Pre-Event, Nov. 11, 2010, 2 pages.
"Quickly Preview Songs in Windows Media Player 12 in Windows 7," Quickly Preview Songs in Windows Media Player 12 in Windows 7. How-to-Geek, Apr. 28, 2010, Web. May 8, 2010, http://web.archive.org/web/20100502013134/http://www.howtogeek.com/howto/16157/quickly-preview-songs-in-windows-media-center-12-in-windows-7>, 6 pages.
Sony, "Intelligent Scene Recognition," https://www.sony-asia.com/article/252999/section/product/product/dsc-t77, downloaded on May 20, 2016, 5 pages.
Stross, "Wearing a Badge, and a Video Camera," The New York Times, http://www.nytimes.com/2013/04/07/business/wearable-video-cameras-for-police-offers.html? R=0, Apr. 6, 2013, 4 pages.
Taser, "Taser Axon Body Camera User Manual," https://www.taser.com/images/support/downloads/product-resourses/axon_body_product_manual.pdf, Oct. 1, 2013, 24 pages.
VGJFeliz, "How to Master Android Lollipop Notifications in Four Minutes!", https://www.youtube.com/watch?v=S-zBRG7GJgs, Feb. 8, 2015, 5 pages.
Wikipedia, "AirDrop,", Wikipedia, the free encyclopedia, http://en.wikipedia.org/wiki/AirDrop, May 17, 2016, 5 pages.
Wikipedia, "Cinemagraph," Wikipedia, the free encyclopedia, http://en.wikipedia.org/wiki/Cinemagraph, Last Modified Mar. 16, 2016, 2 pages.
Wikipedia, "Context Menu," Wikipedia, the free encyclopedia https://en.wikipedia.org/wiki/Context menu, Last Modified May 15, 2016, 4 pages.
Wikipedia, "Mobile Ad Hoc Network," Wikipedia, the free encyclopedia, http://en.wikipedia.org/wiki/Mobile_ad_hoc_network, May 20, 2016, 4 pages.
Wikipedia, "Pie Menu," Wikipedia, the free encyclopedia, http://en.wikipedia.org/wiki/Pie_menu, Last Modified Jun. 4, 2016, 3 pages.
Wikipedia, "Quick Look," from Wikipedia, the free encyclopedia, https;//en.wikipedia.org/wiki/Quick_Look, Last Modified Jan. 15, 2016, 3 pages.
Office Action, dated Oct. 18, 2016, received in Australian Patent Application No. 2013368440, which corresponds with U.S. Appl. No. 14/536,426, 3 pages.
Office Action, dated Jul. 21, 2016, received in European Patent Application No. 13795391.5, which corresponds with U.S. Appl. No. 14/536,426, 9 pages.
Office Action, dated Sep. 13, 2016, received in Japanese Patent Application No. 2015-547948, which corresponds with U.S. Appl. No. 14/536,426, 5 pages.
Final Office Action, dated May 6, 2016, received in U.S. Appl. No. 14/536,426, 23 pages.
Notice of Allowance, dated May 23, 2016, received in Australian Patent Application No. 2013259606, which corresponds with U.S. Appl. No. 14/536,426, 3 pages.
Certificate of Grant, dated Sep. 15, 2016, received in Australian Patent Australian Patent Application No. 2013259606, which corresponds with U.S. Appl. No. 14/536,426, 1 page.
Decision to Grant, dated Jul. 14, 2016, received in European Patent Application No. 13724100.6, which corresponds with U.S. Appl. No. 14/536,426, 1 page.
Letters Patent, dated Aug. 10, 2016, received in European Patent Application No. 13724100.6, which corresponds with U.S. Appl. No. 14/536,426, 1 page.
Certificate of Grant, dated Jul. 29, 2016, received in Australian Patent Application No. 2013368441, which corresponds with U.S. Appl. No. 14/608,926, 1 page.
Office Action, dated May 6, 2016, received in European Patent Application No. 13795392.3, which corresponds with U.S. Appl. No. 14/608,926, 6 pages.
Office Action, dated Nov. 11, 2016, received in European Patent Application No. 13795392.3, which corresponds with U.S. Appl. No. 14/608,926, 6 pages.
Office Action, dated May 12, 2016, received in Korean Patent Application No. 10-2015-7018853, which corresponds with U.S. Appl. No. 14/608,926, 4 pages.
Office Action, dated May 31, 2016, received in Australian Patent Application No. 2013259613, which corresponds with U.S. Appl. No. 14/536,646, 4 pages.

(56) References Cited

OTHER PUBLICATIONS

Notice of Allowance, dated Jul. 5, 2016, received in Australian Patent Application No. 2013259613, which corresponds with U.S. Appl. No. 14/536,646, 3 pages.
Office Action, dated May 31, 2016, received in European Patent Application No. 13724102.2 (5846EP), which corresponds with U.S. Appl. No. 14/536,646, 5 pages.
Notice of Allowance, dated Aug. 15, 2016, received in Australian Patent Application No. 2013259614, which corresponds with U.S. Appl. No. 14/536,141, 1 page.
Office Action, dated Aug. 31, 2016, received in European Patent Application No. 13726053.5, which corresponds with U.S. Appl. No. 14/536,141, 10 pages.
Office Action, dated Oct. 25, 2016, received in Japanese Patent Application No. 2015-511646, which corresponds with U.S. Appl. No. 14/536,141, 6 pages.
Certificate of Grant, dated Jul. 7, 2016, received in Australian Patent Application No. 2013368443, which corresponds with U.S. Appl. No. 14/536,141, 3 pages.
Office Action, dated Oct. 7, 2016, received in European Patent Application No. 13798464.7, which corresponds with U.S. Appl. No. 14/608,942, 7 pages.
Office Action, dated Jul. 4, 2016, received in Japanese Patent Application No. 2015-549393, which corresponds with U.S. Appl. No. 14/536,141, 4 pages.
Office Action, dated Aug. 1, 2016, received in U.S. Appl. No. 14/536,203, 14 pages.
Notice of Allowance, dated Jun. 15, 2016, received in Australian Patent Application No. 2013259630, which corresponds with U.S. Appl. No. 14/536,203, 3 pages.
Certificate of Grant, dated Oct. 21, 2016, received in Australian Patent Application No. 2013259630, which corresponds with U.S. Appl. No. 14/536,203, 3 pages.
Office Action, dated May 31, 2016, received in European Patent Application No. 13724104.8, which corresponds with U.S. Appl. No. 14/536,203, 5 pages.
Notice of Allowance, dated Aug. 5, 2016, received in Japanese Patent Application No. 2015-511650, which corresponds with U.S. Appl. No. 14/536,203, 4 pages.
Certificate of Patent, dated Sep. 9, 2016, received in Japanese Patent Application No. 2015-511650, which corresponds with U.S. Appl. No. 14/536,203, 3 pages.
Office Action, dated Jul. 22, 2016, received in European Office Action No. 13798465.4, which corresponds with U.S. Appl. No. 14/608,965, 8 pages.
Office Action, dated Oct. 20, 2016, received in U.S. Appl. No. 14/536,247, 10 pages.
Notice of Allowance, dated Jun. 28, 2016, received in Australian Patent Application No. 2013259637, which corresponds with U.S. Appl. No. 14/536,267, 3 pages.
Certificate of Grant, dated Oct. 21, 2016, received in Australian Patent Application No. 2013259637, which corresponds with U.S. Appl. No. 14/536,267, 3 pages.
Notice of Allowance, dated Sep. 26, 2016, received in Japanese Patent Application No. 2015-511652, which corresponds with U.S. Appl. No. 14/536,267, 5 pages.
Notice of Allowance, dated Sep. 1, 2016, received in Korean Patent Application No. 2014-7034530, which corresponds with U.S. Appl. No. 14/536,267, 3 pages.
Office Action, dated Jul. 25, 2016, received in Australian Patent Application No. 2013259642, which corresponds with U.S. Appl. No. 14/536,291, 3 pages.
Office Action, dated Aug. 10, 2016, received in Australian Patent Application No. 2013259642, which corresponds with U.S. Appl. No. 14/536,291, 4 pages.
Innovation Patent, dated Sep. 1, 2016, received in Australian Patent Application No. 2016101481, which corresponds with U.S. Appl. No. 14/536,291, 1 page.
Office Action, dated Sep. 29, 2016, received in Australian Patent Application No. 2016101481, which corresponds with U.S. Appl. No. 14/536,291, 3 pages.
Office Action, dated Aug. 22, 2016, received in European Patent Application No. 13724107.1, which corresponds with U.S. Appl. No. 14/536,291, 7 pages.
Office Action, dated Mar. 8, 2016, received in Japanese Patent Application No. 2015-511655, which corresponds with U.S. Appl. No. 14/536,291, 4 pages.
Office Action, dated Jan. 15, 2016, received in Australian Patent Application No. 2013368445, which corresponds with U.S. Appl. No. 14/608,985, 3 pages.
Office Action, dated Jul. 25, 2016, received in Japanese Patent Application No. 13811032.5, which corresponds with U.S. Appl. No. 14/608,985, 8 pages.
Office Action, dated Apr. 25, 2016, received in Japanese Patent Application No. 2015-550384, which corresponds with U.S. Appl. No. 14/608,985, 4 pages.
Office Action, dated Nov. 4, 2016, received in Korean Patent Application No. 10-2015-7019984, which corresponds with U.S. Appl. No. 14/608,985, 8 pages.
Office Action, dated Mar. 31, 2016, received in U.S. Appl. No. 14/864,737, 17 pages.
Notice of Allowance, dated Jul. 1, 2016, received in Chinese Patent Application No. 201620214376.7, which corresponds with U.S. Appl. No. 14/864,737, 3 pages.
Patent, dated Aug. 3, 2016, received in Chinese Patent Application No. 201620214376.7, which corresponds with U.S. Appl. No. 14/864,737, 5 pages.
Certificate of Registration, dated Jun. 20, 2016, received in German Patent Application No. 202016001845.1, which corresponds with U.S. Appl. No. 14/864,737, 3 pages.
Office Action and Search Report, dated Apr. 5, 2016, received in Danish Patent Application No. 201500577, which corresponds with U.S. Appl. No. 14/864,737, 7 pages.
Intention to Grant, dated Aug. 2, 2016, received in Danish Patent Application No. 201500577, which corresponds with U.S. Appl. No. 14/864,737, 2 pages.
Office Action, dated Jun. 27, 2016, received in U.S. Appl. No. 14/866,981, 22 pages.
Notice of Allowance, dated Oct. 24, 2016, received in U.S. Appl. No. 14/866,981, 7 pages.
Office Action, dated May 10, 2016, received in Australian Patent Application No. 2016100254, which corresponds with U.S. Appl. No. 14/866,981, 6 pages.
Patent, dated Nov. 2, 2016, received in Australian Patent Application No. 2016100254, which corresponds with U.S. Appl. No. 14/866,981, 1 page.
Notice of Allowance, dated Jul. 27, 2016, received in Chinese Patent Application No. 201620176169.7, which corresponds with U.S. Appl. No. 14/866,981, 3 pages.
Patent, dated Sep. 28, 2016, received in Chinese Patent Application No. 201620176169.7, which corresponds with U.S. Appl. No. 14/866,981, 4 pages.
Certificate of Registration, dated Jun. 20, 2016, received in German Patent Application No. 202016001514.2, which corresponds with U.S. Appl. No. 14/864,737, 3 pages.
Office Action and Search Report, dated Mar. 18, 2016, received in Danish Patent Application No. 2016100254, which corresponds with U.S. Appl. No. 14/866,981, 9 pages.
Office Action, dated May 19, 2016, received in Australian Patent Application No. 2016100251, which corresponds with U.S. Appl. No. 14/866,159, 5 pages.
Office Action, dated Jul. 5, 2016, received in Chinese Patent Application No. 201620186008.6, which corresponds with U.S. Appl. No. 14/866,159, 3 pages.
Certificate of Registration, dated Jun. 16, 2016, received in German Patent No. 202016001483.9, which corresponds with U.S. Appl. No. 14/866,159, 3 pages.
Office Action (Search Report), dated Mar. 9, 2016, received in Danish Patent Application No. 201500574, which corresponds with U.S. Appl. No. 14/866,159, 11 pages.

(56) References Cited

OTHER PUBLICATIONS

Office Action, dated Sep. 27, 2016, received in Danish Patent Application No. 201500574, which corresponds with U.S. Appl. No. 14/866,159, 4 pages.
Innovation (Unexamined) Patent, dated Aug. 4, 2016, received in Australian Patent Application No. 2016101201, which corresponds with U.S. Appl. No. 14/686,078, 1 page.
Office Action, dated Oct. 12, 2016, received in Australian Patent Application No. 2016101201, which corresponds with U.S. Appl. No. 14/686,078, 3 pages.
Notice of Allowance, dated Oct. 1, 2016, received in Chinese Patent Application No. 201620175847.8, which corresponds with U.S. Appl. No. 14/686,078, 1 page.
Certificate of Registration, dated Jun. 30, 2016, received in German Patent Application No. 20201600156.9, which corresponds with U.S. Appl. No. 14/868,078, 3 pages.
Office Action (Search Report), dated Mar. 30, 2016, received in Australian Patent Application No. 201500588), which corresponds with U.S. Appl. No. 14/868,078, 9 pages.
Office Action, dated Sep. 2, 2016, received in Australian Patent Application No. 201500588, which corresponds with U.S. Appl. No. 14/868,078, 4 pages.
Office Action, dated May 9, 2016, received in U.S. Appl. No. 14/863,432, 26 pages.
Notice of Allowance, dated Nov. 14, 2016, received in U.S. Appl. No. 14/863,432, 7 pages.
Office Action, dated Aug. 19, 2016, received in Australian Patent Application No. 2016100647, which corresponds with U.S. Appl. No. 14/863,432, 5 pages.
Office Action (Search Report), dated Apr. 4, 2016, received in Danish Patent Application No. 201500582, which corresponds with U.S. Appl. No. 14/863,432, 10 pages.
Office Action and Additional Search Report, dated Oct. 7, 2016, received in Danish Patent Application No. 201500582, which corresponds with U.S. Appl. No. 14/863,432, 6 pages.
Office Action, dated Oct. 13, 2016, received in U.S. Appl. No. 14/866,511, 27 pages.
Patent, dated Aug. 8, 2016, received in Australian Patent Application 2016100653, corresponds with U.S. Appl. No. 14/866,511, 1 page.
Office Action and Search Report, dated Mar. 22, 2016, received in Danish Patent Application No. 201500576, which corresponds with U.S. Appl. No. 14/866,511, 10 pages.
Intention to Grant, dated Jun. 8, 2016, received in Danish Patent Application No. 201500576, which corresponds with U.S. Appl. No. 14/866,511, 2 pages.
Grant, dated Aug. 26, 2016, received in Danish Patent Application No. 201500576, which corresponds with U.S. Appl. No. 14/866,511, 2 pages.
Office Action, dated May 10, 2016, received in U.S. Appl. No. 14/866,489, 15 pages.
Final Office Action, dated Sep. 16, 2016, received in U.S. Appl. No. 14/866,489, 24 pages.
Office Action, dated Mar. 28, 2016, received in U.S. Appl. No. 14/869,899, 17 pages.
Office Action, dated Jun. 28, 2016, received in U.S. Appl. No. 14/869,899, 5 pages.
Final Office Action, dated Sep. 2, 2016, received in U.S. Appl. No. 14/869,899, 22 pages.
Innovation (Unexamined) Patent, dated Aug. 25, 2016, received in Australian Patent Application No. 2016101438, which corresponds with U.S. Appl. No. 14/869,899, 1 page.
Certificate of Examination, dated Oct. 11, 2016, received in Australian Patent Application No. 2016101438, which corresponds with U.S. Appl. No. 14/869,899, 1 page.
Office Action (Search Report), dated Feb. 3, 2016, received in Danish Patent Application No. 201500592, which corresponds with U.S. Appl. No. 14/869,899, 9 pages.
Office Action, dated Oct. 7, 2016, received in Danish Patent Application No. 201500592, which corresponds with U.S. Appl. No. 14/869,899, 6 pages.
Office Action, dated Nov. 22, 2016, received in Danish Patent Application No. 201670594, which corresponds with U.S. Appl. No. 14/869,899, 9 pages.
Office Action, dated Mar. 4, 2016, received in U.S. Appl. No. 14/866,992, 30 pages.
Final Office Action, dated Jul. 29, 2016, received in U.S. Appl. No. 14/866,992, 35 pages.
Innovation Patent, dated Sep. 22, 2016, received in Australian Patent Application No. 2016101418, which corresponds with U.S. Appl. No. 14/866,992, 1 page.
Office Action, dated Nov. 22, 2016, received in Australian Patent Application No. 2016101418, which corresponds with U.S. Appl. No. 14/866,992, 7 pages.
Office Action (Search Report), dated Mar. 18, 2016, received in Danish Patent Application No. 201500593, which corresponds with U.S. Appl. No. 14/866,992, 10 pages.
Office Action, dated Jun. 27, 2016, received in Danish Patent Application No. 201500593, which corresponds with U.S. Appl. No. 14/866,992, 7 pages.
Notice of Allowance, dated Aug. 26, 2016, received in U.S. Appl. No. 14/845,217, 5 pages.
Final Office Action, dated Jul. 13, 2016, received in U.S. Appl. No. 14/856,517, 30 pages.
Final Office Action, dated Jul. 15, 2016, received in U.S. Appl. No. 14/856,519, 31 pages.
Final Office Action, dated Jun. 16, 2016, received in U.S. Appl. No. 14/857,645, 12 pages.
Notice of Allowance, dated Oct. 24, 2016, received in U.S. Appl. No. 14/857,645, 6 pages.
Notice of Allowance, dated May 23, 2016, received in U.S. Appl. No. 14/864,580, 9 pages.
Corrected Notice of Allowability, dated Jun. 16, 2016, received in U.S. Appl. No. 14/864,580, 2 pages.
Notice of Allowance, dated Aug. 4, 2016, received in U.S. Appl. No. 14/864,580, 9 pages.
Office Action, dated Aug. 19, 2016, received in Australian Patent Application No. 2016100648, which corresponds with U.S. Appl. No. 14/864,580, 6 pages.
Notice of Allowance, dated Nov. 8, 2016, received in Chinese Patent Application No. 201620470247.4, which corresponds with U.S. Appl. No. 14/864,580, 3 pages.
Innovation (Unexamined) Patent, dated Aug. 25, 2016, received in Australian Patent Application No. 2016101433, which corresponds with U.S. Appl. No. 14/871,236, 1 page.
Angelov, "Sponsor Flip Wall With Jquery & CSS", Tutorialzine. N.p., Mar. 24, 2010. Web. http://tutorialzine.com/2010/03/sponsor-wall-slip-jquery-css/, Mar. 24, 2010, 8 pages.
Anonymous, "Notifications, Android 4.4 and Lower", Android Developers, https://developer.android.com/design/patterns/notifications_k.html, May 24, 2015, 9 pages.
Dzyre, "10 Android Notification Features You Can Fiddle With", http://www.hongkiat.com/blog/android-notification-features, Mar. 10, 2014, 10 pages.
Elliot, "Mac System 7", YouTube. Web. Mar. 8, 2017, http://www.youtube.com/watch?v=XLv22hfuuik, Aug. 3, 2011, 1 page.
Gonzalo et al., "Zliding: Fluid Zooming and Sliding for High Precision Parameter Manipulation", Department of Computer Science, University of Toronto, Seattle, Washington, Oct. 23, 2005, 10 pages.
Grant, "Android's Notification Center", https://www.objc.io/issues/11-android/android-notifications, Apr. 30, 2014, 26 pages.
iPhoneOperatior, "Wasser Liveeffekt fur Homescreen & Lockscreen—Aquaboard (Cydia)", http://www.youtube.com/watch?v=fG9YMF-mB0Q, Sep. 22, 2012, 3 pages.
Kost, "LR3-Deselect All Images But One", Julieanne Kost's Blog, blogs.adobe.com/jkost/2011/12/lr3-deselect-all-images-but-one.html, Dec. 22, 2011, 1 page.
Microsoft, "Lumia—How to Personalize Your Start Screen", https://www.youtube.com/watch?v=6GI5Z3TrSEs, Nov. 11, 2014, 3 pages.

(56) References Cited

OTHER PUBLICATIONS

Office Action, dated Mar. 15, 2017, received in U.S. Appl. No. 14/535,671, 13 pages.
Notice of Allowance, dated Dec. 20, 2016, received in Australian Patent Application No. 2013368440, which corresponds with U.S. Appl. No. 14/536,426, 3 pages.
Office Action, dated Feb. 24, 2017, received in Korean Patent Application No. 10-2015-7018851, which corresponds with U.S. Appl. No. 14/536,426, 3 pages.
Office Action, dated Apr. 5, 2017, received in U.S. Appl. No. 14/536,367, 16 pages.
Office Action, dated Jan. 20, 2017, received in European Patent Application No. 15183980.0, which corresponds with U.S. Appl. No. 14/536,426, 5 pages.
Office Action, dated Feb. 6, 2017, received in Japanese Patent Application No. 2015-511644, which corresponds with U.S. Appl. No. 14/536,426, 6 pages.
Office Action, dated Mar. 9, 2017, received in U.S. Appl. No. 14/536,464, 21 pages.
Office Action, dated Jan. 3, 2017, received in Australian Patent Application No. 2016201451, which corresponds with U.S. Appl. No. 14/608,926, 3 pages.
Notice of Allowance, dated Jan. 17, 2017, received in Japanese Patent Application No. 2015-549392, which corresponds with U.S. Appl. No. 14/608,926, 2 pages.
Patent, dated Feb. 17, 2017, received in Japanese Patent Application No. 2015-549392, which corresponds with U.S. Appl. No. 14/608,926, 3 pages.
Notice of Allowance, dated Mar. 31, 2017, received in Korean Patent Application No. 2015-7018853, which corresponds with U.S. Appl. No. 14/608,926, 4 pages.
Office Action, dated Dec. 1, 2016, received in Chinese Patent Application No. 2013800362059, which corresponds with U.S. Appl. No. 14/536,646, 3 pages.
Notice of Allowance, dated Jan. 4, 2017, received in European Patent Application No. 13724102.2, which corresponds with U.S. Appl. No. 14/536,646, 5 pages.
Notice of Allowance, dated Dec. 22, 2016, received in Japanese Patent Application No. 2015-511645, which corresponds with U.S. Appl. No. 14/536,646, 2 pages.
Office Action, dated Apr. 3, 2017, received in U.S. Appl. No. 14/536,141, 11 pages.
Office Action, dated Mar. 3, 2017, received in Chinese Patent Application No. 201380035893.7, which corresponds with U.S. Appl. No. 14/536,646, 8 pages.
Office Action, dated Mar. 29, 2017, received in Australian patent Application No. 2016201303, which corresponds with U.S. Appl. No. 14/608,942, 3 pages.
Office Action, dated Feb. 24, 2017, received in Korean Patent Application No. 2015-7018448, which corresponds with U.S. Appl. No. 14/608,942, 4 pages.
Notice of Allowance, dated Feb. 1, 2017, received in U.S. Appl. No. 14/536,203, 9 pages.
Notice of Allowance, dated Sep. 1, 2016, received in Korean Patent Application No. 2014-7034520, which corresponds with U.S. Appl. No. 14/536,203, 5 pages.
Office Action, dated Feb. 6, 2017, received in Korean Patent Application No. 2016-7033834, which corresponds with U.S. Appl. No. 14/536,203, 4 pages.
Final Office Action, dated Mar. 24, 2017, received in U.S. Appl. No. 14/536,247, 14 pages.
Office Action, dated Mar. 24, 2017, received in U.S. Appl. No. 14/536,267, 12 pages.
Office Action, dated Mar. 24, 2017, received in Australian Patent Application No. 2016204411, which corresponds with U.S. Appl. No. 14/536,267, 3 pages.
Office Action, dated Dec. 9, 2016, received in Chinese Patent Application No. 2016120601564130, which corresponds with U.S. Appl. No. 14/536,267, 4 pages.
Office Action, dated Mar. 3, 2017, received in Japanese Patent Application No. 2016-125839, which corresponds with U.S. Appl. No. 14/536,267, 6 pages.
Office Action, dated Jan. 5, 2017, received in Korean Patent Application No. 2016-7029533, which corresponds with U.S. Appl. No. 14/536,267, 2 pages.
Office Action, dated Apr. 7, 2017, received in U.S. Appl. No. 14/536,291, 11 pages.
Office Action, dated Mar. 23, 2017, received in European Patent Application No. 13724107.1, which corresponds with U.S. Appl. No. 14/536,291, 8 pages.
Final Office Action, dated Dec. 22, 2016, received in Japanese Patent Application No. 2015-511655, which corresponds with U.S. Appl. No. 14/536,291, 3 pages.
Notice of Allowance, dated Jan. 18, 2017, received in Australian Patent Application No. 2013368445, which corresponds with U.S. Appl. No. 14/608,985, 3 pages.
Office Action, dated Feb. 27, 2017, received in European Patent Application No. 13811032.5, which corresponds with U.S. Appl. No. 14/608,985, 6 pages.
Notice of Allowance, dated Jan. 24, 2017, received in Japanese Patent Application No. 2015-550384, which corresponds with U.S. Appl. No. 14/608,985, 5 pages.
Patent, dated Feb. 24, 2017, received in Japanese Patent Application No. 2015-550384, which corresponds with U.S. Appl. No. 14/608,985, 2 pages.
Office Action, dated Mar. 24, 2017, received in U.S. Appl. No. 14/609,006, 13 pages.
Office Action, dated Apr. 19, 2017, received in U.S. Appl. No. 14/536,296, 12 pages.
Office Action, dated Jan. 19, 2017, received in U.S. Appl. No. 14/609,042, 12 pages.
Notice of Allowance, dated Feb. 27, 2017, received in U.S. Appl. No. 14/864,737, 9 pages.
Notice of Allowance, dated Feb. 10, 2017, received in U.S. Appl. No. 14/866,981, 5 pages.
Office Action, dated Dec. 5, 2016, received in Danish Patent Application No. 201500575, which corresponds with U.S. Appl. No. 14/866,981, 3 pages.
Office Action, dated Mar. 14, 2017, received in Danish Patent Application No. 201500574, which corresponds with U.S. Appl. No. 14/866,159, 5 pages.
Notice of Allowance, dated Jan. 30, 2017, received in received in Danish Patent Application No. 201500588, which corresponds with U.S. Appl. No. 14/868,078, 2 pages.
Notice of Allowance, dated May 2, 2017, received in received in Danish Patent Application No. 201500588, which corresponds with U.S. Appl. No. 14/868,078, 2 pages.
Notice of Allowance, dated Apr. 27, 2017, received in U.S. Appl. No. 14/863,432, 7 pages.
Notice of Allowance, dated Jan. 12, 2017, received in Chinese Patent Application No. 201620470063.8, which corresponds with U.S. Appl. No. 14/863,432, 1 page.
Final Office Action, dated Jan. 27, 2017, received in U.S. Appl. No. 14/866,511, 26 pages.
Notice of Allowance, dated Jan. 12, 2017, received in Chinese Patent Application No. 201620470281.1, which corresponds with U.S. Appl. No. 14/866,511, 1 page.
Patent, dated Jan. 23, 2017, received in Danish Patent Application No. 201500576, which corresponds with U.S. Appl. No. 14/866,511, 3 pages.
Notice of Allowance, dated Apr. 27, 2017, received in U.S. Appl. No. 16/866,489, 27 pages.
Notice of Allowance, dated Feb. 28, 2017, received in U.S. Appl. No. 14/869,899, 9 pages.
Office Action, dated Apr. 13, 2017, received in U.S. Appl. No. 14/866,992, 34 pages.
Office Action, dated Feb. 6, 2017, received in Danish Patent Application No. 201500593, which corresponds with U.S. Appl. No. 14/866,992, 4 pages.
Notice of Allowance, dated Jan. 4, 2017, received in U.S. Appl. No. 14/845,217, 5 pages.

(56) References Cited

OTHER PUBLICATIONS

Office Action, dated May 2, 2017, received in U.S. Appl. No. 14/856,517, 34 pages.
Office Action, dated Mar. 31, 2017, received in U.S. Appl. No. 14/857,700, 14 pages.
Notice of Allowance, dated Dec. 28, 2016, received in U.S. Appl. No. 14/864,580, 8 pages.
Notice of Allowance, dated Apr. 20, 2017, received in U.S. Appl. No. 14/864,601, 13 pages.
Notice of Allowance, dated Jan. 31, 2017, received in U.S. Appl. No. 14/864,627, 7 pages.
Certificate of Examination, dated Dec. 8, 2016, received in Australian Patent Application No. 2016100292, which corresponds with U.S. Appl. No. 14/866,361, 1 page.
Patent, dated May 3, 2017, received in Chinese Patent Application No. 2016201470246.X, which corresponds with U.S. Appl. No. 14/866,987, 2 pages.
Patent, dated Sep. 19, 2016, received in German Patent Application No. 202016002908.9, which corresponds with U.S. Appl. No. 14/866,987, 3 pages.
Office Action, dated Jan. 31, 2017, received in Danish Patent Application No. 201670463, which corresponds with U.S. Appl. No. 14/866,987, 3 pages.
Office Action, dated Apr. 19, 2017, received in Danish Patent Application No. 201670463, which corresponds with U.S. Appl. No. 14/866,987, 3 pages.
Notice of Allowance, dated Feb. 28, 2017, received in U.S. Appl. No. 14/871,236, 9 pages.
Office Action, dated Apr. 13, 2017, received in Australian Patent Application No. 2016101431, which corresponds with U.S. Appl. No. 14/871,227, 4 pages.
Office Action, dated Mar. 24, 2017, received in Japanese Patent Application No. 2016-533201, which corresponds with U.S. Appl. No. 14/871,227, 6 pages.
Office Action, dated Apr. 11, 2017, received in Australian Patent Application No. 2016101437, which corresponds with U.S. Appl. No. 14/871,336, 4 pages.
Notice of Allowance, dated Mar. 23, 2017, received in Danish Patent Application No. 201500601, which corresponds with U.S. Appl. No. 14/871,336, 2 pages.
Office Action, dated Mar. 13, 2017, received in Japanese Patent Application No. 2016-183289, which corresponds with U.S. Appl. No. 14/871,462, 5 pages.
Office Action, dated Mar. 1, 2017, received in U.S. Appl. No. 14/869,855, 14 pages.
Office Action, dated Feb. 9, 2017, received in U.S. Appl. No. 14/869,873, 17 pages.
Office Action, dated May 3, 2017, received in Danish Patent Application No. 201500581, which corresponds with U.S. Appl. No. 14/867,990, 5 pages.
Final Office Action, dated May 1, 2017, received in U.S. Appl. No. 15/136,782, 18 pages.
Office Action, dated Jan. 20, 2017, received in U.S. Appl. No. 15/231,745, 21 pages.
Office Action (Search Report), dated Dec. 14, 2016, received in Danish Patent Application No. 201670590, which corresponds with U.S. Appl. No. 15/231,745, 9 pages.
Office Action, dated Jan. 5, 2017, received in Danish Patent Application No. 201670592, which corresponds with U.S. Appl. No. 15/231,745, 3 pages.
Extended European Search Report, dated Mar. 15, 2017, received in European Patent Application No. 17153418.3, which corresponds with U.S. Appl. No. 14/536,648, 7 pages.
International Search Report and Written Opinion, dated Jan. 12, 2017, received in International Patent No. PCT/US2016/046419, which corresponds with U.S. Appl. No. 14/866,992, 23 pages.
International Search Report and Written Opinion, dated Dec. 15, 2016, received in International Patent Application No. PCT/US2016/046403, which corresponds with U.S. Appl. No. 15/009,661, 17 pages.
International Search Report and Written Opinion, dated Feb. 27, 2017, received in International Patent Application No. PCT/US2016/046407, which corresponds with U.S. Appl. No. 15/009,688, 30 pages.
Extended European Search Report, dated Dec. 21, 2016, received in European Patent Application No. 16189790.5, which corresponds with U.S. Appl. No. 14/871,462, 8 pages.
International Search Report and Written Opinion, dated Jan. 3, 2017, received in International Patent Application No. PCT/US2016/046214, which corresponds with U.S. Appl. No. 15/231,745, 25 pages.
Brownlee, "Android 5.0 Lollipop Feature Review!", https//www.youtube.com/watch?v=pEDQ1z1-PvU, Oct. 27, 2014, 5 pages.
Google-Chrome, "Android 5.0 Lollipop", http://androidlover.net/android-os/android-5-0-lollipop/android-5-0-lollipop-recent-apps-card-google-search.html, Oct. 19, 2014, 10 pages.
YouTube, "How to Master Android Lollipop Notifications in Four Minutes!", Video Gadgets Journal (VGJFelix), https://www.youtube.com/watch?v=S-zBRG7GGJgs, Feb. 8, 2015, 4 pages.
Patent, dated May 12, 2017, received in Japanese Patent Application No. 2015-547948 (5839JP), which corresponds with U.S. Appl. No. 14/536,426, 3 pages.
Patent, dated May 26, 2017, received in Korean Patent Application No. 2015-7018851 (5839KR), which corresponds with U.S. Appl. No. 14/536,426, 3 pages.
Office Action, dated May 15, 2017, received in Australian Patent Application No. 2016216580 (5842AU02), which corresponds with U.S. Appl. No. 14/536,426, 3 pages.
Office Action, dated Jul. 4, 2017, received in European Patent Application No. 13795392.3 (5845EP), which corresponds with U.S. Appl. No. 14/608,926, 4 pages.
Patent, dated Jun. 30, 2017, received in Korean Patent Application No. 2015-7018853 (5845KR), which corresponds with U.S. Appl. No. 14/608,926, 3 pages.
Patent, dated May 26, 2017, received in European Patent Application No. 13724102.2 (5846EP), which corresponds with U.S. Appl. No. 14/536,646, 1 page.
Office Action, dated Jul. 21, 2017, received in Australian Patent Application No. 2016262773 (5847AU01), which corresponds with U.S. Appl. No. 14/536,141, 3 pages.
Notice of Allowance, dated Jun. 30, 2017, received in Japanese Patent Application No. 2015-511646 (5847JP), which corresponds with U.S. Appl. No. 14/536,141, 5 pages.
Office Action, dated Jun. 16, 2017, received in Chinese Patent Application No. 201380068295.X (5848CN), which corresponds with U.S. Appl. No. 14/608,942, 6 pages.
Notice of Allowance, dated May 12, 2017, received in Japanese Patent Application. No. 2015-549393, (5848JP) which corresponds with U.S. Appl. No. 14/608,942, 5 pages.
Patent, dated Jun. 16, 2017, received in Japanese Patent Application No. 2015-549393, (5848JP) which corresponds with U.S. Appl. No. 14/608,942, 3 pages.
Office Action, dated Jul. 4, 2017, received in Australian Patent Application No. 2016238917 (5850AU01), which corresponds with U.S. Appl. No. 14/536,203, 5 pages.
Office Action, dated Jun. 23, 2017, received in Japanese Patent Application No. 2016173113 (5850JP01), which corresponds with U.S. Appl. No. 14/536,203, 5 pages.
Office Action, dated Jul. 21, 2017, received in Australian Patent Application No. 2016216658 (5854AU01), which corresponds with U.S. Appl. No. 14/536,291, 3 pages.
Patent, dated May 18, 2017, received in Australian Patent Application No. 2013368445 (5855AU), which corresponds with U.S. Appl. No. 14/608,985, 1 page.
Office Action, dated May 19, 2017, received in Chinese Patent Application No. 201380068399.0 (5855CN), which corresponds with U.S. Appl. No. 14/608,985, 5 pages.
Office Action, dated Jul. 21, 2017, received in Australian Patent Application No. 2016247194 (5858AU), which corresponds with U.S. Appl. No. 14/536,648, 3 pages.
Office Action, dated May 15, 2017, received in Japanese Patent Application No. 2016-558331 (7246JP), which corresponds with U.S. Appl. No. 14/864,737, 5 pages.

(56) References Cited

OTHER PUBLICATIONS

Notice of Allowance, dated Jun. 23, 2017, received in Japanese Patent Application No. 2016-558331 (7246JP), which corresponds with U.S. Appl. No. 14/864,737, 5 pages.
Office Action, dated Jul. 7, 2017, received in Danish Patent Application No. 201500575 (7247DK), 4 pages.
Office Action, dated Jul. 6, 2017, received in Danish Patent Application No. 201500574 (7265DK), which corresponds with U.S. Appl. No. 14/866,159, 3 pages.
Office Action, dated Jun. 12, 2017, received in Danish Patent Application No. 201500582 (7270DK), which corresponds with U.S. Appl. No. 14/863,432, 5 pages.
Office Action, dated Jun. 9, 2017, received in Japanese Patent Application No. 2016558214 (7294JP), which corresponds with U.S. Appl. No. 14/866,511, 6 pages.
Notice of Allowance, dated Jul. 14, 2017, received in Japanese Patent Application No. 2016558214 (7294JP), which corresponds with U.S. Appl. No. 14/866,511, 5 pages.
Office Action, dated Jul. 3, 2017, received in Danish Patent Application No. 201500592 (7309DK), which corresponds with U.S. Appl. No. 14/869,899, 5 pages.
Office Action, dated Jun. 15, 2017, received in Danish Patent Application No. 201500579 (7334DK), which corresponds with U.S. Appl. No. 14/866,361, 2 pages.
Office Action, dated Jul. 31, 2017, received in Japanese Patent Application No. 2017126445 (7335JP01), which corresponds with U.S. Appl. No. 14/866,987, 6 pages.
Office Action, dated Jun. 16, 2017, received in Japanese Patent Application No. 2016-233450 (7336JP), which corresponds with U.S. Appl. No. 14/866,989, 6 pages.
Office Action, dated Jun. 15, 2017, received in Danish Patent Application No. 201500595 (7337DK), which corresponds with U.S. Appl. No. 14/871,236, 4 pages.
Office Action, dated Aug. 4, 2017, received in Japanese Patent Application No. 2016-533201 (7341JP), which corresponds with U.S. Appl. No. 14/871,227, 6 pages.
Office Action, dated May 15, 2017, received in Danish Patent Application No. 201500594 (7344DK), which corresponds with U.S. Appl. No. 14/867,823, 4 pages.
Office Action, dated May 23, 2017, received in Danish Patent Application No. 201770190 (7399DK), which corresponds with U.S. Appl. No. 15/136,782, 7 pages.
Office Action, dated Jun. 29, 2017, received in Danish Patent Application No. 201670587 (7403DK), which corresponds with U.S. Appl. No. 15/231,745, 4 pages.
Office Action, dated Jul. 6, 2017, received in Danish Patent Application No. 201670590 (7403DK01), which corresponds with U.S. Appl. No. 15/231,745, 3 pages.
Office Action, dated Jul. 27, 2017, received in Australian Patent Application No. 2017100535 (7430AU), which corresponds with U.S. Appl. No. 15/272,341, 4 pages.
Office Action, dated Aug. 4, 2017, received in Danish Patent Application No. 201770377 (7479DK), 9 pages.
Search Report, dated Jun. 22, 2017, received in Dutch Patent Application No. 2016375, which corresponds with U.S. Appl. No. 14/866,981, 17 pages.
Search Report, dated Jun. 19, 2017, received in Dutch Patent Application No. 2016377, which corresponds with U.S. Appl. No. 14/866,159, 13 pages.
Extended European Search Report, dated Jun. 22, 2017, received in European Patent Application No. 16189421.7, which corresponds with U.S. Appl. No. 14/866,987, 7 pages.
Extended European Search Report, dated Jun. 8, 2017, received in European Patent Application No. 16189425.8, which corresponds with U.S. Appl. No. 14/866,989, 8 pages.
Extended European Search Report, dated Jul. 25, 2017, received in European Patent Application No. 17171972.7, which corresponds with U.S. Appl. No. 14/870,882, 12 pages.
Extended European Search Report, dated Jul. 25, 2017, received in European Patent Application No. 1717226.3, which corresponds with U.S. Appl. No. 14/871,336, 9 pages.
Office Action, dated Jun. 29, 2017, received in U.S. Appl. No. 14/608,895 (5839), 30 pages.
Office Action, dated Jul. 26, 2017, received in U.S. Appl. No. 14/536,235 (5840), 14 pages.
Office action, dated Aug. 3, 2017, received in U.S. Appl. No. 14/536,426 (5842), 10 pages.
Office Action, dated Jul. 17, 2017, received in U.S. Appl. No. 14/536,166 (5849), 19 pages.
Notice of Allowance, dated Jul. 10, 2017, received in U.S. Appl. No. 14/609,042 (5859), 8 pages.
Notice of Allowance, dated Jun. 19, 2017, received in U.S. Appl. No. 14/864,737 (7246), 8 pages.
Notice of Allowance, dated Jul. 6, 2017, received in U.S. Appl. No. 14/866,489 (7298), 12 pages.
Office Action, dated May 18, 2017, received in U.S. Appl. No. 14/856,519 (7318), 35 pages.
Office Action, dated Jun. 9, 2017, received in U.S. Appl. No. 14/856,520 (7319), 36 pages.
Office Action, dated Jun. 30, 2017, received in U.S. Appl. No. 14/856,522 (7320), 22 pages.
Notice of Allowance, dated Jun. 16, 2017, received in in U.S. Appl. No. 14/857,645 (7321), 5 pages.
Office Action, dated May 11, 2017, received in U.S. Appl. No. 14/867,823 (7344), 42 pages.
Office Action, dated Jul. 6, 2017, received in U.S. Appl. No. 14/867,892 (7345), 55 pages.
Final Office Action, dated Jun. 2, 2017, received in U.S. Appl. No. 15/081,771 (7398), 17 pages.

\* cited by examiner

```
┌─────────────────────────────────────────────────────────────────┐
│ Display a response in accordance with the detected contact, the response │─── 13308
│   being based at least in part on an input-output mapping of intensity to │
│     response at the location of the contact on the touch-sensitive surface │
│  ┌───────────────────────────────────────────────────────────┐  │
│  │  The input-output mapping including, for a respective location on the │──── 13310
│  │                    touch-sensitive surface:               │  │
│  │                                                            │  │
│  │   A first input-output relationship between intensity and response over a │
│  │              first range of intensity values.             │  │
│  │                                                            │  │
│  │   A second input-output relationship between intensity and response │
│  │   over a second range of intensity values, the second range of intensity │
│  │   values being different from the first range of intensity values. │
│  │                                                            │  │
│  │   A transitional intensity value where the first range of intensity values │
│  │   meets or overlaps the second range of intensity values, where, at the │
│  │                    transitional intensity value:          │  │
│  │                                                            │  │
│  │    The first input-output relationship has a first rate of change of │
│  │               response with change in intensity.          │  │
│  │                                                            │  │
│  │   The second input-output relationship has a second rate of change of │
│  │               response with change in intensity.          │  │
│  │                                                            │  │
│  │  The first rate of change is substantially the same as the second rate of │
│  │                             change.                       │  │
│  │                              (B)                          │  │
│  │  ─ ─ ─ ─ ─ ─ ─ ─ ─ ─ ─ ─ ─ ─ ─ ─ ─ ─ ─ ─ ─ ─ ─ ─ ─ ─     │  │
│  │  │ A first property of the device varies at different locations on the │ │
│  │  │ touch-sensitive surface. The first input-output relationship is the │ │
│  │  │  same at a first location and a second location on the touch-  │───13320
│  │  │  sensitive surface. The second input-output relationship is    │ │
│  │  │  different at the first location than at the second location on the │ │
│  │  │                    touch-sensitive surface.             │ │
│  │  ─ ─ ─ ─ ─ ─ ─ ─ ─ ─ ─ ─ ─ ─ ─ ─ ─ ─ ─ ─ ─ ─ ─ ─ ─ ─     │  │
│  │                              (C)                          │  │
│  │  ─ ─ ─ ─ ─ ─ ─ ─ ─ ─ ─ ─ ─ ─ ─ ─ ─ ─ ─ ─ ─ ─ ─ ─ ─ ─     │  │
│  │  │ The response includes changing a current value of a property from a │───13322
│  │  │    first value to a second value in a predefined range of values. │ │
│  │  ─ ─ ─ ─ ─ ─ ─ ─ ─ ─ ─ ─ ─ ─ ─ ─ ─ ─ ─ ─ ─ ─ ─ ─ ─ ─     │  │
│  │  │ The response includes adjusting one or more of: volume, brightness, │ │
│  │  │ user interface object spacing, user interface object size, user interface │───13324
│  │  │     object opacity, content scrubbing, and animation progress. │ │
│  │  ─ ─ ─ ─ ─ ─ ─ ─ ─ ─ ─ ─ ─ ─ ─ ─ ─ ─ ─ ─ ─ ─ ─ ─ ─ ─     │  │
└─────────────────────────────────────────────────────────────────┘
```

Figure 9C

```
┌─────────────────────────────────────────────────────────────┐
│   In response to detecting the change in intensity of the contact at the   │──13614
│   respective location on the touch-sensitive surface, adjust an output of the │
│                              device                          │
│   ┌─────────────────────────────────────────────────────────┐   │
│   │  In accordance with a determination that the respective location has a │──13618
│   │  second dynamic range that is different from the first dynamic range, │
│   │  the output is adjusted in accordance with the change in the intensity of │
│   │  the contact at the respective location and a second input-output │
│   │  mapping of intensity to response that corresponds to the second │
│   │  dynamic range. The second input-output mapping is different from the │
│   │                  first input-output mapping.                │
│   └─────────────────────────────────────────────────────────┘   │
│                              (B)                             │
│   ┌ ─ ─ ─ ─ ─ ─ ─ ─ ─ ─ ─ ─ ─ ─ ─ ─ ─ ─ ─ ─ ─ ─ ─ ─ ─ ─ ─ ┐   │
│   │   The first input-output mapping maps a first range of intensity │──13626
│   │              values to a respective range of output.         │
│   │                                                              │
│   │      The second input-output mapping maps a second range of  │
│   │   intensity values, different from the first range of intensity values, │
│   │                  to the respective range of output.          │
│   └ ─ ─ ─ ─ ─ ─ ─ ─ ─ ─ ─ ─ ─ ─ ─ ─ ─ ─ ─ ─ ─ ─ ─ ─ ─ ─ ─ ┘   │
│   ┌ ─ ─ ─ ─ ─ ─ ─ ─ ─ ─ ─ ─ ─ ─ ─ ─ ─ ─ ─ ─ ─ ─ ─ ─ ─ ─ ─ ┐   │──13628
│   │     The first input-output mapping has a first portion that  │
│   │     corresponds to a range of intensity values below a transition │
│   │   intensity value and a second portion that corresponds to a range │
│   │          of intensity values above the transition intensity value. │
│   │                                                              │
│   │      The second input-output mapping has a first portion that │
│   │    corresponds to a range of intensity values below the transition │
│   │   intensity value and a second portion that corresponds to a range │
│   │          of intensity values above the transition intensity value. │
│   │                                                              │
│   │    The first portion of the first input-output mapping is the same as │
│   │         the first portion of the second input-output mapping. │
│   │                                                              │
│   │   The second portion of the first input-output mapping is different │
│   │      from the second portion of the second-input-output mapping. │
│   └ ─ ─ ─ ─ ─ ─ ─ ─ ─ ─ ─ ─ ─ ─ ─ ─ ─ ─ ─ ─ ─ ─ ─ ─ ─ ─ ─ ┘   │
│                              (C)                             │
└─────────────────────────────────────────────────────────────┘
```

Figure 12C

DEVICE, METHOD, AND GRAPHICAL USER INTERFACE FOR TRANSITIONING BETWEEN TOUCH INPUT TO DISPLAY OUTPUT RELATIONSHIPS

RELATED APPLICATIONS

This application is a continuation of PCT Patent Application Serial No. PCT/US2013/069483, filed on Nov. 11, 2013, entitled "Device, Method, and Graphical User Interface for Transitioning between Touch Input to Display Output Relationships," which claims the benefit of and priority to U.S. Provisional Patent Application Ser. No. 61/778,363, filed on Mar. 12, 2013, entitled "Device, Method, and Graphical User Interface for Transitioning between Touch Input to Display Output Relationships;" and U.S. Provisional Patent Application No. 61/747,278, filed Dec. 29, 2012, entitled "Device, Method, and Graphical User Interface for Manipulating User Interface Objects with Visual and/or Haptic Feedback," which applications are incorporated by reference herein in their entireties.

This application is also related to the following: U.S. Provisional Patent Application Ser. No. 61/778,092, filed on Mar. 12, 2013, entitled "Device, Method, and Graphical User Interface for Selecting Object within a Group of Objects;" U.S. Provisional Patent Application Ser. No. 61/778,125, filed on Mar. 12, 2013, entitled "Device, Method, and Graphical User Interface for Navigating User Interface Hierarchies;" U.S. Provisional Patent Application Ser. No. 61/778,156, filed on Mar. 12, 2013, entitled "Device, Method, and Graphical User Interface for Manipulating Framed Graphical Objects;" U.S. Provisional Patent Application Ser. No. 61/778,179, filed on Mar. 12, 2013, entitled "Device, Method, and Graphical User Interface for Scrolling Nested Regions;" U.S. Provisional Patent Application Ser. No. 61/778,171, filed on Mar. 12, 2013, entitled "Device, Method, and Graphical User Interface for Displaying Additional Information in Response to a User Contact;" U.S. Provisional Patent Application Ser. No. 61/778,191, filed on Mar. 12, 2013, entitled "Device, Method, and Graphical User Interface for Displaying User Interface Objects Corresponding to an Application;" U.S. Provisional Patent Application Ser. No. 61/778,211, filed on Mar. 12, 2013, entitled "Device, Method, and Graphical User Interface for Facilitating User Interaction with Controls in a User Interface;" U.S. Provisional Patent Application Ser. No. 61/778,239, filed on Mar. 12, 2013, entitled "Device, Method, and Graphical User Interface for Forgoing Generation of Tactile Output for a Multi-Contact Gesture;" U.S. Provisional Patent Application Ser. No. 61/778,284, filed on Mar. 12, 2013, entitled "Device, Method, and Graphical User Interface for Providing Tactile Feedback for Operations Performed in a User Interface;" U.S. Provisional Patent Application Ser. No. 61/778,287, filed on Mar. 12, 2013, entitled "Device, Method, and Graphical User Interface for Providing Feedback for Changing Activation States of a User Interface Object;" U.S. Provisional Patent Application Ser. No. 61/778,367, filed on Mar. 12, 2013, entitled "Device, Method, and Graphical User Interface for Moving a User Interface Object Based on an Intensity of a Press Input;" U.S. Provisional Patent Application Ser. No. 61/778,265, filed on Mar. 12, 2013, entitled "Device, Method, and Graphical User Interface for Transitioning between Display States in Response to a Gesture;" U.S. Provisional Patent Application Ser. No. 61/778,373, filed on Mar. 12, 2013, entitled "Device, Method, and Graphical User Interface for Managing Activation of a Control Based on Contact Intensity;" U.S. Provisional Patent Application Ser. No. 61/778,412, filed on Mar. 13, 2013, entitled "Device, Method, and Graphical User Interface for Displaying Content Associated with a Corresponding Affordance;" U.S. Provisional Patent Application Ser. No. 61/778,413, filed on Mar. 13, 2013, entitled "Device, Method, and Graphical User Interface for Selecting User Interface Objects;" U.S. Provisional Patent Application Ser. No. 61/778,414, filed on Mar. 13, 2013, entitled "Device, Method, and Graphical User Interface for Moving and Dropping a User Interface Object;" U.S. Provisional Patent Application Ser. No. 61/778,416, filed on Mar. 13, 2013, entitled "Device, Method, and Graphical User Interface for Determining Whether to Scroll or Select Content;" and U.S. Provisional Patent Application Ser. No. 61/778,418, filed on Mar. 13, 2013, entitled "Device, Method, and Graphical User Interface for Switching between User Interfaces," which are incorporated herein by reference in their entireties.

This application is also related to the following: U.S. Provisional Patent Application Ser. No. 61/645,033, filed on May 9, 2012, entitled "Adaptive Haptic Feedback for Electronic Devices;" U.S. Provisional Patent Application Ser. No. 61/665,603, filed on Jun. 28, 2012, entitled "Adaptive Haptic Feedback for Electronic Devices;" and U.S. Provisional Patent Application Ser. No. 61/681,098, filed on Aug. 8, 2012, entitled "Adaptive Haptic Feedback for Electronic Devices," which are incorporated herein by reference in their entireties.

TECHNICAL FIELD

This relates generally to electronic devices with touch-sensitive surfaces, including but not limited to electronic devices with touch-sensitive surfaces that detect inputs for manipulating user interfaces.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include adjusting the position and/or size of one or more user interface objects or activating buttons or opening files/applications represented by user interface objects, as well as associating metadata with one or more user interface objects or otherwise manipulating user interfaces. Exemplary user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture or iPhoto from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But existing methods for performing these manipulations are cumbersome and inefficient. In addition, existing methods take longer than necessary, thereby wasting energy. This latter consideration is particularly important in battery-operated devices.

SUMMARY

Accordingly, there is a need for electronic devices with faster, more efficient methods and interfaces for manipulating user interfaces. Such methods and interfaces optionally complement or replace conventional methods for manipulating user interfaces. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

There is a need for electronic devices with faster, more efficient methods for assigning respective portions of an aggregate intensity to a plurality of contacts. Such methods may complement or replace conventional methods for assigning respective portions of an aggregate intensity to a plurality of contacts. Such methods reduce the cognitive burden on a user and produce a more efficient human-machine interface. For battery-operated devices, such methods conserve power and increase the time between battery charges.

In accordance with some embodiments, a method is performed at an electronic device with a display, a touch-sensitive surface and a plurality of intensity sensors to detect intensity of contacts with the touch-sensitive surface. The method includes detecting, on the touch-sensitive surface, a plurality of contacts. While detecting the plurality of contacts, the method further includes: receiving a first intensity measurement from a first intensity sensor of the plurality of intensity sensors; receiving a second intensity measurement from a second intensity sensor of the plurality of intensity sensors, where the first intensity sensor is different from the second intensity sensor; and assigning a first portion of an aggregate intensity of the contacts to the first contact and assigning a second portion of the aggregate intensity to the second contact. The method includes assigning the aggregate intensity based at least in part on: the first intensity measurement; the second intensity measurement; a location of the first intensity sensor relative to the touch-sensitive surface; a location of the second intensity sensor relative to the touch-sensitive surface; and a comparison between values of a set of one or more properties of the first contact and corresponding values of the set of one or more properties of the second contact. In response to detecting the plurality of contacts, the method further includes performing an operation based at least in part on the portion of the aggregate intensity assigned to the first contact.

In accordance with some embodiments, an electronic device includes: a display unit configured to display information; a touch-sensitive surface to receive contacts; a plurality of intensity sensor units to detect intensity of contacts with the touch-sensitive surface; and a processing unit coupled to the display unit, the touch-sensitive surface unit, and the plurality of sensor units. The processing unit is configured to detect, on the touch-sensitive surface unit, a plurality of contacts. While detecting the plurality of contacts, the processing unit is further configured to: receive a first intensity measurement from a first intensity sensor unit of the plurality of intensity sensors unit; receive a second intensity measurement from a second intensity sensor unit of the plurality of intensity sensor units, where the first intensity sensor unit is different from the second intensity sensor unit; and assign a first portion of an aggregate intensity of the contacts to the first contact and a second portion of the aggregate intensity to the second contact. The processing unit is configured to assign the aggregate intensity to the plurality of contacts based at least in part on: the first intensity measurement; the second intensity measurement; a location of the first intensity sensor unit relative to the touch-sensitive surface unit; a location of the second intensity sensor unit relative to the touch-sensitive surface unit; and a comparison between values of a set of one or more properties of the first contact and corresponding values of the set of one or more properties of the second contact. The processing unit is further configured to respond to detecting the plurality of contacts by performing an operation based at least in part on the portion of the aggregate intensity assigned to the first contact.

Thus, electronic devices with displays, touch-sensitive surfaces and a plurality of intensity sensors to detect intensity of contacts with the touch-sensitive surface are provided with faster, more efficient methods for assigning respective portions of an aggregate intensity to a plurality of contacts, thereby increasing the effectiveness, efficiency, and user satisfaction with such devices. Such methods may complement or replace conventional methods for assigning respective portions of an aggregate intensity to a plurality of contacts.

An electronic device detects, on a touch-sensitive surface, a plurality of contacts via a plurality of intensity sensors. While detecting the plurality of contacts, the device assigns portions of an aggregate intensity of the contacts to each of the plurality of contacts based on: the first intensity measurement received from a first intensity sensor; the second intensity measurement received from a second intensity sensor; a location of the first intensity sensor relative to the touch-sensitive surface; a location of the second intensity sensor relative to the touch-sensitive surface; and a comparison between values of a set of one or more properties of the first contact and corresponding values of the second contact. In response to detecting the plurality of contacts, the device performs an operation based at least in part on the portion of the aggregate intensity assigned to the first contact.

There is a need for electronic devices with faster, more efficient methods and interfaces for transitioning between touch input to display output relationships. Such methods and interfaces may complement or replace conventional methods for transitioning between touch input to display output relationships. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a touch-sensitive surface and a display, where the device includes one or more sensors to detect intensity of contacts with the touch-sensitive surface. The method includes detecting a contact on the touch-sensitive surface, determining a location of the contact on the touch-sensitive surface, determining an intensity of the contact on the touch-sensitive surface, and displaying a response in accordance with the detected contact, the response being based at least in part on an input-output mapping of intensity to response at the location of the contact on the touch-sensitive surface. The input-output mapping includes, for a respective location on the touch-sensitive surface, a first input-output relationship (e.g., touch input to display output) between intensity and response over a first range of intensity values, a second input-output relationship between intensity and response over a second range of intensity values, the second range of intensity values being different from the first range of intensity values, and a transitional intensity value where the first range of intensity values meets or overlaps the second range of intensity values, where, at the transitional intensity value, the first input-output relationship has a first rate of change of response with change in intensity, the second input-output relationship has a second rate of change of response with change in intensity, and the first rate of change is substantially the same as the second rate of change.

In accordance with some embodiments, an electronic device includes a display unit configured to display a response in accordance with a detected contact, a touch-sensitive surface unit configured to receive user contacts, one or more sensor units configured to detect intensity of contacts with the touch-sensitive surface unit, and a processing unit coupled to the display unit, the touch-sensitive surface unit, and the sensor units. The processing unit is configured to detect a contact on the touch-sensitive surface unit, determine a location of the contact on the touch-sensitive surface unit, determine an intensity of the contact on the touch-sensitive surface unit, and enable display of a response in accordance with the detected contact, the response being based at least in part on an input-output mapping of intensity to response at the location of the contact on the touch-sensitive surface unit. The input-output mapping includes, for a respective location on the touch-sensitive surface unit, a first input-output relationship between intensity and response over a first range of intensity values, a second input-output relationship between intensity and response over a second range of intensity values, the second range of intensity values being different from the first range of intensity values, and a transitional intensity value where the first range of intensity values meets or overlaps the second range of intensity values, where, at the transitional intensity value, the first input-output relationship has a first rate of change of response with change in intensity, the second input-output relationship has a second rate of change of response with change in intensity, and the first rate of change is substantially the same as the second rate of change.

Thus, electronic devices with displays, touch-sensitive surfaces and one or more sensors to detect intensity of contacts with the touch-sensitive surface are provided with faster, more efficient methods and interfaces for transitioning between touch input to display output relationships, thereby increasing the effectiveness, efficiency, and user satisfaction with such devices. Such methods and interfaces may complement or replace conventional methods for transitioning between touch input to display output relationships.

There is a need for electronic devices with faster, more efficient methods and interfaces for adjusting outputs with changes in contact intensity and varying dynamic range of intensity detection. Such methods and interfaces may complement or replace conventional methods for adjusting outputs with changes in contact intensity and varying dynamic range of intensity detection. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a touch-sensitive surface and a display, where the device includes one or more sensors to detect intensity of contacts with the touch-sensitive surface. The method includes detecting a contact on the touch-sensitive surface, and determining a respective location of the contact on the touch-sensitive surface, where the respective location on the touch-sensitive surface has a respective dynamic range for detecting intensity of the contact. The method further includes determining an intensity of the contact on the touch-sensitive surface at the respective location, detecting a change in intensity of the contact, and in response to detecting the change in intensity of the contact at the respective location on the touch-sensitive surface, adjusting an output of the device, where, in accordance with a determination that the respective location has a first dynamic range, the output is adjusted in accordance with the change in the intensity of the contact at the respective location and a first input-output mapping of intensity to response that corresponds to the first dynamic range, and, in accordance with a determination that the respective location has a second dynamic range that is different from the first dynamic range, the output is adjusted in accordance with the change in the intensity of the contact at the respective location and a second input-output mapping of intensity to response that corresponds to the second dynamic range, where the second input-output mapping is different from the first input-output mapping.

In accordance with some embodiments, an electronic device includes a display unit, a touch-sensitive surface unit configured to receive user contacts, one or more sensor units configured to detect intensity of contacts with the touch-sensitive surface unit, and a processing unit coupled to the display unit, the touch-sensitive surface unit, and the sensor units. The processing unit is configured to detect a contact on the touch-sensitive surface unit, determine a respective location of the contact on the touch-sensitive surface unit, where the respective location on the touch-sensitive surface unit has a respective dynamic range for detecting intensity of the contact. The processing unit is further configured to determine an intensity of the contact on the touch-sensitive surface unit at the respective location, detect a change in intensity of the contact, and, in response to detecting the change in intensity of the contact at the respective location on the touch-sensitive surface, adjust an output of the device, where, in accordance with a determination that the respective location has a first dynamic range, the output is adjusted in accordance with the change in the intensity of the contact at the respective location and a first input-output mapping of intensity to response that corresponds to the first dynamic range, and, in accordance with a determination that the respective location has a second dynamic range that is different from the first dynamic range, the output is adjusted in accordance with the change in the intensity of the contact at the respective location and a second input-output mapping of intensity to response that corresponds to the second dynamic range, where the second input-output mapping is different from the first input-output mapping.

Thus, electronic devices with displays, touch-sensitive surfaces and one or more sensors to detect intensity of contacts with the touch-sensitive surface are provided with faster, more efficient methods and interfaces for adjusting outputs with changes in contact intensity and varying dynamic range of intensity detection, thereby increasing the effectiveness, efficiency, and user satisfaction with such devices. Such methods and interfaces may complement or replace conventional methods for adjusting outputs with changes in contact intensity and varying dynamic range of intensity detection.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing the operations of any of the methods referred to in the fifth paragraph of the Description of Embodiments, In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods referred to in the fifth paragraph of the Description of Embodiments, which are updated in response to inputs, as described in the fifth paragraph of the Description of Embodiments. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform the operations of any of the methods referred to in the fifth paragraph of the Description of Embodiments. In accordance with some embodiments, an electronic device includes: a display, a touch-sensitive surface, and optionally one or more sensors to detect intensity of contacts with the touch-sensitive surface; and means for performing the operations of any of the methods referred to in the fifth paragraph of the Description of Embodiments. In accordance with some embodiments, an information processing apparatus, for use in an electronic device with a display and a touch-sensitive surface, optionally one or more sensors to detect intensity of contacts with the touch-sensitive surface, includes means for performing the operations of any of the methods referred to in the fifth paragraph of the Description of Embodiments.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 9A-9C are flow diagrams illustrating a method of transitioning between touch input to display output relationships in accordance with some embodiments.

FIGS. 12A-12D are flow diagrams illustrating a method of adjusting outputs with changes in contact intensity and varying dynamic range of intensity detection in accordance with some embodiments.

DESCRIPTION OF EMBODIMENTS

Figure 1A:
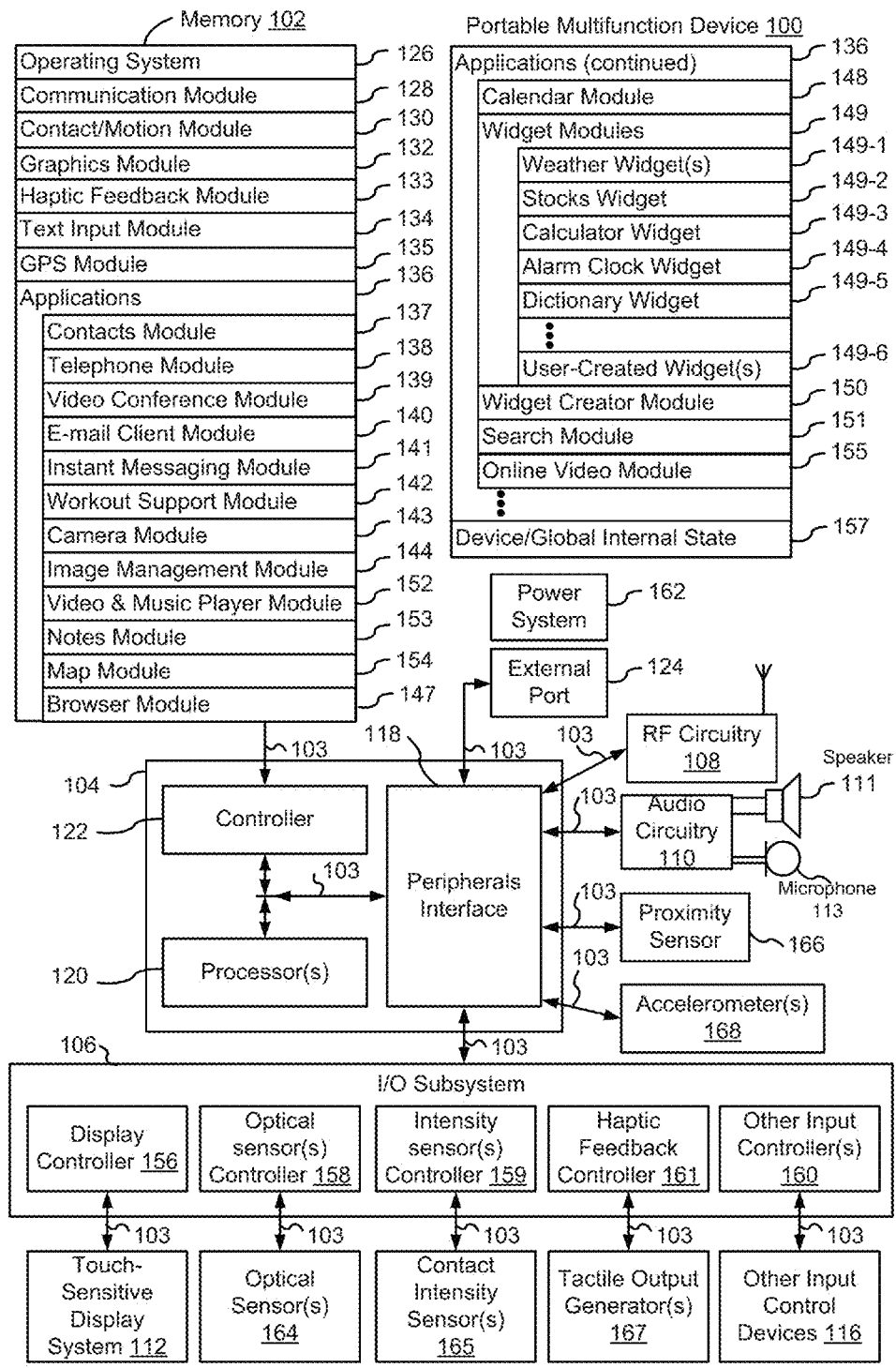
FIG. 1A is a block diagram illustrating a portable multifunction device with a touch-sensitive display in accordance with some embodiments.

The methods, devices and GUIs described herein provide visual and/or haptic feedback that makes manipulation of user interface objects more efficient and intuitive for a user. For example, in a system where the clicking action of a trackpad is decoupled from the contact intensity (e.g., contact force, contact pressure, or a substitute therefore) that is needed to reach an activation threshold, the device can generate different tactile outputs (e.g., "different clicks") for different activation events (e.g., so that clicks that accomplish a particular result are differentiated from clicks that do not produce any result or that accomplish a different result from the particular result). Additionally, tactile outputs can be generated in response to other events that are not related to increasing intensity of a contact, such as generating a tactile output (e.g., a "detent") when a user interface object is moved to a particular position, boundary or orientation, or when an event occurs at the device.

Additionally, in a system where a trackpad or touch-screen display is sensitive to a range of contact intensity that includes more than one or two specific intensity values (e.g., more than a simple on/off, binary intensity determination), the user interface can provide responses (e.g., visual or tactile cues) that are indicative of the intensity of the contact within the range. In some implementations, a pre-activation-threshold response and/or a post-activation-threshold response to an input are displayed as continuous animations. As one example of such a response, a preview of an operation is displayed in response to detecting an increase in contact intensity that is still below an activation threshold for performing the operation. As another example of such a response, an animation associated with an operation continues even after the activation threshold for the operation has been reached. Both of these examples provide a user with a continuous response to the force or pressure of a user's contact, which provides a user with visual and/or haptic feedback that is richer and more intuitive. More specifically, such continuous force responses give the user the experience of being able to press lightly to preview an operation and/or press deeply to push "past" or "through" a predefined user interface state corresponding to the operation.

Additionally, for a device with a touch-sensitive surface that is sensitive to a range of contact intensity, multiple contact intensity thresholds can be monitored by the device and different functions can be mapped to different contact intensity thresholds. This serves to increase the available "gesture space" providing easy access to advanced features for users who know that increasing the intensity of a contact at or beyond a second "deep press" intensity threshold will cause the device to perform a different operation from an operation that would be performed if the intensity of the contact is between a first "activation" intensity threshold and the second "deep press" intensity threshold. An advantage of assigning additional functionality to a second "deep press" intensity threshold while maintaining familiar functionality at a first "activation" intensity threshold is that inexperienced users who are, in some circumstances, confused by the additional functionality can use the familiar functionality by just applying an intensity up to the first "activation" intensity threshold, whereas more experienced users can take advantage of the additional functionality by applying an intensity at the second "deep press" intensity threshold.

Additionally, for a device with a touch-sensitive surface that is sensitive to a range of contact intensity, the device can provide additional functionality by allowing users to perform complex operations with a single continuous contact. For example, when selecting a group of objects, a user can move a continuous contact around the touch-sensitive surface and can press while dragging (e.g., applying an intensity greater than a "deep press" intensity threshold) to add additional elements to a selection. In this way, a user can intuitively interact with a user interface where pressing harder with a contact causes objects in the user interface to be "stickier."

A number of different approaches to providing an intuitive user interface on a device where a clicking action is decoupled from the force that is needed to reach an activation threshold and/or the device is sensitive to a wide range of contact intensities are described below. Using one or more of these approaches (optionally in conjunction with each other) helps to provide a user interface that intuitively provides users with additional information and functionality, thereby reducing the user's cognitive burden and improving the human-machine interface. Such improvements in the human-machine interface enable users to use the device faster and more efficiently. For battery-operated devices, these improvements conserve power and increase the time between battery charges. For ease of explanation, systems, methods and user interfaces for including illustrative examples of some of these approaches are described below, as follows:

Many electronic devices sense a pressure of a user input. For example, a device with a pressure sensitive button determines an amount that the button is depressed by the user based on a pressure measurement of a pressure sensor integrated with the button. However, such methods do not provide a way to estimate the intensity of multiple different simultaneously detected contacts and thus do not provide a way to interact with an intensity sensitive user interface with multiple contacts. The device improves on these methods by assigning a first portion of an aggregate intensity (e.g., a sum of intensity measurements received from each intensity sensor of a plurality of intensity sensors) of a plurality of contacts on a touch-sensitive surface to a first contact of the plurality of contacts and by assigning a second portion of the aggregate intensity to a second contact of the plurality of contacts, while detecting the plurality of contacts on the touch-sensitive surface, thereby enabling the device to estimate intensity of multiple simultaneously detected contacts and use this information to control convenient and efficient user interfaces. In particular, FIGS. 5A-5L illustrate exemplary user interfaces and contacts with a touch-sensitive surface that are assigned respective portions of an aggregate intensity to a plurality of contacts. FIGS. 6A-6C are flow diagrams illustrating a method of assigning respective portions of an aggregate intensity to a plurality of contacts. The depictions in FIGS. 5A-5L are used to illustrate the processes in FIGS. 6A-6C.

Figure 8A:
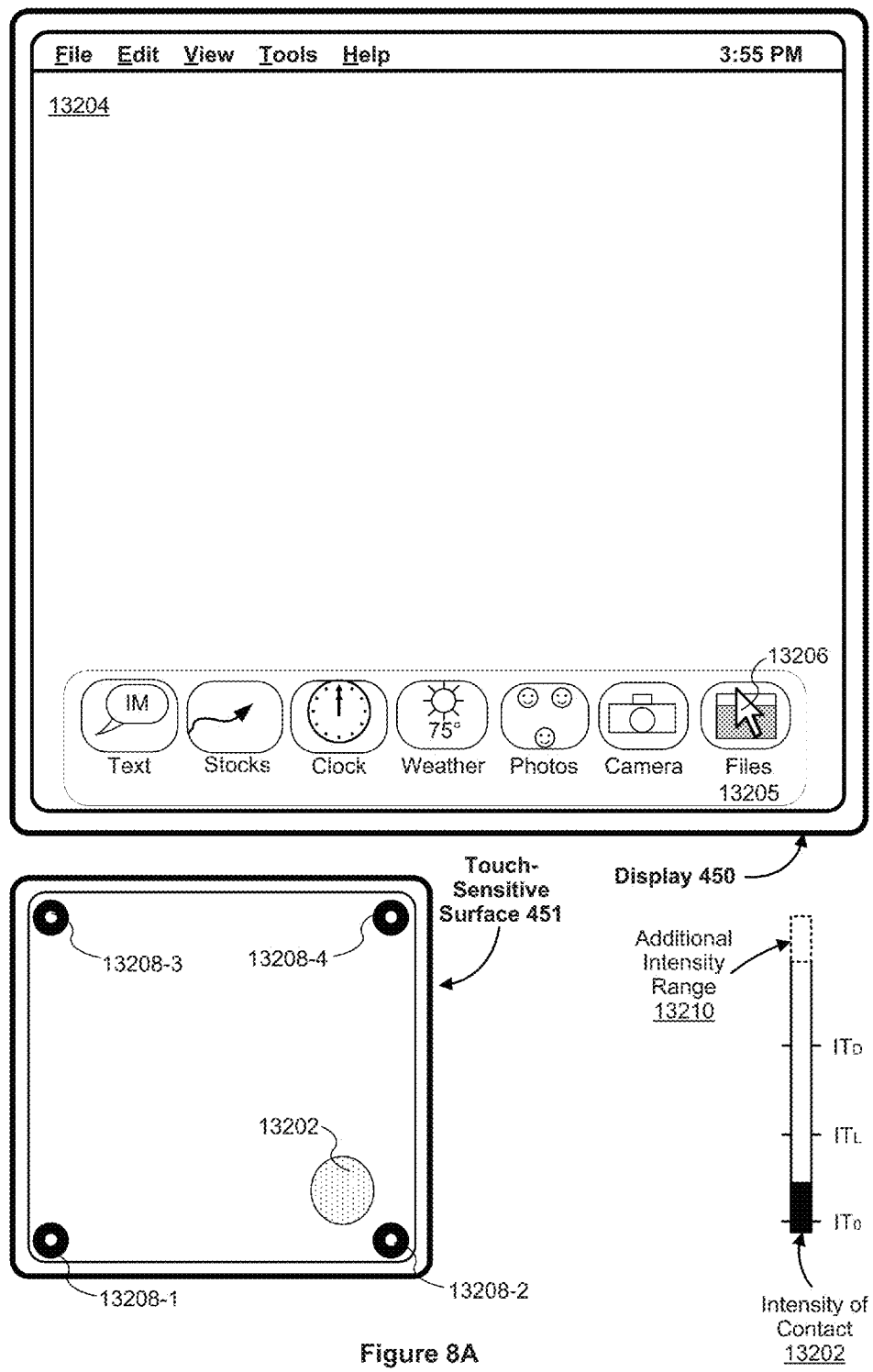
FIGS. 8A-8V illustrate exemplary user interfaces for transitioning between touch input to display output relationships in accordance with some embodiments.
Figure 8B:
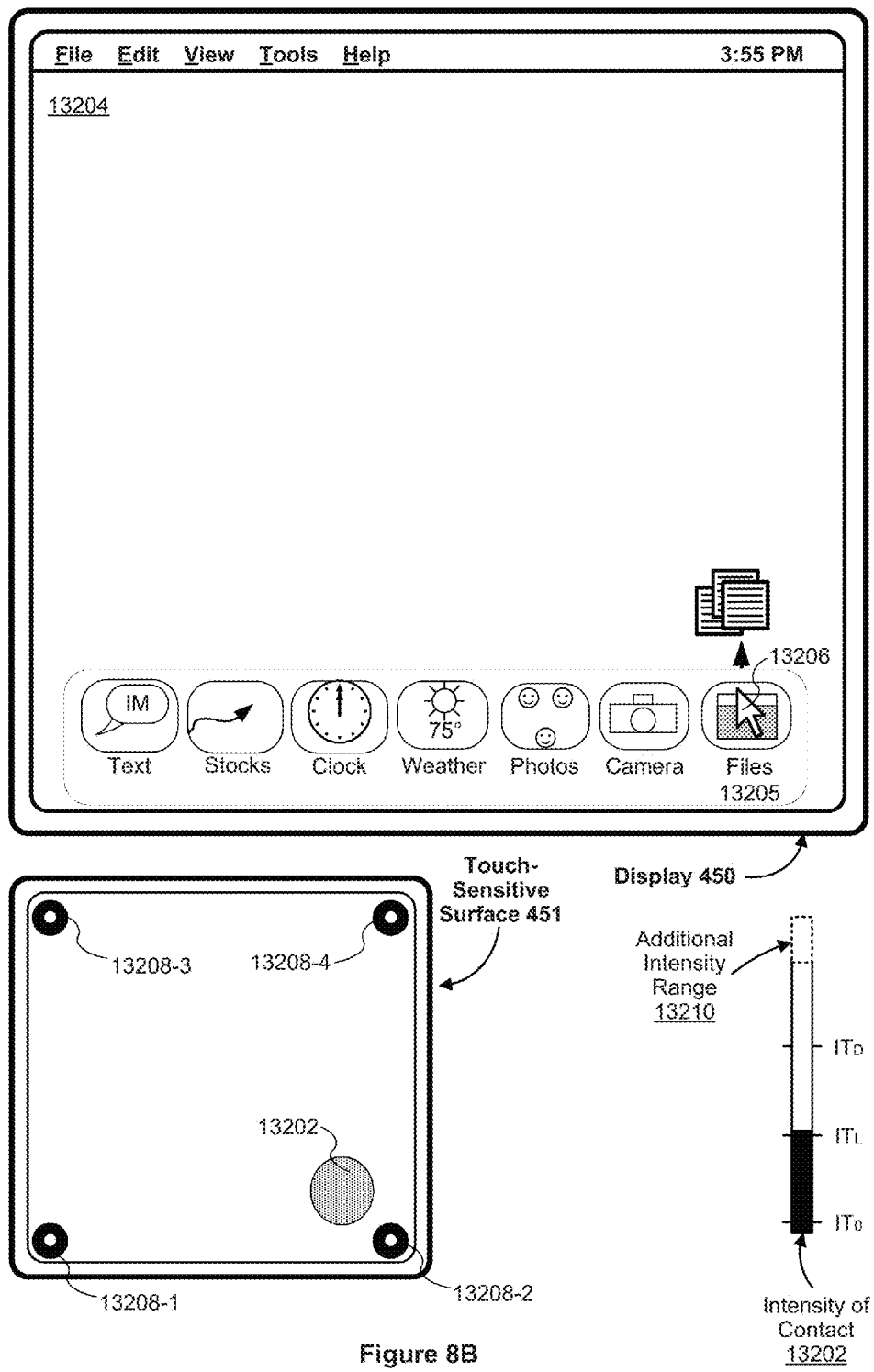
Figure 8C:
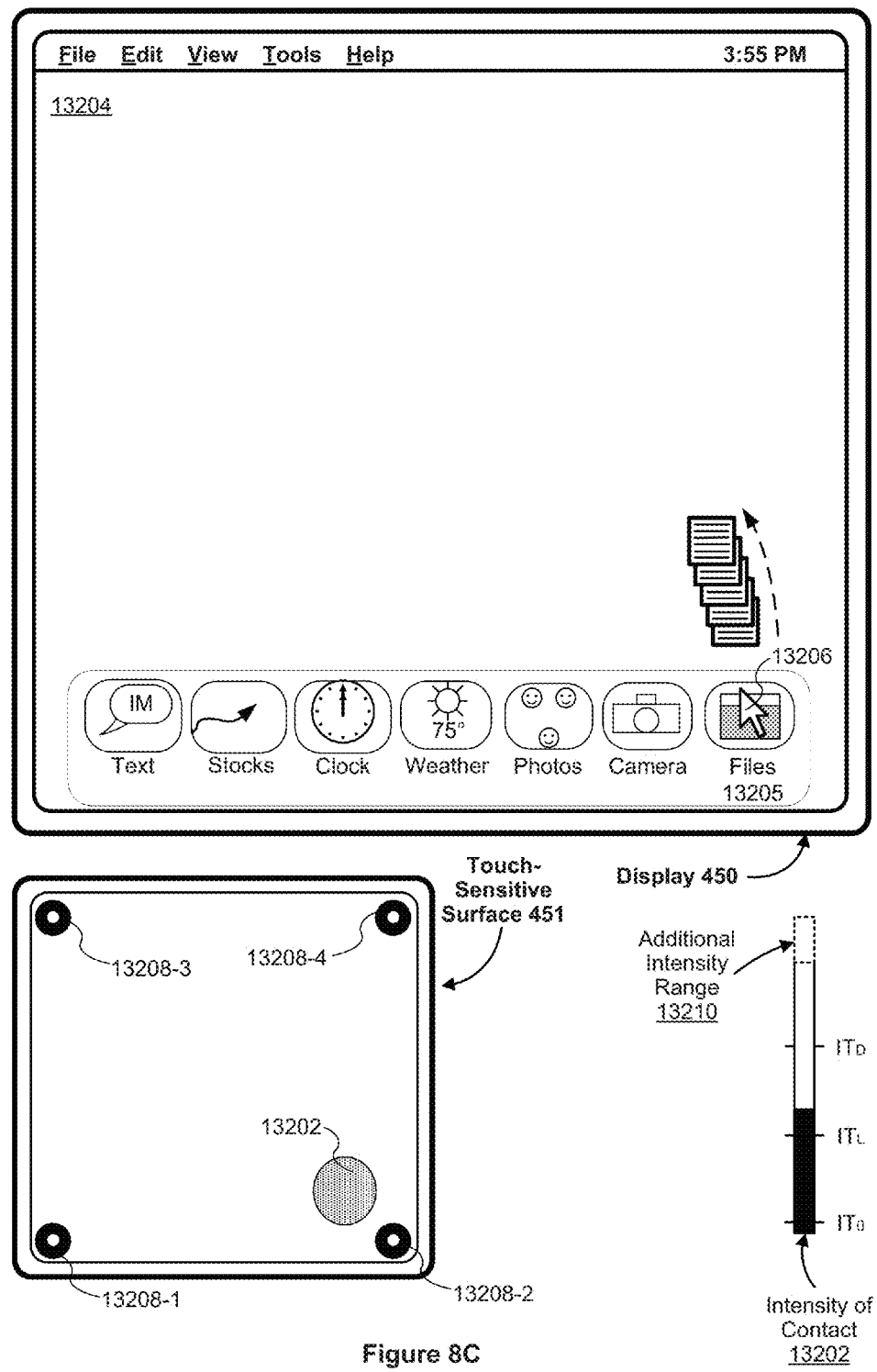
Figure 8D:
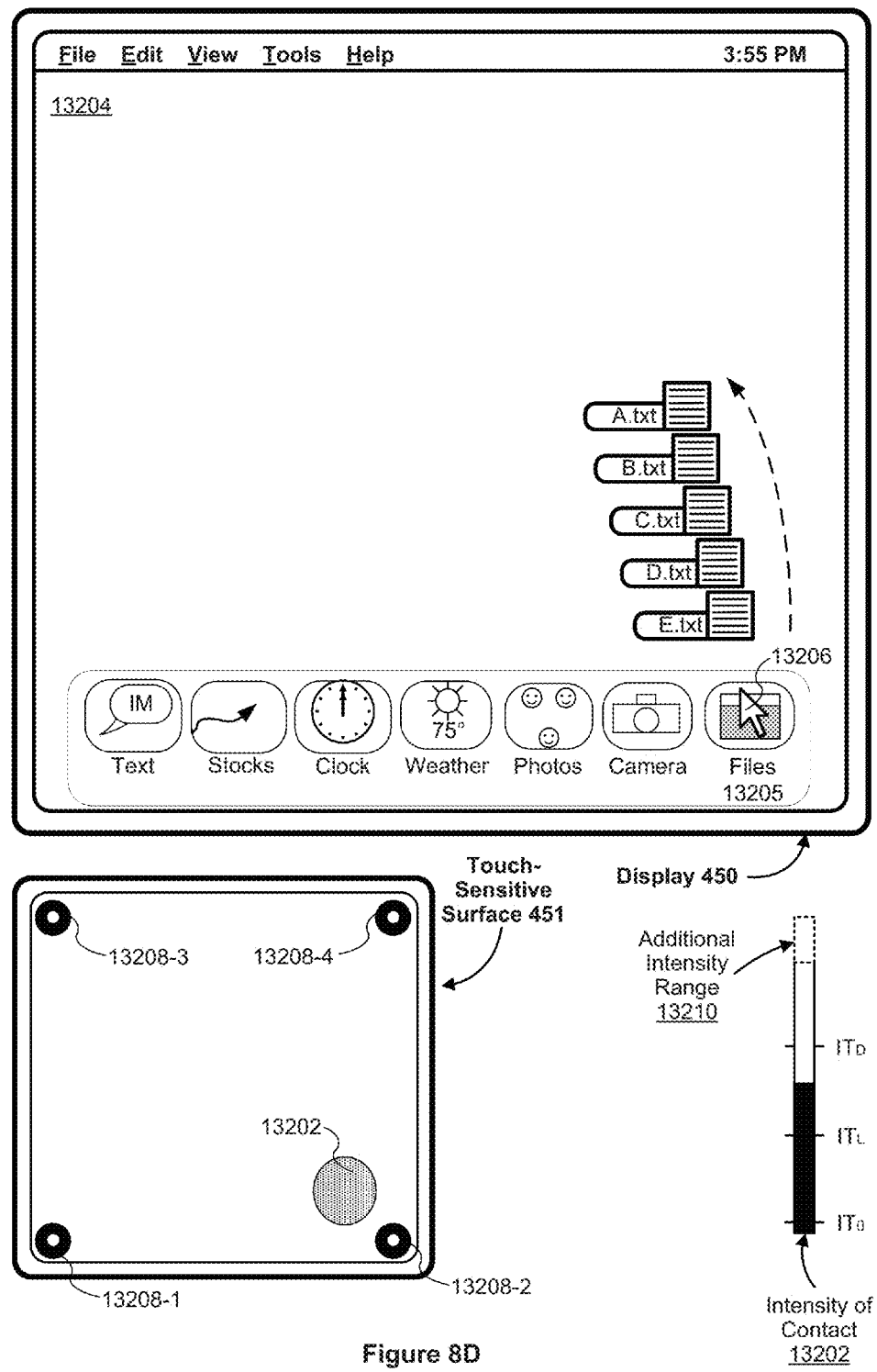
Figure 8E:
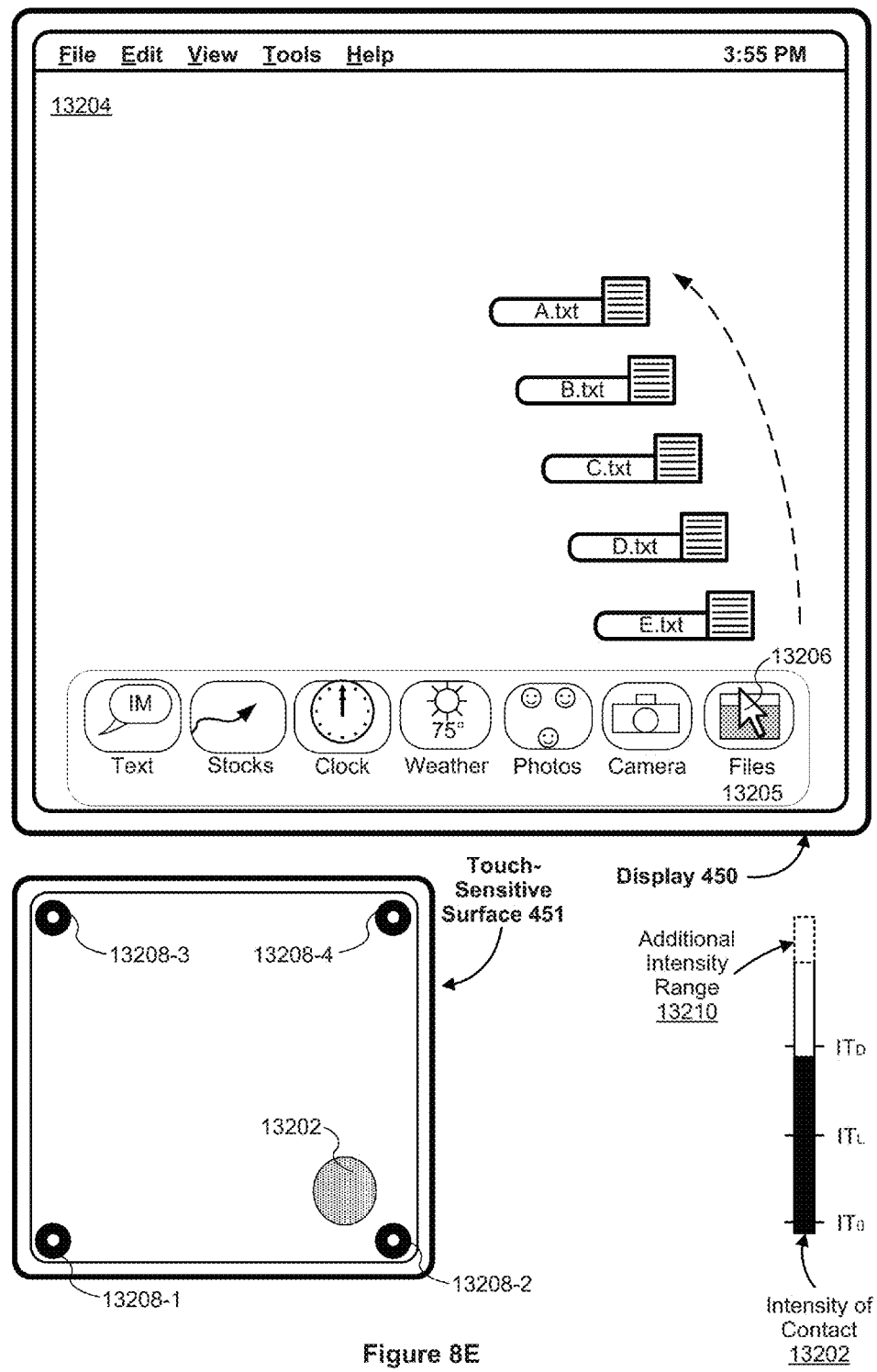

Many electronic devices have graphical user interfaces that include various user interface objects that are controlled in accordance with input-output relationships between inputs and corresponding outputs. In some situations there is a constant input-output relationship between inputs and corresponding outputs. However, a constant input-output relationship can be distracting an inefficient for a user when there is a particular range of outputs that the user is likely to want to achieve. A simplistic variable input-output relationship can also be confusing and disconcerting to a user if the user notices discontinuities in the input-output relationship. The embodiments described below provide an efficient and intuitive way of transitioning between touch input to display output relationships when interacting with user interface objects, thereby enabling the device to control convenient and efficient user interfaces. In particular, FIGS. 8A-8V illustrate exemplary user interfaces for transitioning between touch input to display output relationships using inputs on a touch-sensitive surface. FIGS. 9A-9C are flow diagrams illustrating a method of transitioning between touch input to display output relationships using inputs on a touch-sensitive surface. The user interfaces in FIGS. 8A-8V are further used to illustrate the processes described below with reference to FIGS. 9A-9C.

Many electronic devices have touch-sensitive surfaces. The touch-sensitive surfaces optionally utilizes multiple intensity sensors and have a maximum intensity detection threshold that varies with location on the touch-sensitive surface. This variation in maximum intensity detection threshold can be addressed by using a uniform maximum intensity detection threshold for the whole touch-sensitive surface that is a lowest common denominator maximum intensity detection threshold. However, this approach keeps the device from being used to its full potential and thus provides a less efficient and less effective user interface. The embodiments described below improve on these methods by dynamically adjusting input-output relationships to take advantage of maximum intensity detection thresholds that are higher than the maximum intensity thresholds on the least sensitive portions of the touch-sensitive surface. The embodiments described below provide an efficient and intuitive way of adjusting outputs with changes in contact intensity and varying dynamic range of intensity detection, thereby enabling the device to control convenient and efficient user interfaces. In particular, FIGS. 11B-11U illustrate exemplary user interfaces for adjusting outputs with changes in contact intensity (e.g., corresponding to inputs on a touch-sensitive surface) and varying dynamic range of intensity detection in accordance with some embodiments. FIGS. 12A-12D are flow diagrams illustrating a method of adjusting outputs with changes in contact intensity (e.g., corresponding to inputs on a touch-sensitive surface) and varying dynamic range of intensity detection in accordance with some embodiments. The user interfaces in FIGS. 11B-11U are further used to illustrate the processes described below with reference to FIGS. 12A-12D.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
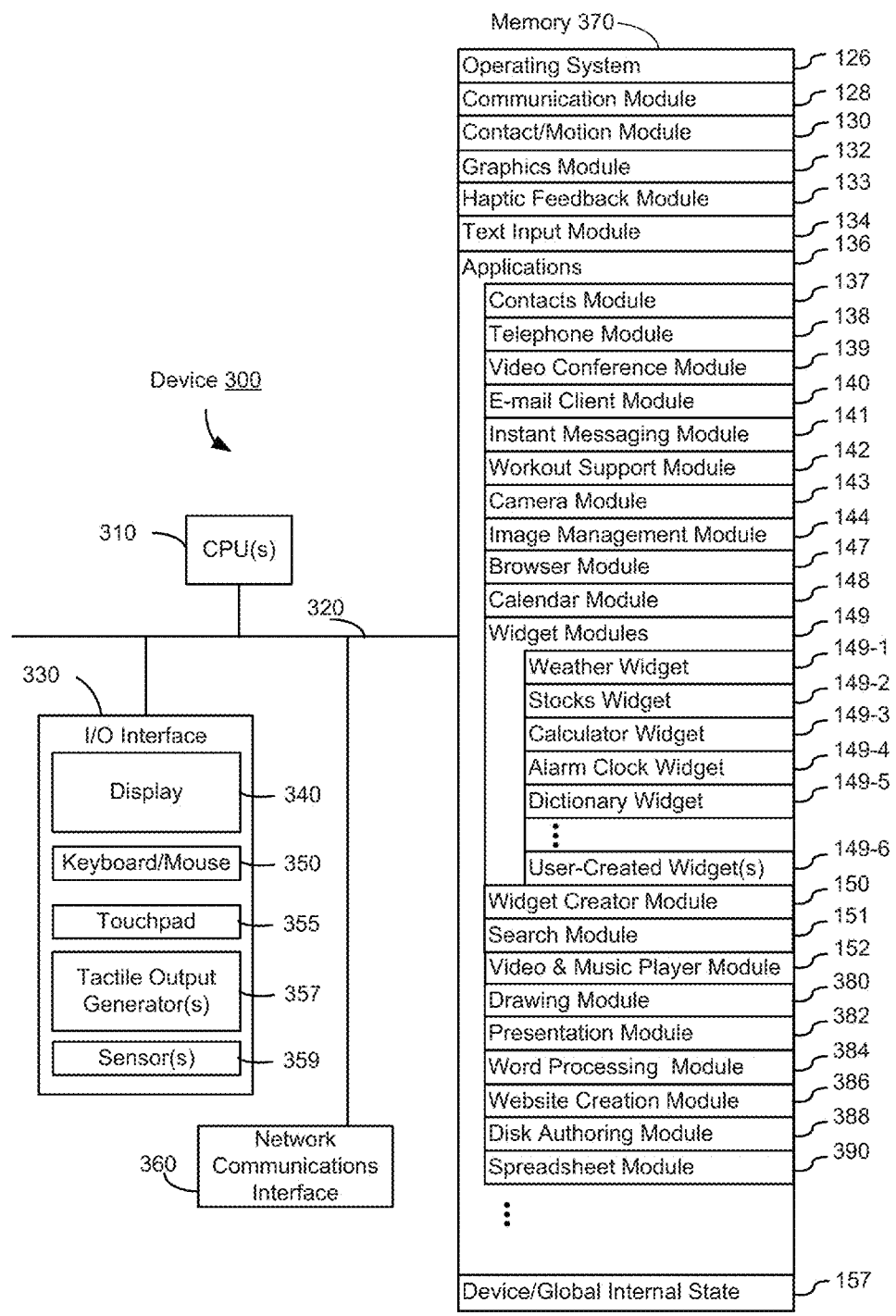
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns and intensities. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
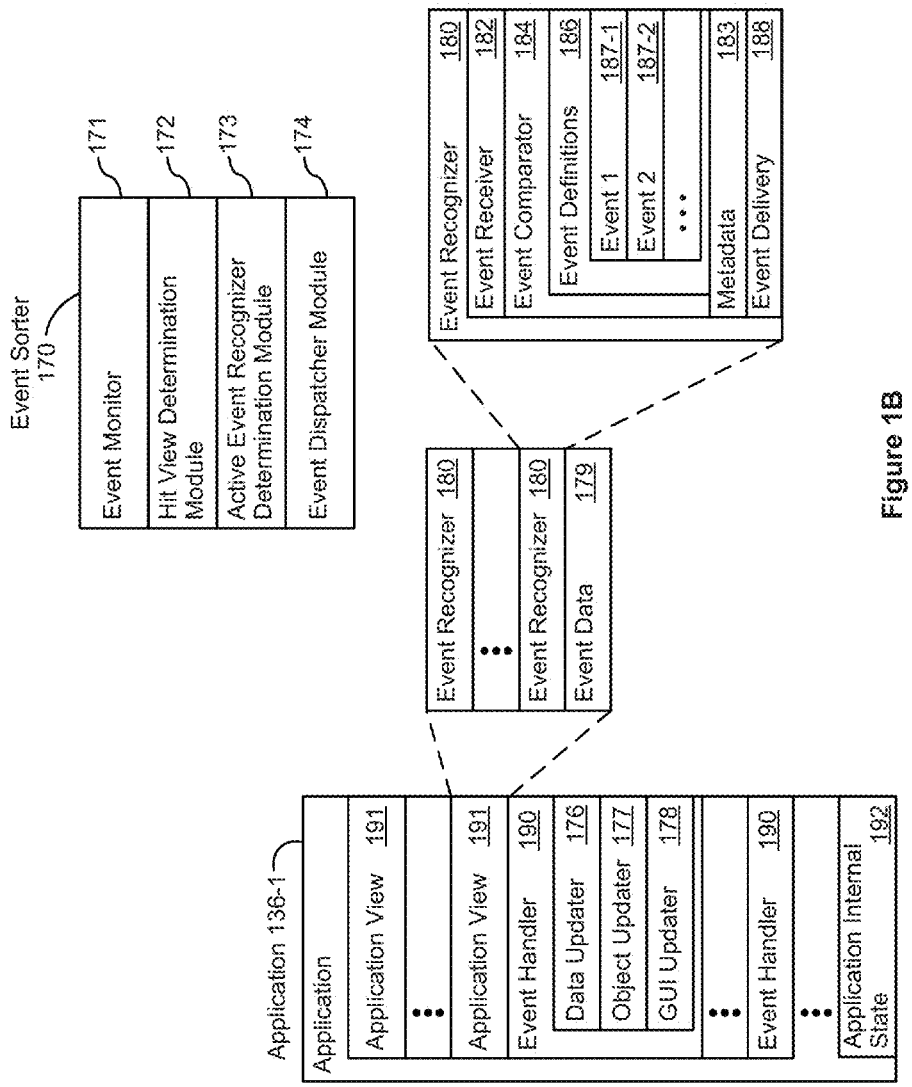
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
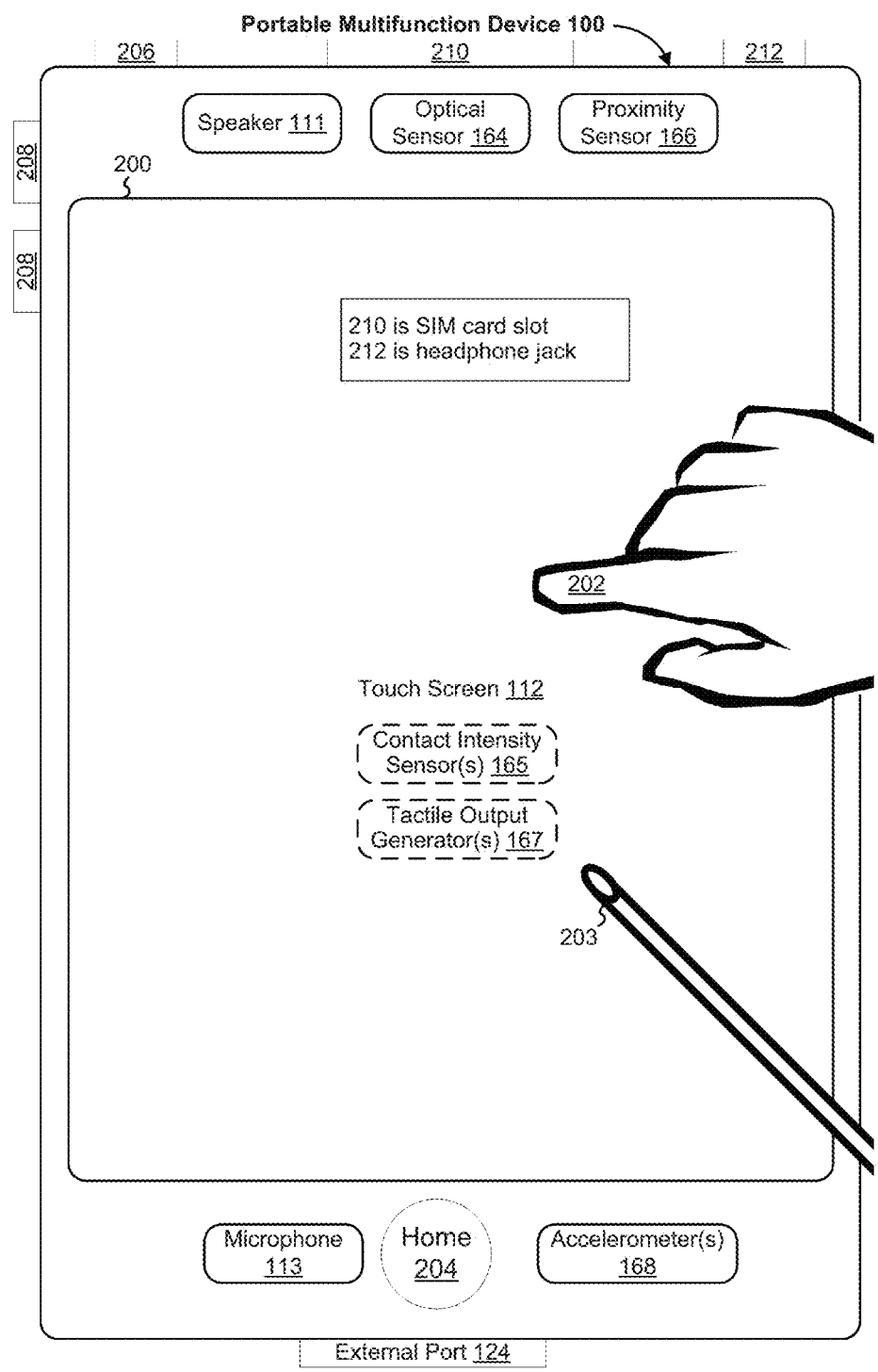
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
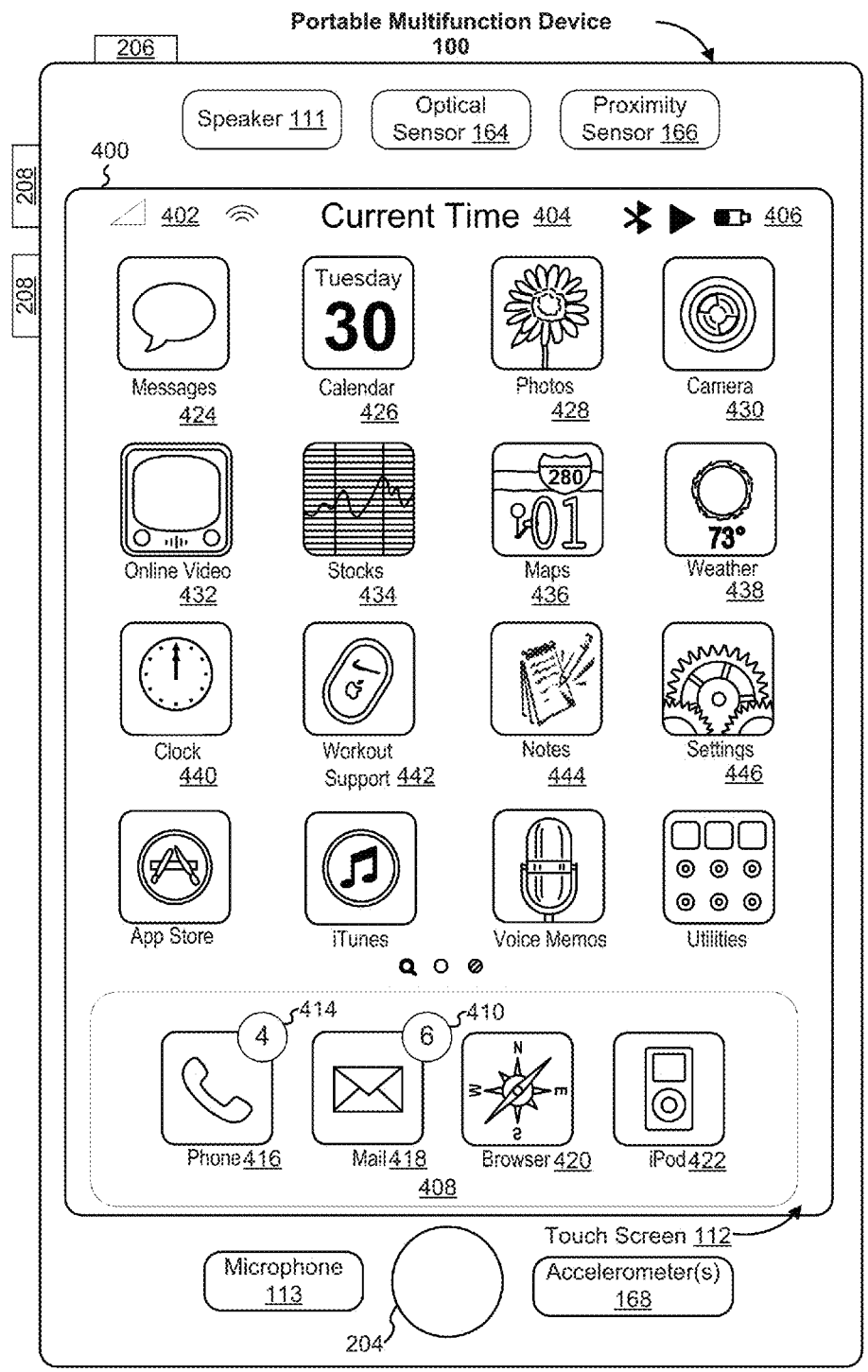
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
Icon 416 for telephone module 138, labeled "Phone," which optionally includes an indicator 414 of the number of missed calls or voicemail messages;
Icon 418 for e-mail client module 140, labeled "Mail," which optionally includes an indicator 410 of the number of unread e-mails;
Icon 420 for browser module 147, labeled "Browser;" and
Icon 422 for video and music player module 152, also referred to as iPod (trademark of Apple Inc.) module 152, labeled "iPod;" and
Icons for other applications, such as:
Icon 424 for IM module 141, labeled "Text;"
Icon 426 for calendar module 148, labeled "Calendar;"
Icon 428 for image management module 144, labeled "Photos;"
Icon 430 for camera module 143, labeled "Camera;"
Icon 432 for online video module 155, labeled "Online Video"
Icon 434 for stocks widget 149-2, labeled "Stocks;"
Icon 436 for map module 154, labeled "Map;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
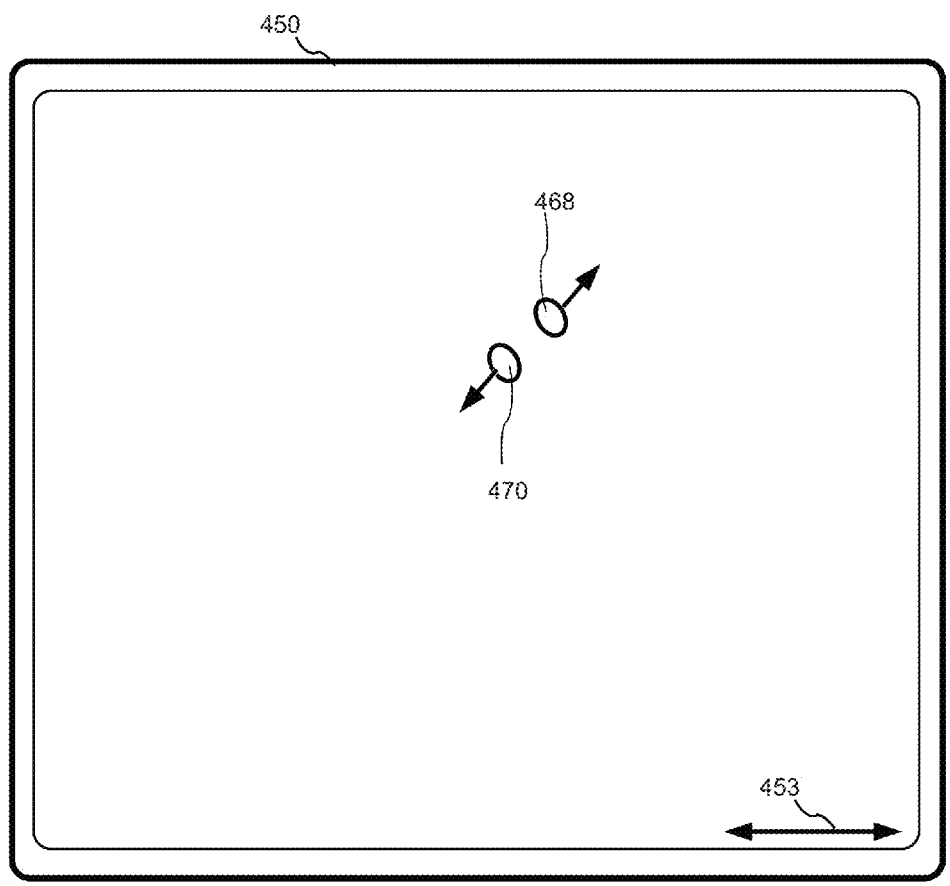
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

The user interface figures described below include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$, and/or one or more other intensity thresholds). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with an intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of intensity of the contact from an intensity below the light press intensity threshold $IT_L$ to an intensity between the light press intensity threshold $IT_L$ and the deep press intensity threshold $IT_D$ is sometimes referred to as a "light press" input. An increase of intensity of the contact from an intensity below the deep press intensity threshold $IT_D$ to an intensity above the deep press intensity threshold $IT_D$ is sometimes referred to as a "deep press" input. An increase of intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of intensity of the contact from an intensity above the contact-detection intensity threshold $IT_0$ to an intensity below the contact intensity threshold $IT_0$ is sometimes referred to as detecting liftoff of the contact from the touch-surface. In some embodiments $IT_0$ is zero. In some embodiments $IT_0$ is greater than zero. In some illustrations a shaded circle or oval is used to represent intensity of a contact on the touch-sensitive surface. In some illustrations a circle or oval without shading is used represent a respective contact on the touch-sensitive surface without specifying the intensity of the respective contact.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

User Interfaces and Associated Processes

Assigning Respective Portions of an Aggregate Intensity to a Plurality of Contacts Many electronic devices sense a pressure of a user input. For example, a device with a pressure sensitive button determines an amount that the button is depressed by the user based on a pressure measurement of a pressure sensor integrated with the button. However, such methods do not provide a way to estimate the intensity of multiple different simultaneously detected contacts and thus do not provide a way to interact with an intensity sensitive user interface with multiple contacts. The device improves on these methods by assigning a first portion of an aggregate intensity (e.g., a sum of intensity measurements received from each intensity sensor of a plurality of intensity sensors) of a plurality of contacts on a touch-sensitive surface to a first contact of the plurality of contacts and by assigning a second portion of the aggregate intensity to a second contact of the plurality of contacts, while detecting the plurality of contacts on the touch-sensitive surface. The device assigns the aggregate intensity to the plurality of contacts based at least in part on: a first intensity measurement received from a first intensity sensor of the plurality of intensity sensors; a second intensity measurement from a second intensity sensor of the plurality of intensity sensors; a location of the first intensity sensor relative to the touch-sensitive surface; a location of the second intensity sensor relative to the touch-sensitive surface; and a comparison between values of a set of one or more properties of the first contact (e.g., the location of the first contact relative to a center of force) and corresponding values of the set of one or more properties of the second contact, thereby enabling the device to estimate intensity of multiple simultaneously detected contacts and use this information to control convenient and efficient user interfaces.

FIGS. 5A-5L illustrate exemplary user interfaces and contacts with a touch-sensitive surface that are assigned respective portions of an aggregate intensity to a plurality of contacts in accordance with some embodiments. The depictions in these figures are used to illustrate the processes described below, including the processes in FIGS. 6A-6C. FIGS. 5B and 5H-5K include intensity diagrams that show the current intensity measurements of the intensity sensors relative to units of intensity. FIGS. 5F and 5H-5J include intensity diagrams that show the current intensities of a plurality of contacts on the touch-sensitive surface relative to units of intensity.

In some implementations, the intensity assigned to a respective contact is compared with one or more of a plurality of distinct intensity thresholds, for example one or more of a contact detection intensity threshold, "$IT_0$," a light press intensity threshold, "$IT_L$," and a deep press intensity threshold, "$IT_D$," and then one or more operations are performed in accordance with a result of the comparison as described in greater detail with respect to other methods described herein (e.g., those listed in the fifth paragraph of the Description of Embodiments).

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 5A-5L and 6A-6C will be discussed with reference to display 450 and a separate touch-sensitive surface 451; however, analogous operations are, optionally, performed on a device with a touch-sensitive display system 112 in response to detecting the contacts described in FIGS. 5A-5L on the touch-sensitive display system 112 while displaying the user interfaces shown in FIGS. 5A-5L on the touch-sensitive display system 112. In some implementations, a focus selector is, optionally: a respective contact, a representative point corresponding to a contact (e.g., a centroid of a respective contact or a point associated with a respective contact), or a centroid or center of force of two or more contacts detected on the touch-sensitive display system 112.

Figure 5A:
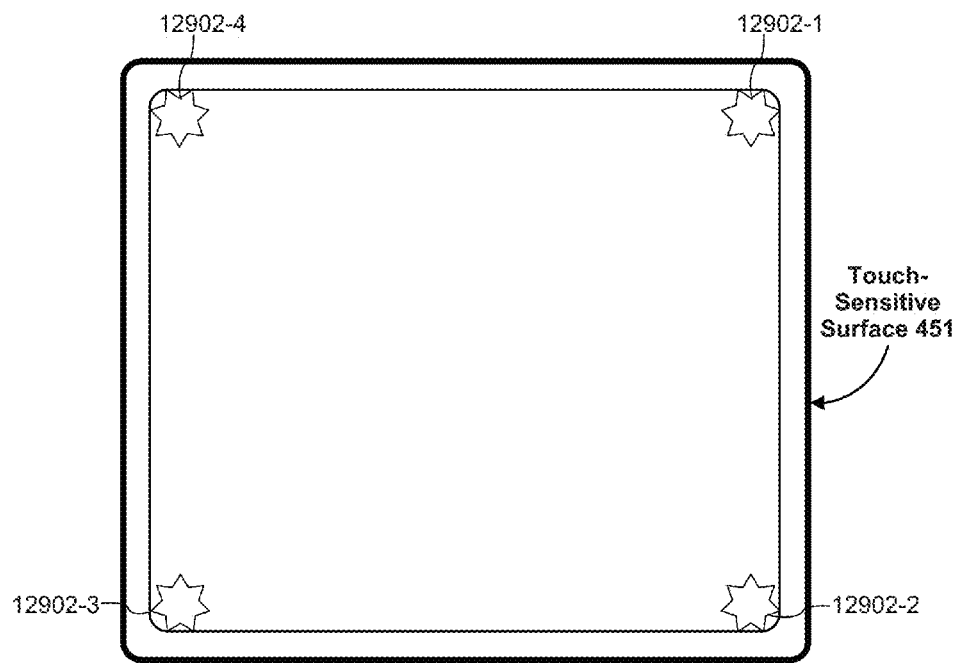
FIGS. 5A-5L illustrate exemplary user interfaces and contacts with a touch-sensitive surface that are assigned respective portions of an aggregate intensity in accordance with some embodiments.
Figure 6A:
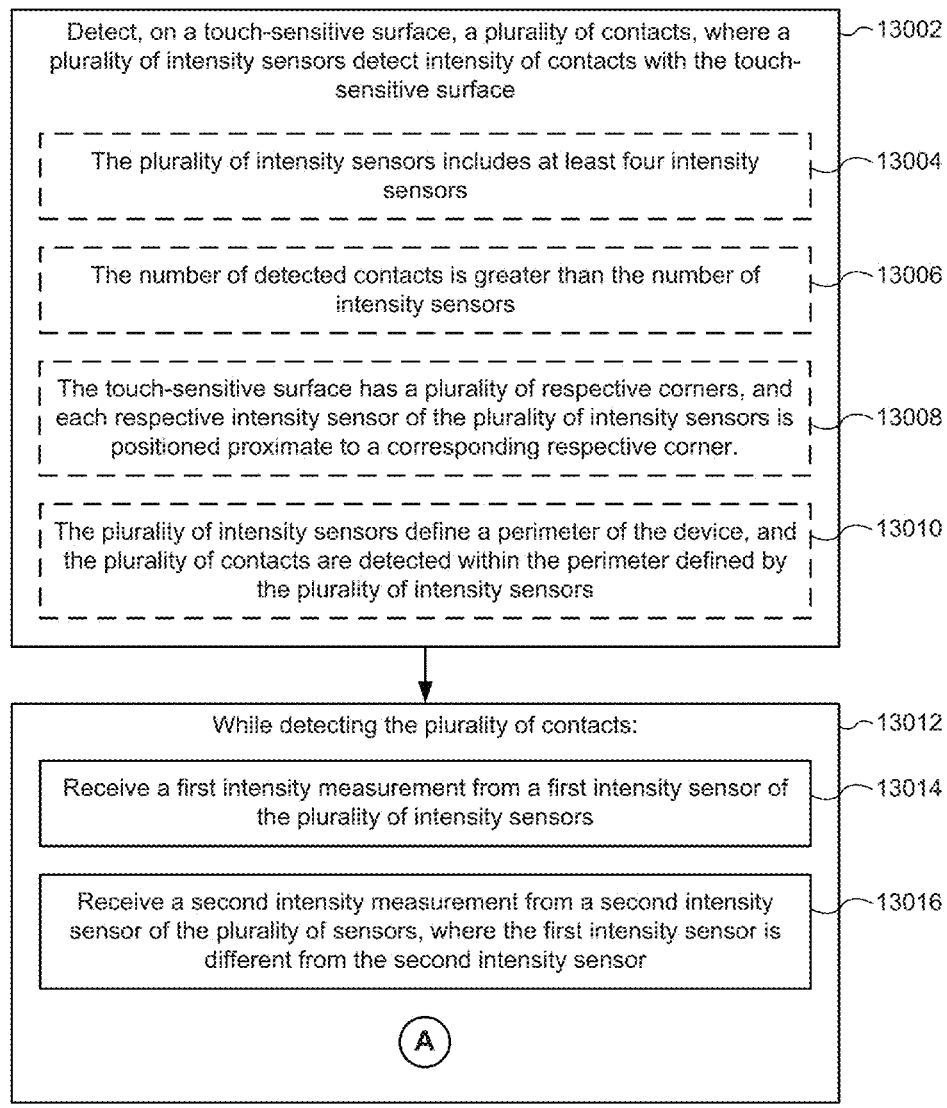
FIGS. 6A-6C are flow diagrams illustrating a method of assigning respective portions of an aggregate intensity to a plurality of contacts in accordance with some embodiments.
Figure 6B:
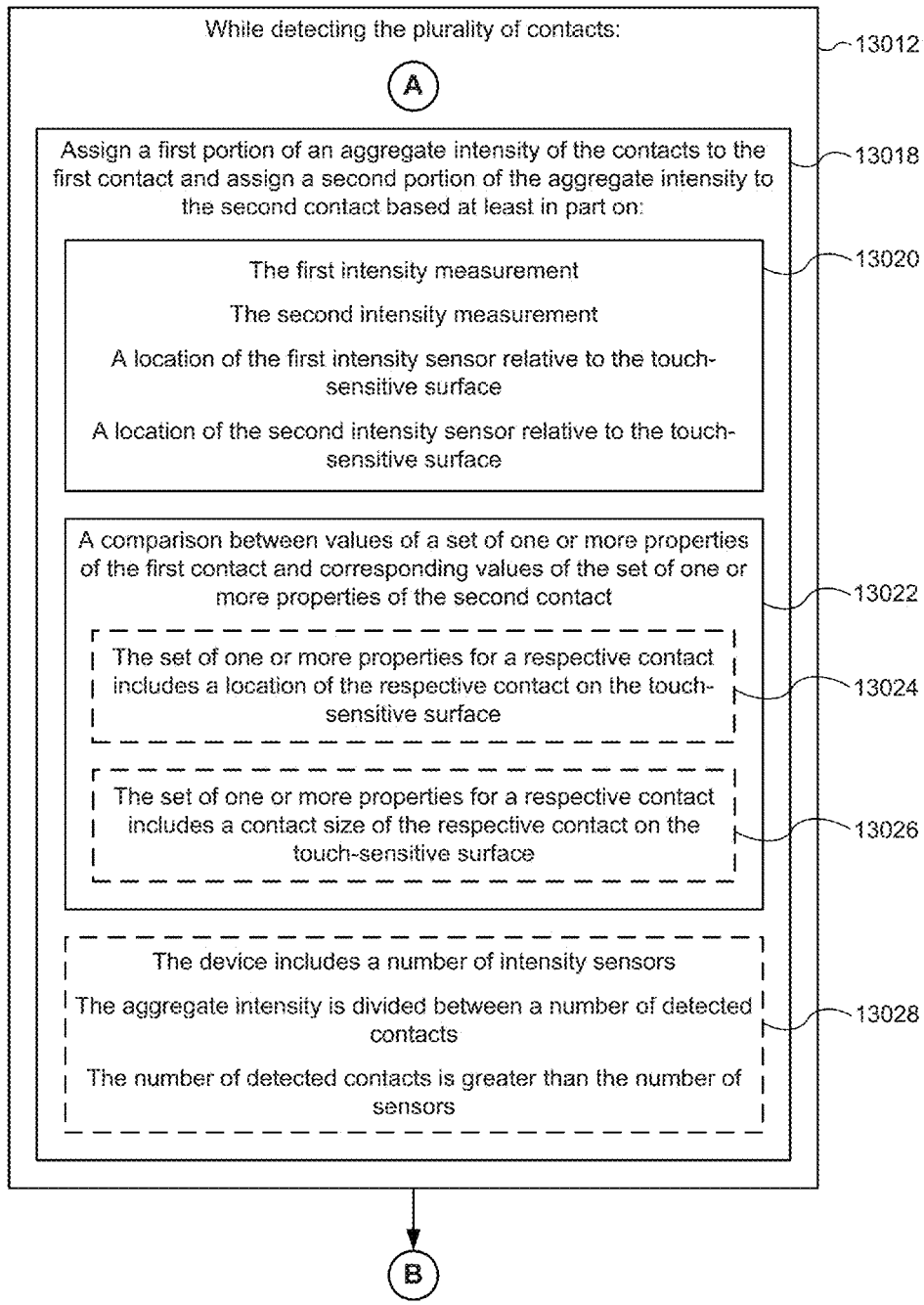
Figure 6C:
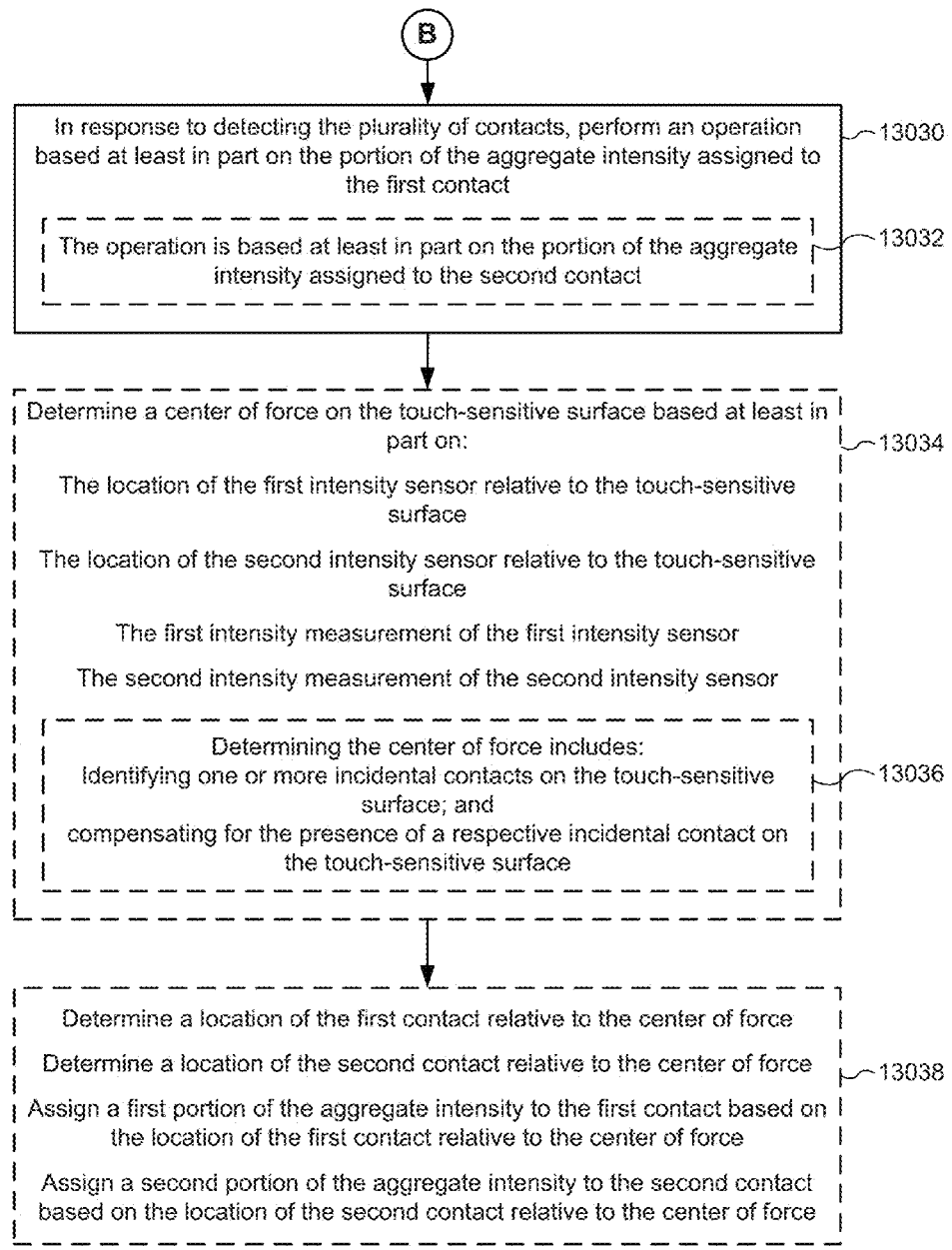

FIG. 5A illustrates a touch-sensitive surface 451 with a plurality of intensity sensors 12902. In some implementations, touch-sensitive surface 451 has four or more intensity sensors 12902. In this example, each of the plurality of intensity sensors 12902 (e.g., four intensity sensors) are positioned in a respective corner of touch-sensitive surface 451.

Figure 5B:
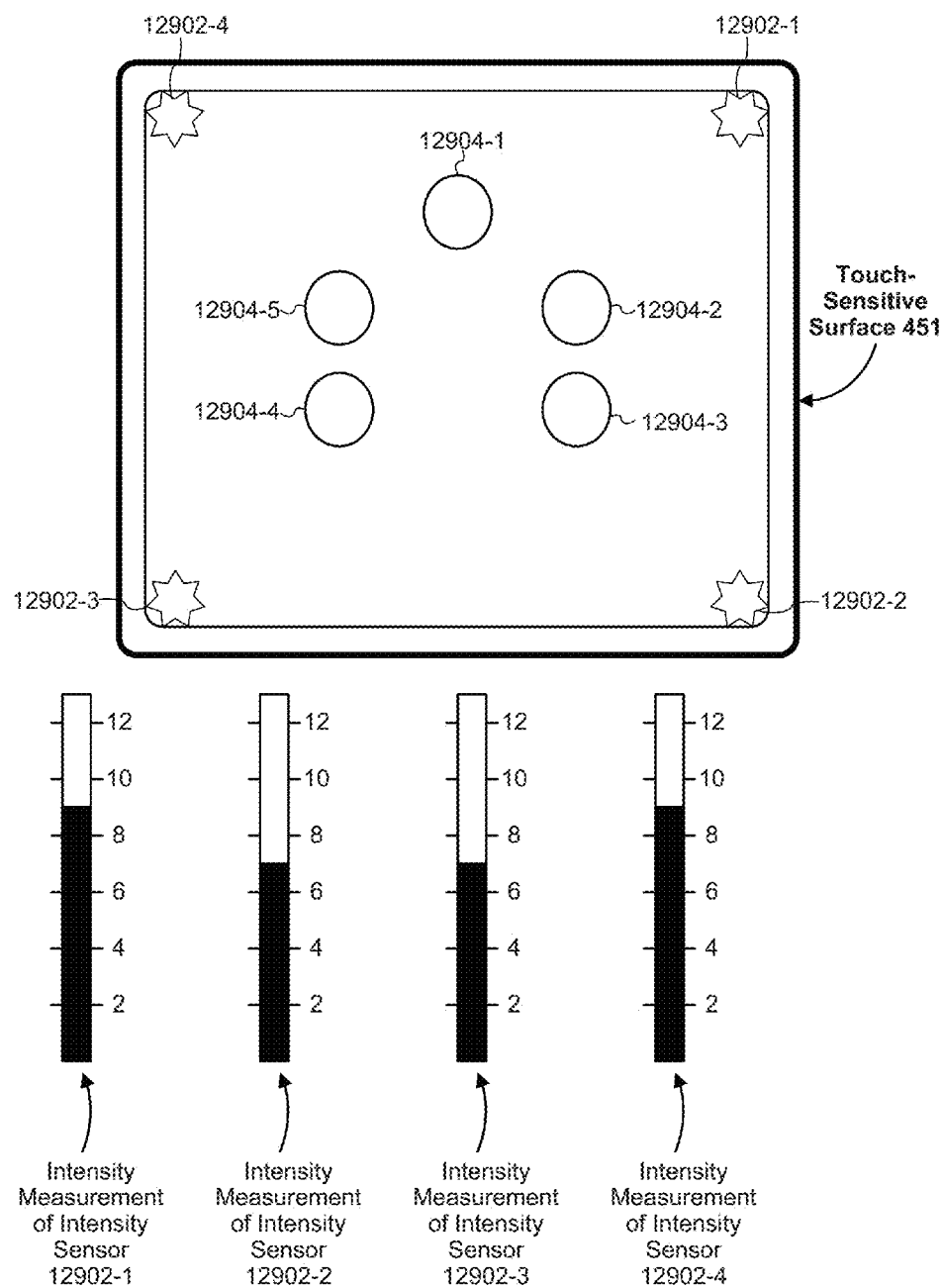

FIG. 5B illustrates detecting a plurality of contacts 12904 on touch-sensitive surface 451. In this example, the number of contacts (e.g., five contacts 12904) detected on touch-sensitive surface 451 is greater than the number of intensity sensors (e.g., four intensity sensors 12902). In some embodiments, a count of the detected contacts (e.g., five in FIG. 5B) is greater than a count of the intensity sensor units (e.g., four in FIG. 5B). FIG. 5B further illustrates respective intensity measurements of each intensity sensor 12902 (e.g., a measurement of the pressure registered at each sensor) while the plurality of contacts 12904 is detected on touch-sensitive surface 451. In this example, the intensity measurements of intensity sensors 12902-1 and 12902-4 are each 9 units of intensity, and the intensity measurements of intensity sensors 12902-2 and 12902-3 are each 7 units of intensity. Furthermore, in some implementations, an aggregate intensity is the sum of the intensity measurements of a plurality of intensity sensors 12902, which in this example is 32 intensity units. The arrangement of contacts 12904 in FIGS. 5B-5I is not necessarily a typical of human-user inputs.

Figure 5C:
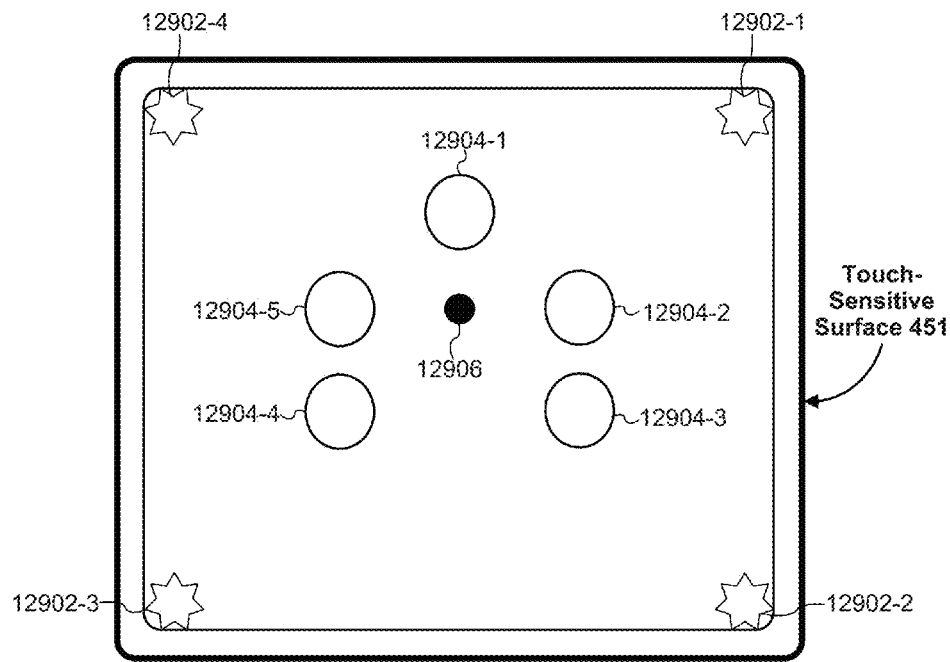

FIG. 5C illustrates determining a center of force 12906 on touch-sensitive surface 451 based at least in part on a location of the intensity sensors 12902 relative to touch-sensitive surface 451 (e.g., each intensity sensor 12902 is positioned in a respective corner of touch-sensitive surface 451) and the intensity measurements of intensity sensors 12902 (e.g., the intensity measurements of intensity sensors 12902 in FIG. 5B). In some implementations, x and y components of the center of force 12906 are determined using predefined mathematical functions, such as $x=\alpha(Bx-Ax)/(Bx+Ax)$ and $y=\beta(Dy-Cy)/(Dy+Cy)$ where Ax is the sum of the measured intensities of sensors 12902-3 and 12902-4, Bx is the sum of the measured intensities of sensors 12902-1 and 12902-2, Cy is the sum of the measured intensities of sensors 12902-2 and 12902-3, Dy is the sum of the measured intensities of sensors 12902-1 and 12902-4, and $\alpha$ and $\beta$ are scaling factors.

Figure 5D:
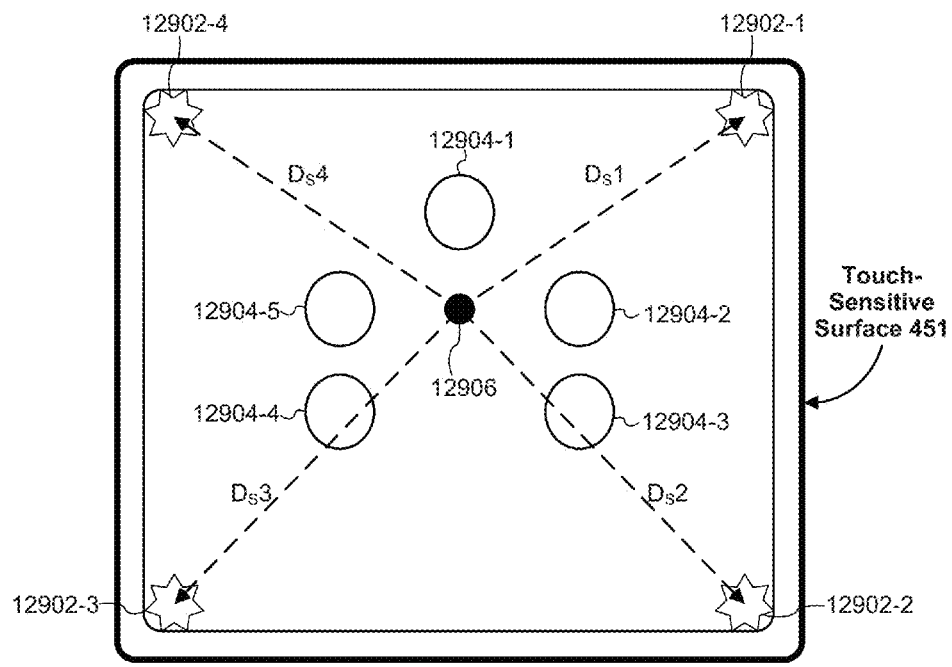

FIG. 5D illustrates the distance from center of force 12906 to intensity sensors 12902. In this example, the distances from center of force 12906 to sensors 12902-1 and 12902-4 (e.g., $D_S1$ and $D_S4$, respectively) are shorter than the distances from center of force 12906 to sensors 12902-2 and 12902-3 (e.g., $D_S2$ and $D_S3$, respectively). In this example, center of force 12906 is closer to sensors 12902-1 and 12902-4 due to the higher intensity measurements of intensity sensors 12902-1 and 12902-4 (e.g., each 9 units of intensity in FIG. 5B) in contrast to the intensity measurements of intensity sensors 12902-2 and 12902-3 (e.g., each 7 units of intensity in FIG. 5B).

Figure 5E:
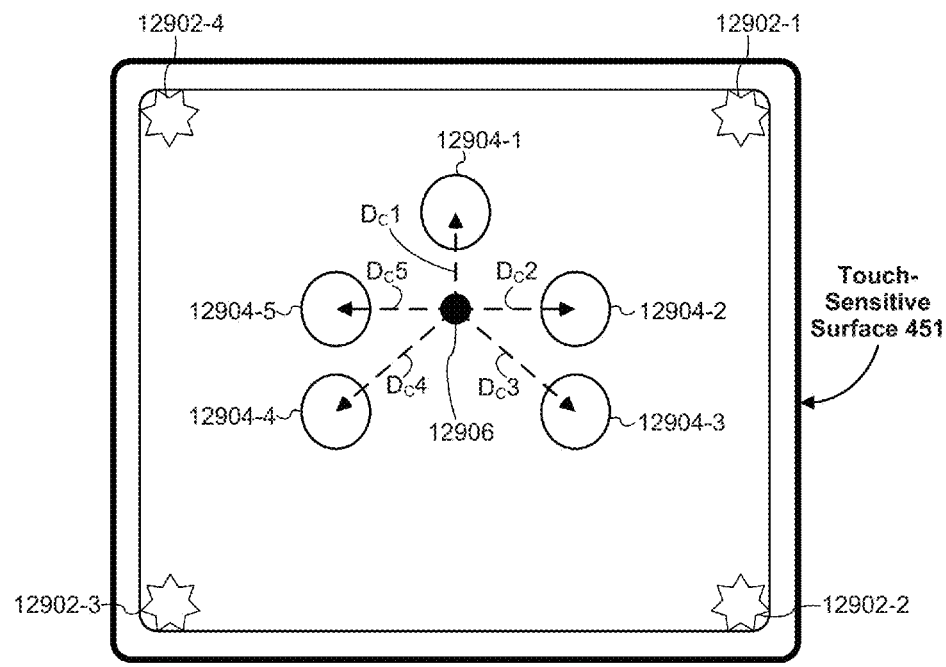

FIG. 5E illustrates determining a location of contacts 12904 relative to center of force 12906. In this example, the distances from center of force 12906 to contacts 12904-1, 12904-2 and 12904-5 (e.g., $D_C1$, $D_C2$ and $D_C5$, respectively) are less than the distances from center of force 12906 to contacts 12904-3 and 12904-4 (e.g., $D_C3$ and $D_C4$, respectively).

Figure 5F:
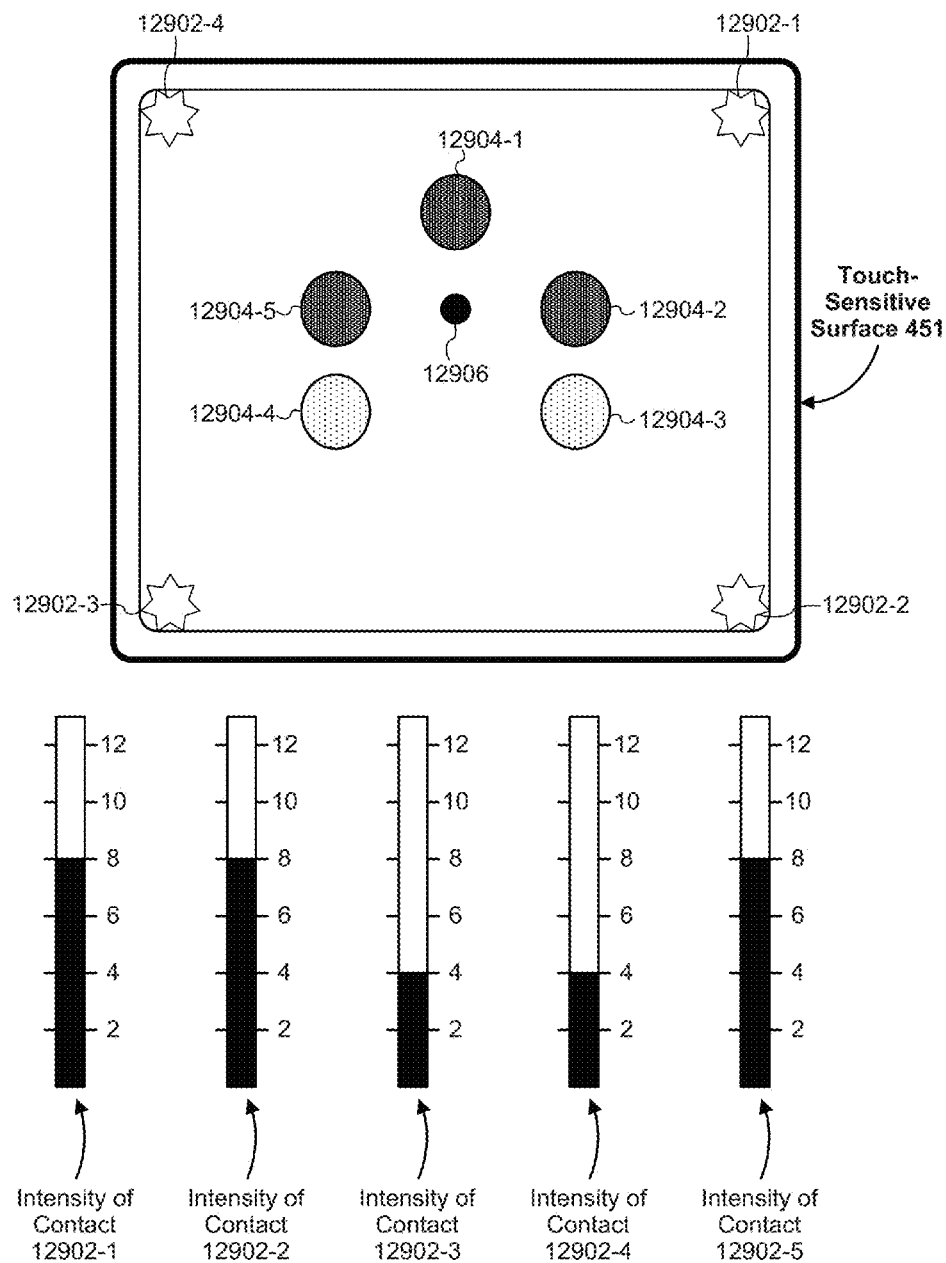

FIG. 5F illustrates assigning the aggregate intensity (e.g., the sum of the intensity measurements of intensity sensors 12902 in FIG. 5B—32 intensity units) to contacts 12904 based on their distances from the center of force 12906 (e.g., the respective Dc distances in FIG. 5E). In this example, each of contacts 12904-1, 12904-2 and 12904-5 are assigned 8 intensity units of the aggregate intensity, and each of contacts 12904-3 and 12904-4 are assigned 4 intensity units of the aggregate intensity. More generally, in some implementations, each contact j is assigned a respective intensity $I_j$ that is portion of the aggregate intensity, A, in accordance with a predefined mathematical function, $I_j = A \cdot (D_j/\Sigma D_i)$, where $D_j$ is the distance of the respective contact j to the center of force, and $\Sigma D_i$ is the sum of the distances of all the respective contacts (e.g., i=1 to last) to the center of force.

Figure 4B:
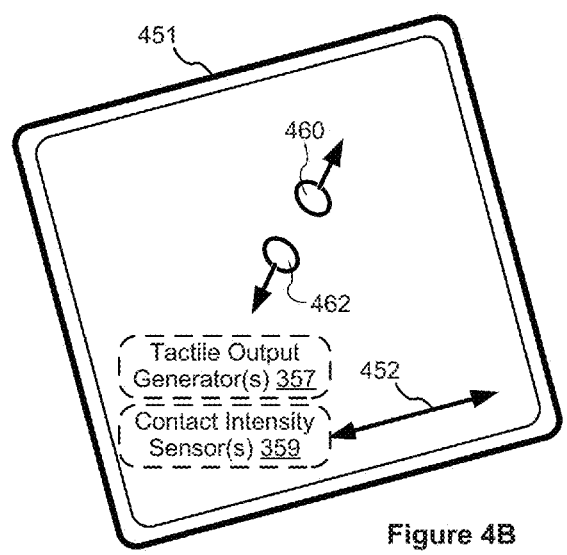
Figure 5G:
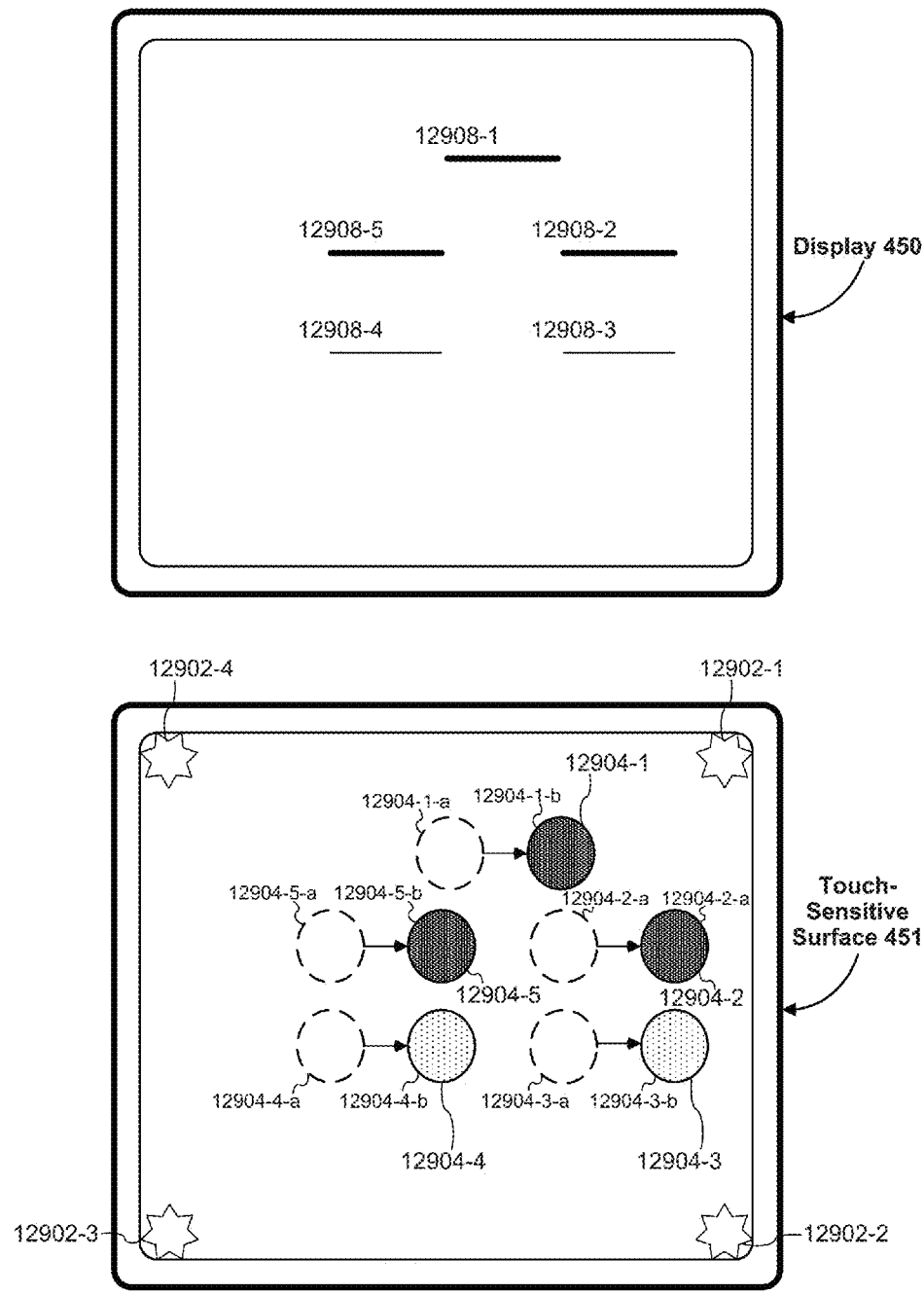

FIG. 5G illustrates performing an operation based at least in part on the portions of the aggregate intensity assigned to a first contact and a second contact. In this example, each of contacts 12904 move from respective position (a) to respective position (b) (e.g., contact 12904-1 moved from position 12904-1-a to position 12904-1-b) on touch-sensitive surface 451. FIG. 5G further illustrates displaying lines 12908 on display 450 in accordance with a change in position of a respective contact 12904, and displaying line thicknesses of lines 12908 on display 450 in accordance with the intensity assigned to the corresponding respective contacts 12904, as described above with reference to FIG. 5F. In this example, the respective length of lines 12908 map to the corresponding respective change in position of contacts 12904 in FIG. 5G (e.g., the length of line 12908-1 maps to the change in position of contact 12904-1 from position 12904-1-a to position 12904-1-b, and the length of line 12908-3 maps to the change in position of contact 12904-3 from position 12904-3-a to position 12904-3-b). Furthermore, in this example, the thicknesses of lines 12908 map to the corresponding respective intensity assigned to contacts 12904, as described above with reference to FIG. 5F (e.g., the thickness of line 12908-1 maps to the intensity assigned to contact 12904-1 in FIG. 5F, 8 units of intensity, and the thickness of line 12908-3 maps to the intensity assigned to contact 12904-3 in FIG. 5F, 4 units of intensity).

Figure 5H:
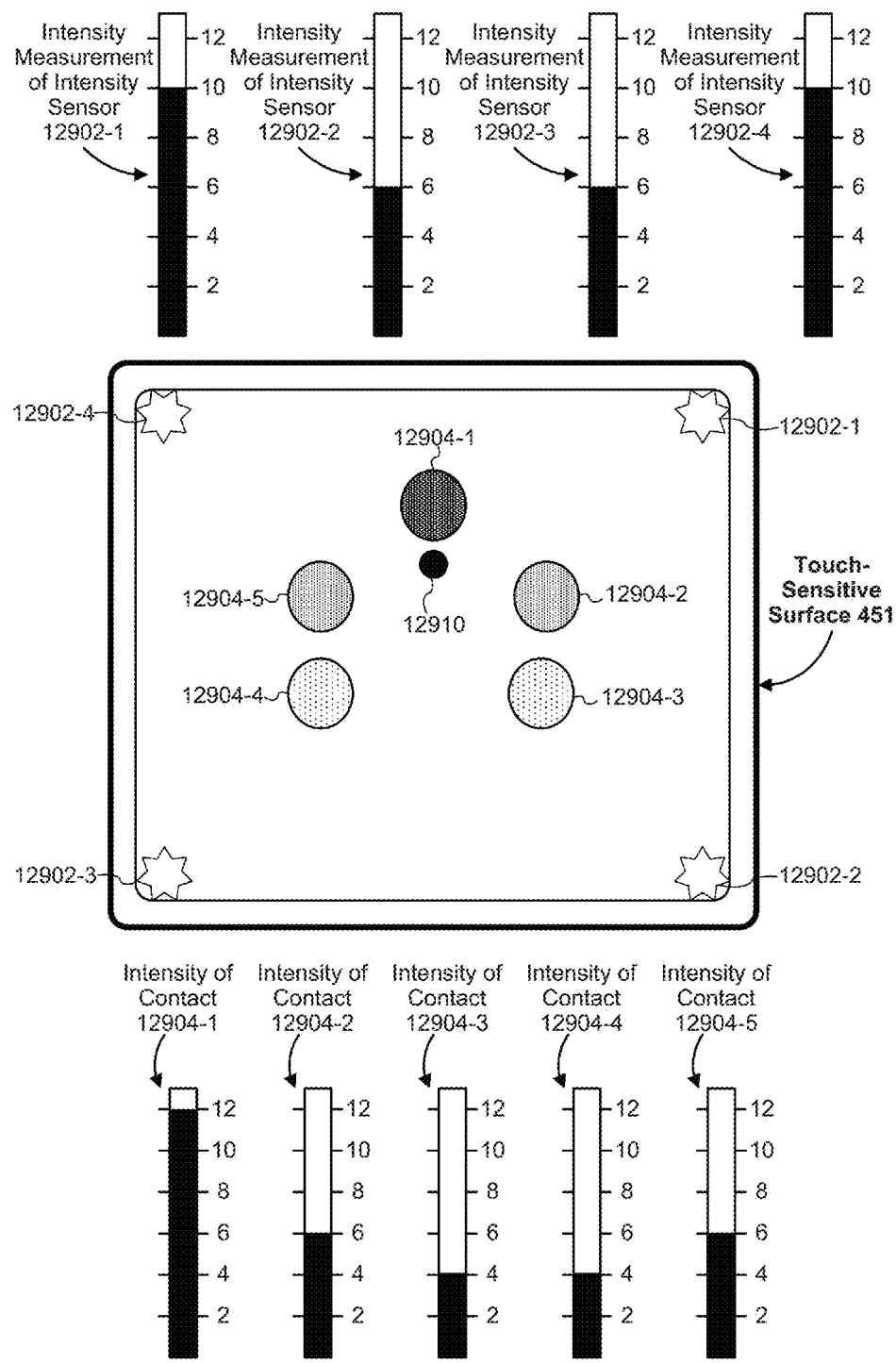

FIG. 5H illustrates center of force 12910 at a location closer to contact 12904-1 in comparison to center of force 12906 in FIG. 5C (e.g., due to the intensity measurements of intensity sensors 12902 in FIG. 5H). In this example, the intensity measurements of intensity sensors 12902-1 and 12902-4 are each 10 units of intensity, and the intensity measurements of intensity sensors 12902-2 and 12902-3 are each 6 units of intensity (e.g., the aggregate intensity is the sum of the intensity measurements of intensity sensors 12902—32 units of intensity).

Figure 5I:
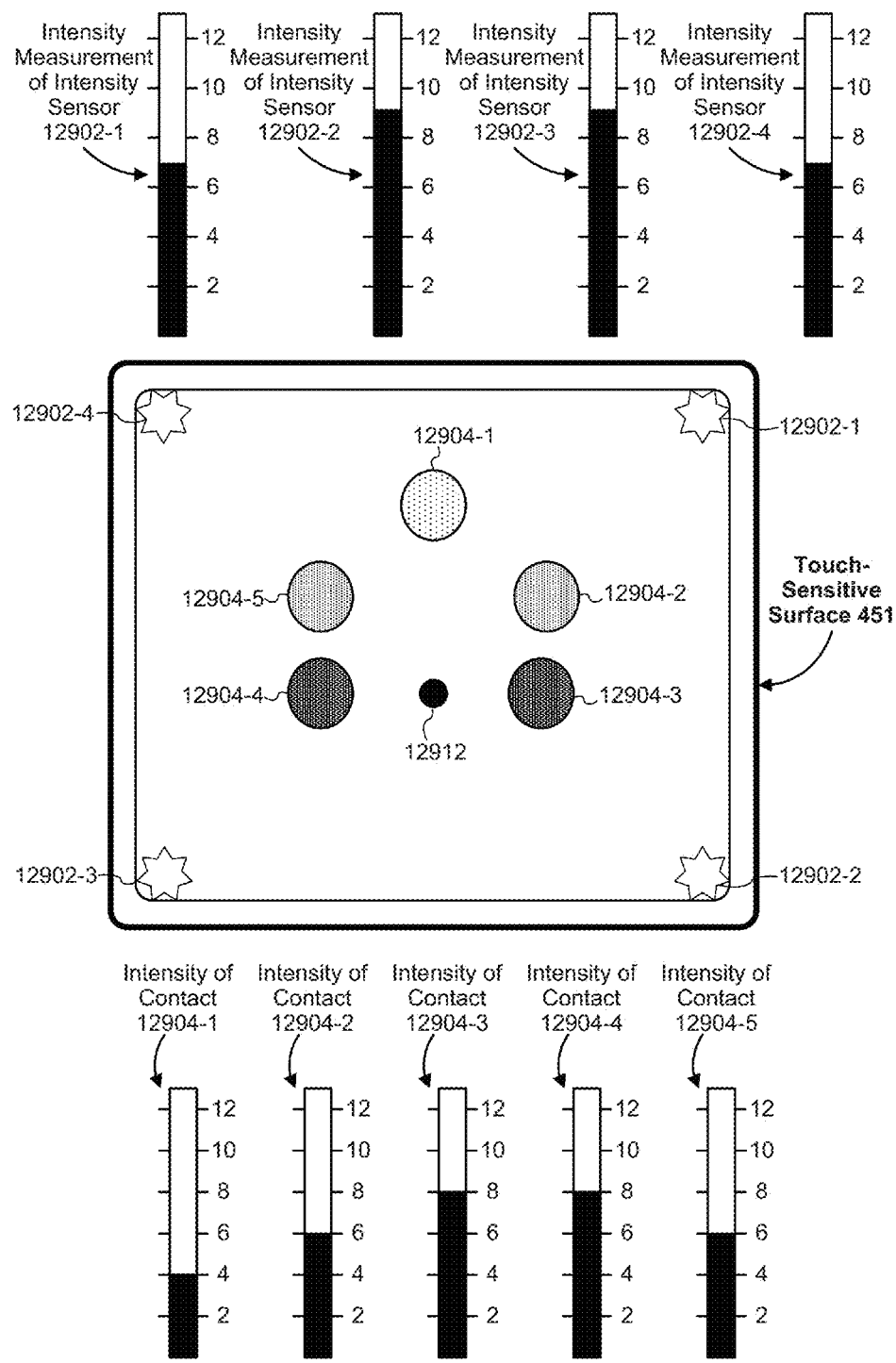

FIG. 5I illustrates center of force 12912 at a location closer to contacts 12904-3 and 12904-4 in comparison to center of force 12906 in FIG. 5C (e.g., due to the intensity measurements of intensity sensors 12902 in FIG. 5I). In this example, the intensity measurements of intensity sensors 12902-2 and 12902-3 are each 9 units of intensity, and the intensity measurements of intensity sensors 12902-1 and 12902-4 are each 7 units of intensity (e.g., the aggregate intensity is the sum of the intensity measurements of intensity sensors 12902—32 units of intensity).

Figure 5J:
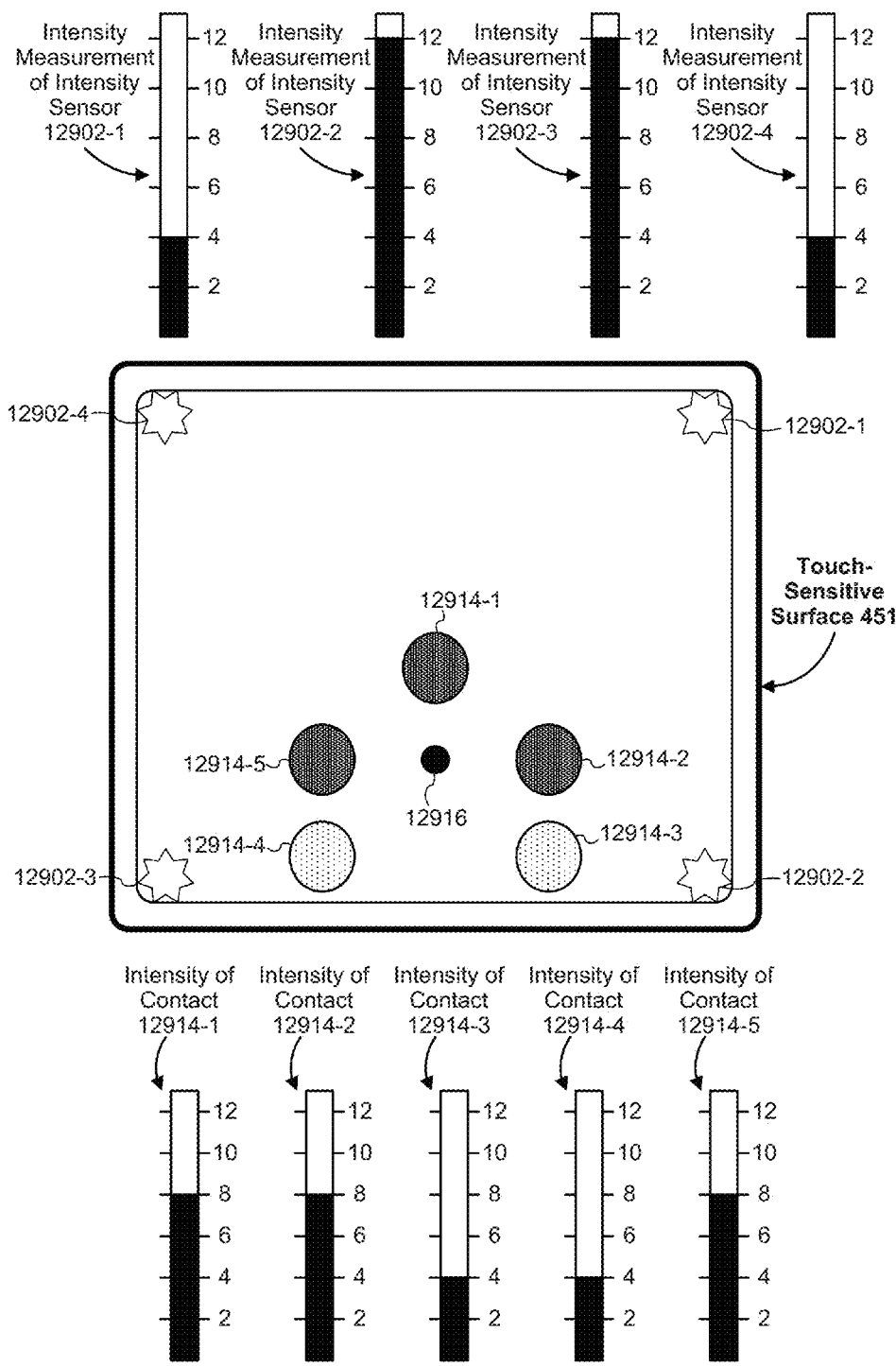

FIG. 5J illustrates contacts 12914 detected on touch-sensitive surface 451 (e.g., contact 12914 are positioned closer to a bottom edge of touch-sensitive surface 451 than contacts 12904 in FIG. 5C). FIG. 5J further illustrates center of force 12916 at a location relative to contacts 12914 such that the intensities assigned to contacts 12914 in FIG. 5J are the same as the intensities assigned to contacts 12904 in FIG. 5F.

Figure 5K:
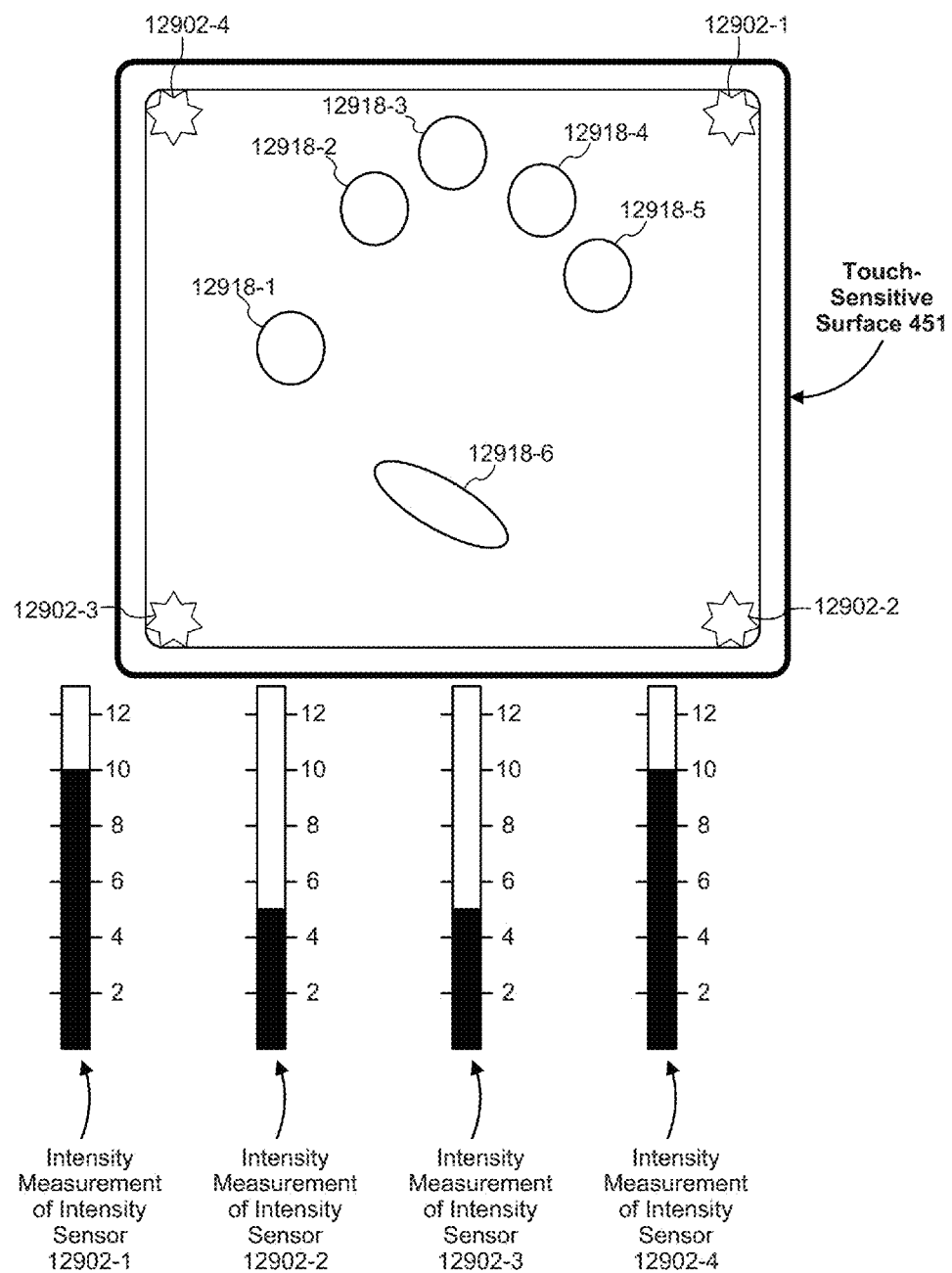

FIG. 5K illustrates a plurality of contacts 12918 detected on touch-sensitive surface 451. In this example, six contacts are detected on touch-sensitive surface 451 (e.g., contacts 12918 represent a human-user's right hand including a portion of the human-user's palm). FIG. 5K further illustrates identifying an incidental contact on touch-sensitive surface 451 (e.g., contact 12918-6—the portion of the human-user's palm). In this example, the intensity measurements of intensity sensors 12902-1 and 12902-4 are each 10 units of intensity, and the intensity measurements of intensity sensors 12902-2 and 12902-3 are each 5 units of intensity (e.g., an aggregate intensity is the sum of the intensity measurements of intensity sensors 12902—30 units of intensity).

Figure 5L:
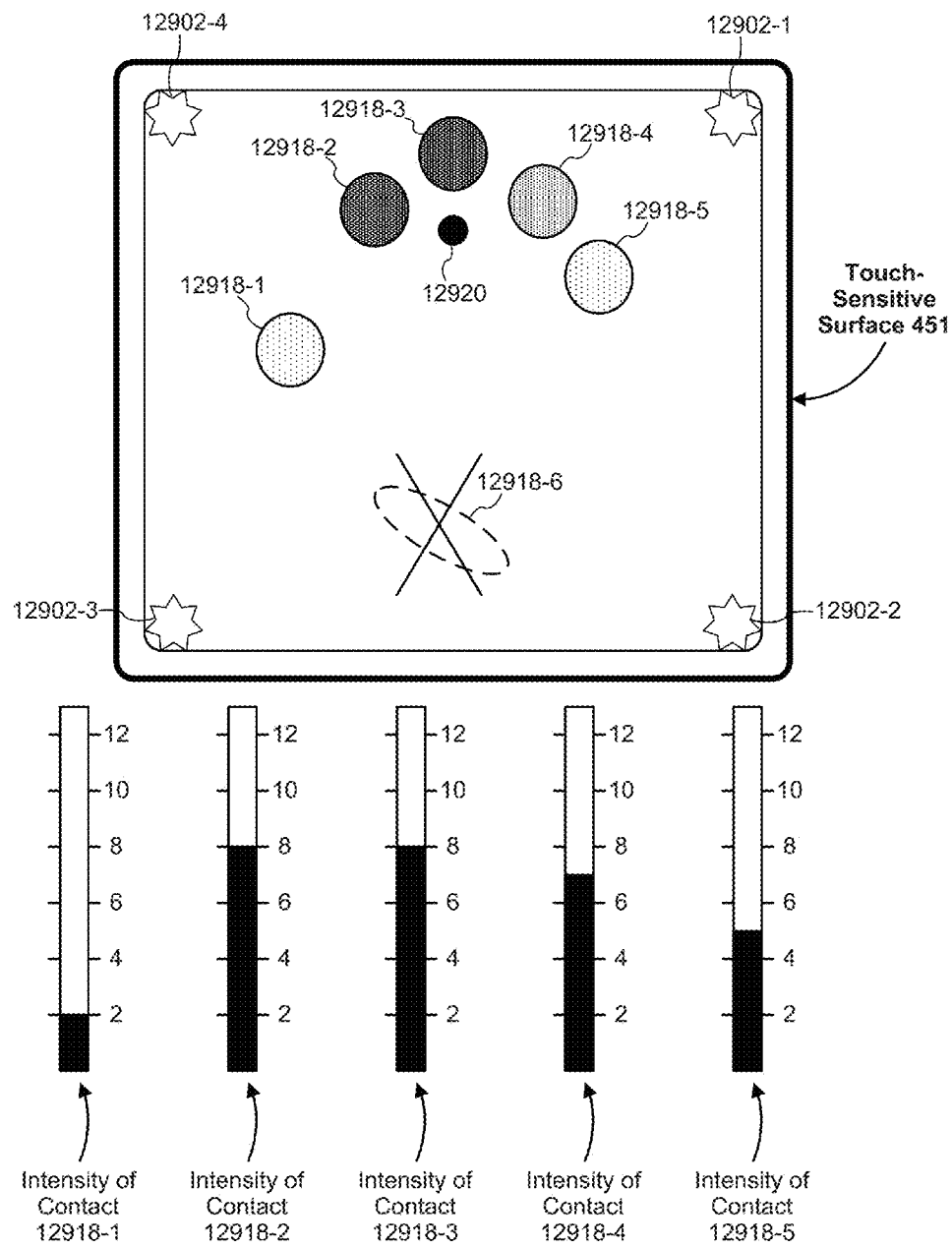

FIG. 5L illustrates compensating for the presence of a respective incidental contact (e.g., incidental palm contact 12918-6) on touch-sensitive surface 451. In this example, incidental contact 12918-6 is ignored and intensity contributions due to the palm input are, optionally, attributed to the other contacts (e.g., by computing the intensities of the contacts using the total detected intensity without assigning any of the total detected intensity to incidental contact 12918-6). Alternatively, the estimated contribution of incidental contact 12918-6 to the intensity measurements of intensity sensors 12902 is canceled, when determining center of force 12920 based on contact contribution criteria (e.g., a shape, a surface area and/or an intensity of contact 12918-6). For example, in some implements, when a contact fails to satisfy predefined contact contribution criteria, the contact is ignored at least for purposes of determining a center of force, or an estimated intensity contribution of incidental contact 12918-6 (e.g., based on contact size of incidental contact 12918-6 or a predetermined value) is subtracted from the weighted average. FIG. 5L further illustrates assigning portions of the aggregate intensity (e.g., a total of 30 units of intensity) to contacts 12918 (e.g., ignoring contact 12918-6). FIG. 5L further illustrates contact 12918-6 crossed out due to it being ignored, or due to cancellation of its estimated contribution to the intensity measurements of intensity sensors 12902, in FIG. 5K.

FIGS. 6A-6C are flow diagrams illustrating a method 13000 of assigning respective portions of an aggregate intensity to a plurality of contacts in accordance with some embodiments. The method 13000 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 13000 are, optionally, combined and/or the order of some operations is, optionally, be changed.

As described below, the method 13000 provides an intuitive way to assign respective portions of an aggregate intensity to a plurality of contacts. The method reduces the cognitive burden on a user when assigning respective portions of an aggregate intensity to a plurality of contacts, thereby creating a more efficient human-machine interface. For battery-operated electronic devices, enabling a user to assign respective portions of an aggregate intensity to a plurality of contacts faster and more efficiently conserves power and increases the time between battery charges.

The device detects (13002), on a touch sensitive surface, a plurality of contacts, where a plurality intensity sensors detect intensity of contacts with the touch-sensitive surface. FIG. 5B, for example, shows the device detecting a plurality of contacts 12904 (e.g., 5 contacts) on touch-sensitive surface 451 via a plurality of intensity sensors 12902 (e.g., 4 intensity sensors).

In some embodiments, the plurality of intensity sensors includes (13004) at least four intensity sensors. FIG. 5B, for example, shows four intensity sensors 12902. In some embodiments, the number of detected contacts (13006) is greater than the number of intensity sensors (e.g., the device detects five contacts on the touch-sensitive surface and there are four intensity sensors, one on each corner of the touch-sensitive surface). FIG. 5B, for example, shows five detected contacts (e.g., contacts 12904) and four intensity sensors 12902 (e.g., a count of the detected contacts 12904 is greater than a count of the intensity sensor units 12902).

In some embodiments, the touch-sensitive surface has (13008) a plurality of respective corners, and each respective intensity sensor of the plurality of intensity sensors is positioned proximate to a corresponding respective corner. FIG. 5B, for example, shows the each intensity sensor of the plurality of intensity sensors 12902 positioned proximate to a corresponding corner of touch-sensitive surface 451.

In some embodiments, the plurality of intensity sensors define (13010) a perimeter of the device (e.g., a perimeter of the touch-sensitive surface), and the plurality of contacts are detected within the perimeter defined by the plurality of intensity sensors. FIG. 5B, for example, shows intensity sensors 12902 defining a perimeter of touch-sensitive surface 451 and the plurality of contacts 12904 detected within the perimeter defined by intensity sensors 12902.

While detecting (13012) the plurality of contacts, the device receives (13014) a first intensity measurement from a first intensity sensor of the plurality of intensity sensors, and the device also receives (13016) a second intensity measurement from a second intensity sensor of the plurality of intensity sensors, where the first intensity sensor is different second intensity sensor. FIG. 5B, for example, shows the device receiving a first intensity measurement (e.g., intensity measurement of intensity sensor 12902-1) from a first intensity sensor (e.g., intensity sensor 12902-1) and, also, receiving a second intensity measurement (e.g., intensity measurement of intensity sensor 12902-2) from a second intensity sensor (e.g., intensity sensor 12902-2) while detecting the plurality of contacts 12904 on touch-sensitive surface 451.

While detecting (13012) the plurality of contacts, the device assigns (13018) a first portion of an aggregate intensity of the contacts to the first contact and assigns a second portion of an aggregate intensity of the contacts to the second contact. FIG. 5B, for example, shows an aggregate intensity of the contacts (e.g., the sum of the intensity measurements of intensity sensors 12902—32 units of intensity). FIG. 5F, for example, shows the device assigning a first portion of the aggregate intensity of the contacts to first contact 12904-1 (e.g., the intensity of contact 12904-1 is 8 units of intensity) while the device detects the plurality of contacts 12904 on touch-sensitive surface 451. FIG. 5F, for example, also shows the device assigning a second portion of the aggregate intensity to second contact 12904-2 (e.g., the intensity of contact 12904-2 is 8 units of intensity) while the device detects the plurality of contacts 12904 on touch-sensitive surface 451.

The device assigns (13018) portions of the aggregate intensity to the plurality of contacts based at least in part on (13020): the first intensity measurement; the second intensity measurement; a location of the first intensity sensor relative to the touch-sensitive surface; and a location of the second intensity sensor relative to the touch-sensitive surface. FIG. 5F, for example, shows the device assigning the aggregate intensity (e.g., 32 intensity units) to the plurality of contacts 12904 based at least in part on: the first intensity measurement of intensity sensor 12902-1 in FIG. 5B; the second intensity measurement of intensity sensor 12902-2 in FIG. 5B; the location of first intensity sensor 12902-1 relative to touch-sensitive surface 451 in FIG. 5B; and the location of second intensity sensor 12902-2 relative to touch-sensitive surface 451 in FIG. 5B.

The device also assigns (13018) portions of the aggregate intensity to the plurality of contacts based at least in part on a comparison (13022) between values of a set of one or more properties (e.g., location, distance from center of force, contact size) of the first contact and corresponding values of the set of one or more properties of the second contact. FIG. 5F, for example, shows the device assigning the aggregate intensity (e.g., 32 units of intensity) to the plurality of contacts based also at least in part on a comparison between values of a set of one or more properties of first contact 12904-1 (e.g., the distance from center of force 12906 to contact 12904-1 in FIG. 5E—$D_C1$) and corresponding values of a set of one or more properties of second contact 12904-2 (e.g., the distance from center of force 12906 to contact 12904-2 in FIG. 5E—$D_C2$).

In some embodiments, the set of one or more properties for a respective contact includes (13024) a location of the respective contact on the touch-sensitive surface. The location of the contact on the touch-sensitive surface is, optionally, relative to one or more other detected contacts, relative to a center of force (e.g., the corresponding $D_C$ distances of respective contacts 12904 in FIG. 5E), or relative to one or more intensity sensors. In some embodiments, the set of one or more properties of a respective contact includes (13026) a contact size of the respective contact on the touch-sensitive surface. In some embodiments, relative intensity of contacts can be determined based in part on an absolute contact size or a change in contact size, because as a finger is pressed onto the touch-sensitive surface, more of the finger comes into contact with the touch-sensitive surface. Thus, as a user presses a finger down harder onto the touch-sensitive surface, the size of a contact corresponding to the finger increases.

In some embodiments, the device includes (13028) a number of intensity sensors, the aggregate intensity is divided between a number of detected contacts, and the number of detected contacts is greater than the number of intensity sensors. In some implementations, the number of intensity sensors is four or more. FIG. 5F, for example, shows the aggregate intensity (e.g., the sum of the intensity measurements of intensity sensors 12902 in FIG. 5B—32 units of intensity) divided between the number of detected contacts 12904 on touch-sensitive surface 451 (e.g., the sum of the intensities of contacts 12904 in FIG. 5F equals the aggregate intensity—32 units of intensity). Also, in FIG. 5F, for example, the number of detected contacts 12904 (e.g., five) is greater than the number of intensity sensors 12902 (e.g., four).

In response to detecting the plurality of contacts, the device performs (13030) an operation based at least in part on the portion of the aggregate intensity assigned to the first contact. In some embodiments, means for performing an operation are enabled while means for detecting the plurality of contacts are detecting the plurality of contacts. In some embodiments, the operation is based (13032) at least in part on the portion of the aggregate intensity assigned to the second contact. FIG. 5G, for example, shows the device performing an operation (e.g., displaying lines 12908 on display 450) based at least in part on the portions of the aggregate intensity assigned to the first contact and the second contact (e.g., the thickness of lines 12908-1 and 12908-2 correspond to the intensity assigned to corresponding contacts 12904-1 and 12904-2, respectively, in FIG. 5F).

In some embodiments, the device determines (13034) a center of force on the touch-sensitive surface based at least in part on: the location of the first intensity sensor relative to the touch-sensitive surface; the location of the second intensity sensor relative to the touch-sensitive surface; the first intensity measurement of the first intensity sensor; and the second intensity measurement of the second intensity sensor. In some embodiments, the center of force is a weighted average of the locations of intensity sensors 12902 (e.g., the corresponding $D_S$ distances from respective intensity sensors 12902 to center of force 12906), where the intensity contributions of each of intensity sensors 12902 are weighted in accordance with the respective intensity measurement that corresponds to the respective intensity sensor. FIG. 5C, for example, shows center of force 12906 determined based at least in part on: the location of the first intensity sensor 12902-1 relative to touch-sensitive surface 451; the location of the second intensity sensor 12902-2 relative to touch-sensitive surface 451; the first intensity measurement of first intensity sensor 12902-1 in FIG. 5B; and the second intensity measurement of second intensity sensor 12902-2 in FIG. 5B. In some embodiments, the center of force on the touch-sensitive surface is determined prior to, or as part of, assigning portions of the intensity of contacts on the touch-sensitive surface (as described in greater detail above with reference to operation 13018).

In some embodiments, determining the center of force includes (13036): identifying one or more incidental contacts on the touch-sensitive surface (e.g., a palm contact or accidental finger contact); and compensating for the presence of a respective incidental contact on the touch-sensitive surface (e.g., ignoring the incidental contact, or cancelling an estimated contribution of the incidental contact to the aggregate intensity). FIG. 5L, for example, shows identifying an incidental contact (e.g., contacts 12918-6) on touch-sensitive surface 451 and compensating for the presence of contact 12918-6 on touch-sensitive surface 451 (e.g., by cancelling the estimated contribution of incidental contact 12918-6 to the intensity measurements of intensity sensors 12902 in FIG. 5K) when determining center of force 13020.

In some embodiments, the device determines (13038) a location of the first contact relative to the center of force, determines a location of the second contact relative to the center of force, assigns the first portion of the aggregate intensity to the first contact based on the location of the first contact relative to the center of force, and assigns the second portion of the aggregate intensity to the second contact based on the location of the second contact relative to the center of force. In some embodiments, the aggregate intensity is divided between the detected contacts, including the first contact and the second contact, based on a comparison between the location of the first contact relative to the center of force and the location of the second contact relative to the center of force, so that more intensity is assigned to the contact that is closer to the center of force (e.g., the aggregate intensity is assigned to contacts based on the assumption that the intensity contribution of a respective contact is proportional to the distance of the contact to the center of force). In some implementations, the center of force is determined using the predefined mathematical function described above with reference to FIG. 5C. Furthermore, in some implementations, the portion of the aggregate intensity assigned to respective detected contacts is determined using the predefined mathematical function described above with reference to FIG. 5F. In some embodiments, locations of the contacts are determined prior to, or as part of, assigning portions of the intensity of contacts on the touch-sensitive surface (as described in greater detail above with reference to operation 13018).

For example, the intensity contributions of the plurality of contacts are determined so that the center of force is located on the touch-sensitive surface in accordance with a weighted average of the locations of the plurality of contacts, where the locations of each of the respective contacts is weighted in accordance with a respective portion of the aggregate intensity that is assigned to the respective contact (e.g., the portions of the aggregate intensity that are assigned to particular contacts are determined by reversing the computation of a weighted average, starting with the total intensity, the location of the weighted average and the locations of the contacts and working backwards to determine the weights for the different contacts). For example, if four intensity sensors identify an aggregate intensity of 4 units of intensity at a respective point (e.g., the center of force) on the touch-sensitive surface, and the device detects two contacts on the touch-sensitive surface, a first contact 1 centimeter from the respective point, a second contact 3 centimeters from the respective point and directly across from the first contact, the device would assign 75% of the intensity (e.g., 3 units of intensity) to the first contact and 25% of the intensity (e.g., 1 unit of intensity) to the second contact.

FIG. 5E, for example, shows the device determining a location of first contact 12904-1 relative to center of force 12906 (e.g., distance $D_C1$) and a location of second contact 12904-2 relative to center of force 12906 (e.g., distance $D_C2$). FIG. 5F, for example, further shows the device assigning the first portion of the aggregate intensity (e.g., the sum of the intensity measurements of intensity sensors 12902 in FIG. 5B) to first contact 12904-1 (e.g., intensity of contact 12904-1—8 units of intensity) based on the location of first contact 12904-1 relative to center of force 12906 (e.g., distance $D_C1$) and the second portion of the aggregate intensity (e.g., the sum of the intensity measurements of intensity sensors 12902 in FIG. 5B) to second contact 12904-2 (e.g., intensity of contact 12904-2—8 units of intensity) based on the location of second contact 12904-2 relative to center of force 12906 (e.g., distance $D_C2$). It should be understood that the particular order in which the operations in FIGS. 6A-6C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 13000 described above with respect to FIGS. 6A-6C. For example, the contacts described above with reference to method 13000 optionally have one or more of the characteristics of the contacts described herein with reference to other methods described herein (e.g., those listed the fifth paragraph of the Description of Embodiments). For brevity, these details are not repeated here.

Figure 7:
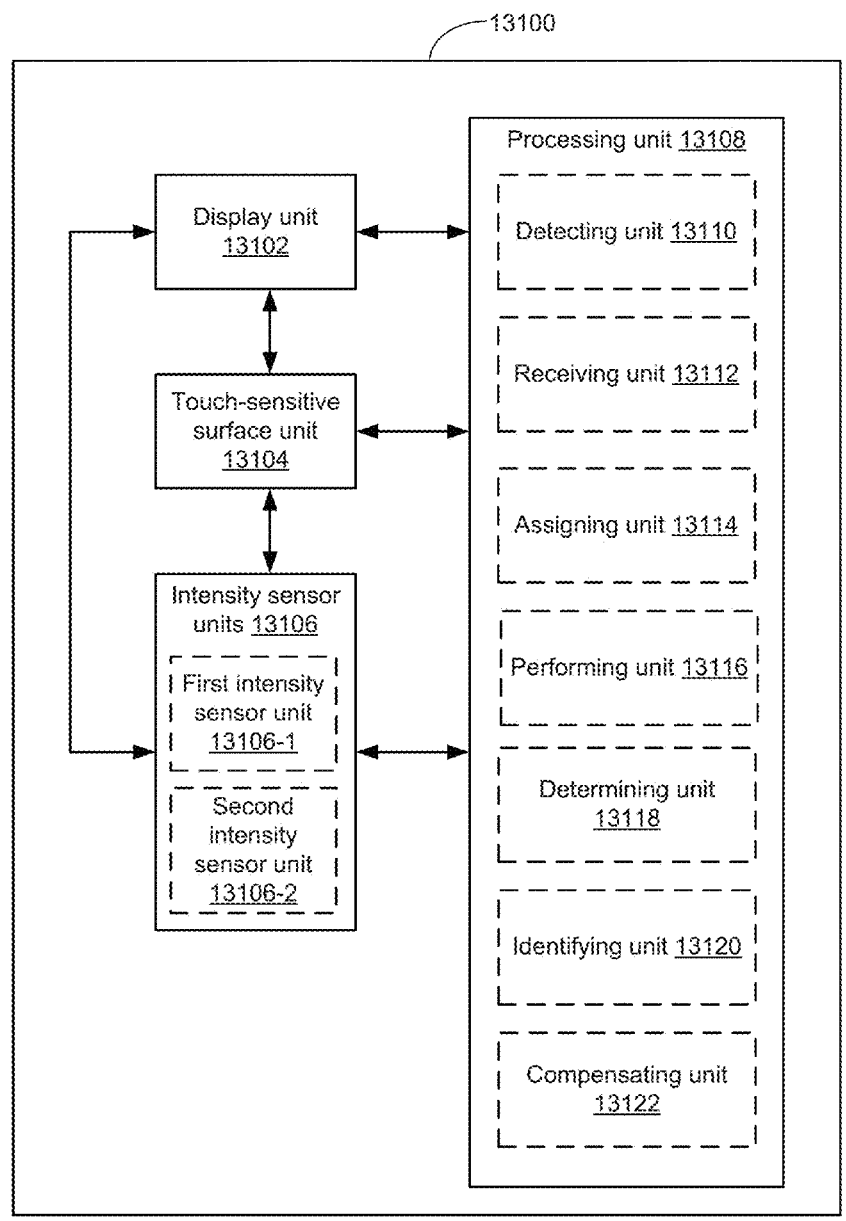
FIG. 7 is a functional block diagram of an electronic device in accordance with some embodiments.

In accordance with some embodiments, FIG. 7 shows a functional block diagram of an electronic device 13100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 7 are, optionally, combined or separated into sub-blocks to implement the principles of the various described embodiments. Therefore, the description herein optionally supports any possible combination or separation or further definition of the functional blocks described herein.

As shown in FIG. 7, an electronic device 13100 includes: a display unit 13102 configured to display information; a touch-sensitive surface unit 13104 configured to receive contacts; a plurality of intensity sensor units 13106 to detect intensity of contacts with the touch-sensitive surface 13104; and a processing unit 13108 coupled to the display unit 13102, the touch-sensitive surface unit 13104 and the plurality of intensity sensor units 13106. In some embodiments, the processing unit 13108 includes a detecting unit 13110, a receiving unit 13112, an assigning unit 13114, a performing unit 13116, a determining unit 13118, an identifying unit 13120, and a compensating unit 13122.

The processing unit 13108 is configured to detect (e.g., with the detecting unit 13110), on the touch-sensitive surface unit 13104, a plurality of contacts. While detecting the plurality of contacts, the processing unit 13108 is further configured to: receive (e.g., with the receiving unit 13112) a first intensity measurement from a first intensity sensor unit 13106-1 of the plurality of intensity sensors unit 13106; receive (e.g., with the receiving unit 13112) a second intensity measurement from a second intensity sensor unit 13106-2 of the plurality of intensity sensor units 13106, wherein the first intensity sensor unit 13106-1 is different from the second intensity sensor unit 13106-2; and assign (e.g., with the assigning unit 13114) a first portion of an aggregate intensity of the contacts to the first contact and assign (e.g., with the assigning unit 13114) a second portion of the aggregate intensity to the second contact. The processing unit 13108 is configured to assign (e.g., with the assigning unit 13114) the aggregate intensity based at least in part on: the first intensity measurement; the second intensity measurement; a location of the first intensity sensor unit 13106-1 relative to the touch-sensitive surface unit 13104; a location of the second intensity sensor unit 13106-2 relative to the touch-sensitive surface unit 13104; and a comparison between values of a set of one or more properties of the first contact and corresponding values of the set of one or more properties of the second contact. In response to detecting the plurality of contacts, the processing unit 13108 is further configured to perform (e.g., with the performing unit 13116) an operation based at least in part on the portion of the aggregate intensity assigned to the first contact.

In some embodiments, the operation is based at least in part on the portion of the aggregate intensity assigned to the second contact.

In some embodiments, the number of detected contacts is greater than the number of intensity sensor units 13106.

In some embodiments, the device includes a number of intensity sensor units 13106, the aggregate intensity is divided between a number of detected contacts, and the number of detected contacts is greater than the number of intensity sensor units 13106.

In some embodiments, the plurality of intensity sensor units 13106 define a perimeter on the device, and the plurality of contacts are detected within the perimeter defined by the plurality of intensity sensor units 13106.

In some embodiments, the plurality of intensity sensor units 13106 includes at least four intensity sensor units.

In some embodiments, the touch-sensitive surface unit 13104 has a plurality of respective corners, and each respective intensity sensor unit of the plurality of intensity sensor units 13106 is positioned proximate to a corresponding respective corner.

In some embodiments, the set of one or more properties for a respective contact includes a location of the respective contact on the touch-sensitive surface unit 13104.

In some embodiments, the set of one or more properties of a respective contact include a contact size of the respective contact on the touch-sensitive surface unit 13104.

In some embodiments, the processing unit 13108 is further configured to determine (e.g., with the determining unit 13118) a center of force on the touch-sensitive surface unit 13104 based at least in part on: the location of the first intensity sensor unit 13106-1 relative to the touch-sensitive surface unit 13104; the location of the second intensity sensor unit 13106-2 relative to the touch-sensitive surface unit 13104; the first intensity measurement of the first intensity sensor unit 13106-1; and the second intensity measurement of the second intensity sensor unit 13106-2.

In some embodiments, determining (e.g., with the determining unit 13118) the center of force includes: identifying (e.g., with the identifying unit 13120) one or more incidental contacts on the touch-sensitive surface unit 13104; and compensating (e.g., with the compensating unit 13122) for the presence of a respective incidental contact on the touch-sensitive surface unit 13104.

In some embodiments, the processing unit 13108 is configured to: determine (e.g., with the determining unit 13118) a location of the first contact relative to the center of force; determine (e.g., with the determining unit 13118) a location of the second contact relative to the center of force; assign (e.g., with the assigning unit 13114) the first portion of the aggregate intensity to the first contact based on the location of the first contact relative to the center of force; and assign (e.g., with the assigning unit 13114) the second portion of the aggregate intensity to the second contact based on the location of the second contact relative to the center of force.

The operations in the information processing methods described above are, optionally, implemented by running one or more functional modules in information processing apparatus such as general purpose processors (e.g., as described above with respect to FIGS. 1A and 3) or application specific chips.

The operations described above with reference to FIGS. 6A-6C are, optionally, implemented by components depicted in FIGS. 1A-1B or FIG. 7. For example, detecting operation 13002, receiving operations 13014-13016, assigning operation 13018, and determining operation 13034 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Transitioning Between Touch Input to Display Output Relationships

Many electronic devices have graphical user interfaces that include various user interface objects that are controlled in accordance with input-output relationships between inputs and corresponding outputs. In some situations there is a constant input-output relationship between inputs and corresponding outputs. However, a constant input-output relationship can be distracting an inefficient for a user when there is a particular range of outputs that the user is likely to want to achieve. However, a variable input-output relationship can also be confusing and disconcerting to a user if the user notices discontinuities in the input-output relationship. The embodiments described below improve on these methods by providing an efficient and intuitive way of transitioning between touch input to display output relationships when interacting with user interface objects. In particular, in accordance with some embodiments described below, some user interface objects have two or more touch input to display output relationships that govern how those objects are displayed in response to user inputs, especially touch inputs. For example, in some circumstances, opening a file folder involves an animation progression with multiple stages or options depending on the properties of the user input.

FIGS. 8A-8V illustrate exemplary user interfaces for transitioning between touch input to display output relationships using inputs on a touch-sensitive surface in accordance with some embodiments. The user interfaces in these figures are used to illustrate the processes described below, including the processes described below with reference to FIGS. 9A-9C. FIGS. 8B-8I and 8N-8T include intensity diagrams that show the current intensity of the contact on the touch-sensitive surface relative to a plurality of intensity thresholds including a respective threshold (e.g., "$IT_D$"). In some embodiments, operations similar to those described below with reference to $IT_D$ are performed with reference to a different intensity threshold (e.g., "$IT_L$").

FIG. 8A illustrates an example user interface 13204, including files icon 13205, displayed on display 450 of a device (e.g., device 300) and responsive to inputs (e.g., a finger contact) on touch-sensitive surface 451. FIG. 8A further illustrates intensity sensors 13208 to detect the intensity of contacts on touch-sensitive surface 451. FIG. 8A also shows contact 13202 and intensity of contact 13202 as well as additional intensity range 13210 corresponding to the relative location of contact 13202 on touch-sensitive surface 451 and intensity sensors 13208. In accordance with some embodiments, FIG. 8A also illustrates a displayed representation of a focus selector (e.g., cursor 13206) corresponding to input 13202 detected on touch-sensitive surface 451.

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes contact intensity sensor(s) 165 on the display (FIG. 1A). For convenience of explanation, the embodiments described with reference to FIGS. 8A-8K and 9A-9C will be discussed with reference to display 450 and a separate touch-sensitive surface 451, however analogous operations are, optionally, performed on a device with a touch-sensitive display system 112 in response to detecting the contacts described in FIGS. 8A-8K on the touch-sensitive display system 112 while displaying the user interfaces shown in FIGS. 8A-8K on the touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on the touch-sensitive display system 112, in place of cursor 13206. Likewise, for embodiments discussed with reference with a touch-sensitive display system 112 (e.g., as shown in FIGS. 8M-8V), analogous operations are, optionally, performed on a device with display 450 and a separate touch-sensitive surface 451 in response to detecting the contacts described in FIGS. 8M-8V on the touch-sensitive surface 451 while displaying the user interfaces shown in FIGS. 8M-8V on the display 450. In embodiments where a display 450 and touch-sensitive surface 451 replace touch screen 112, the focus selector is, optionally: a cursor, a magnifying glass, or a spotlight, in place of a respective contact (e.g., contact 13228 in FIGS. 8M-8V), a representative point corresponding to a contact, or a centroid of two or more contacts detected on the touch-sensitive display system 112.

In some embodiments, cursor 13206 is a displayed representation of the focus selector with a position on display 450 that is determined in accordance with contacts received by touch-sensitive surface 451. In other implementations the focus selector has a different displayed representation (e.g., a magnifying glass). Alternatively, in some implementations a representation of the focus selector is not displayed. For example, in implementations using a touch-sensitive display system, the position of the focus selector corresponds to the location on the display of a contact or gesture. Further, the focus selector is herein defined to be "over" a user interface object when the position of the focus selector corresponds to the location on the display of the user interface object.

Figure 8F:
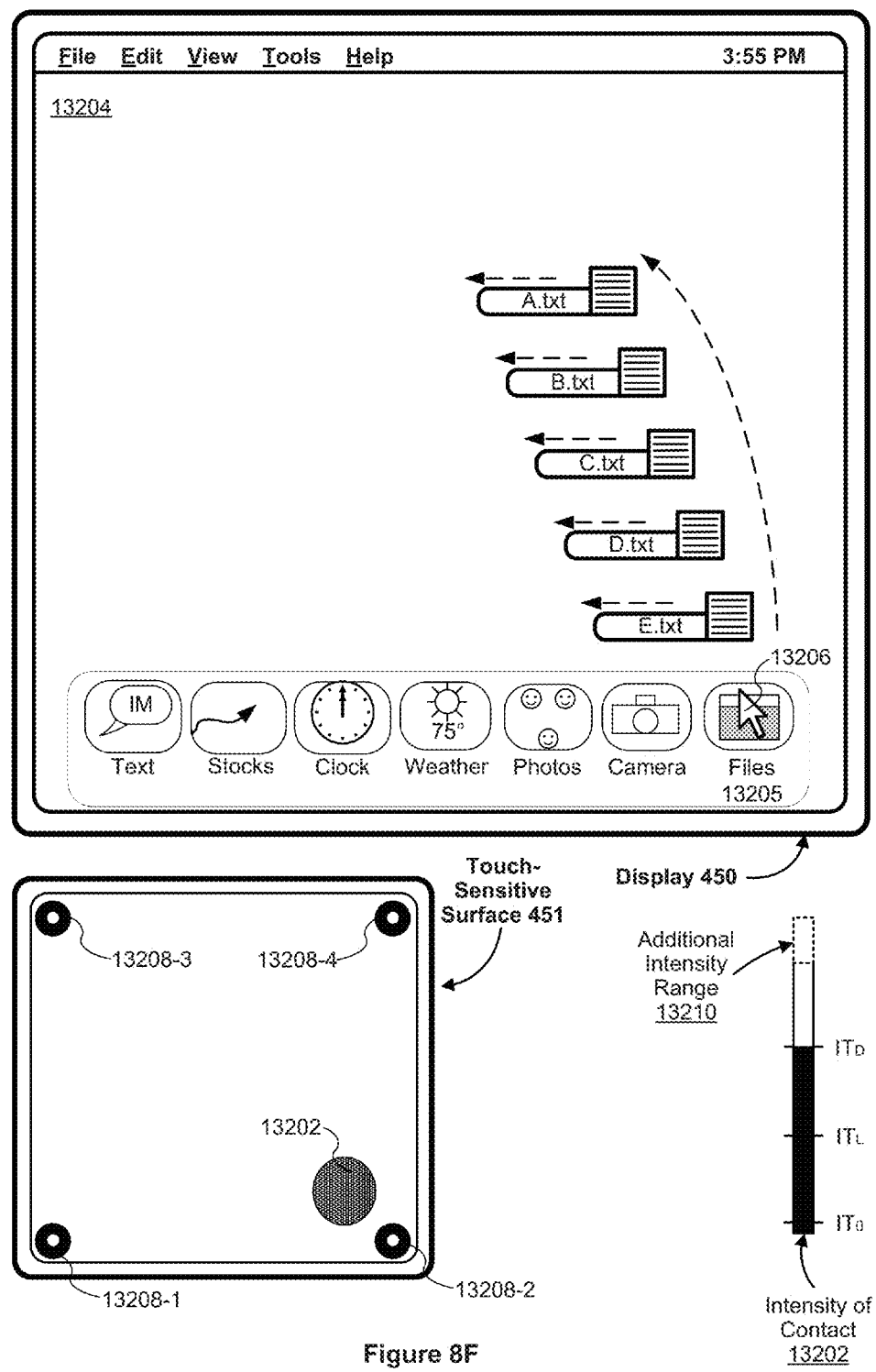
Figure 8G:
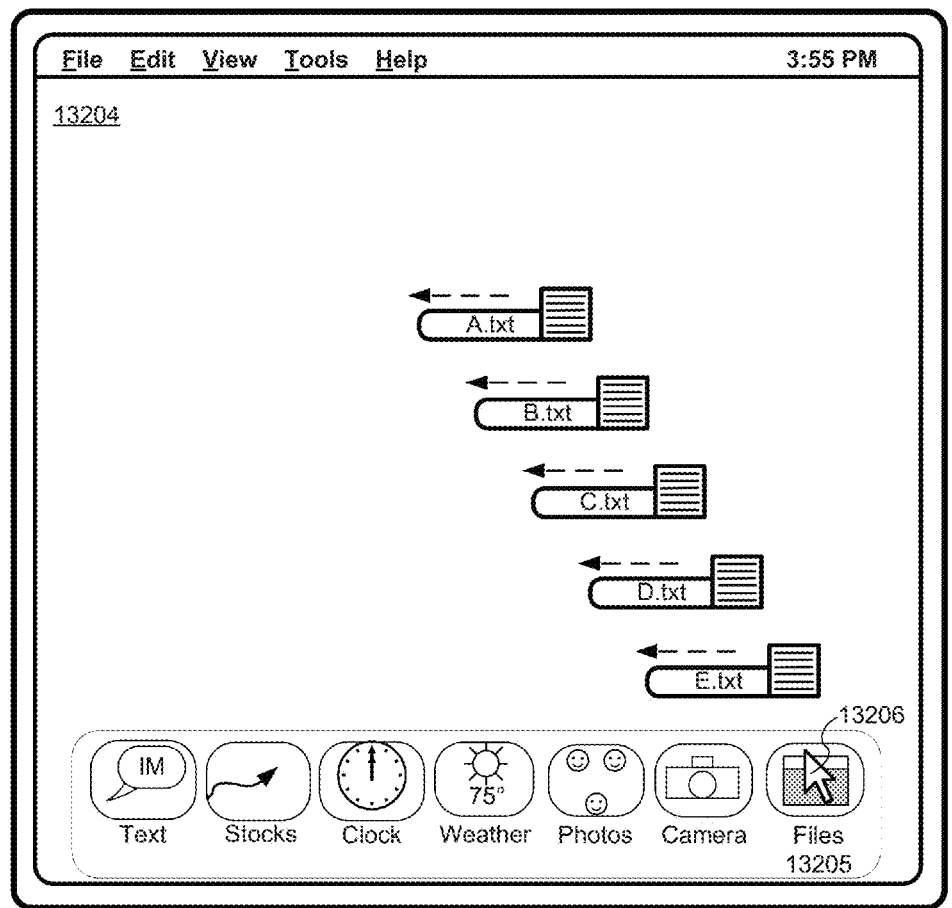
Figure 8G:
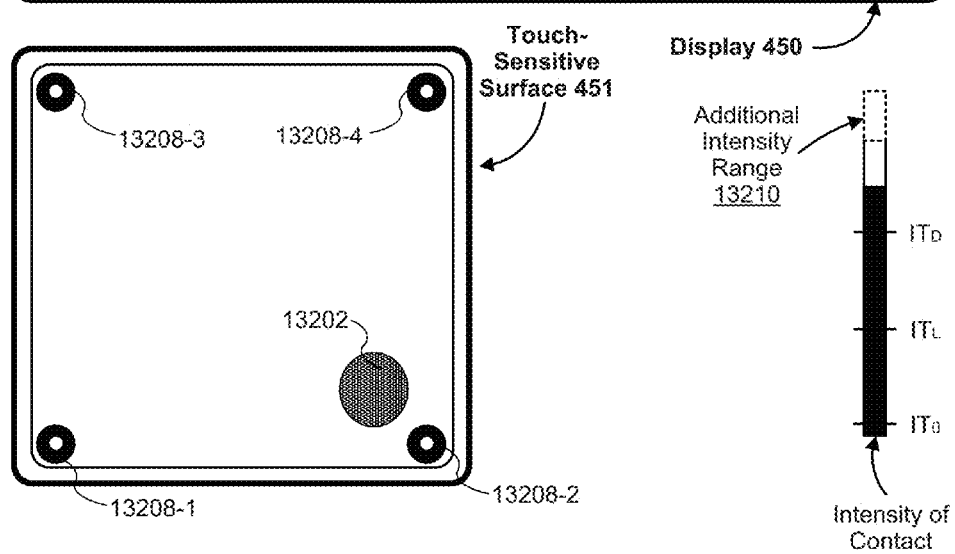
Figure 8H:
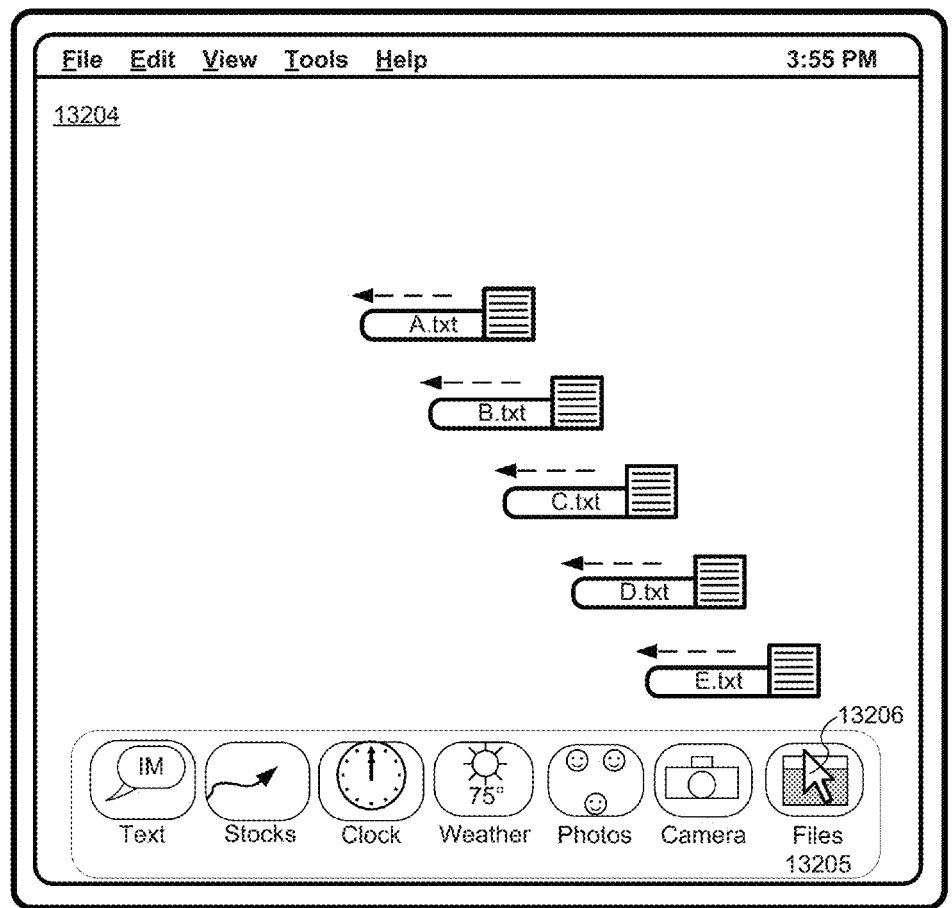
Figure 8H:
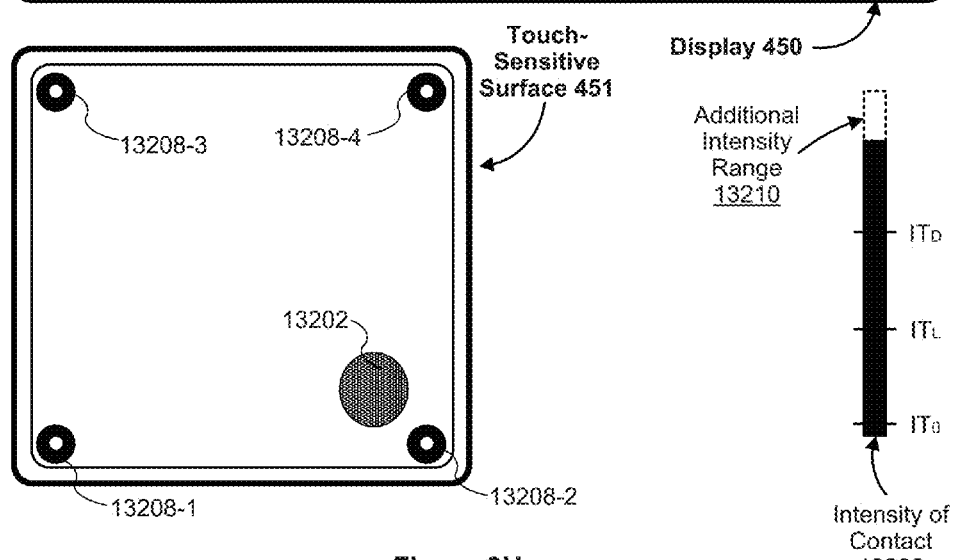
Figure 8I:
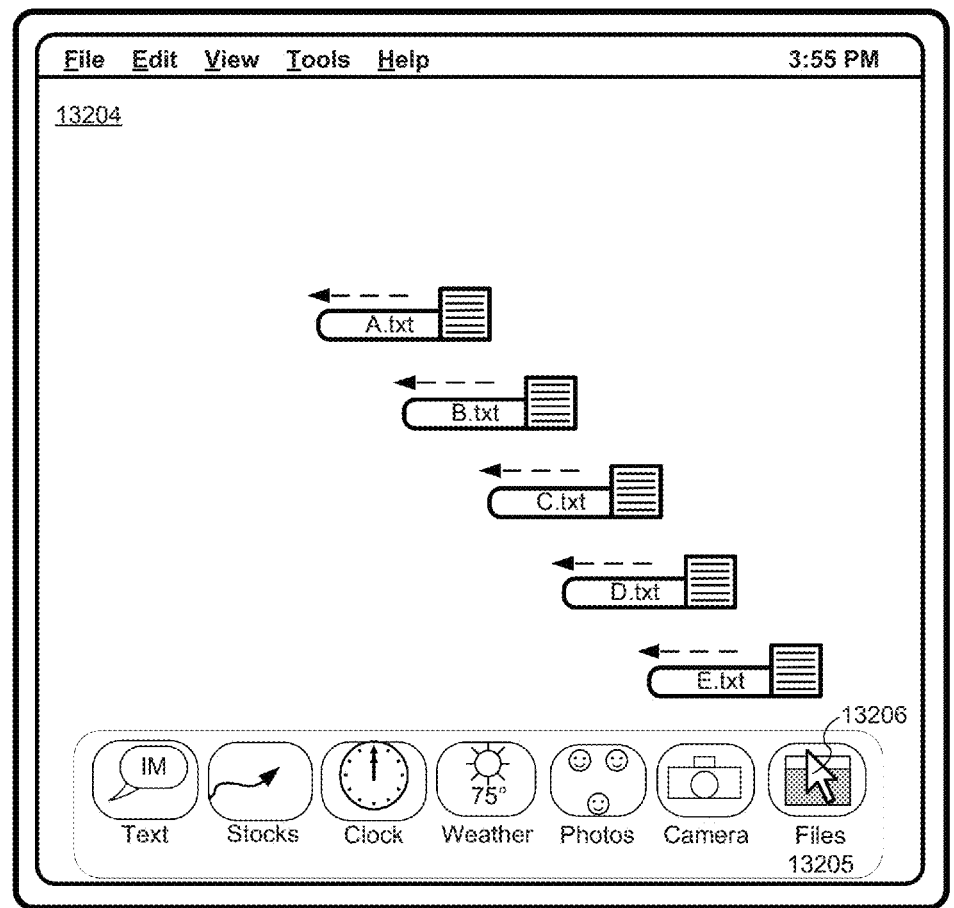
Figure 8I:
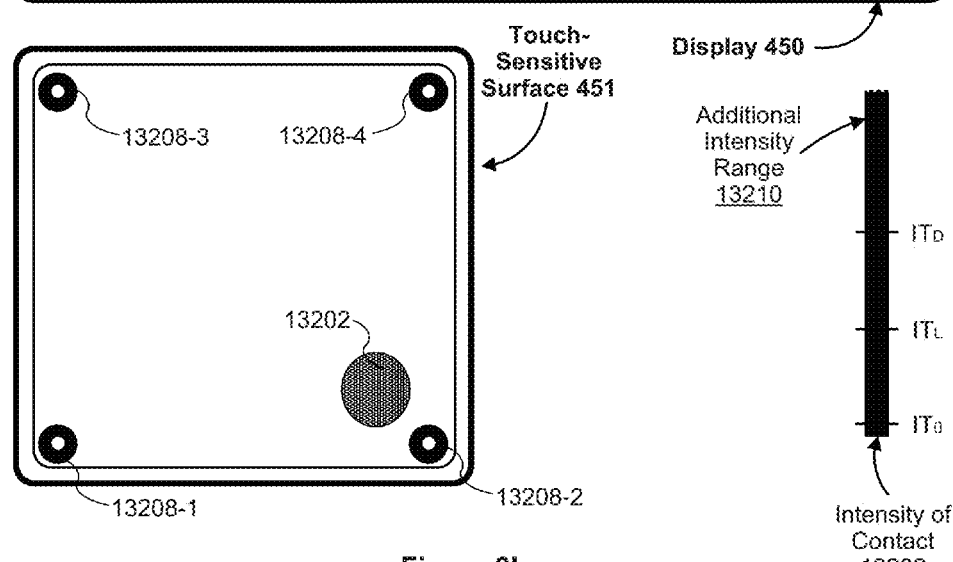
Figure 8J:
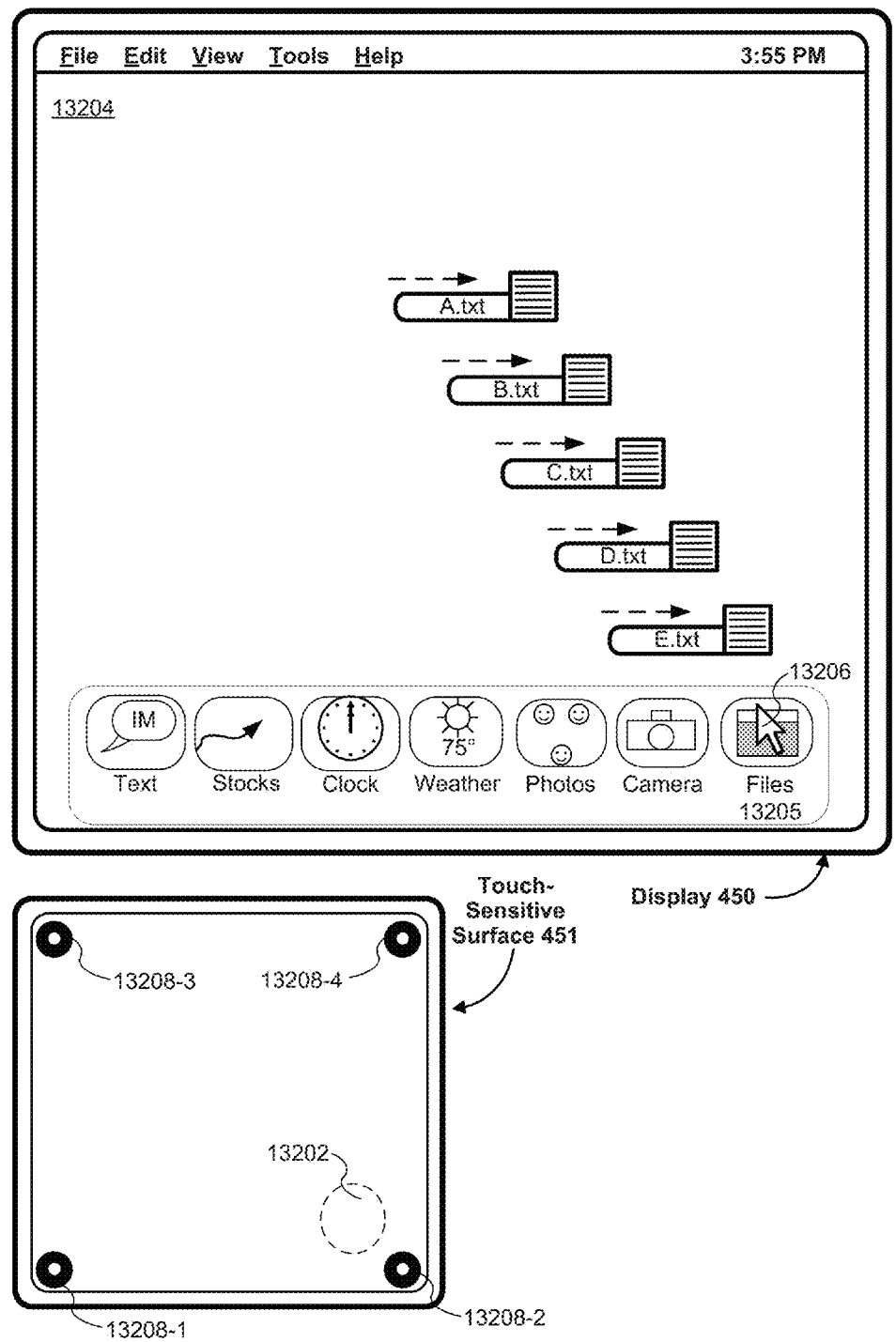
Figure 8K:
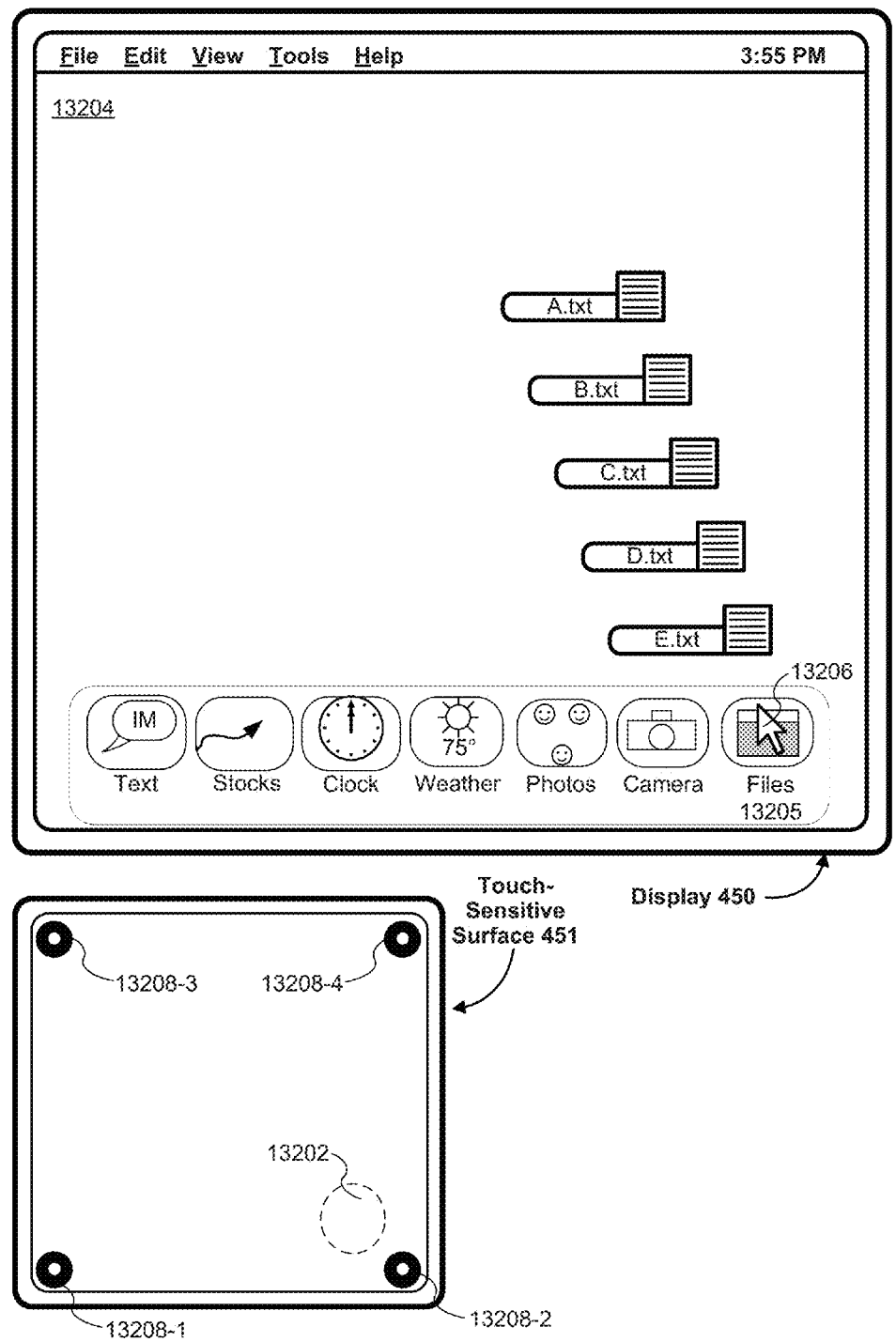

FIGS. 8B-8K illustrate an example of adjusting the progress of an animation in accordance with intensity of a contact. FIGS. 8B-8E illustrate an animation displaying the files associated with files icon 13205 progressing in accordance with a first touch input to display output relationship as intensity of contact 13202 increases from just above $IT_L$ to just below $IT_D$. FIG. 8F illustrates a transition point in the animation progress as intensity of contact 13202 reaches $IT_D$. FIGS. 8G-8I illustrate the animation progressing in accordance with a second touch input to display output relationship as intensity of contact 13202 increases beyond $IT_D$. FIGS. 8J-8K illustrate lift-off of contact 13202 and an animation that returns (e.g., bounces back) the graphical representation of files associated with file icon 13205 to the state shown in FIG. 8F.

Figure 8L:
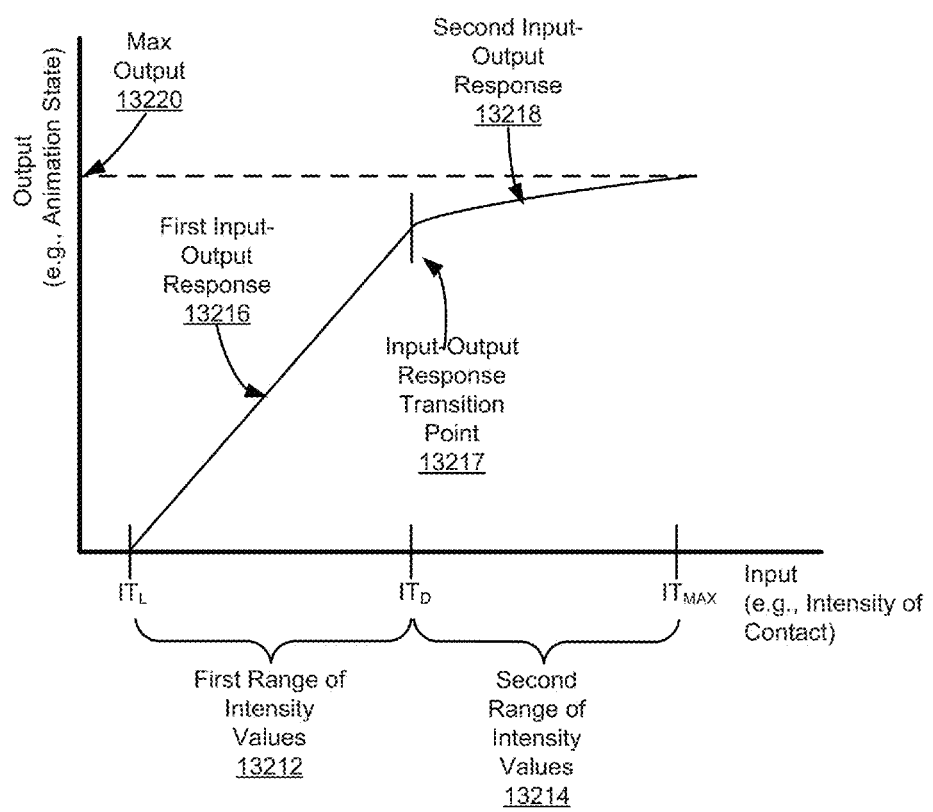

FIG. 8L illustrates an example of adjusting an output in response to change in input (e.g., change in intensity of a finger contact). FIG. 8L shows first touch input to display output response 13216 (e.g., a linear response) corresponding to first range of intensity values 13212 between $IT_L$ and $IT_D$. FIG. 8L also shows touch input to display output response transition point 13217 corresponding to intensity $IT_D$ and a smooth transition to second touch input to display output response 13218 (e.g., a cubic spline response) corresponding to second range of intensity values 13214 between $IT_D$ and $IT_{MAX}$. FIG. 8L further shows the output approaching max output 13220 as the input approaches $IT_{MAX}$.

Figure 8M:
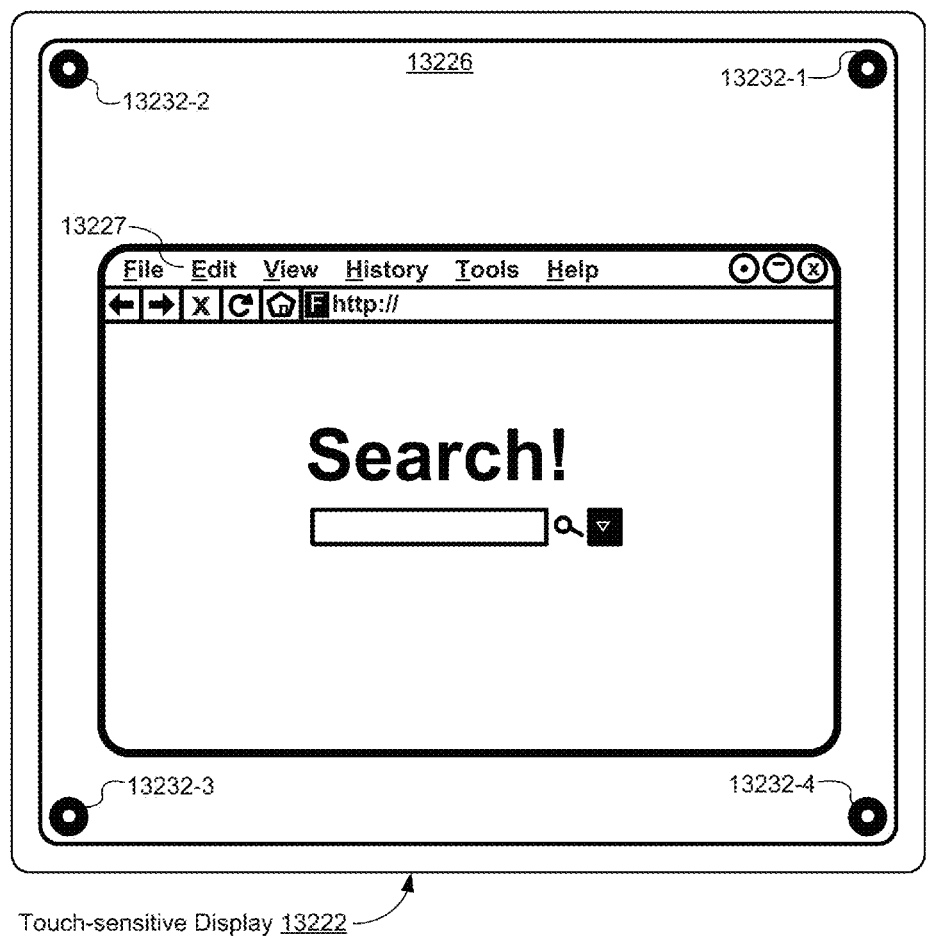

FIG. 8M illustrates an example user interface 13226, including menu bar 13227, displayed on touch-sensitive display 13222, which is responsive to inputs (e.g., a finger contact). FIG. 8M further illustrates intensity sensors 13232 to detect the intensity of contacts on touch-sensitive display 13222.

Figure 8N:
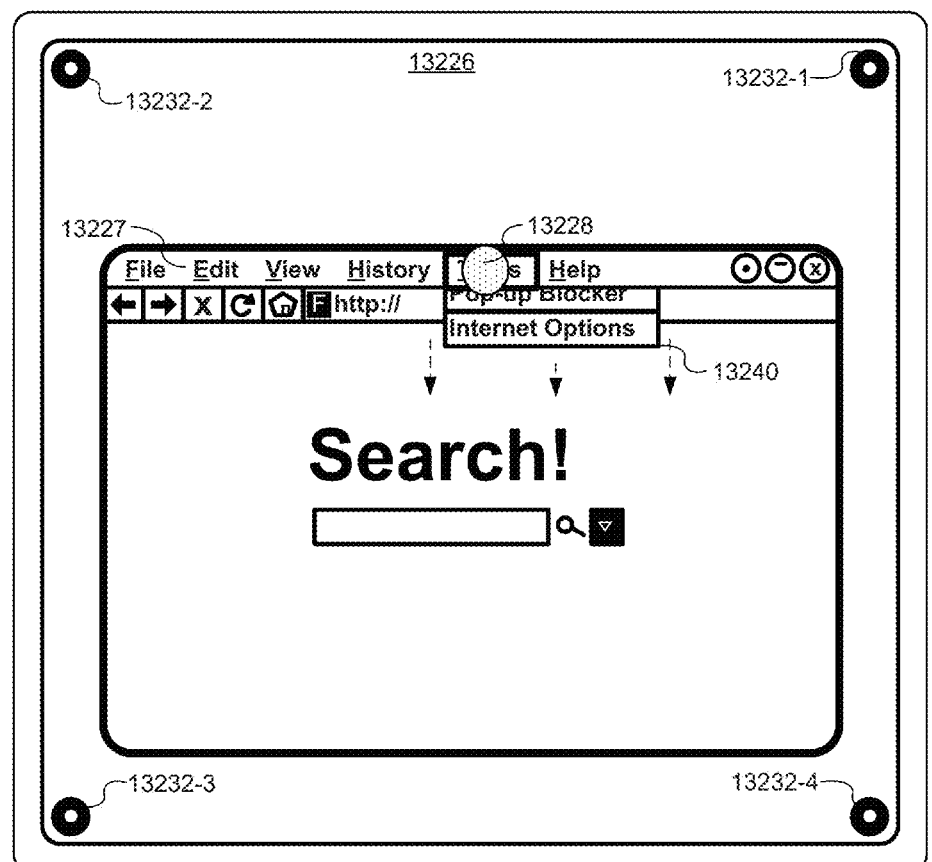
Figure 8N:
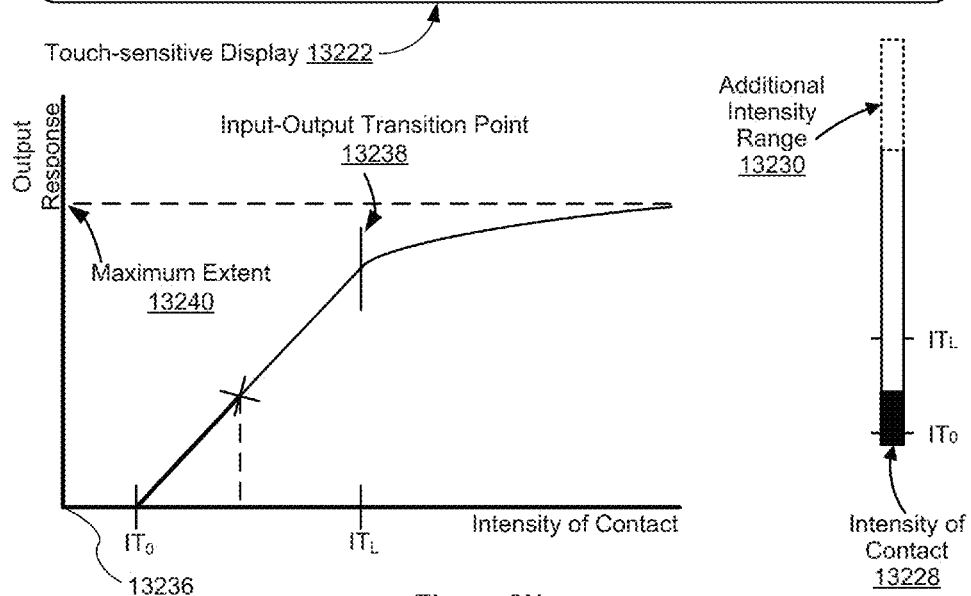
Figure 8O:
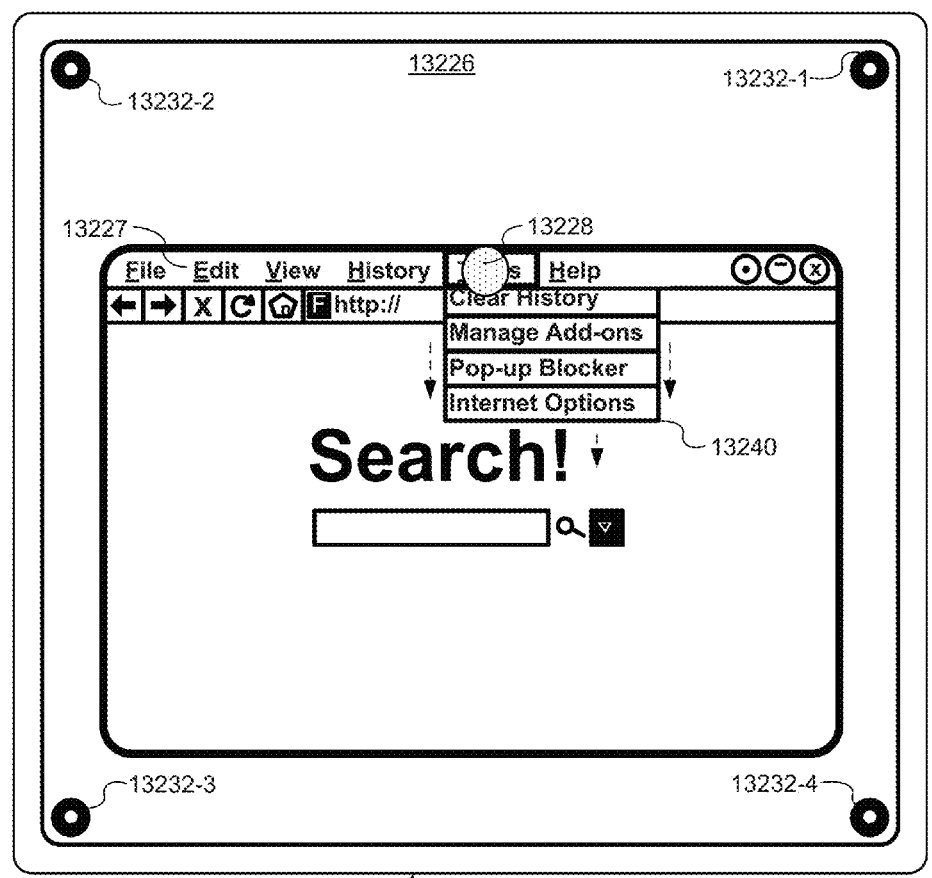
Figure 8O:
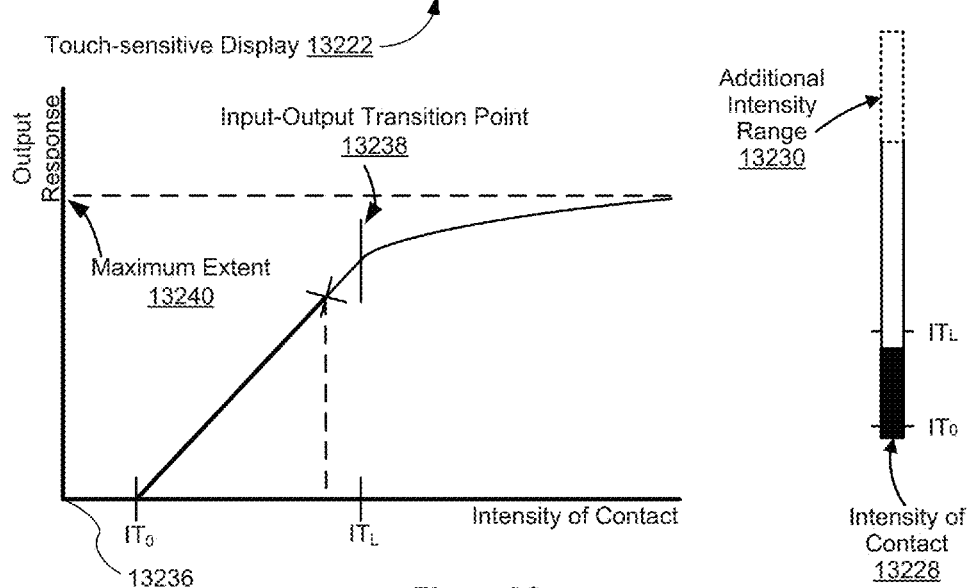
Figure 8P:
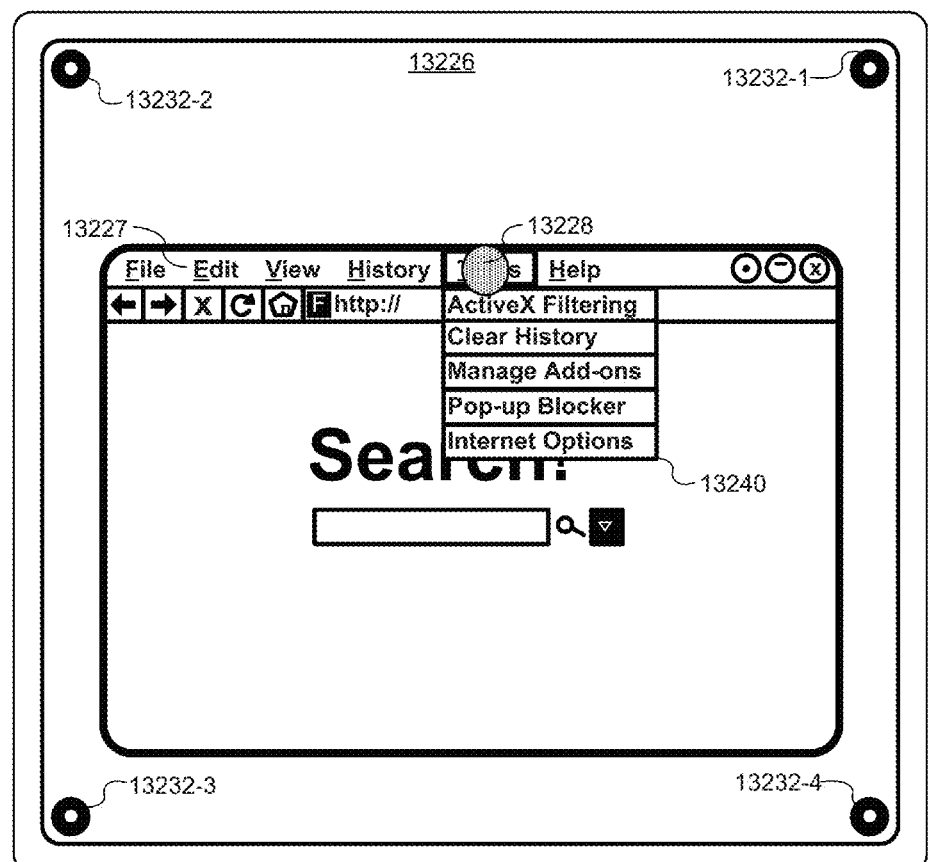
Figure 8P:
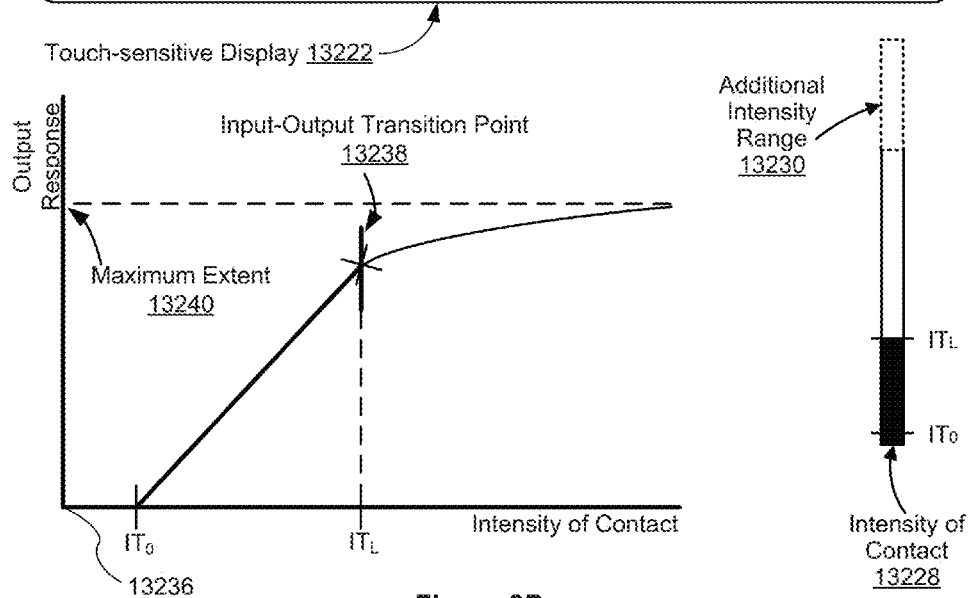
Figure 8Q:
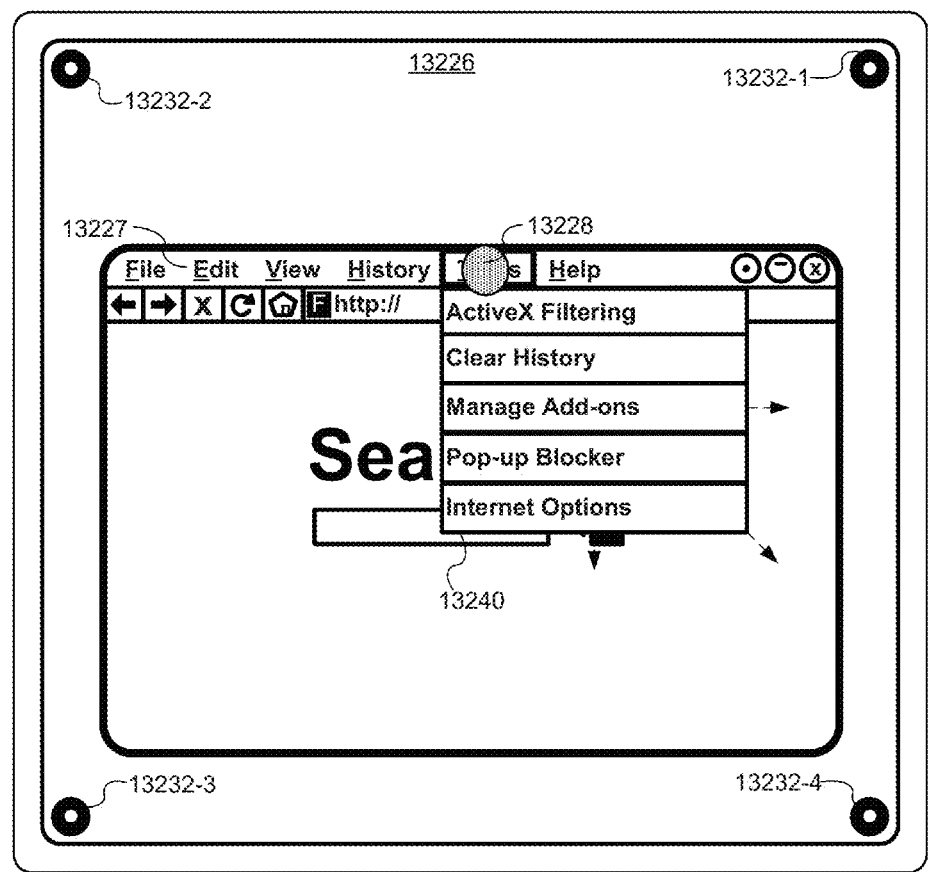
Figure 8Q:
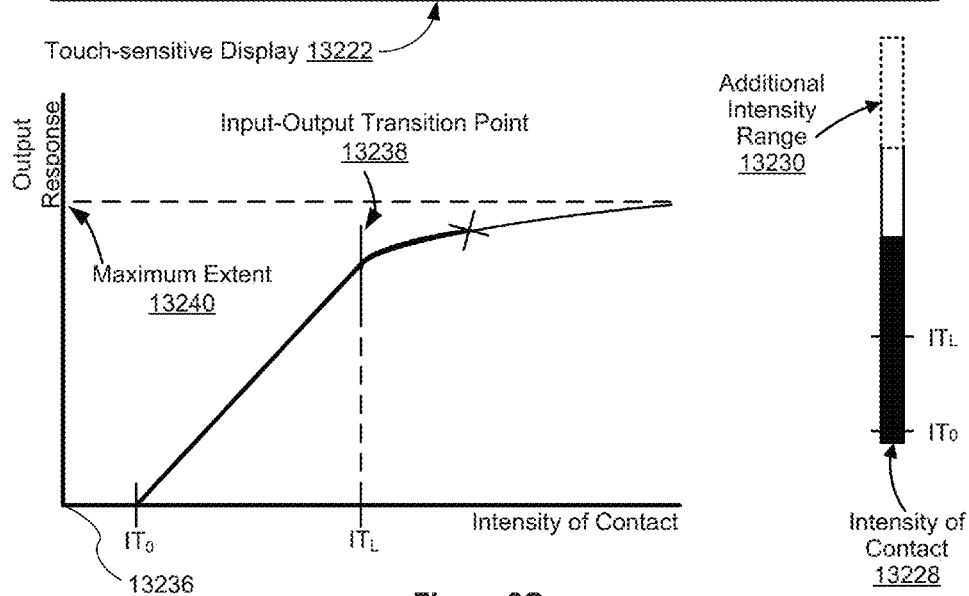
Figure 8R:
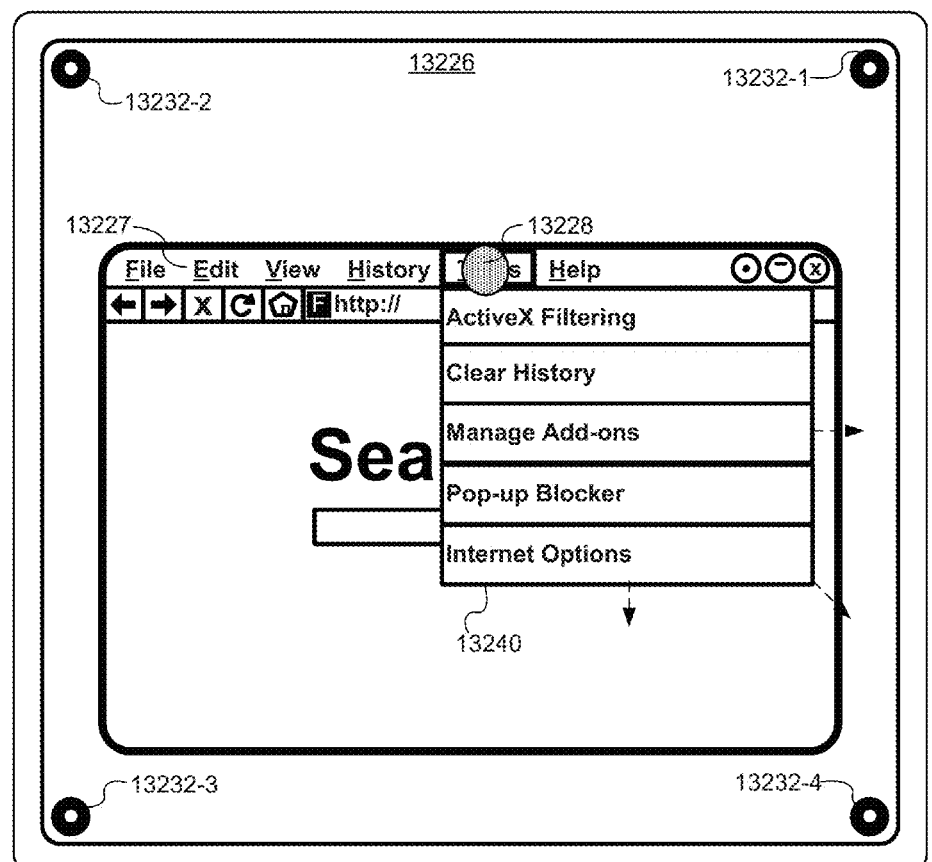
Figure 8R:
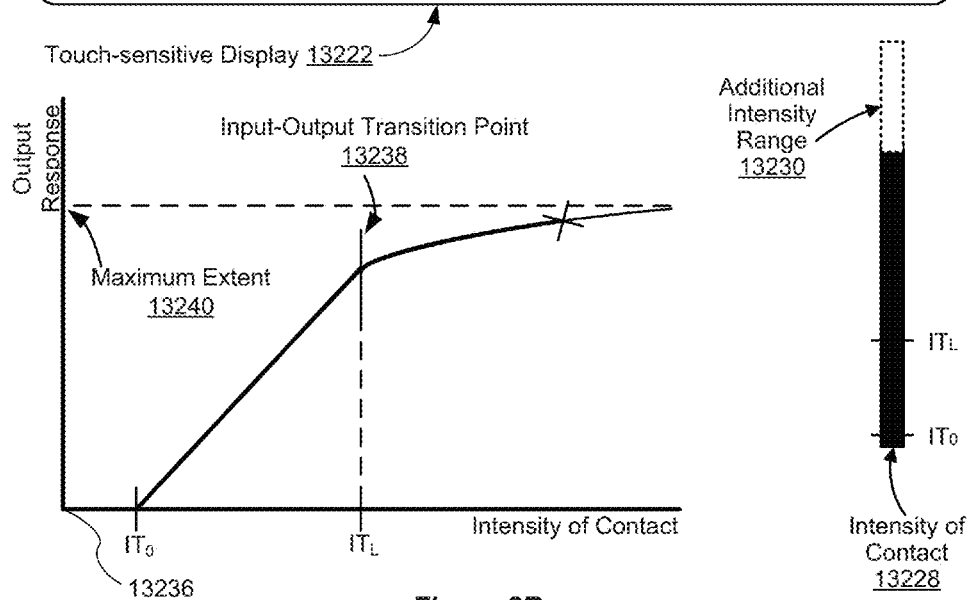
Figure 8S:
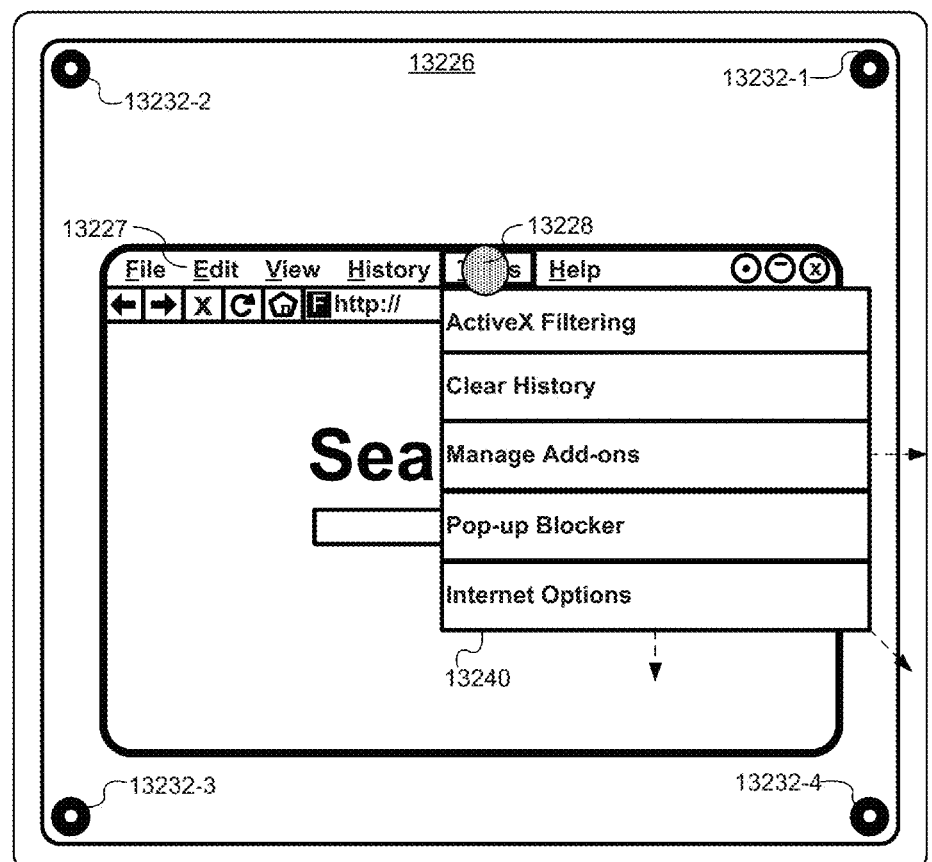
Figure 8S:
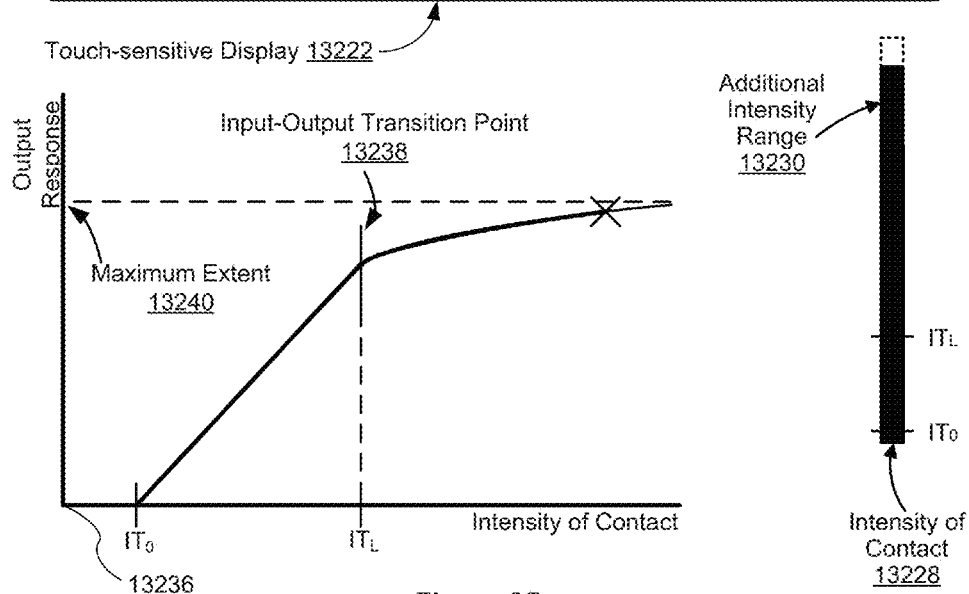
Figure 8T:
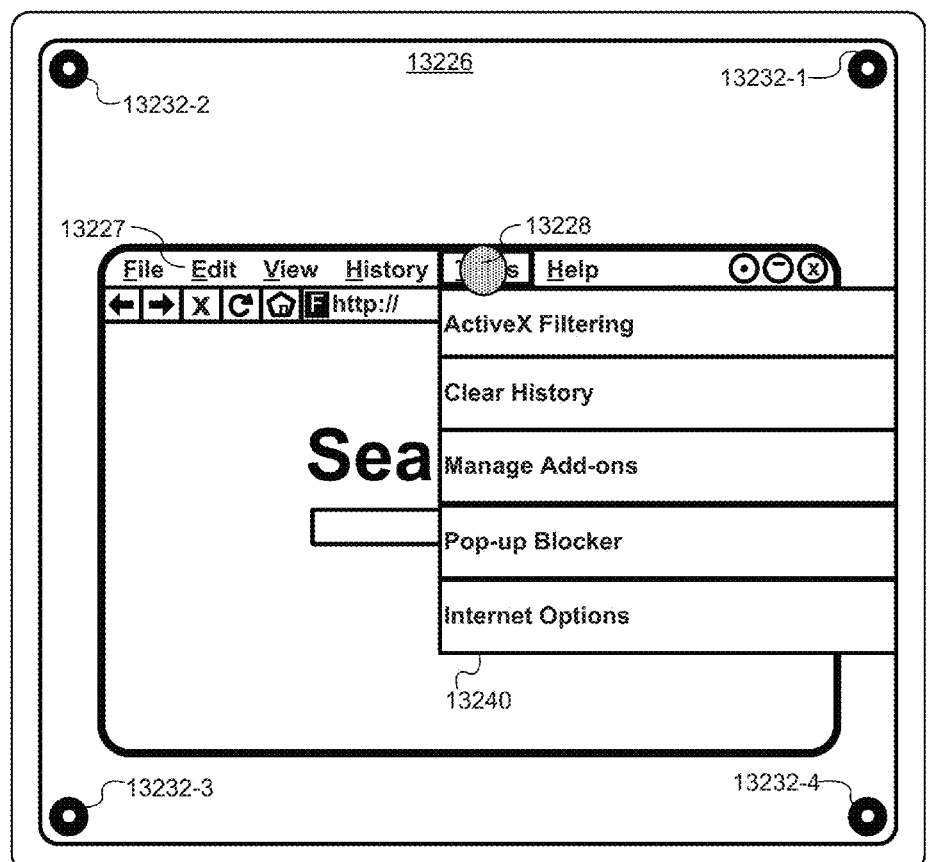
Figure 8T:
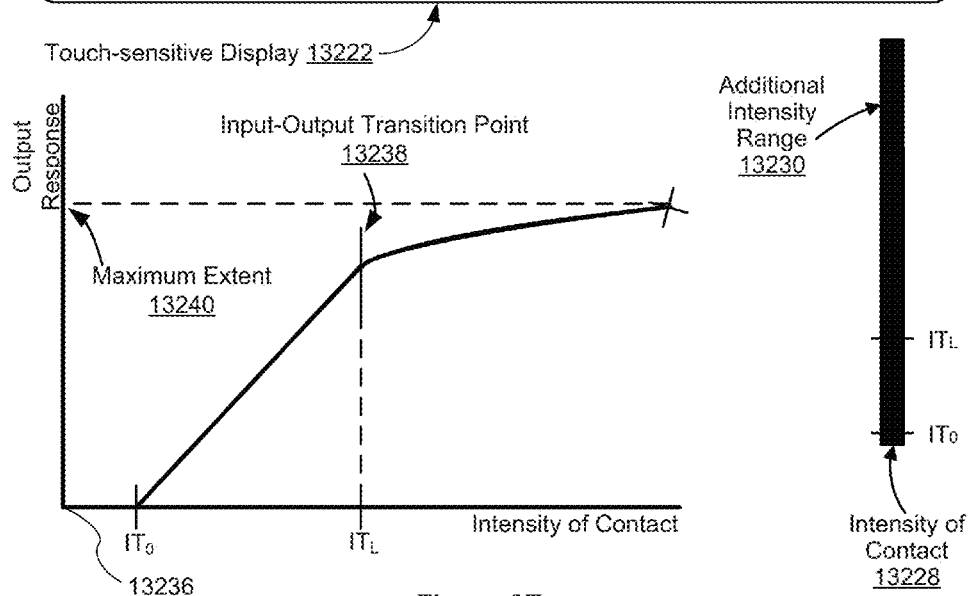
Figure 8U:
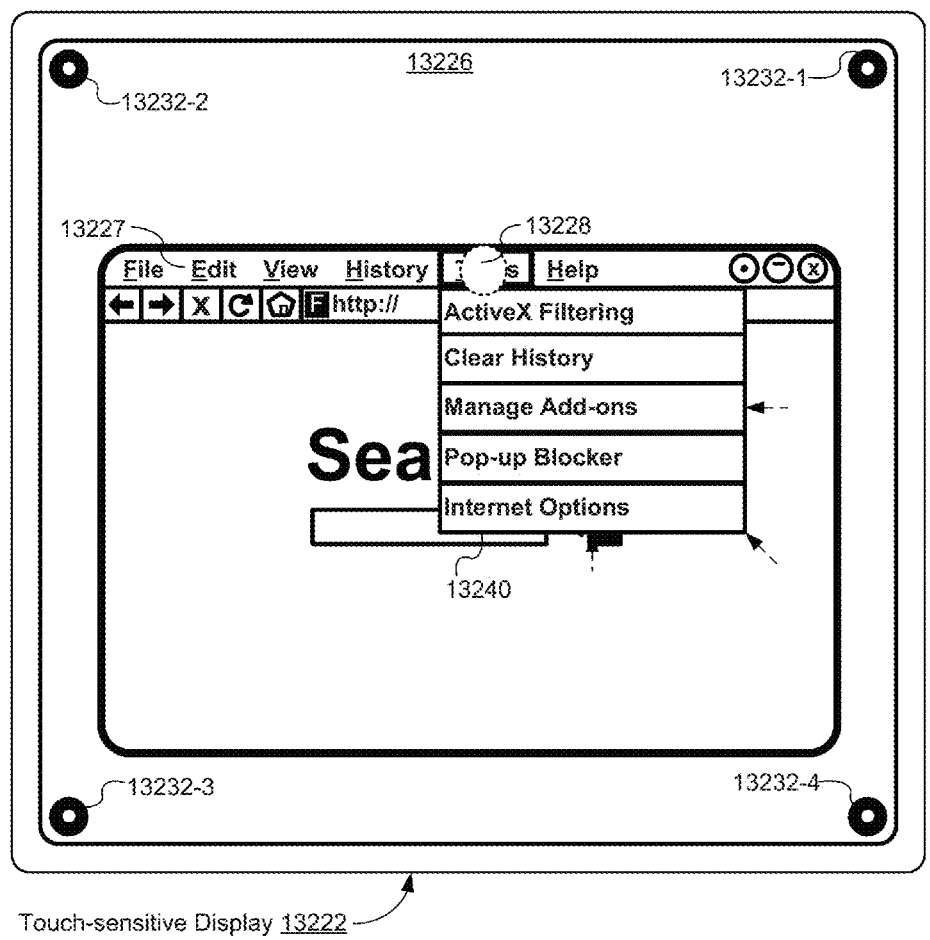
Figure 8V:
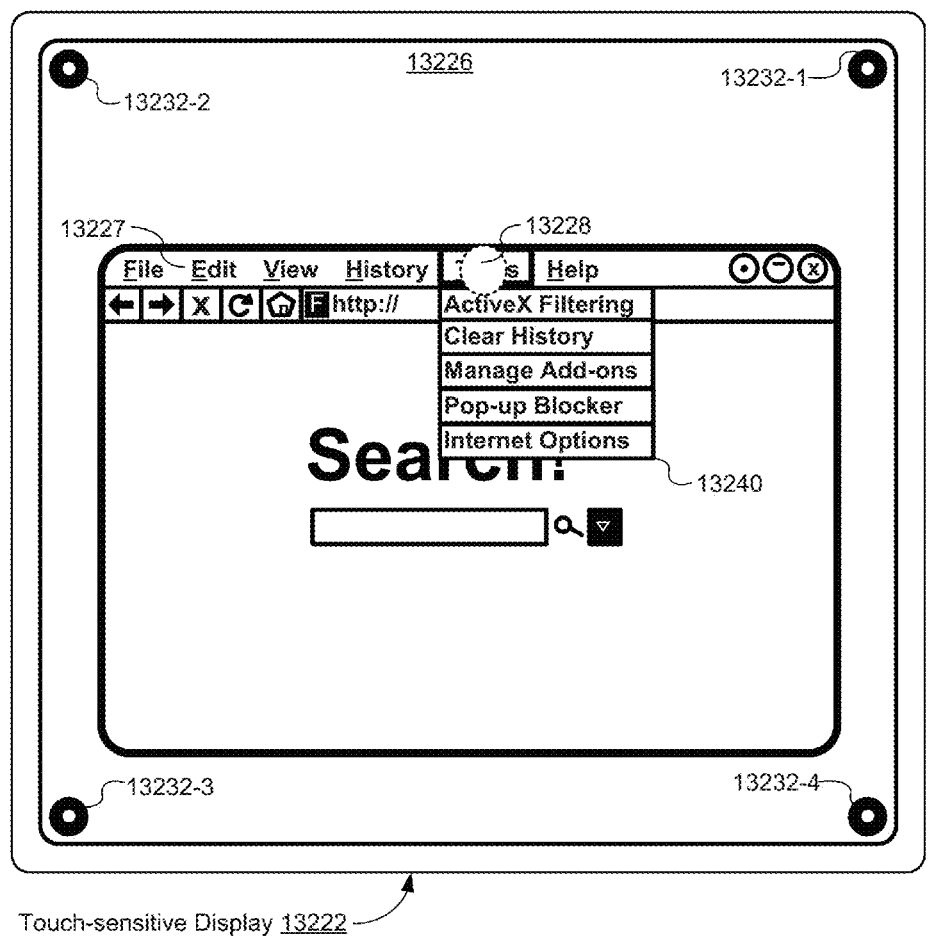
Figure 9A:
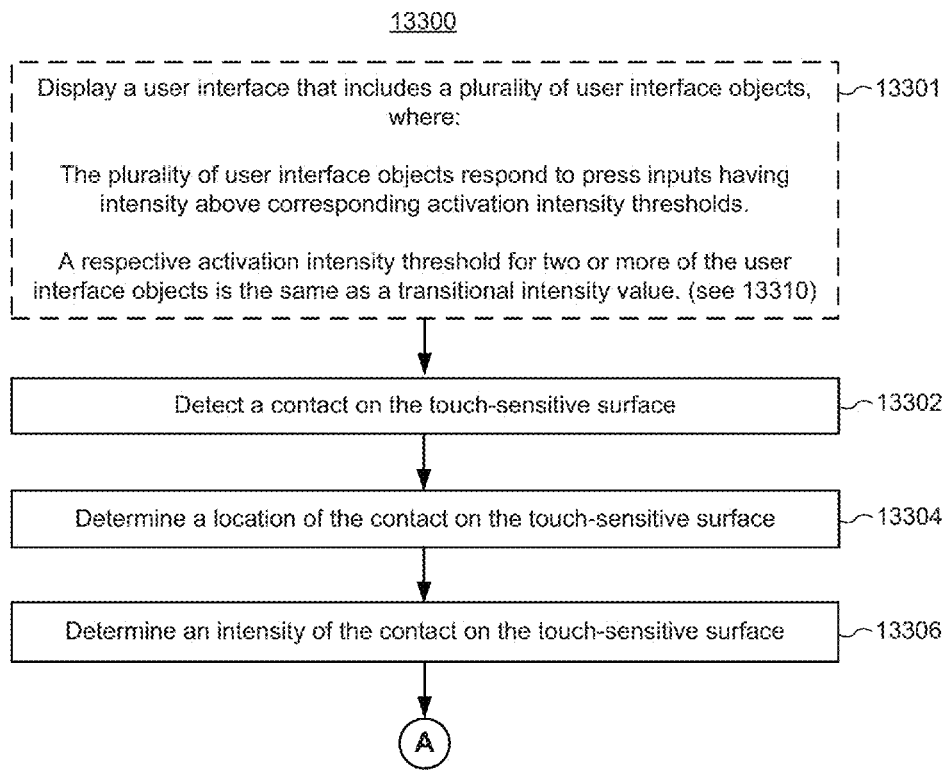
Figure 9B:
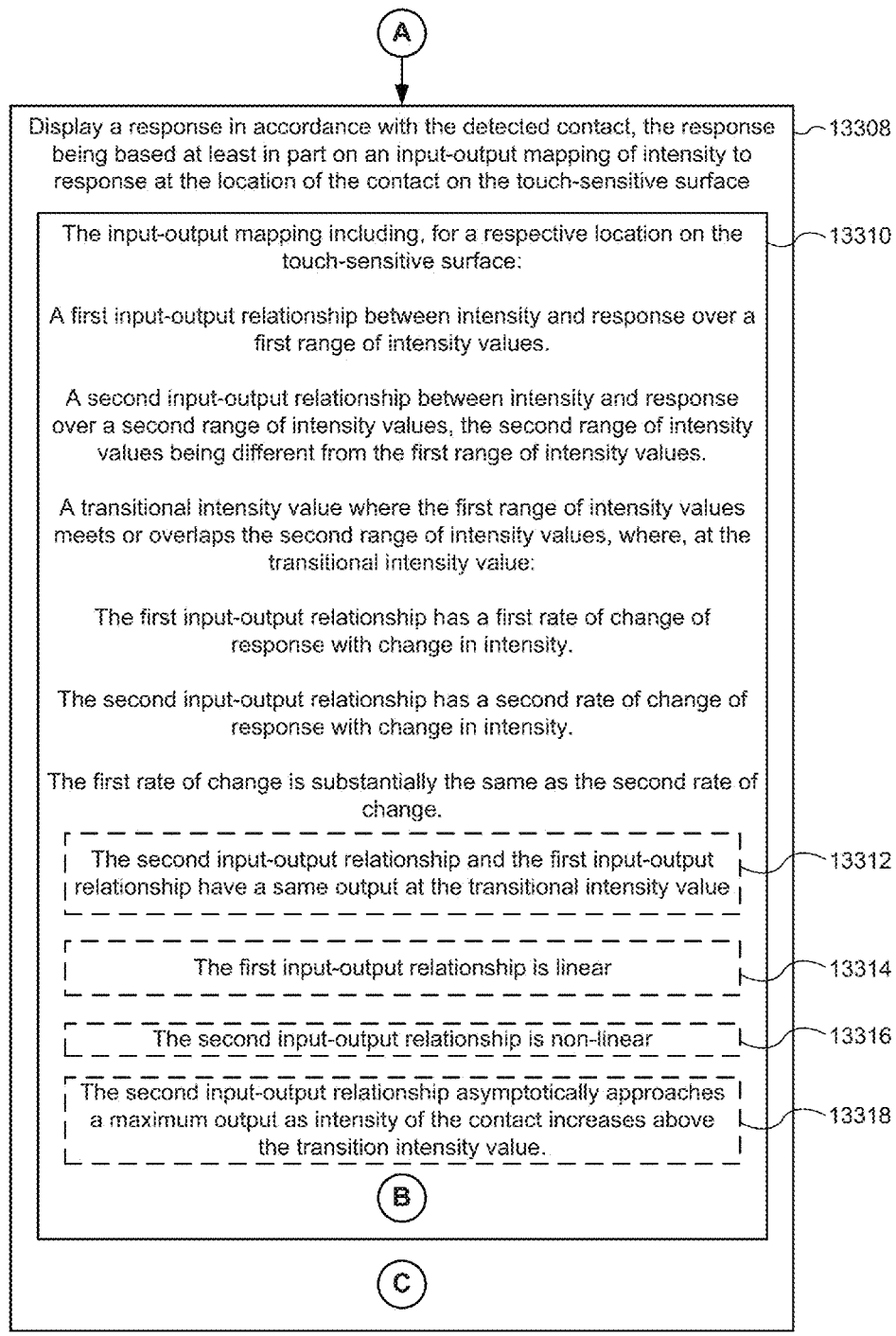

FIGS. 8N-8V illustrate another example of adjusting the progress of an animation in accordance with intensity of a contact. FIGS. 8N-8O show contact 13228 detected over the "Tools" option on menu bar 13227 and intensity of contact 13228 as well as additional intensity range 13230 corresponding to the relative location of contact 13228 on touch-sensitive display 13222 and intensity sensors 13232. FIGS. 8N-8O further show graph 13236 displaying output response (e.g., animation progress) in accordance with change in intensity of contact 13228. In FIGS. 8N-8O, the animation of "Tools" sub-menu 13240 progresses as intensity of contact 13228 increases from just above $IT_0$ (in FIG. 8N) to just below $IT_L$ (in FIG. 8O) in accordance with a first touch input to display output response. FIG. 8P shows intensity of contact 13228 reaching $IT_L$ and animation progress reaching touch input to display output transition point 13238. FIG. 8P also shows the entirety of "Tools" sub-menu 13240. FIGS. 8Q-8T illustrate the animation of "Tools" sub-menu 13240 progressing as intensity of contact 13228 increases above $IT_L$ in accordance with a second touch input to display output response. FIGS. 8U-8V illustrate lift-off of contact 13228 and an animation that returns (e.g., bounces back) the graphical representation of "Tools" sub-menu 13240 to the state shown in FIG. 8P.

FIGS. 9A-9C are flow diagrams illustrating method 13300 of transitioning between input-output relationships (e.g., touch input to display output relationships) in accordance with some embodiments. Method 13300 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 13300 are, optionally, combined and/or the order of some operations is, optionally, changed.

As described below, method 13300 provides an intuitive way to transition between input-output relationships. The method reduces the cognitive burden on a user when navigating user interface hierarchies, thereby creating a more efficient human-machine interface. For battery-operated electronic devices, enabling a user to transition between touch input to display output relationships faster and more efficiently conserves power and increases the time between battery charges.

In some embodiments, the device displays (13301) a user interface that includes a plurality of user interface objects, where the plurality of user interface objects respond to press inputs having intensity above corresponding activation intensity thresholds (e.g., activation intensity thresholds that correspond to respective ones of the user interface objects) and a respective activation intensity threshold for two or more of the user interface objects is the same as a transitional intensity value. For example, one or more buttons, links, menus, or other selectable user interface elements are selected by the device in response to detecting a contact with intensity above a transitional intensity value while a corresponding focus selector is over the user interface element. In these embodiments, for example, in FIG. 8N one or more of the menu options in menu bar 13227 have the same $IT_L$ and input-output transition point 13238 as the "Tools" option.

The device detects (13302) a contact (e.g., a finger contact) on the touch-sensitive surface. For example, in FIG. 8A the device detects contact 13202 on touch-sensitive surface 451.

The device determines (13304) a location of the contact on the touch-sensitive surface (e.g., a current (x,y) position of a representative point in the contact, such as the centroid of the contact). For example, the device in FIG. 8A determines the position of contact 13202 on touch-sensitive surface 451.

The device determines (13306) an intensity of the contact on the touch-sensitive surface. In some embodiments, determining the intensity of the contact on the touch-sensitive surface includes generating a plurality of measurements of the intensity of the contact over time so as to detect changes in the intensity of the contact over time. For example, the device in FIG. 8A determines intensity of contact 13202 on touch-sensitive surface 451.

The device displays (13308) a response in accordance with the detected contact (e.g., displaying a response in accordance with an intensity of the contact and/or a change in intensity of the contact), the response being based at least in part on an input-output mapping of intensity to response at the location of the contact on the touch-sensitive surface. For example, in FIGS. 8B-8K the device displays an animation progression in accordance with intensity of contact 13202.

The input-output mapping includes (13310), for a respective location on the touch-sensitive surface: a first input-output relationship between intensity and response over a first range of intensity values, a second input-output relationship between intensity and response over a second range of intensity values, the second range of intensity values being different from the first range of intensity values, and a transitional intensity value where the first range of intensity values meets or overlaps the second range of intensity values, where, at the transitional intensity value: the first input-output relationship has a first rate of change of response with change in intensity, the second input-output relationship has a second rate of change of response with change in intensity, and the first rate of change is substantially the same as the second rate of change. In some embodiments, the first rate of change is substantially the same as the second rate of change when the first rate of change is within a margin of 10% or 20% of the second rate of change. In some embodiments, the first rate of change is the same as the second rate of change. For example, in FIGS. 8N-8T the device displays an animation progressing in accordance with intensity of contact 13228. In this example, FIGS. 8N-8O illustrate the animation progressing in accordance with a first input-output relationship as intensity of contact 13228 increases from slightly above $IT_0$ to slightly below $IT_L$, FIG. 8P illustrates a smooth transition in the animation at transitional intensity value $IT_L$, and FIGS. 8Q-8T illustrate the animation progressing in accordance with a second input-output relationship as intensity of contact 13228 increases above $IT_L$.

In some embodiments, the second input-output relationship and the first input-output relationship have (13312) a same output at the transitional intensity value (e.g., there is a continuous transition between the first input-output relationship and the second input-output relationship). For example, FIGS. 8O-8Q illustrate a continuous transition in animation progression at input-output transition point 13238 corresponding to transitional intensity value $IT_L$.

In some embodiments, the first input-output relationship is (13314) linear. For example, in FIG. 8L first input-output response 13216, corresponding to first range of intensity values 13212, is linear.

In some embodiments, the second input-output relationship is (13316) non-linear (e.g., the second input-output relationship is a cubic spline curve). For example, in FIG. 8L second input-output response 13218, corresponding to second range of intensity values 13214, is non-linear.

In some embodiments, the second input-output relationship asymptotically approaches (13318) a maximum output as intensity of the contact increases above the transition intensity value. For example, an animation has a maximum extent and the maximum extent of the animation is approached asymptotically as the intensity of the contact increases toward a respective maximum intensity at the location of the contact on the touch-sensitive surface. In FIGS. 8Q-8T, for example, the animation asymptotically approaches maximum extent 13240 as intensity of contact 13228 increases toward the respective maximum intensity corresponding to the location of contact 13228 on touch-sensitive display 13222.

In some embodiments, a first property of the device (e.g., a dynamic range of the device for detecting intensity of a contact on the touch-sensitive surface) varies (13320) at different locations on the touch-sensitive surface. In some implementations, the first input-output relationship is the same at a first location and a second location on the touch-sensitive surface and the second input-output relationship is different at the first location than at the second location on the touch-sensitive surface. For example, the second input-output relationship is selected or defined by the device in response to current conditions of the device, so as to provide a smooth transition from the fixed first input-output relationship to the dynamic second input-output relationship while also taking into account limitations on detecting intensity at the location of the contact, such as the dynamic range of intensity detection at the location of the contact. In these embodiments, for example, the first input-output relationship in FIGS. 8N-8P is the same for different locations of contact 13228 on touch-sensitive display 13222 and the second input-output relationship in FIGS. 8Q-8T is different for different locations of contact 13228 on touch-sensitive display 13222.

In some embodiments, the response includes (13322) changing a current value of a property from a first value to a second value in a predefined range of values. For example, changing the files animation progress from a first value in FIG. 8B to a second value in FIG. 8C.

In some embodiments, the response includes (13324) adjusting one or more of: volume, brightness, user interface object spacing, user interface object size, user interface object opacity, content scrubbing, and animation progress. For example, successive adjustments to a files animation progress is illustrated in FIGS. 8B-8K.

It should be understood that the particular order in which the operations in FIGS. 9A-9C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 13300 described above with respect to FIGS. 9A-9C. For example, the contacts, contact locations, contact intensities, user interfaces, input-output mappings, input-output relationships, and responses described above with reference to method 13300 optionally have one or more of the characteristics of the contacts, contact locations, contact intensities, user interfaces, input-output mappings, input-output relationships, and responses described herein with reference to other methods described herein (e.g., those listed in the fifth paragraph of the Description of Embodiments). For brevity, these details are not repeated here.

Figure 10:
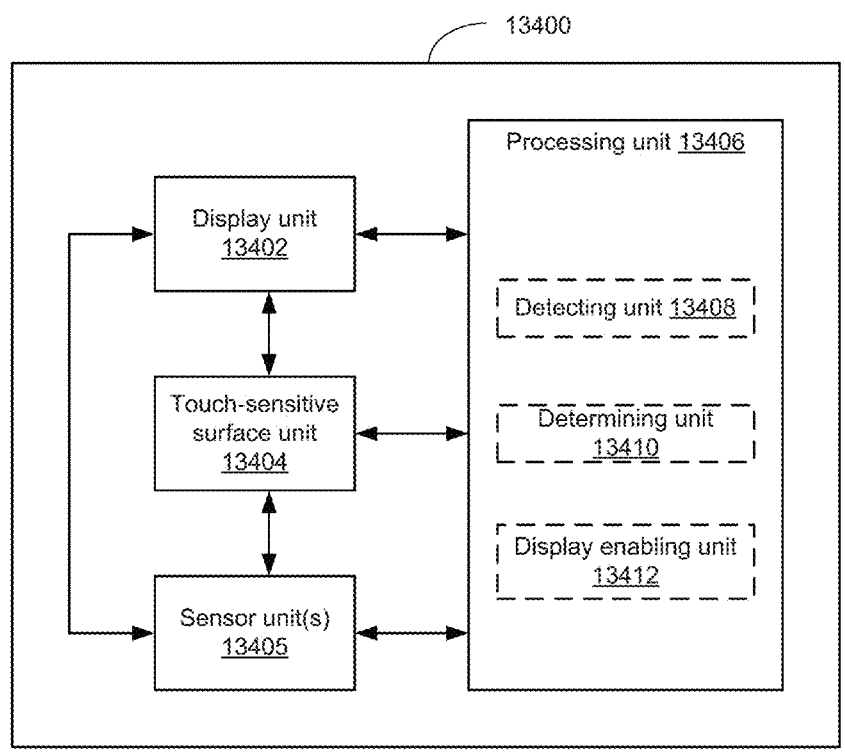
FIG. 10 is a functional block diagram of an electronic device in accordance with some embodiments.

In accordance with some embodiments, FIG. 10 shows a functional block diagram of an electronic device 13400 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein. As shown in FIG. 10, electronic device 13400 includes display unit 13402 configured to display a response in accordance with a detected contact, touch-sensitive surface unit 13404 configured to receive user contacts, one or more sensor units 13405 configured to detect intensity of contacts with the touch-sensitive surface unit, and processing unit 13406 coupled to display unit 13402, touch-sensitive surface unit 13404, and sensor units 13405. In some embodiments, processing unit 13406 includes detecting unit 13408, determining unit 13410, and display enabling unit 13412.

Processing unit 13406 is configured to detect (e.g., with detecting unit 13408) a contact on the touch-sensitive surface unit, determine (e.g., with determining unit 13410) a location of the contact on the touch-sensitive surface unit, determine (e.g., with determining unit 13410) an intensity of the contact on the touch-sensitive surface unit, and enable display of (e.g., with display enabling unit 13412) a response in accordance with the detected contact, the response being based at least in part on an input-output mapping of intensity to response at the location of the contact on the touch-sensitive surface unit. The input-output mapping includes, for a respective location on the touch-sensitive surface unit, a first input-output relationship between intensity and response over a first range of intensity values, a second input-output relationship between intensity and response over a second range of intensity values, the second range of intensity values being different from the first range of intensity values, and a transitional intensity value where the first range of intensity values meets or overlaps the second range of intensity values. At the transitional intensity value, the first input-output relationship has a first rate of change of response with change in intensity, the second input-output relationship has a second rate of change of response with change in intensity, and the first rate of change is substantially the same as the second rate of change.

In some embodiments, the second input-output relationship and the first input-output relationship have a same output at the transitional intensity value.

In some embodiments, the first input-output relationship is linear.

In some embodiments, the second input-output relationship is non-linear.

In some embodiments, the second input-output relationship asymptotically approaches a maximum output as intensity of the contact increases above the transition intensity value.

In some embodiments, processing unit 13406 is further configured to enable display of (e.g., with display enabling unit 13412) a user interface that includes a plurality of user interface objects, where the plurality of user interface objects respond to press inputs having an intensity above corresponding activation intensity thresholds, and a respective activation intensity threshold for two or more of the user interface objects is the same as the transitional intensity value.

In some embodiments, a first property of the device varies at different locations on touch-sensitive surface unit 13404, the first input-output relationship is the same at a first location and a second location on touch-sensitive surface unit 13404, and the second input-output relationship is different at the first location than at the second location on touch-sensitive surface unit 13404.

In some embodiments, the response includes changing a current value of a property from a first value to a second value in a predefined range of values.

In some embodiments, the response includes adjusting one or more of: volume, brightness, user interface object spacing, user interface object size, user interface object opacity, content scrubbing, and animation progress.

The operations in the information processing methods described above are, optionally implemented by running one or more functional modules in information processing apparatus such as general purpose processors (e.g., as described above with respect to FIGS. 1A and 3) or application specific chips. The operations described above with reference to FIGS. 9A-9C is optionally implemented by components depicted in FIGS. 1A-1B or FIG. 10. For example, detection operation 13302, determining operations 13304 and 13306, and displaying operation 13308 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Adjusting Outputs with Changes in Contact Intensity and Varying Dynamic Range of Intensity Detection Many electronic devices have touch-sensitive surfaces. The touch-sensitive surfaces optionally utilizes multiple intensity sensors and have a maximum intensity detection threshold that varies with location on the touch-sensitive surface. This variation in maximum intensity detection threshold can be addressed by using a uniform maximum intensity detection threshold for the whole touch-sensitive surface that is a lowest common denominator maximum intensity detection threshold. However, this approach keeps the device from being used to its full potential and thus provides a less efficient and effective user interface. The embodiments described below improve on these methods by dynamically adjusting input-output relationships to take advantage of maximum intensity detection thresholds that are higher than the maximum intensity thresholds on the least sensitive portions of the touch-sensitive surface. For example, in some circumstances, a touch-sensitive surface with multiple intensity sensors has, at a first location, a maximum intensity corresponding to 500 g of force, and, at a second location, a maximum intensity corresponding to 2000 g of force. In this example, it is desirable to utilize the additional intensity range at the second location. The embodiments described below provide an efficient and intuitive way of adjusting outputs with changes in contact intensity and varying dynamic range of intensity detection, thereby enabling the device to control convenient and efficient user interfaces.

FIGS. 11B-11U illustrate exemplary user interfaces for adjusting outputs with changes in contact intensity and varying dynamic range of intensity detection in accordance with some embodiments. The user interfaces in these figures are used to illustrate the processes described below, including the processes described below with reference to FIGS. 12A-12D. FIGS. 11B-11J and 11M-11U include intensity diagrams that show the current intensity of the contact on the touch-sensitive surface relative to a plurality of intensity thresholds including a respective threshold (e.g., "$IT_D$"). In some embodiments, operations similar to those described below with reference to $IT_D$ are performed with reference to a different intensity threshold (e.g., "$IT_L$").

Figure 11A:
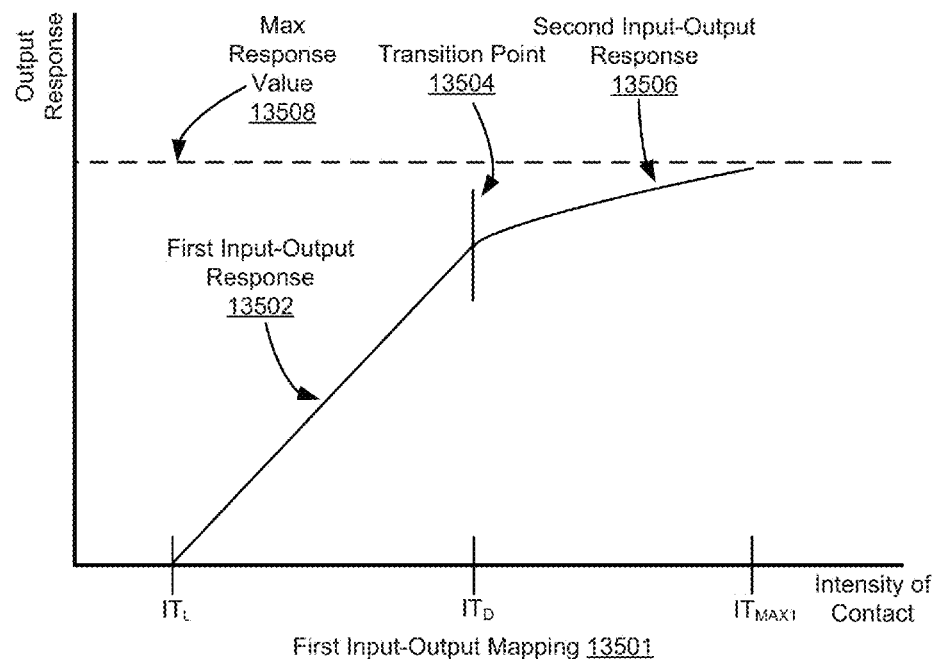
FIG. 11A illustrates mappings between ranges of intensity values and output responses, for one or more contacts on a touch-sensitive surface, in accordance with some embodiments.
Figure 11A:
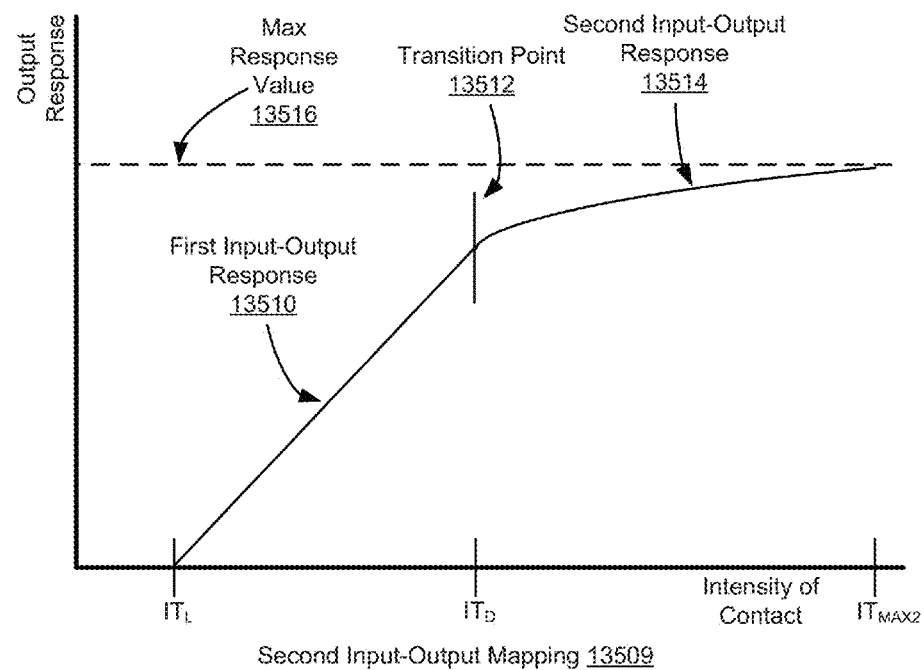
Figure 11B:
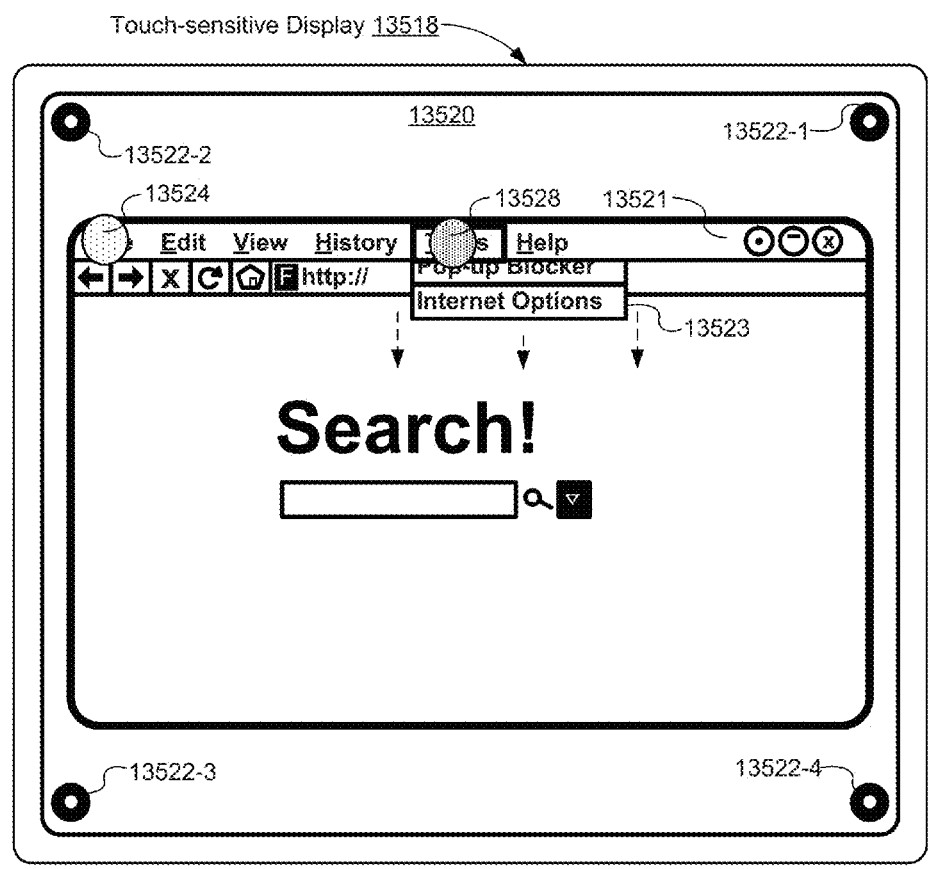
FIGS. 11B-11U illustrate exemplary user interfaces for adjusting outputs with changes in contact intensity and varying dynamic range of intensity detection in accordance with some embodiments.
Figure 11B:
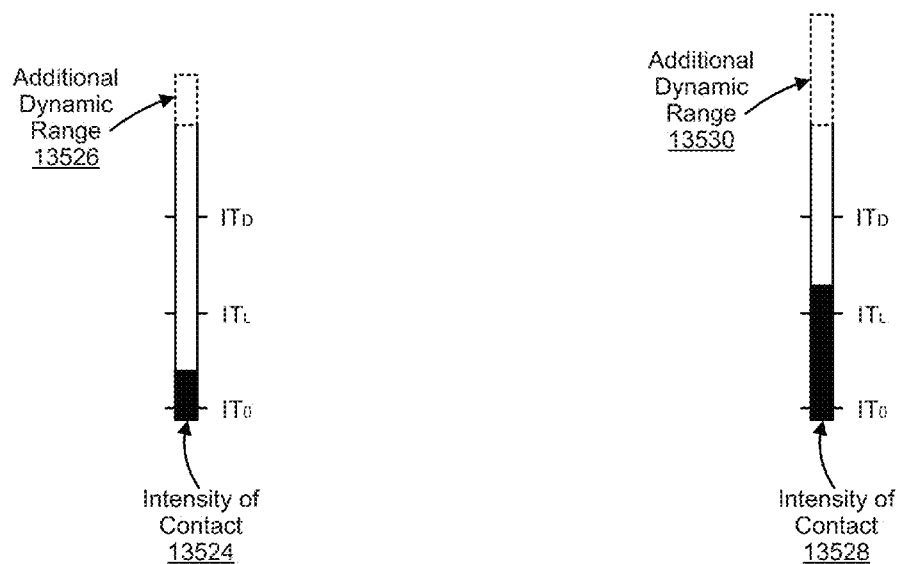

FIG. 11A illustrates an example of adjusting outputs in response to change in inputs (e.g., change in intensity of a finger contact). FIG. 11A shows first input-output mapping 13501 including: first input-output response 13502 (e.g., a linear response) corresponding to a range of intensity values between $IT_L$ and $IT_D$, input-output response transition point 13504 corresponding to intensity $IT_D$, a smooth transition to second input-output response 13506 (e.g., a cubic spline response) corresponding to a range of intensity values between $IT_D$ and $IT_{MAX1}$, and the output approaching max output 13508 as the input approaches $IT_{MAX1}$. FIG. 11A further shows second input-output mapping 13509 including: first input-output response 13510 corresponding to a range of intensity values between $IT_L$ and $IT_D$, input-output response transition point 13512 corresponding to intensity $IT_D$, a smooth transition to second input-output response 13514 corresponding to a range of intensity values between $IT_D$ and $IT_{MAX2}$, and the output approaching max output 13516 as the input approaches $IT_{MAX2}$.

FIG. 11B illustrates an example user interface 13520, including menu bar 13521 and Tools submenu 13523, displayed on touch-sensitive display 13518. FIG. 11B further illustrates intensity sensors 13522 to detect the intensity of contacts on touch-sensitive display 13518. FIG. 11B also shows contact 13524 and intensity of contact 13524 as well as additional dynamic range 13526 corresponding to the relative location of contact 13524 on touch-sensitive display 13518 and intensity sensors 13522. FIG. 11B further shows contact 13528 and intensity of contact 13528 as well as additional dynamic range 13530 corresponding to the relative location of contact 13528 on touch-sensitive display 13518 and intensity sensors 13522.

Figure 11C:
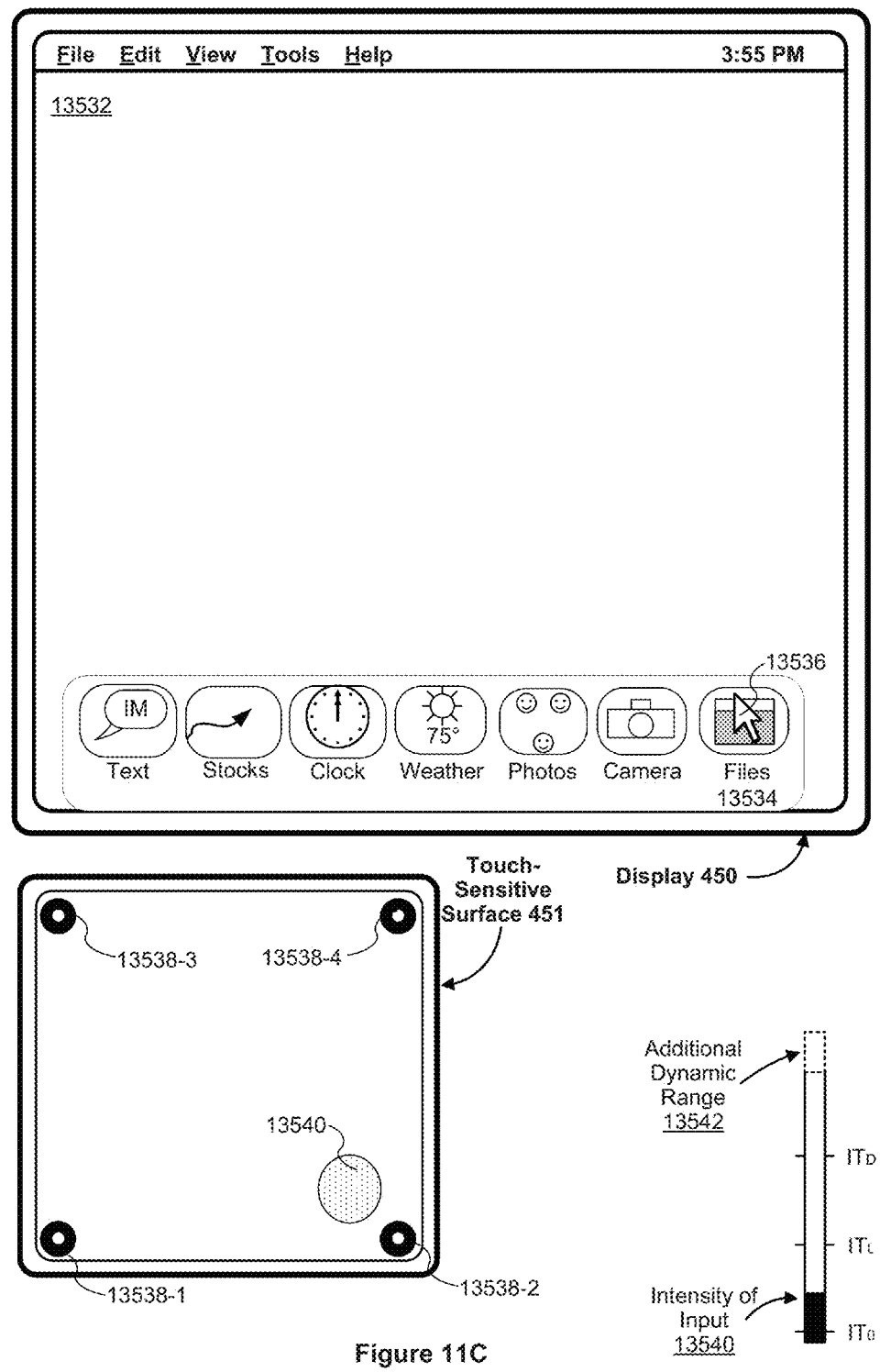
Figure 11D:
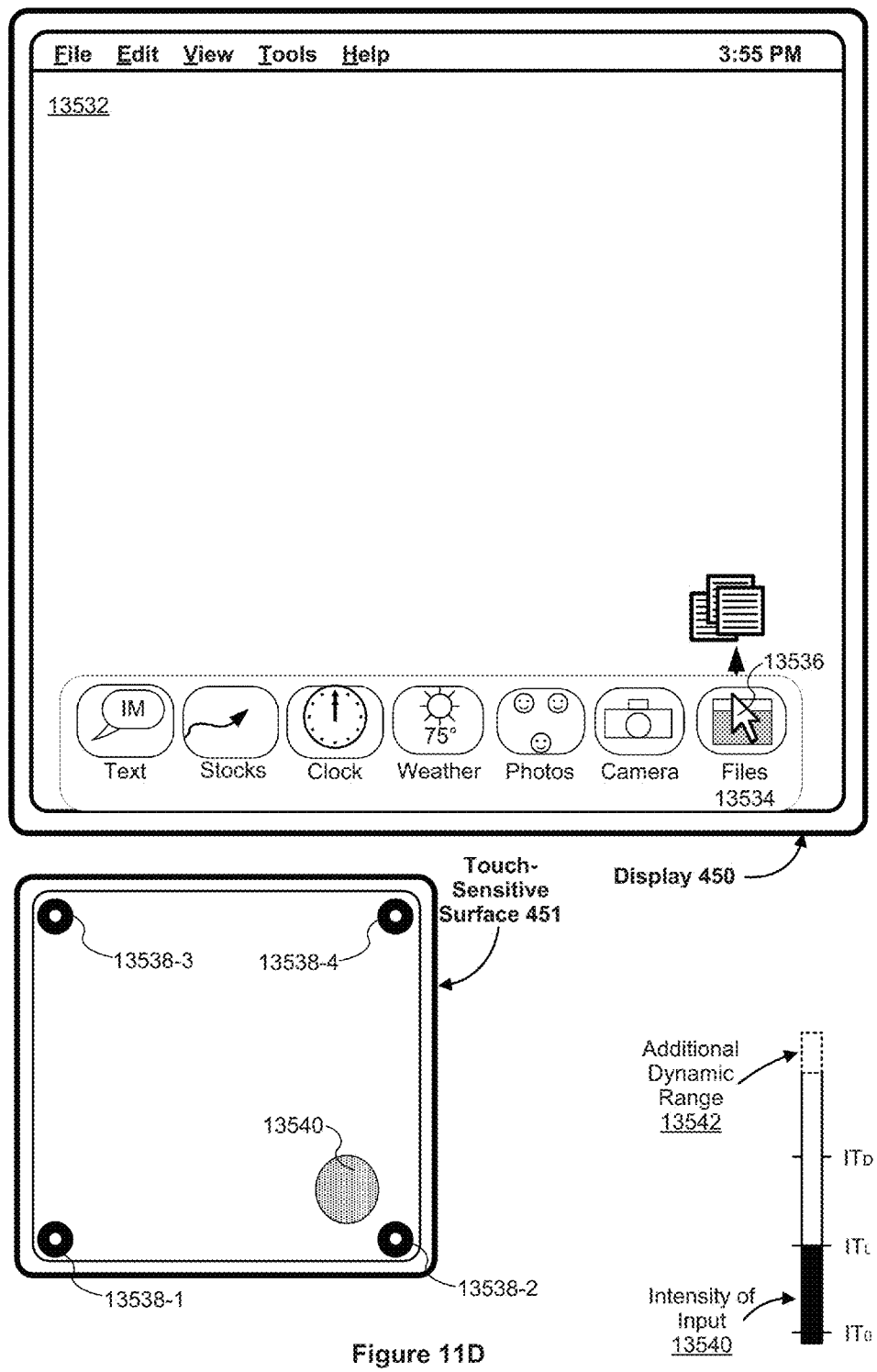
Figure 11E:
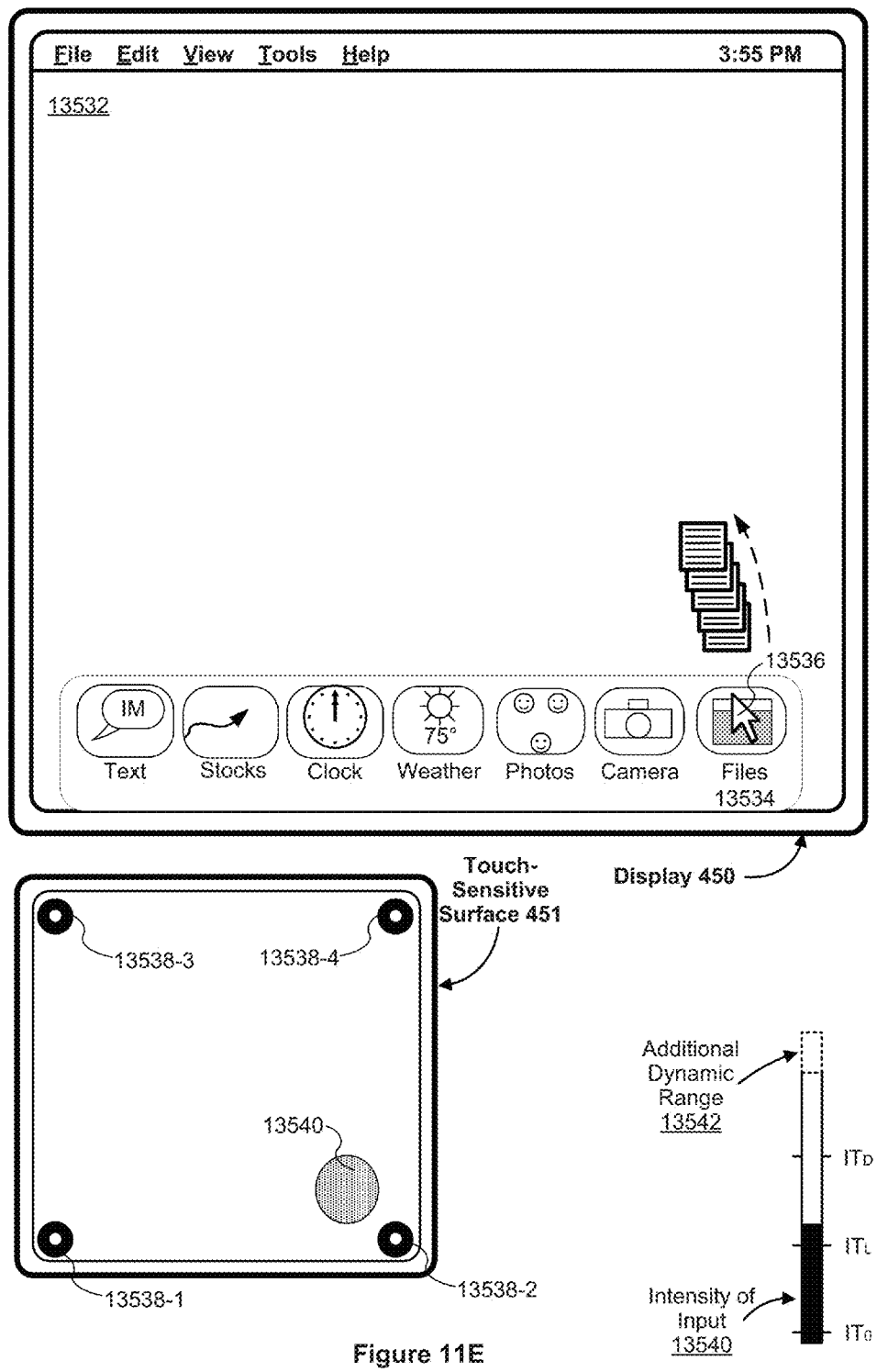
Figure 11F:
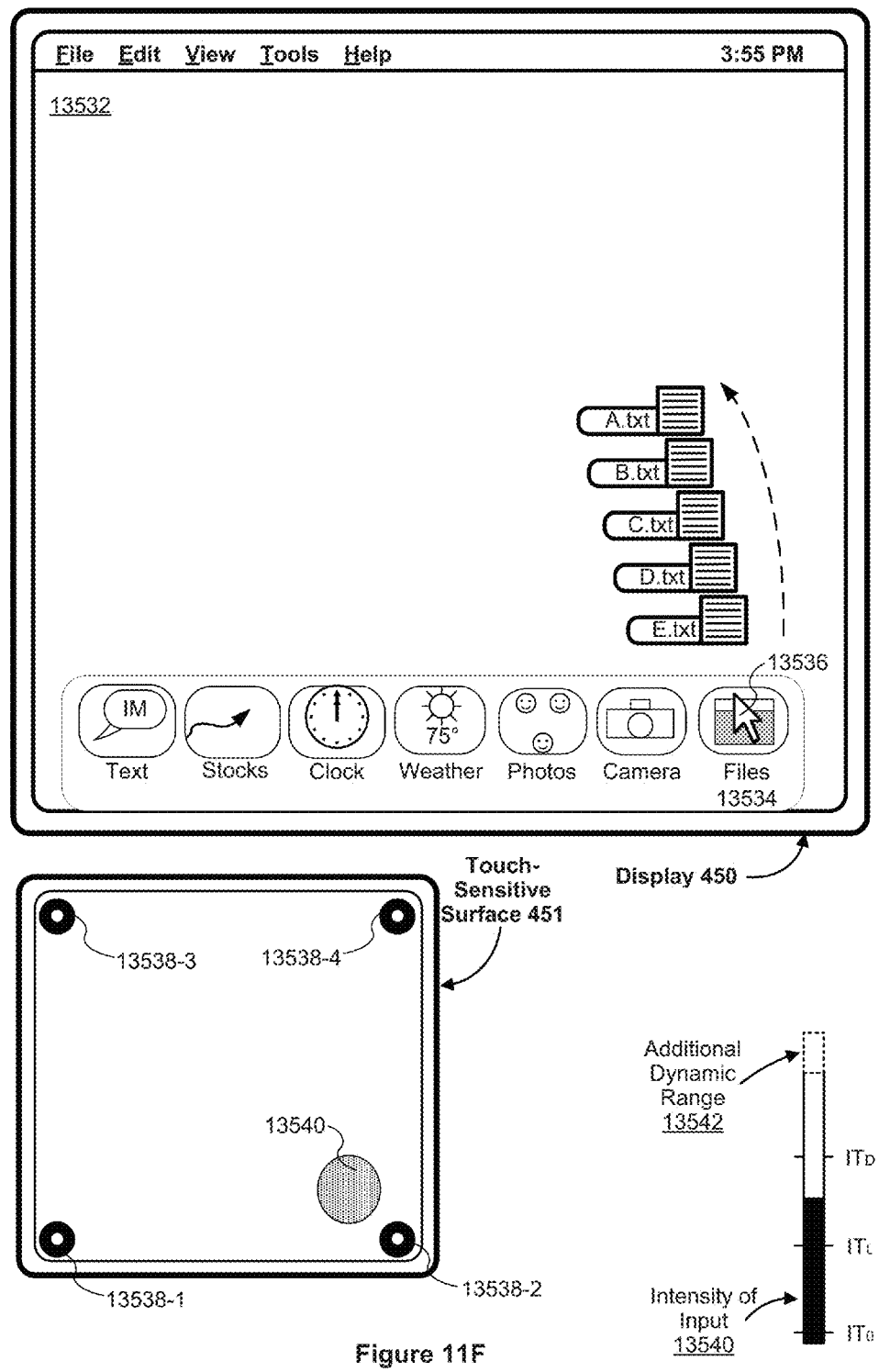
Figure 11G:
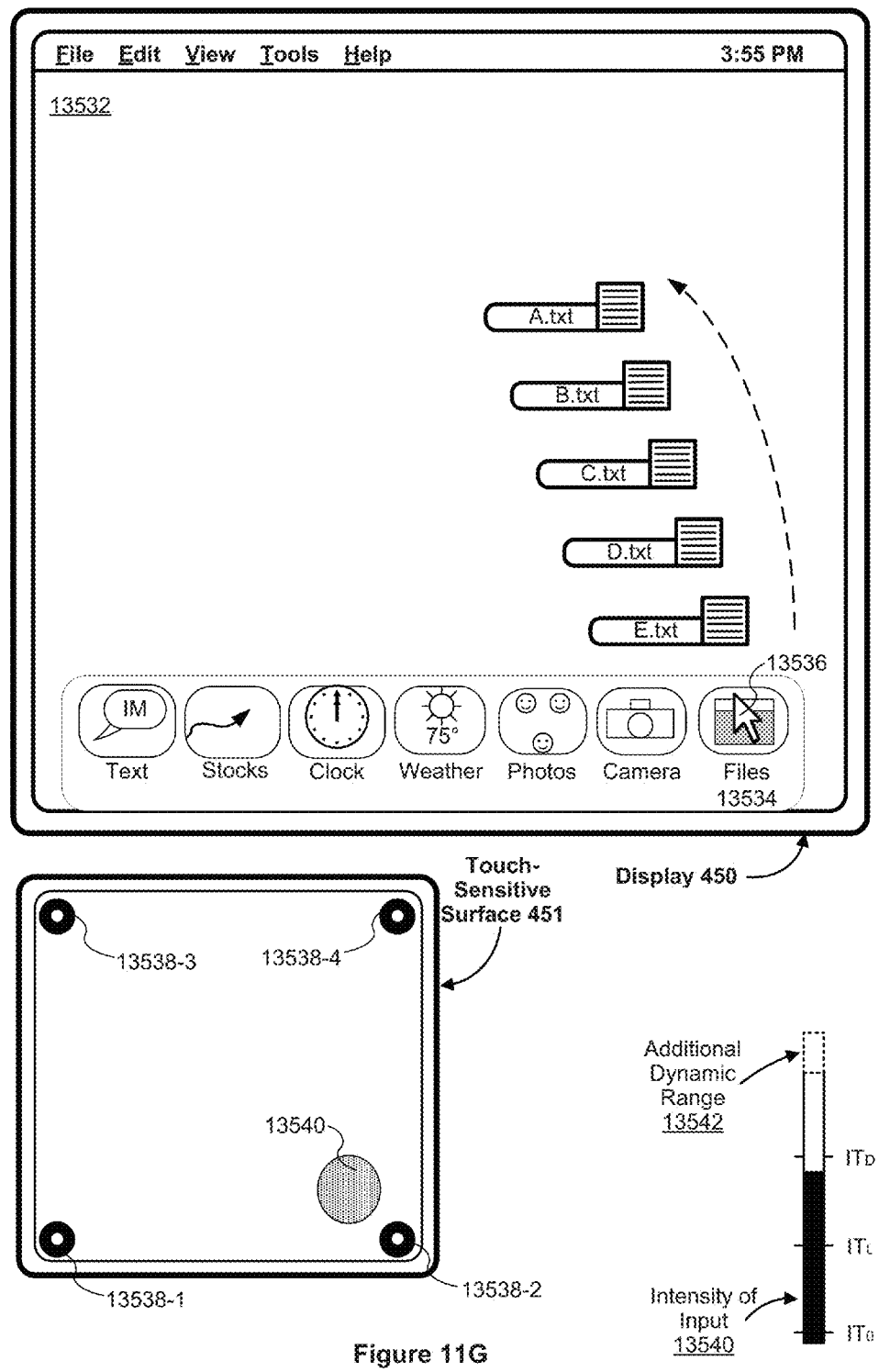
Figure 11H:
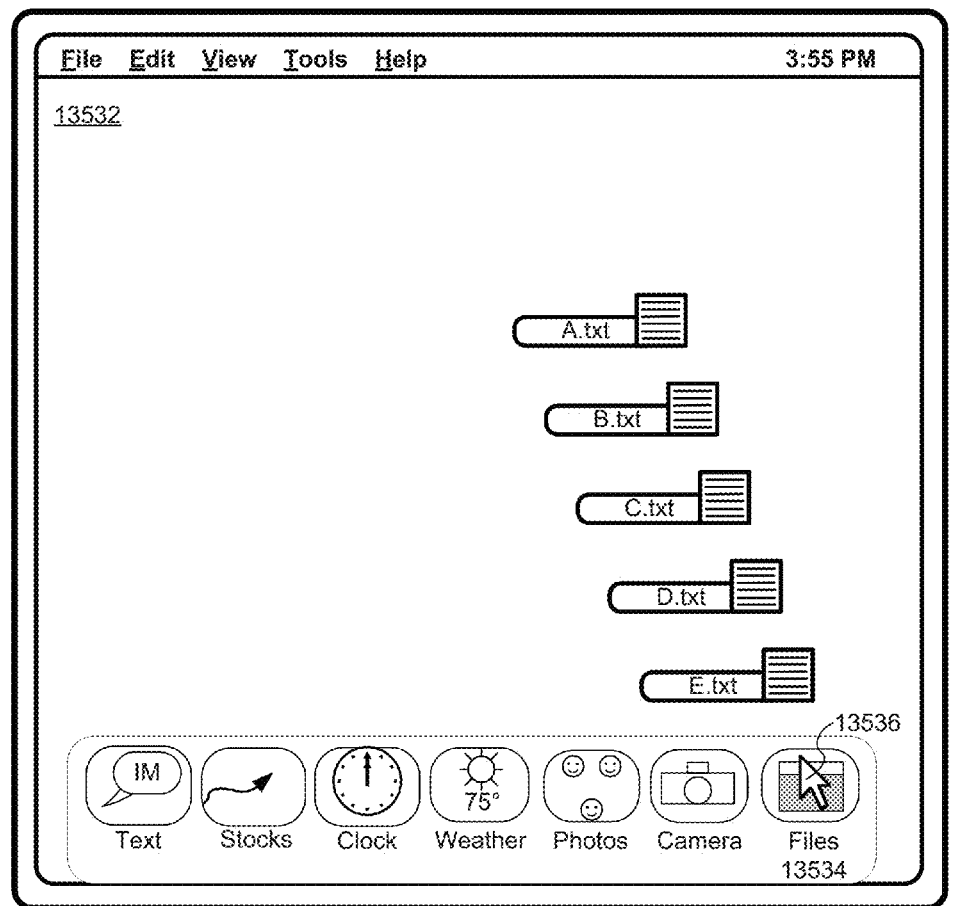
Figure 11H:
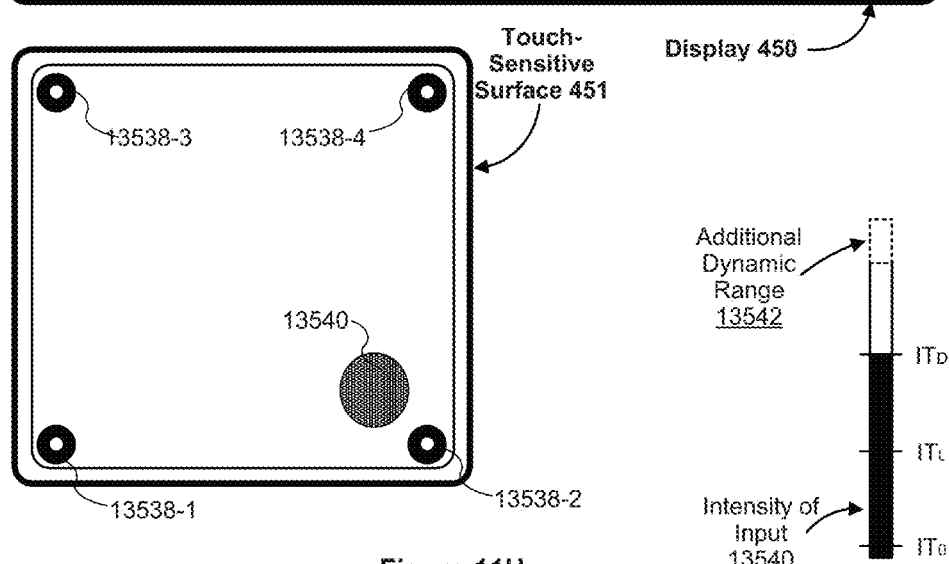
Figure 11I:
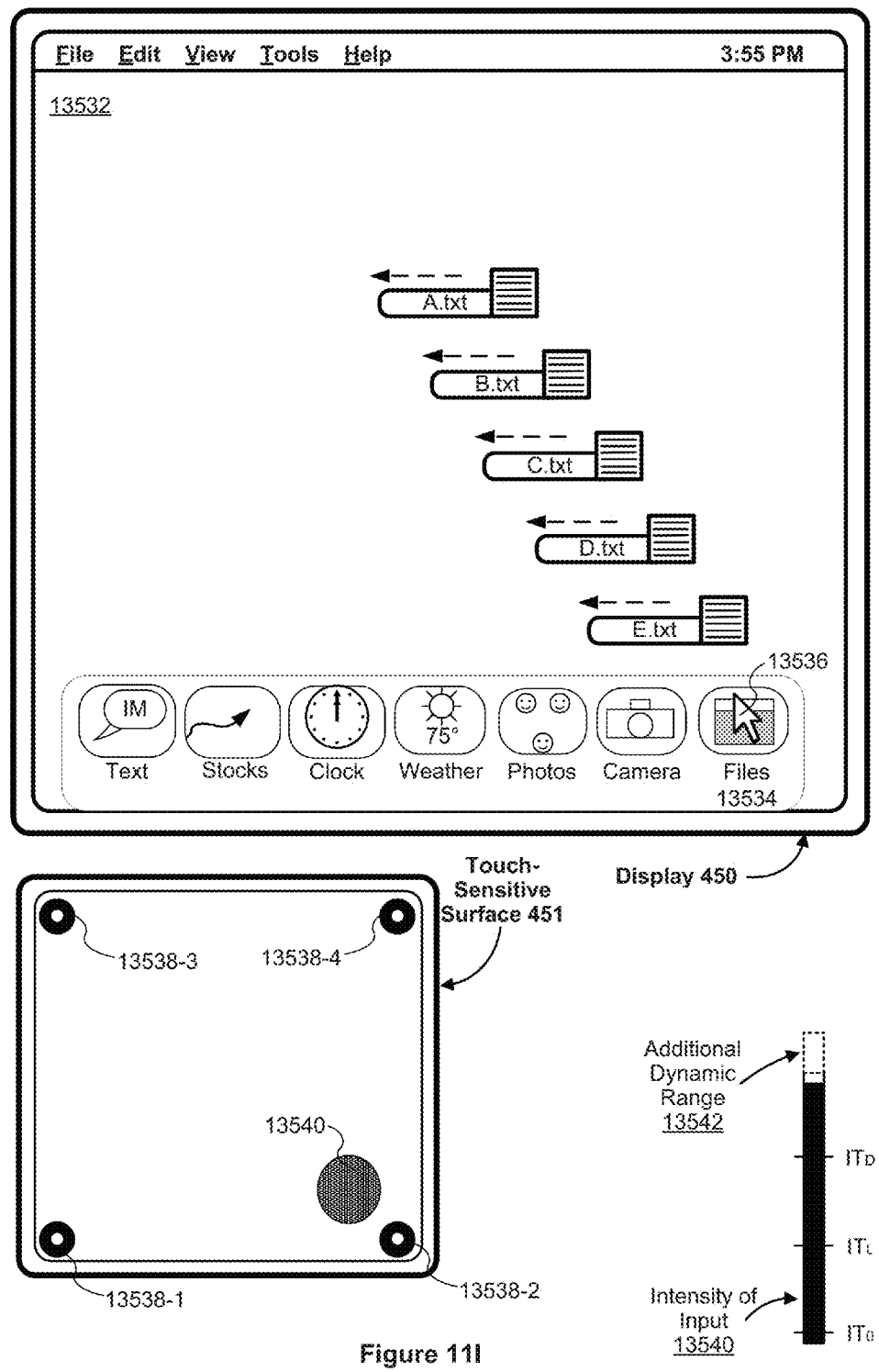
Figure 11J:
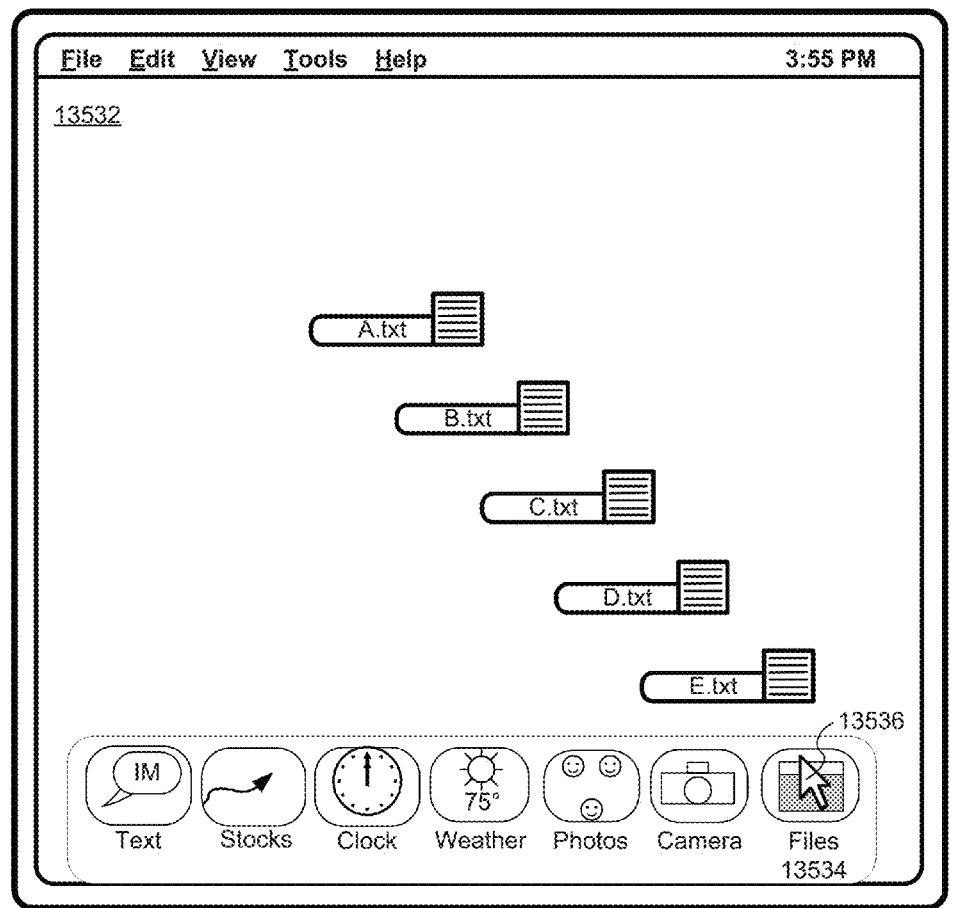
Figure 11J:
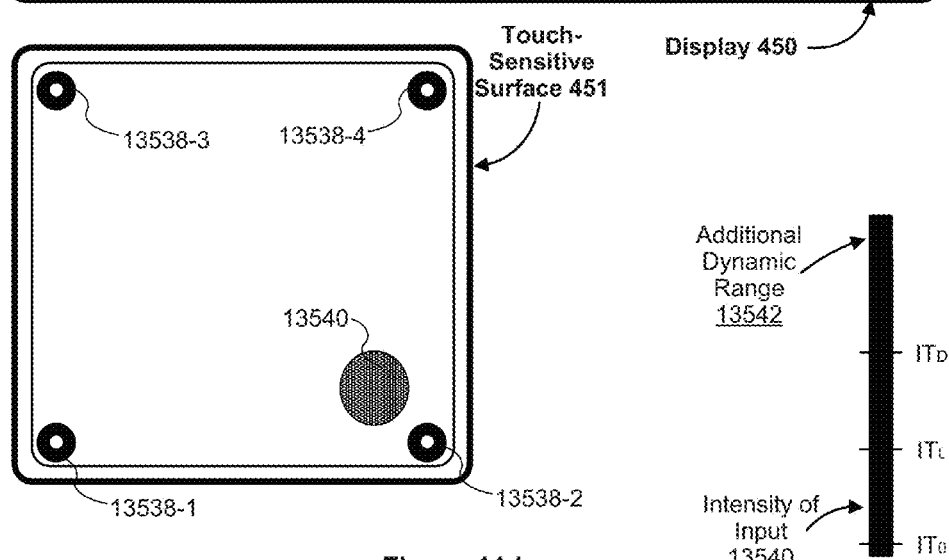
Figure 11K:
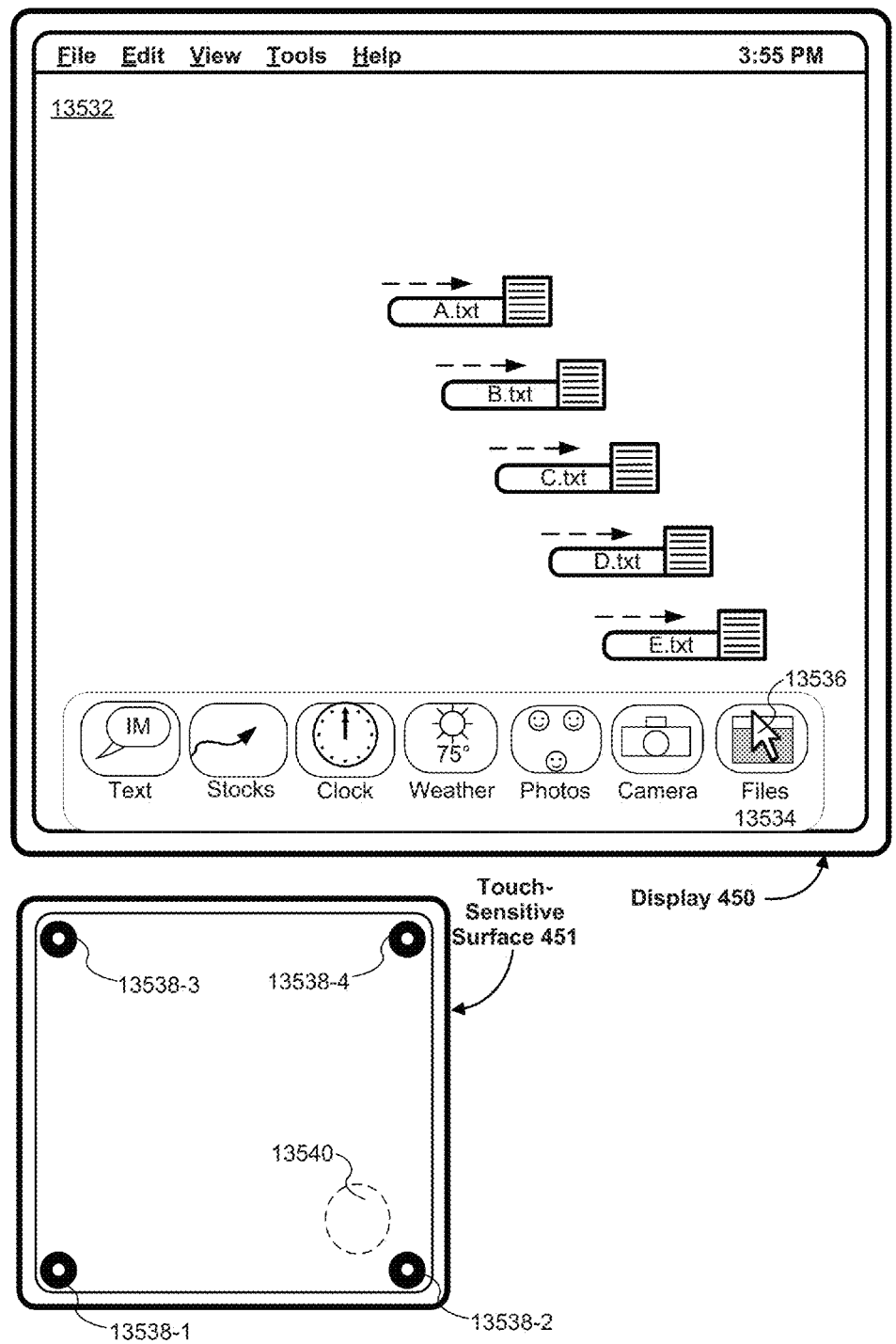
Figure 11L:
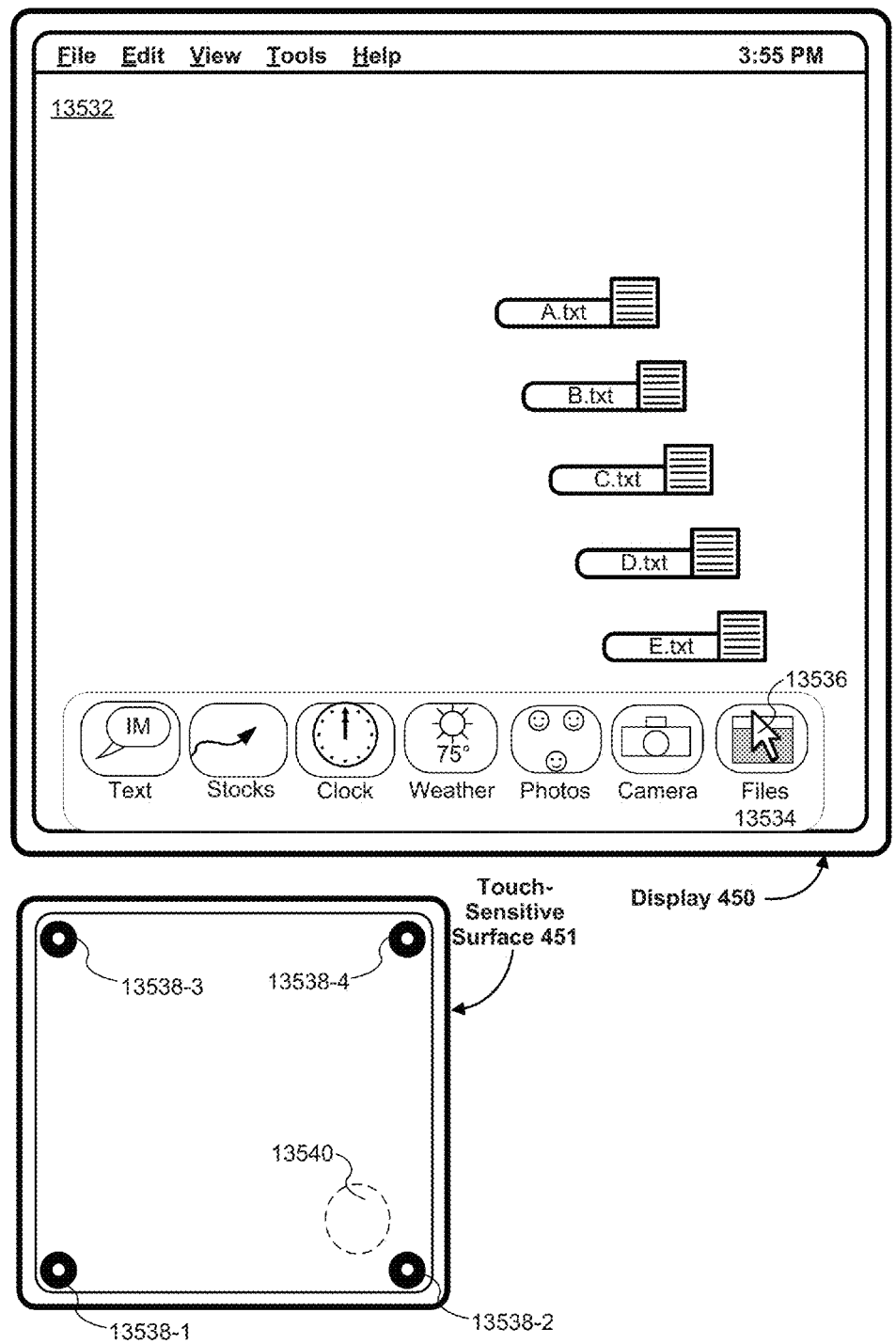

FIGS. 11C-11L illustrate an example of adjusting the progress of an animation in accordance with intensity of a contact. FIG. 11C illustrates user interface 13532, including files icon 13534, displayed on display 450 of a device (e.g., device 300). FIG. 11C further illustrates contact 13540 detected on touch-sensitive surface 451, intensity of contact 13540 below $IT_L$, intensity sensors 13538, and additional dynamic range 13542 corresponding to the relative location of contact 13540 on touch-sensitive surface 451 and intensity sensors 13538. In accordance with some embodiments, FIGS. 11C-11L illustrate a displayed representation of focus selector (e.g., cursor 13536) corresponding to input 13540 detected on touch-sensitive surface 451. FIGS. 11D-11G illustrate an animation displaying the files associated with files icon 13505 progressing in accordance with a first input-output relationship as intensity of contact 13540 increases from $IT_L$ to just below $IT_D$. FIG. 11H illustrates a transition point in the animation progress as intensity of contact 13540 reaches $IT_D$. FIGS. 11I-11J illustrate the animation progressing in accordance with a second input-output relationship as intensity of contact 13540 increases beyond $IT_D$. FIGS. 11K-11L illustrate lift-off of contact 13540 and an animation that returns (e.g., bounces back) the graphical representation of files associated with file icon 13534 to the state shown in FIG. 11H.

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes contact intensity sensor(s) 165 on the display (FIG. 1A).

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes contact intensity sensors 165 on the display (FIG. 1A). For convenience of explanation, the embodiments described with reference to FIGS. 11C-11U will be discussed with reference to display 450 and a separate touch-sensitive surface 451. However, analogous operations are, optionally, performed on a device with a touch-sensitive display system 112 in response to detecting the contacts described in FIGS. 11C-11U on the touch-sensitive display system 112 while displaying the user interfaces shown in FIGS. 11C-11U on the touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on the touch-sensitive display system 112, in place of cursor 13536.

Figure 11M:
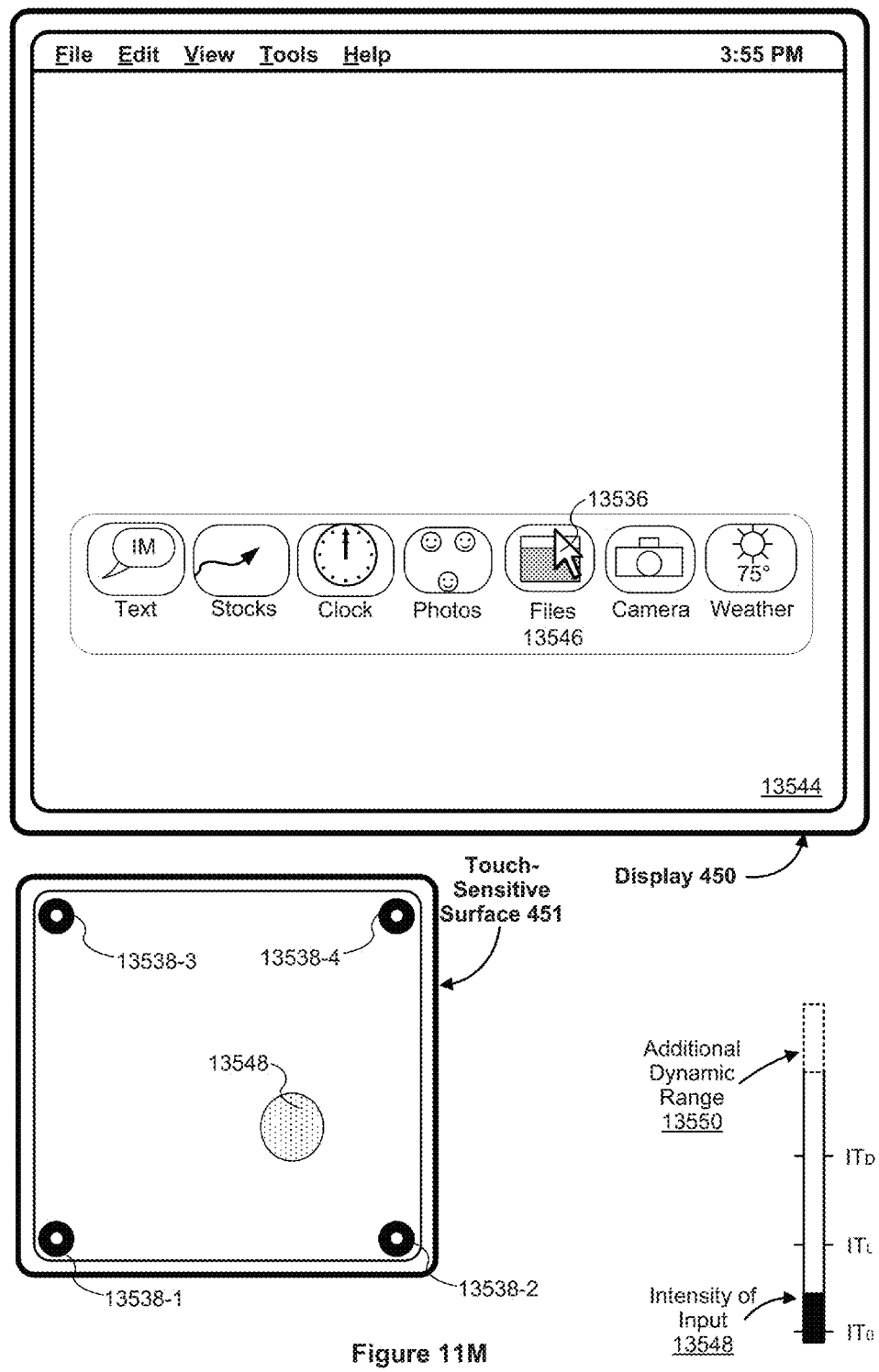
Figure 11N:
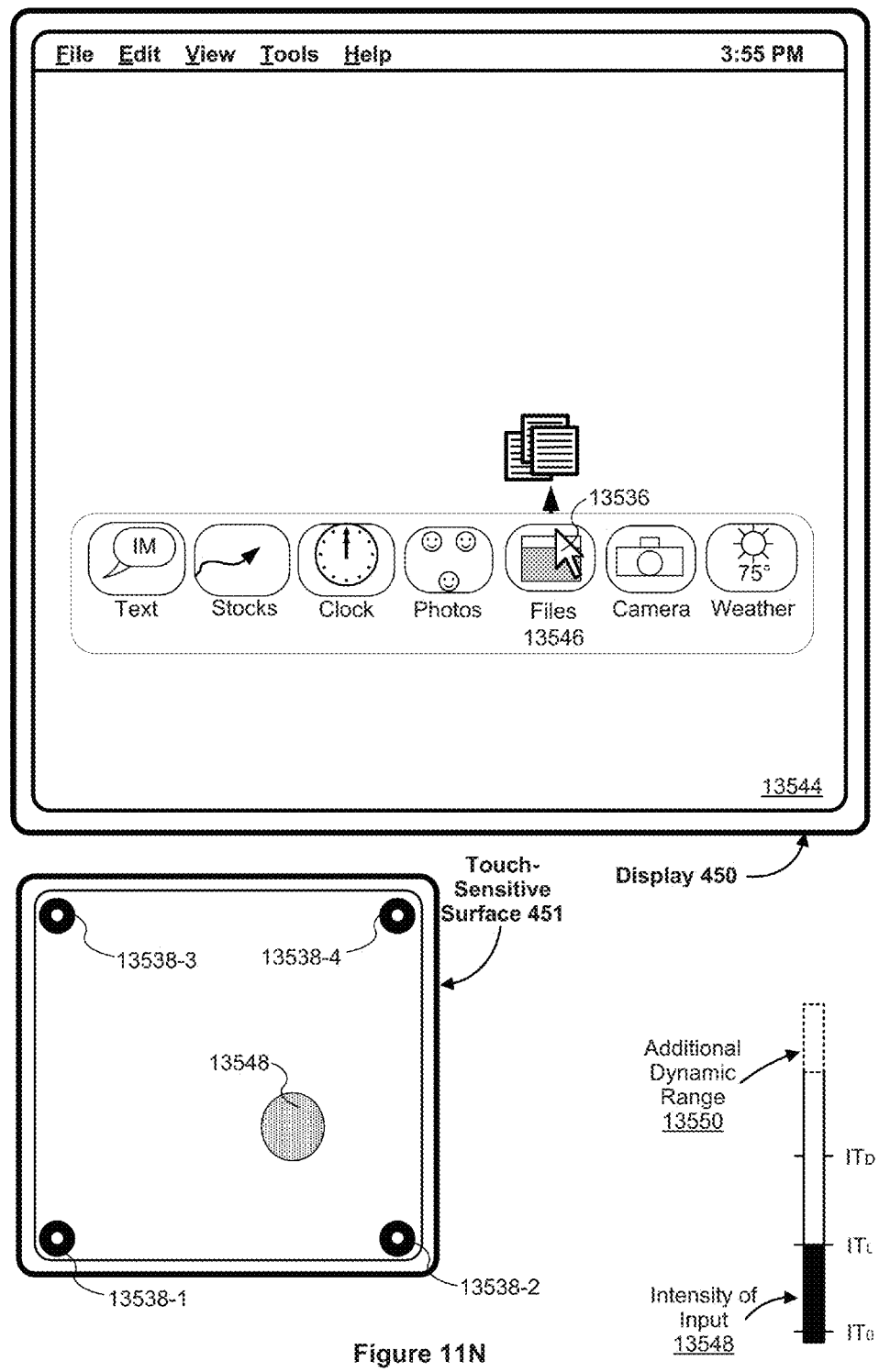
Figure 11O:
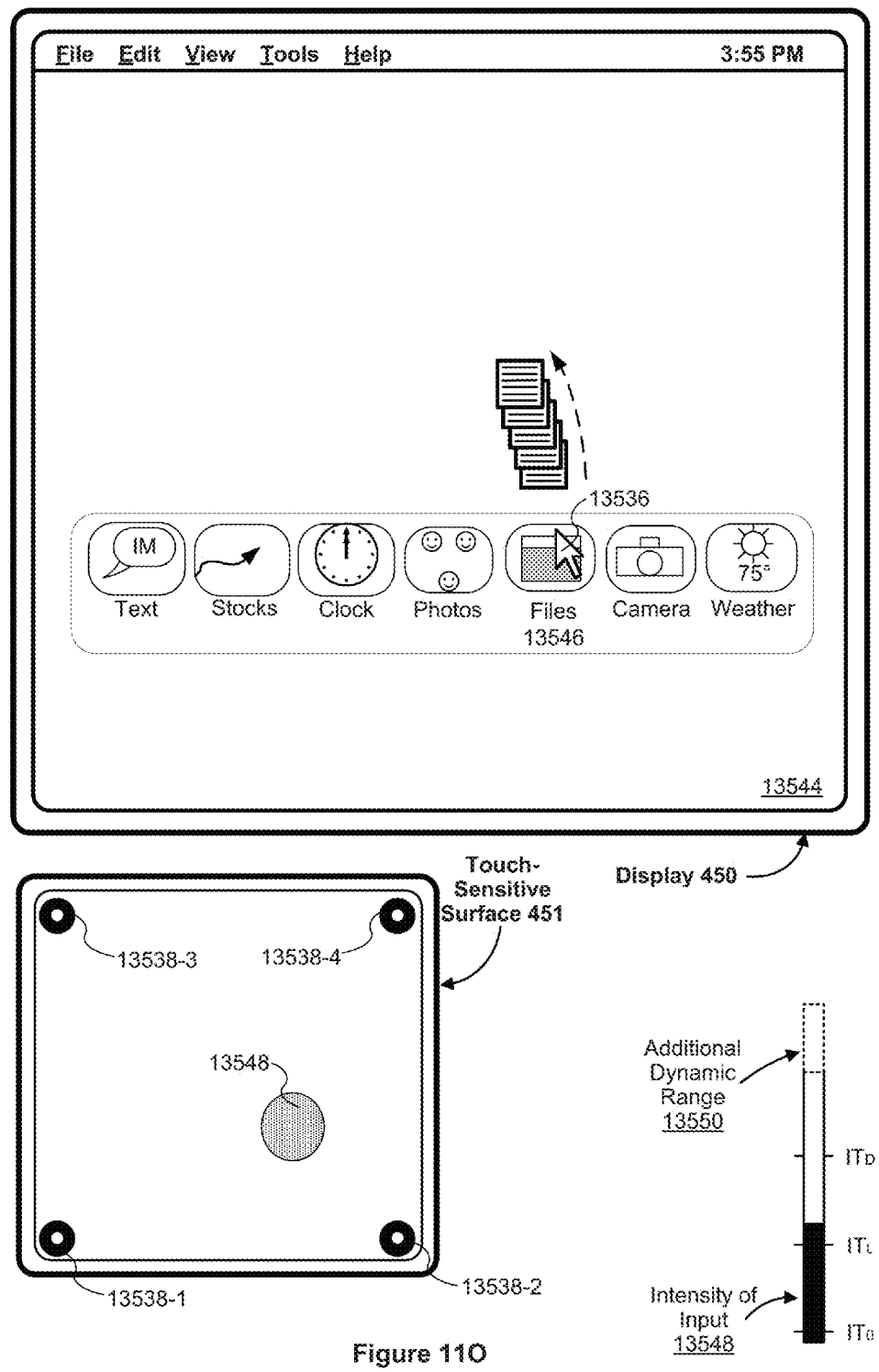
Figure 11P:
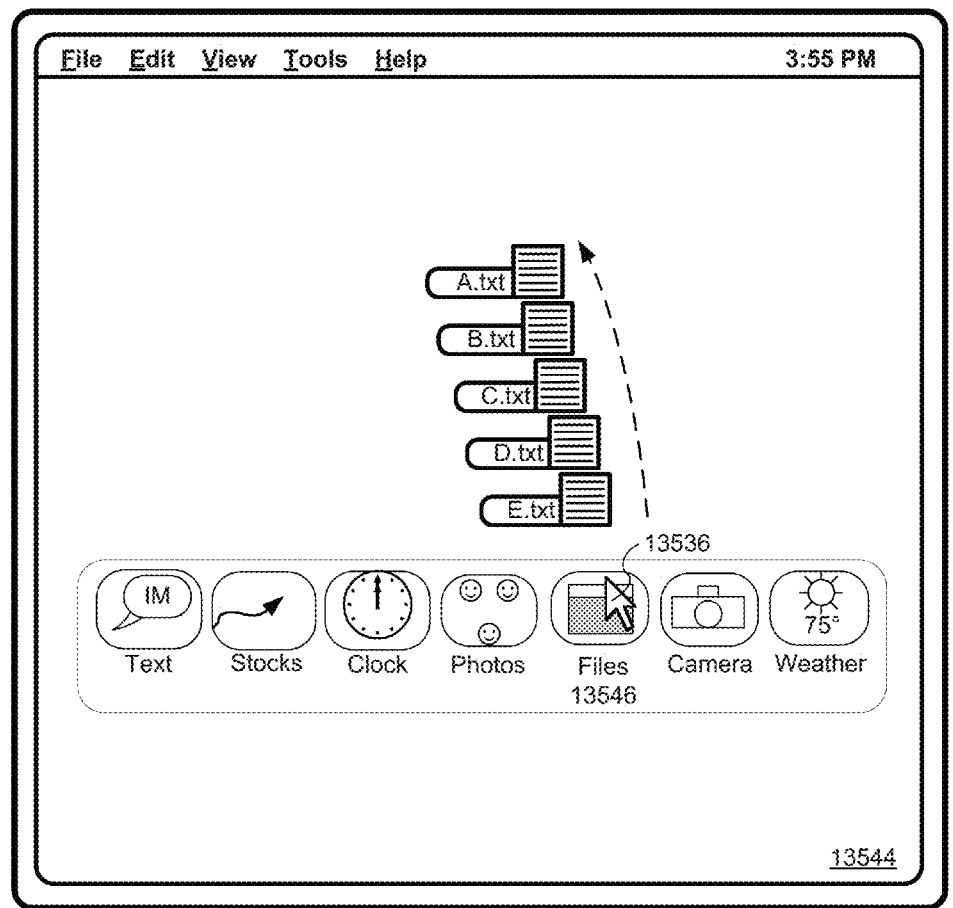
Figure 11P:
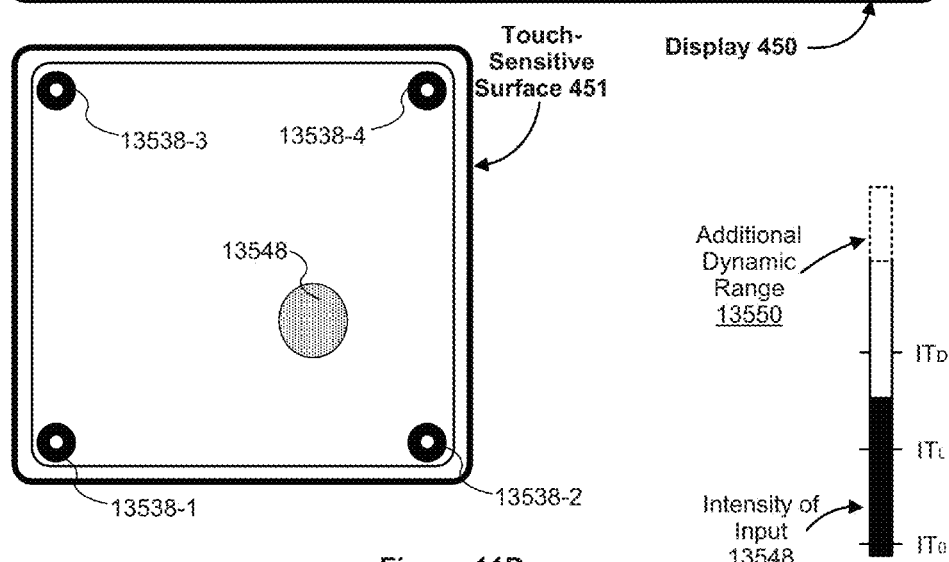
Figure 11Q:
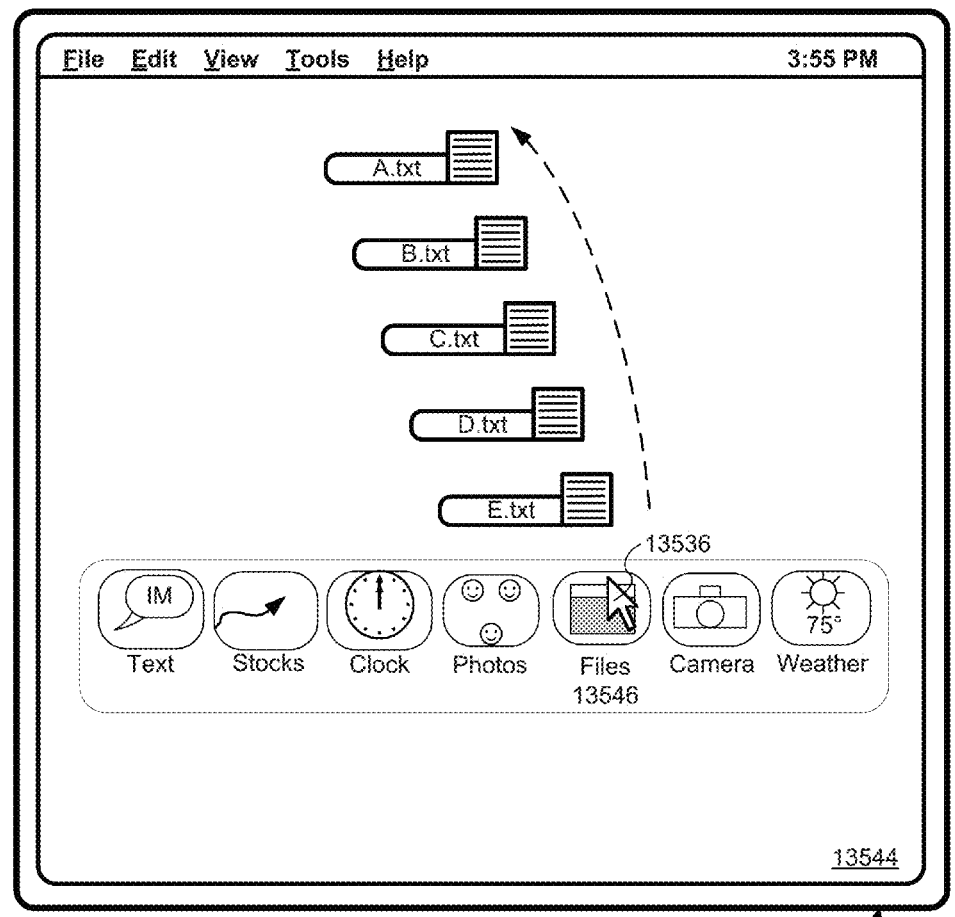
Figure 11Q:
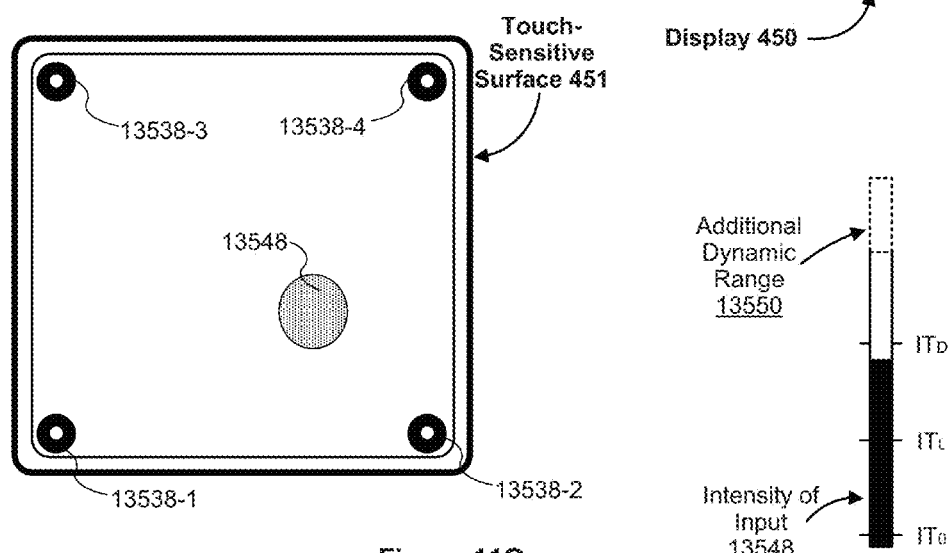
Figure 11R:
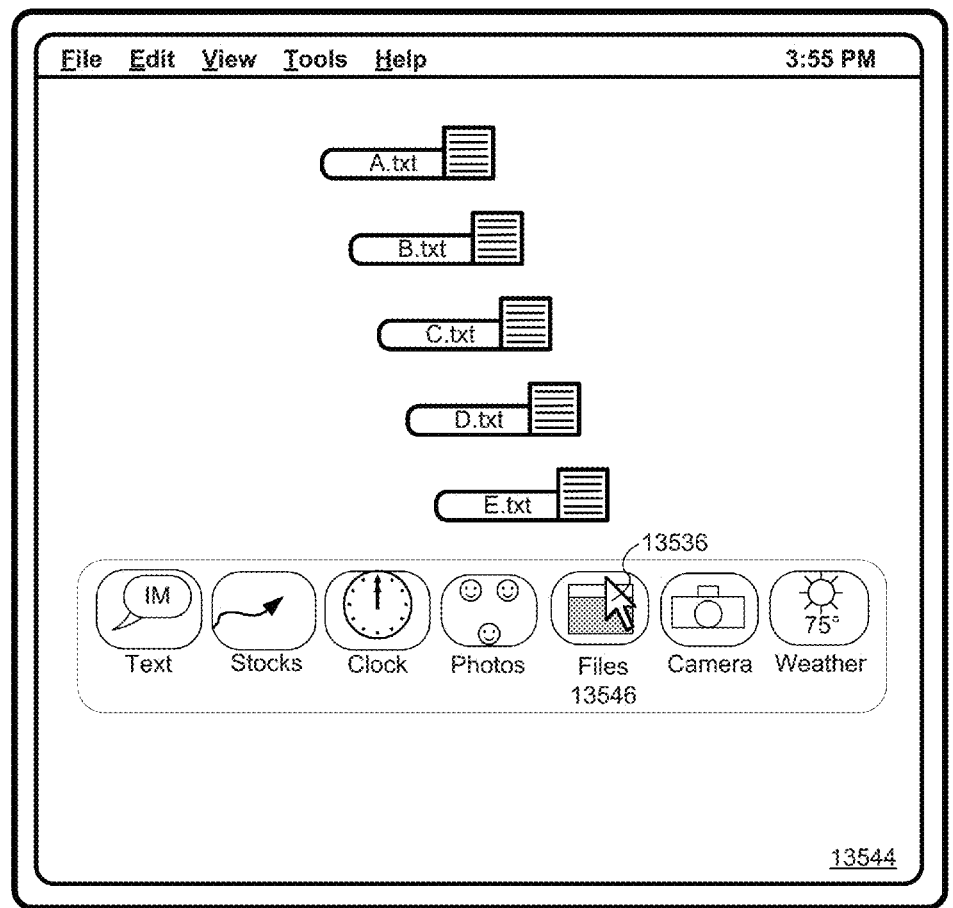
Figure 11R:
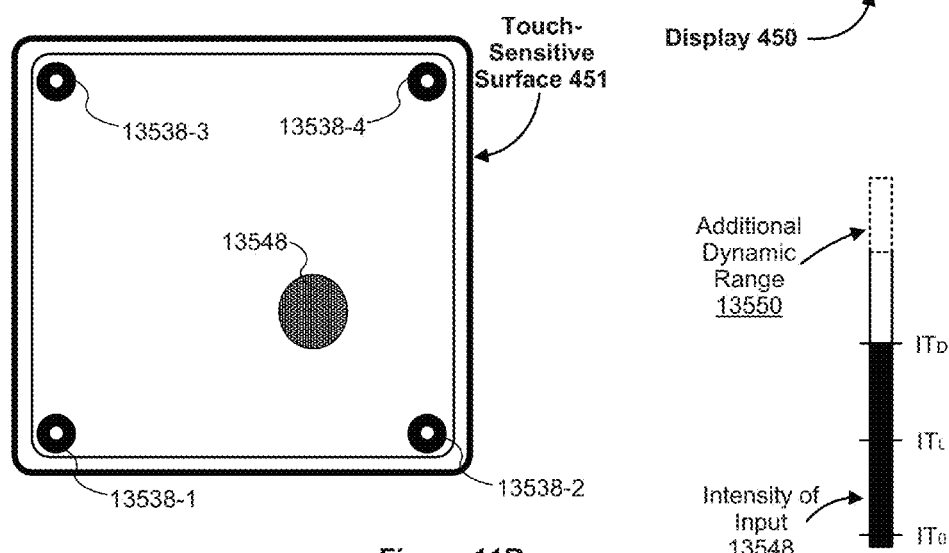
Figure 11S:
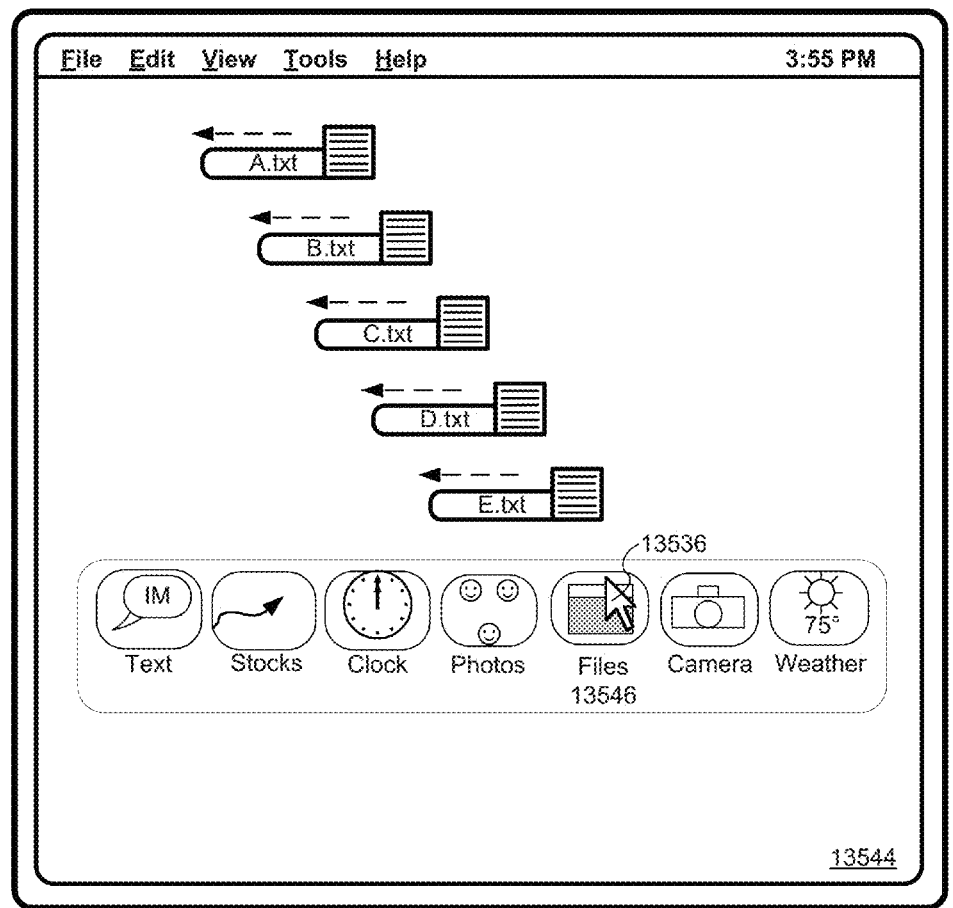
Figure 11S:
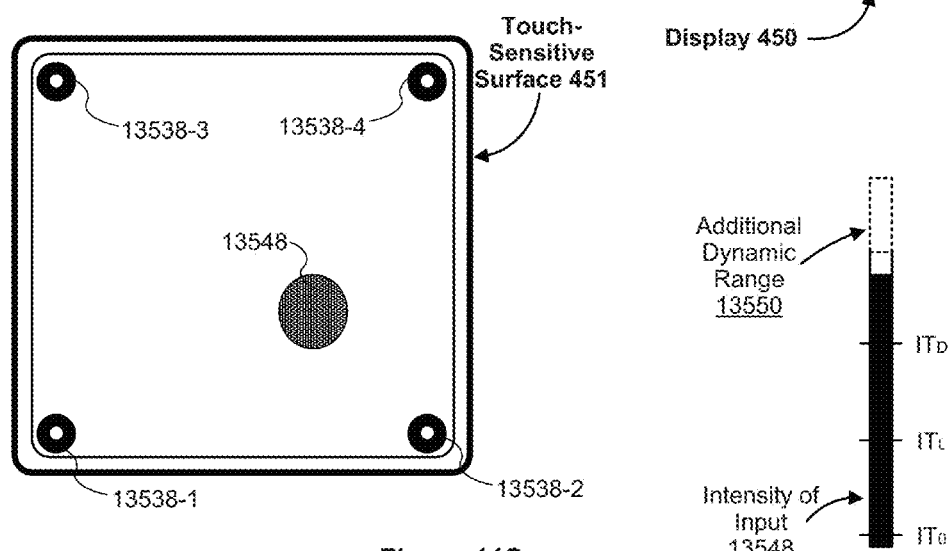
Figure 11T:
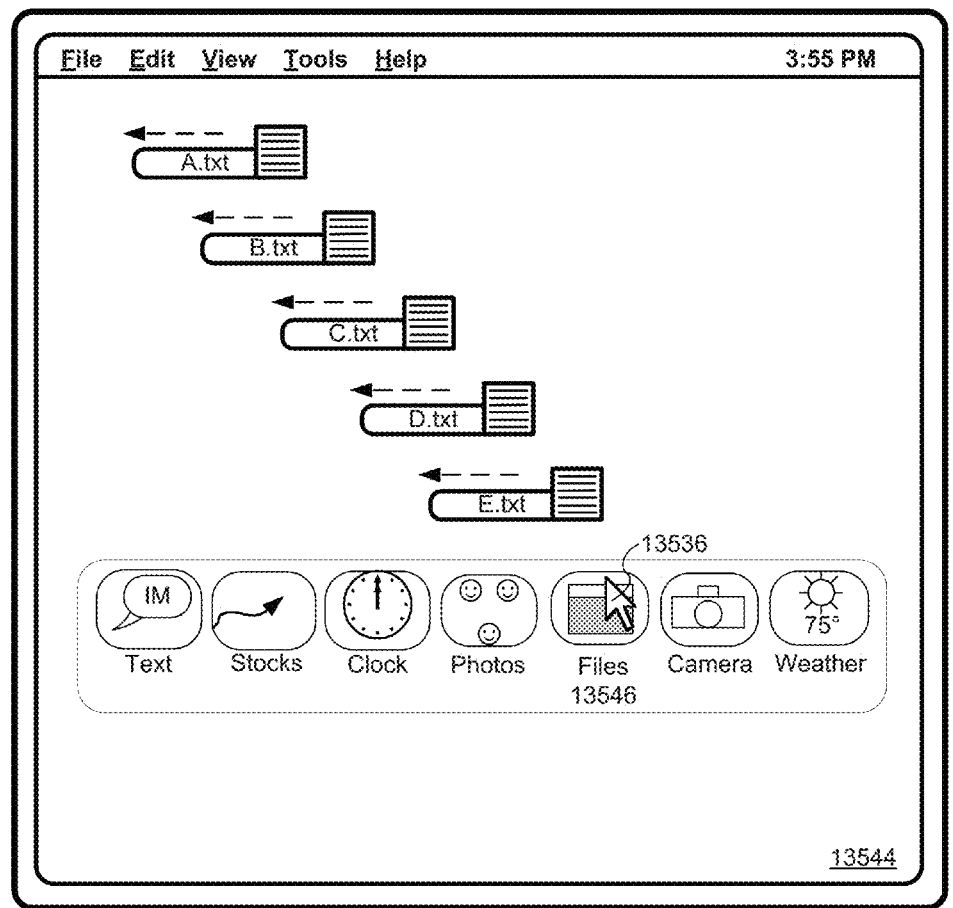
Figure 11T:
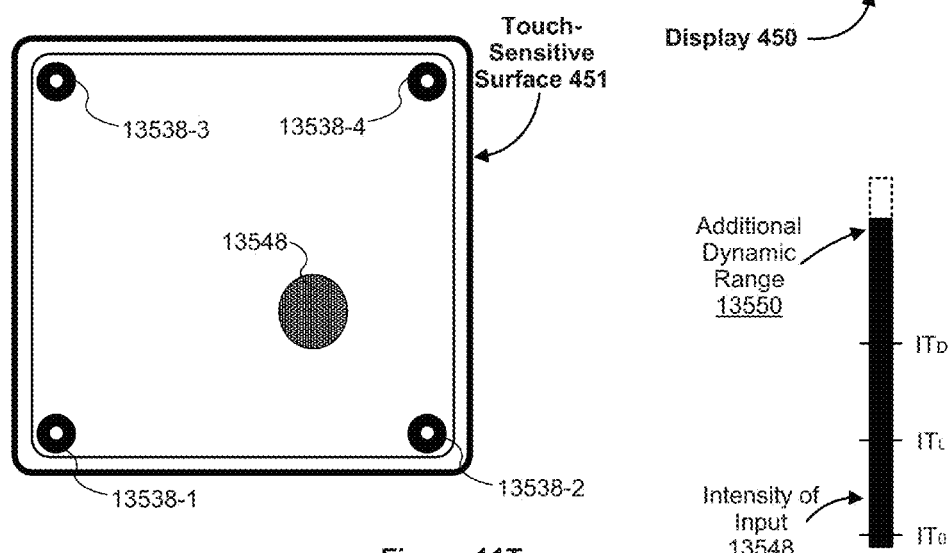
Figure 11U:
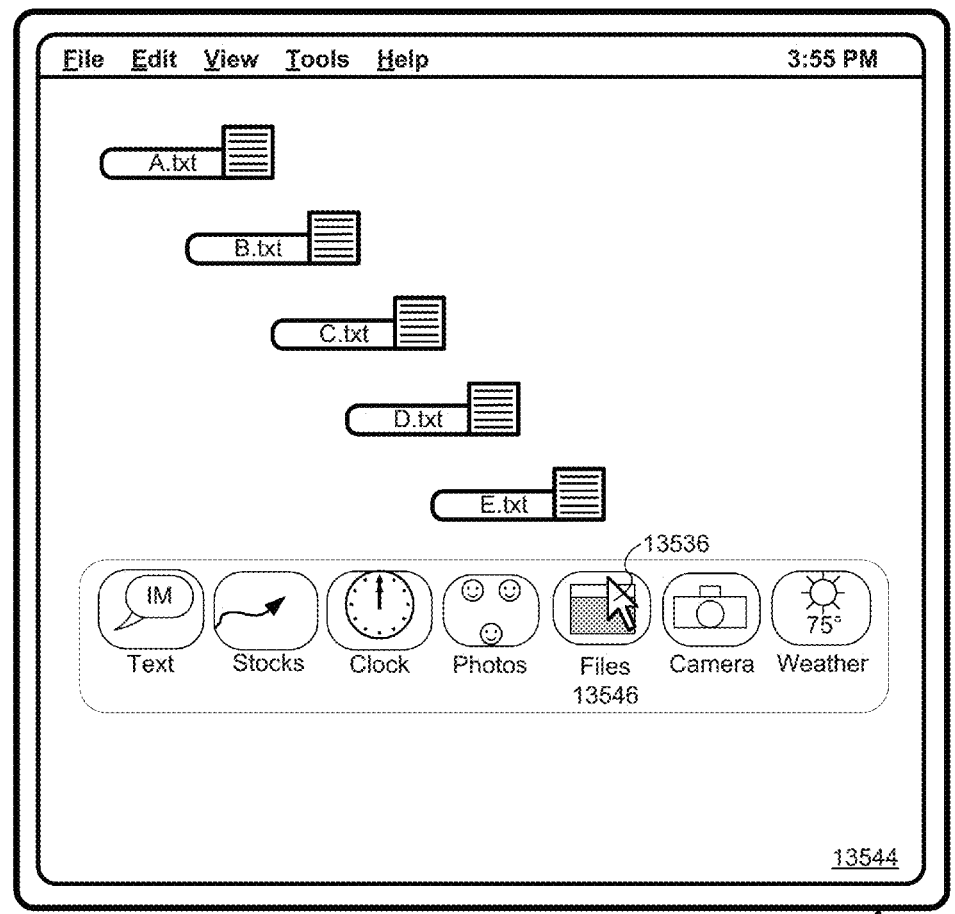
Figure 11U:
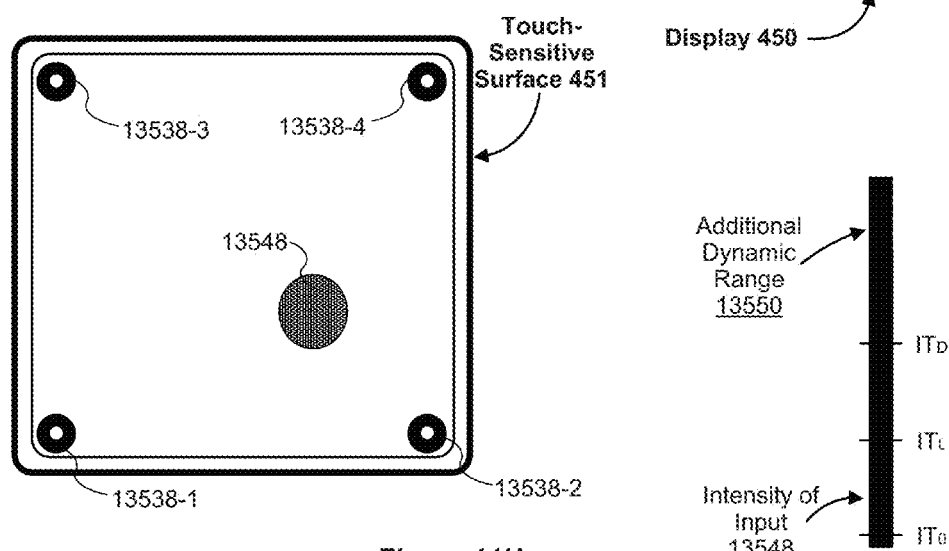
Figure 12A:
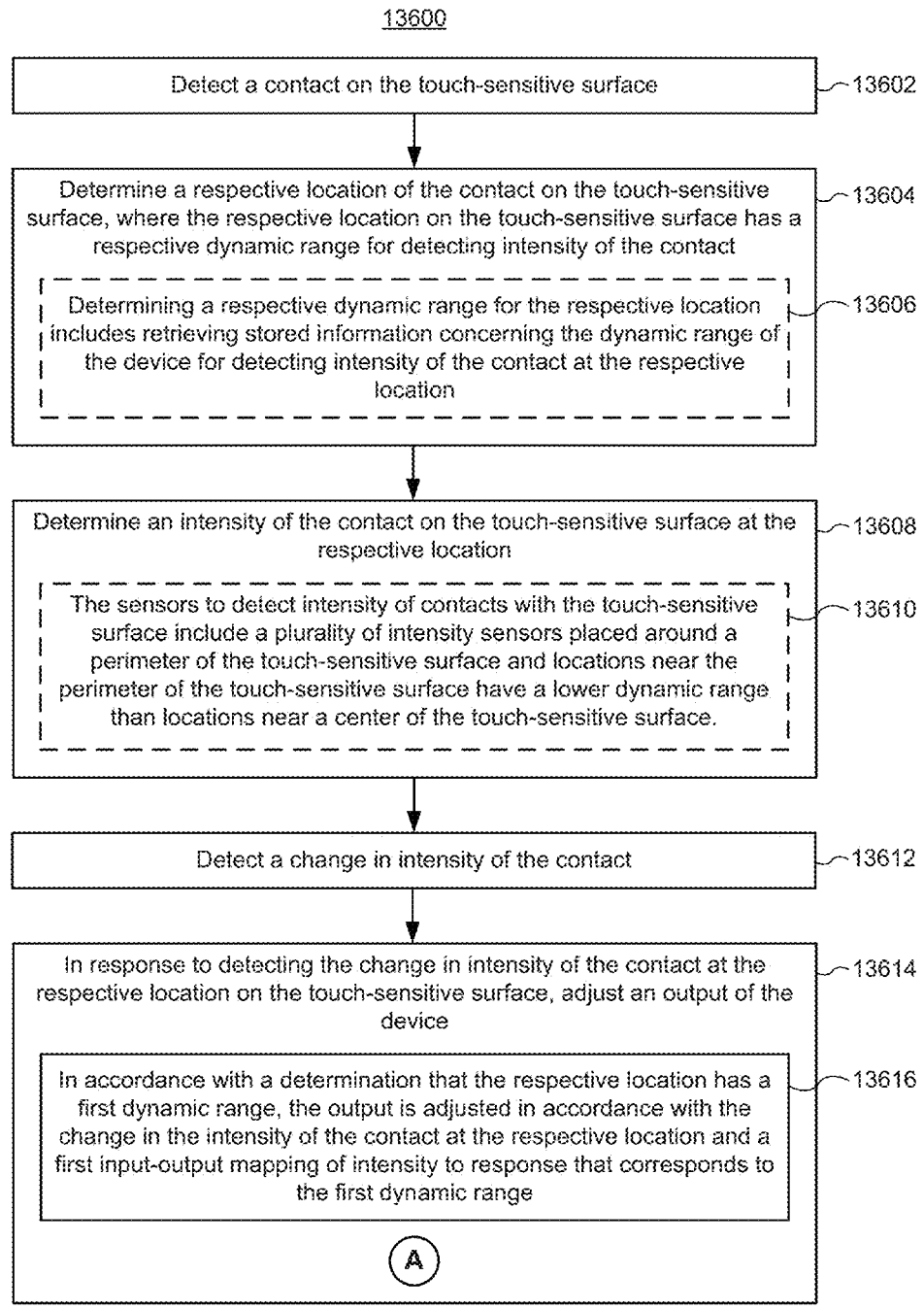
Figure 12B:
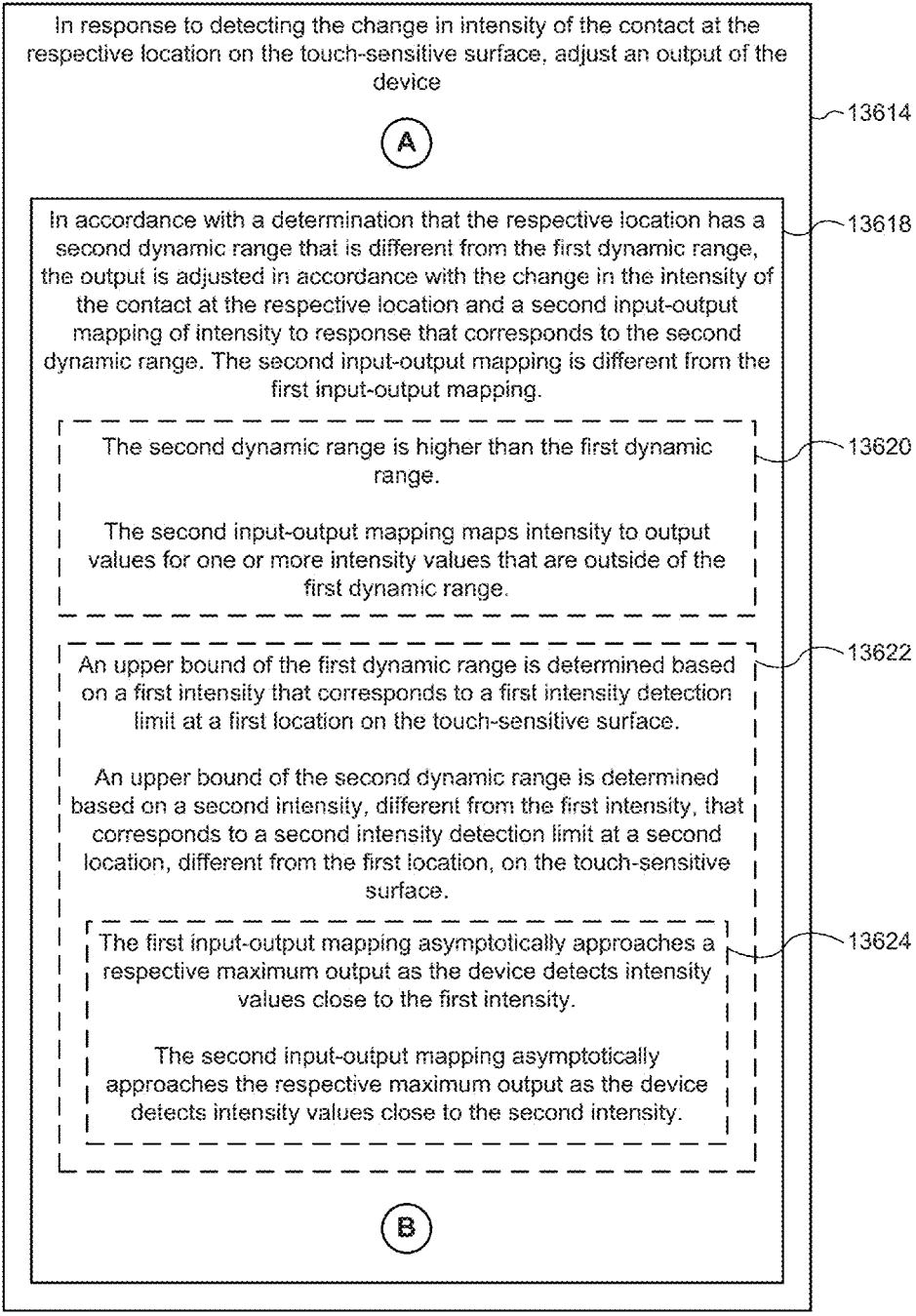
Figure 12D:
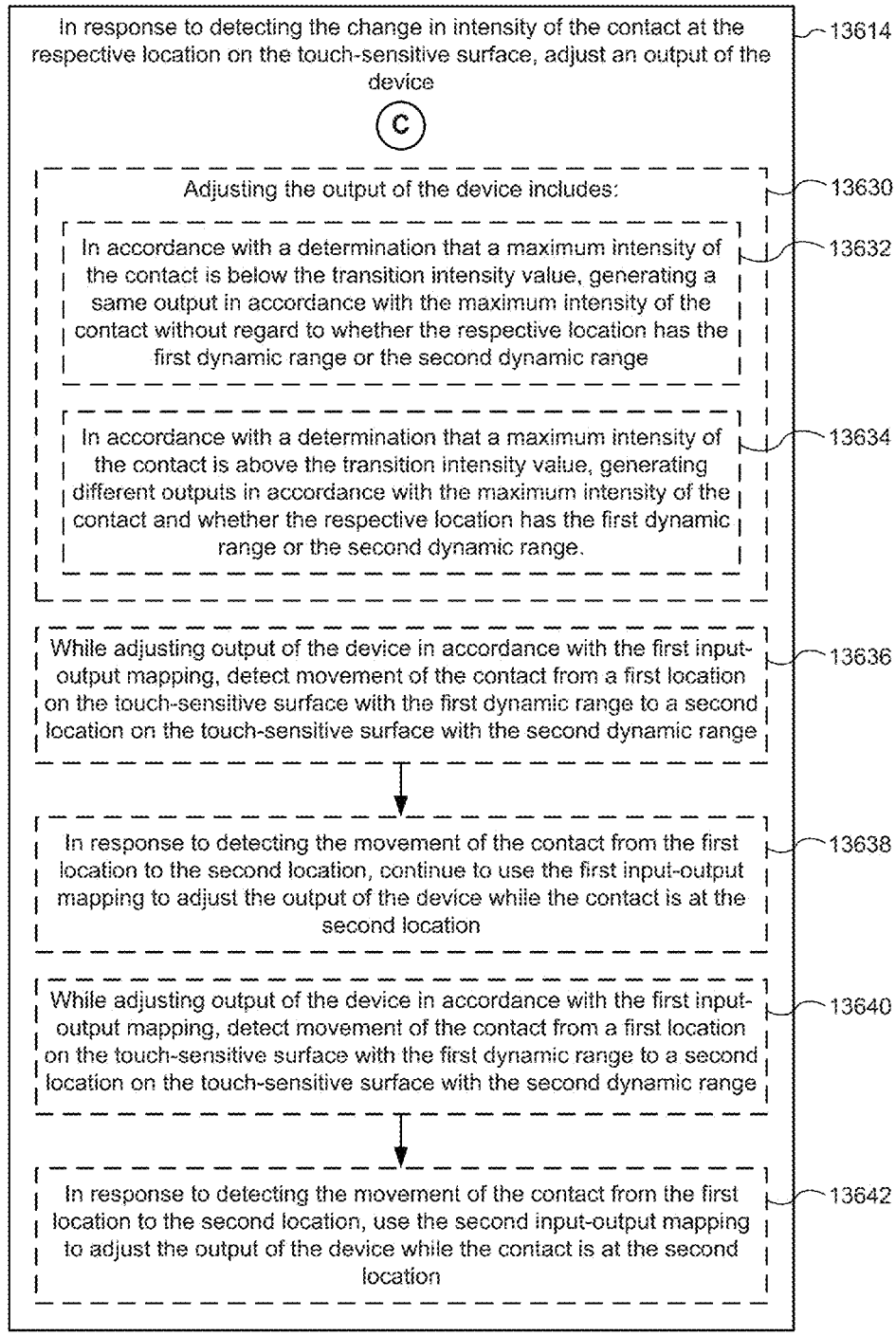

FIGS. 11M-11U illustrate another example of adjusting the progress of an animation in accordance with intensity of a contact. FIG. 11M illustrates user interface 13544, including files icon 13546, displayed on display 450 of a device (e.g., device 300). FIG. 11M further illustrates contact 13548 detected on touch-sensitive surface 451, intensity of contact 13548 below $IT_L$, intensity sensors 13538, and additional dynamic range 13550 corresponding to the relative location of contact 13548 on touch-sensitive surface 451 and intensity sensors 13538. FIGS. 11N-11Q illustrate an animation displaying the files associated with files icon 13546 progressing in accordance with a first input-output relationship as intensity of contact 13548 increases from $IT_L$ to just below $IT_D$. FIG. 11R illustrates a transition point in the animation progress as intensity of contact 13548 reaches $IT_D$. FIGS. 11S-11U illustrate the animation progressing in accordance with a second input-output relationship as intensity of contact 13548 increases beyond $IT_D$.

FIGS. 12A-12D are flow diagrams illustrating method 13600 of adjusting outputs with changes in contact intensity and varying dynamic range of intensity detection in accordance with some embodiments. Method 13600 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 13600 are, optionally, combined and/or the order of some operations is, optionally, changed.

As described below, method 13600 provides an intuitive way to adjust user interface outputs with changes in contact intensity and in accordance with a dynamic input range that varies according to location of the contact. The method reduces the cognitive burden on a user when navigating user interface hierarchies, thereby creating a more efficient human-machine interface. For battery-operated electronic devices, enabling a user to navigate user interface hierarchies faster and more efficiently, while adjusting outputs with changes in contact intensity and varying dynamic range of intensity detection, conserves power and increases the time between battery charges.

The device detects (13602) a contact (e.g., a finger contact) on the touch-sensitive surface. For example, in FIG. 11B the device detects contact 13524 on touch-sensitive display 13518.

The device determines (13604) a respective location of the contact on the touch-sensitive surface (e.g., a current (x,y) position of a representative point in the contact, such as the centroid of the contact), where the respective location on the touch-sensitive surface has a respective dynamic range for detecting intensity of the contact. For example, the device in FIG. 11B determines the location of contact 13524 and corresponding additional intensity range 13526.

In some embodiments, the device determining a respective dynamic range for the respective location includes (13606) retrieving stored information concerning the dynamic range of the device for detecting intensity of the contact at the respective location (e.g., information that was previously stored at the device or at a remote computer system). For example, in these embodiments, the device in FIG. 11B retrieves stored information concerning additional dynamic range 13526 corresponding to the location of contact 13524.

The device determines (13608) an intensity of the contact on the touch-sensitive surface at the respective location. In some embodiments, determining the intensity of the contact on the touch-sensitive surface includes making a plurality of measurements of the intensity of the contact over time so as to detect changes in the intensity of the contact over time. For example, the device in FIG. 11B determines intensity of contact 13524.

In some embodiments, the sensors to detect intensity of contacts with the touch-sensitive surface include (13610) a plurality of intensity sensors placed around a perimeter of the touch-sensitive surface (e.g., the intensity sensors are located proximate to the corners of a trackpad) and locations near the perimeter of the touch-sensitive surface have a lower dynamic range than locations near a center of the touch-sensitive surface. For example, the device in FIG. 11C includes intensity sensors 13538 located proximate to the corners of touch-sensitive surface 451.

The device detects (13612) a change in intensity of the contact. In some embodiments, the change in intensity of the contact is detected while the contact remains at the respective location. For example, FIGS. 11C-11D illustrate a device detecting contact 13540 on touch-sensitive surface 451 and an increase in intensity of contact 13540 from below $IT_L$ in FIG. 11C to $IT_L$ in FIG. 11D.

In response to detecting the change in intensity of the contact at the respective location on the touch-sensitive surface, the device adjusts (13614) an output. For example, in FIGS. 11C-11L the device adjusts an animation progression of files associated with files icon 13534.

In accordance with a determination that the respective location has (13616) a first dynamic range, the output is adjusted in accordance with the change in the intensity of the contact at the respective location and a first input-output mapping of intensity to response that corresponds to the first dynamic range. For example, in FIGS. 11C-11L the device adjusts an animation progression of files associated with files icon 13534. FIGS. 11C-11J further illustrate the location of contact 13540 on touch-sensitive surface 451 and corresponding additional dynamic range 13542. In this example, the animation progresses in accordance with changes in intensity of contact 13540 and an input-output mapping corresponding to additional dynamic range 13542.

Conversely, in accordance with a determination that the respective location has (13618) a second dynamic range that is different from the first dynamic range, the output is adjusted in accordance with the change in the intensity of the contact at the respective location and a second input-output mapping of intensity to response that corresponds to the second dynamic range, where the second input-output mapping is different from the first input-output mapping. For example, in FIGS. 11M-11U the device adjusts an animation progression of files associated with files icon 13546. FIGS. 11M-11U further illustrate the location of contact 13548 on touch-sensitive surface 451 and corresponding additional dynamic range 13550, which is different from additional dynamic range 13542 in FIG. 11C. In this example, the animation progresses in accordance with changes in intensity of contact 13548 and an input-output mapping corresponding to additional dynamic range 13550.

In some embodiments, the second dynamic range is higher (13620) than the first dynamic range (e.g., the second dynamic range includes a larger range of intensity values than the first dynamic range) and the second input-output mapping maps intensity to output values for one or more intensity values that are outside of the first dynamic range (e.g., the second dynamic range includes a maximum detectable intensity that is higher than the maximum detectable intensity of the first dynamic range). For example, in FIG. 11B the device detects contact 13524 at a first location with corresponding additional dynamic range 13526 and contact 13528 at a second location with corresponding additional dynamic range 13530. In this example, contact 13528 at the second location has a larger dynamic range that includes multiple intensity values, which are outside of the dynamic range associated with the location of contact 13524.

In some embodiments, an upper bound of the first dynamic range is determined (13622) based on a first intensity that corresponds to a first intensity detection limit at a first location on the touch-sensitive surface and an upper bound of the second dynamic range is determined based on a second intensity, different from the first intensity, that corresponds to a second intensity detection limit at a second location, different from the first location, on the touch-sensitive surface. In some embodiments, the first intensity detection limit is determined based on an actual, theoretical or estimated intensity that is a maximum intensity that the device is capable of detecting at the first location. In some embodiments, the second intensity detection limit is determined based on an actual, theoretical or estimated intensity that is a maximum intensity that the device is capable of detecting at the second location. In these embodiments, for example, in FIG. 11B additional dynamic range 13526 corresponds to a first intensity detection limit associated with the location of contact 13524 and additional dynamic range 13530 corresponds to a second intensity detection limit associated with the location of contact 13528.

In some embodiments, the first input-output mapping asymptotically approaches (13624) a respective maximum output as the device detects intensity values close to the first intensity (e.g., the upper bound of the first dynamic range) and the second input-output mapping asymptotically approaches the respective (e.g., the same respective) maximum output as the device detects intensity values close to the second intensity (e.g., the upper bound of the second dynamic range). In some embodiments, both input-output mappings approach a same final animation state at a maximum detectable intensity, but the maximum detectable intensities of the input-output mappings are different. Thus, the device reaches the final animation state at the first location at an intensity that is different from the intensity at which the device reaches the final animation state at the second location. For example, FIG. 11A illustrates first input-output mapping 13501 with max response value 13508 and second input-output mapping 13509 with max response value 13516. FIG. 11A further illustrates the output response in first input-output mapping 13501 asymptotically approaching max response value 13508 and the output response in second input-output mapping 13509 asymptotically approaching max response value 13516. In this example, and in these embodiments, max response value 13508 is the same as max response value 13516.

In some embodiments, the first input-output mapping maps (13626) a first range of intensity values to a respective range of output and the second input-output mapping maps a second range of intensity values, different from the first range of intensity values, to the respective range (e.g., the same respective range) of output. For example, at the first location 0-500 g of force is mapped to a predefined range of output values (e.g., 0-130% animation progression), and at the second location 0-2000 g of force is mapped to the same predefined range of output values (e.g., 0-130% animation progression). In these embodiments, for example, the animation progression illustrated in FIGS. 11C-11J corresponds to a first input-output mapping and the animation progression illustrated in FIGS. 11M-11U corresponds to a second input-output mapping. In this example, and in these embodiments, the animation progression illustrated in FIGS. 11C-11J corresponds to the same respective output range as the animation progression illustrated in FIGS. 11M-11U.

In some embodiments, the first input-output mapping has (13628) a first portion (e.g., a linear response portion) that corresponds to a range of intensity values below a transition intensity value and a second portion (e.g., a non-linear response portion) that corresponds to a range of intensity values above the transition intensity value. In some implementations, the second input-output mapping has a first portion (e.g., a linear response portion) that corresponds to a range of intensity values below the transition intensity value and a second portion (e.g., a non-linear response portion) that corresponds to a range of intensity values above the transition intensity value. In some implementations, the first portion of the first input-output mapping is the same as the first portion of the second input-output mapping (e.g., linear portion) and the second portion of the first input-output mapping is different from the second portion of the second input-output mapping (e.g., cubic portion). For example, FIG. 11A shows first input-output mapping 13501 including first range of intensity values 13502 (e.g., a linear portion) corresponding to intensities between $IT_L$ and $IT_D$ and second range of intensity values 13506 (e.g., a non-linear portion) corresponding to intensities between $IT_D$ and $IT_{MAX1}$. FIG. 11A further shows second input-output mapping 13509 including first range of intensity values 13510 corresponding to intensities between $IT_L$ and $IT_D$ and second range of intensity values 13514 corresponding to intensities between $IT_D$ and $IT_{MAX2}$. It is noted that that $IT_{MAX2}$ is different from $IT_{MAX1}$, and in this example represents a higher intensity value than $IT_{MAX1}$. In accordance with these embodiments, first range of intensity values 13502 in first input-output mapping 13501 is the same as first range of intensity values 13510 in second input-output mapping 13509 and second range of intensity values 13506 in first input-output mapping 13501 is different from second range of intensity values 13514 in second input-output mapping 13509.

In some embodiments, adjusting the output of the device includes (13630), in accordance with a determination that a maximum intensity of the contact is below the transition intensity value, generating (13632) a same output in accordance with the maximum intensity of the contact without regard to whether the respective location has the first dynamic range or the second dynamic range and, in accordance with a determination that a maximum intensity of the contact is above the transition intensity value, generating (13634) different outputs in accordance with the maximum intensity of the contact and whether the respective location has the first dynamic range or the second dynamic range (e.g., when the respective location has the first dynamic range, the device generates a first output, and when the respective location has the second dynamic range, the device generates a second output different from the first output). For example, if the device detected two substantially identical press inputs at two different locations on the touch-sensitive surface (e.g., a first location with a first dynamic range and a second location with the second dynamic range, with the two inputs detected at different times), the device produces outputs that depend at least in part on the dynamic range of the locations and whether the intensity of the contact is above the transition intensity. In this example, when the inputs are below the transition intensity, the device produces substantially identical outputs at the two locations, but, when the inputs are above the transition intensity, the device produces different outputs at the two locations even if the two inputs are substantially identical. Thus, in this example, the differences in the output, due to differing dynamic range of the location of the press input, are confined to the range of intensities above the transition intensity. Consequently, in this example, the device maintains a consistent the user experience across the touch-sensitive surface for inputs with intensities below the transition intensity while also taking advantage of increased dynamic range of some portions of the touch-sensitive surface (e.g., the center of the touch-sensitive surface, an locations near the center (e.g., within a predefined distance of the center, or within a predefined window around the center) of the touch-sensitive surface), to provide additional feedback to the user.

In some embodiments, while adjusting output of the device in accordance with the first input-output mapping, the device detects (13636) movement of the contact from a first location on the touch-sensitive surface with the first dynamic range to a second location on the touch-sensitive surface with the second dynamic range and, in response to detecting the movement of the contact from the first location to the second location, the device continues (13638) to use the first input-output mapping to adjust the output of the device while the contact is at the second location. In these embodiments, the animation illustrated in FIGS. 11C-11J is unchanged by subsequent movement of contact 13540.

Conversely, in some embodiments, while adjusting output of the device in accordance with the first input-output mapping, the device detects (13640) movement of the contact from a first location on the touch-sensitive surface with the first dynamic range to a second location on the touch-sensitive surface with the second dynamic range and, in response to detecting the movement of the contact from the first location to the second location, the device uses (13642) the second input-output mapping to adjust the output of the device while the contact is at the second location. In some embodiments, there is a smooth transition between the first input-output mapping and the second input-output mapping, so that, if the intensity of the contact is maintained at a respective intensity, the output gradually changes as the contact moves from the first location to the second location. In these embodiments, the animation illustrated in FIGS. 11C-11J is adjusted in accordance with the dynamic range corresponding to the location of contact 13540 resulting from subsequent movement of contact 13540.

It should be understood that the particular order in which the operations in FIGS. 12A-12D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 13600 described above with respect to FIGS. 12A-12D. For example, the contacts, gestures, user interface objects, intensity thresholds, focus selectors, outputs, and animations described above with reference to method 13600 optionally have one or more of the characteristics of the contacts, gestures, user interface objects, intensity thresholds, focus selectors, outputs, and animations described herein with reference to other methods described herein (e.g., those listed in the fifth paragraph of the Description of Embodiments). For brevity, these details are not repeated here.

Figure 13:
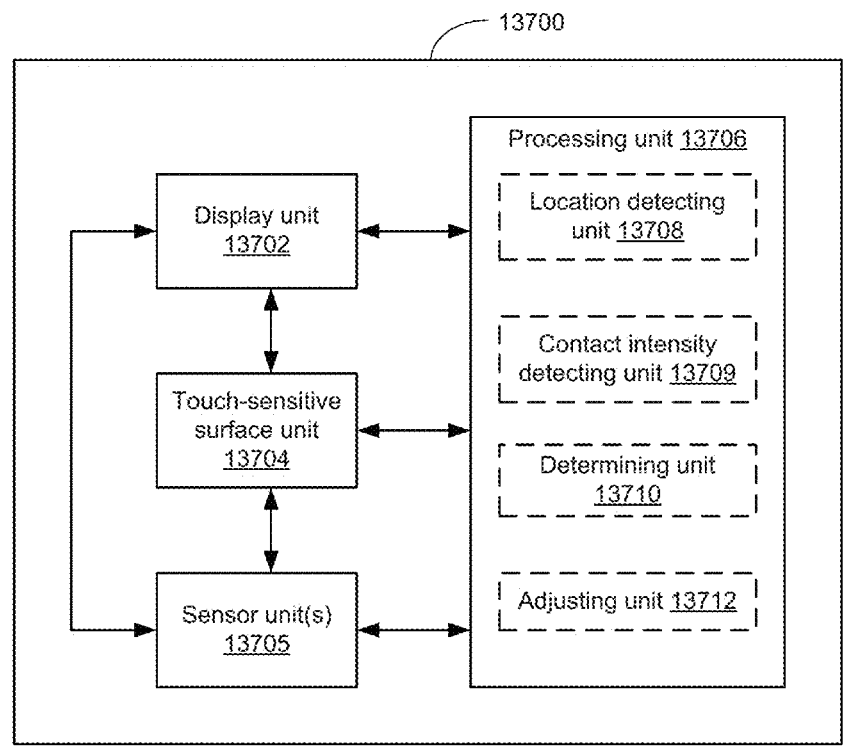
FIG. 13 is a functional block diagram of an electronic device in accordance with some embodiments.

In accordance with some embodiments, FIG. 13 shows a functional block diagram of an electronic device 13700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, electronic device 13700 includes display unit 13702, touch-sensitive surface unit 13704 configured to receive user contacts, one or more sensor units 13705 configured to detect intensity of contacts with the touch-sensitive surface unit, and processing unit 13706 coupled to display unit 13702, touch-sensitive surface unit 13704, and sensor units 13705. In some embodiments, processing unit 13706 includes location detecting unit 13708, contact intensity detecting unit 13709, determining unit 13710, and adjusting unit 13712.

Processing unit 13706 is configured to detect (e.g., with contact intensity detecting unit 13709) a contact on touch-sensitive surface unit 13704, determine (e.g., with determining unit 13710) a respective location of the contact on touch-sensitive surface unit 13704, where the respective location on touch-sensitive surface unit 13704 has a respective dynamic range for detecting intensity of the contact. Processing unit 13706 is further configured to determine (e.g., with determining unit 13710) an intensity of the contact on touch-sensitive surface unit 13704 at the respective location and detect (e.g., with contact intensity detecting unit 13709) a change in intensity of the contact. Processing unit 13706 is further configured to, in response to detecting the change in intensity of the contact at the respective location on touch-sensitive surface 13704, adjust (e.g., with adjusting unit 13712) an output of the device, where, in accordance with a determination that the respective location has a first dynamic range, the output is adjusted in accordance with the change in the intensity of the contact at the respective location and a first input-output mapping of intensity to response that corresponds to the first dynamic range, and, in accordance with a determination that the respective location has a second dynamic range that is different from the first dynamic range, the output is adjusted in accordance with the change in the intensity of the contact at the respective location and a second input-output mapping of intensity to response that corresponds to the second dynamic range, where the second input-output mapping is different from the first input-output mapping.

In some embodiments, the device determines (e.g., with determining unit 13710) a respective dynamic range for the respective location includes retrieving stored information concerning the dynamic range of the device for detecting intensity of the contact at the respective location.

In some embodiments, the second dynamic range is higher than the first dynamic range and the second input-output mapping maps intensity to output values for one or more intensity values that are outside of the first dynamic range.

In some embodiments, an upper bound of the first dynamic range is determined (e.g., with determining unit 13710) based on a first intensity that corresponds to a first intensity detection limit at a first location on touch-sensitive surface unit 13704 and an upper bound of the second dynamic range is determined (e.g., with determining unit 13710) based on a second intensity, different from the first intensity, that corresponds to a second intensity detection limit at a second location, different from the first location, on touch-sensitive surface unit 13704.

In some embodiments, the first input-output mapping asymptotically approaches a respective maximum output as the device detects (e.g., with contact intensity detecting unit 13709) intensity values close to the first intensity and the second input-output mapping asymptotically approaches the respective maximum output as the device detects (e.g., with contact intensity detecting unit 13709) intensity values close to the second intensity.

In some embodiments, the first input-output mapping maps a first range of intensity values to a respective range of output and the second input-output mapping maps a second range of intensity values, different from the first range of intensity values, to the respective range of output.

In some embodiments, the first input-output mapping has a first portion that corresponds to a range of intensity values below a transition intensity value and a second portion that corresponds to a range of intensity values above the transition intensity value, the second input-output mapping has a first portion that corresponds to a range of intensity values below the transition intensity value and a second portion that corresponds to a range of intensity values above the transition intensity value, the first portion of the first input-output mapping is the same as the first portion of the second input-output mapping, and the second portion of the first input-output mapping is different from the second portion of the second input-output mapping.

In some embodiments, adjusting (e.g., with adjusting unit 13712) the output of the device includes, in accordance with a determination that a maximum intensity of the contact is below the transition intensity value, generating a same output in accordance with the maximum intensity of the contact without regard to whether the respective location has the first dynamic range or the second dynamic range and, in accordance with a determination that a maximum intensity of the contact is above the transition intensity value, generating different outputs in accordance with the maximum intensity of the contact and whether the respective location has the first dynamic range or the second dynamic range.

In some embodiments, sensors units 13705 configured to detect intensity of contacts with touch-sensitive surface unit 13704 include a plurality of intensity sensors placed around a perimeter of touch-sensitive surface unit 13704 and locations near the perimeter of touch-sensitive surface unit 13704 have a lower dynamic range than locations near a center of touch-sensitive surface unit 13704.

In some embodiments, processing unit 13706 is further configured to, while adjusting (e.g., with adjusting unit 13712) output of the device in accordance with the first input-output mapping, detect (e.g., with location detecting unit 13708) movement of the contact from a first location on touch-sensitive surface unit 13704 with the first dynamic range to a second location on touch-sensitive surface unit 13704 with the second dynamic range and, in response to detecting the movement of the contact from the first location to the second location, continue to use the first input-output mapping to adjust (e.g., with adjusting unit 13712) the output of the device while the contact is at the second location.

In some embodiments, processing unit 13706 is further configured to, while adjusting (e.g., with adjusting unit 13712) output of the device in accordance with the first input-output mapping, detect (e.g., with location detecting unit 13708) movement of the contact from a first location on touch-sensitive surface unit 13704 with the first dynamic range to a second location on touch-sensitive surface unit 13704 with the second dynamic range and, in response to detecting the movement of the contact from the first location to the second location, use the second input-output mapping to adjust (e.g., with adjusting unit 13712) the output of the device while the contact is at the second location.

The operations in the information processing methods described above are, optionally, implemented by running one or more functional modules in information processing apparatus such as general purpose processors (e.g., as described above with respect to FIGS. 1A and 3) or application specific chips.

The operations described above with reference to FIGS. 12A-12D are, optionally, implemented by components depicted in FIGS. 1A-1B or FIG. 13. For example, detection operations 13602, 13612, 13636, and 13640, determining operations 13604 and 13608, and adjusting operation 13614 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

It should be understood that the particular order in which the operations have been described above is merely exemplary and is not intended to indicate that the described order is the only order in which the operations could be performed. One of ordinary skill in the art would recognize various ways to reorder the operations described herein. Additionally, it should be noted that the various processes separately described herein (e.g., those listed in the fifth paragraph of the Description of Embodiments) can be combined with each other in different arrangements. For example, the contacts, user interface objects, tactile sensations, intensity thresholds, and/or focus selectors described above with reference to any one of the various processes separately described herein (e.g., those listed in the fifth paragraph of the Description of Embodiments) optionally have one or more of the characteristics of the contacts, gestures, user interface objects, tactile sensations, intensity thresholds, and focus selectors described herein with reference to one or more of the other methods described herein (e.g., those listed in the fifth paragraph of the Description of Embodiments). For brevity, all of the various possible combinations are not specifically enumerated here, but it should be understood that the claims described above may be combined in any way that is not precluded by mutually exclusive claim features.

The foregoing description, for purpose of explanation, has been described with reference to specific embodiments. However, the illustrative discussions above are not intended to be exhaustive or to limit the various described embodiments to the precise forms disclosed. Many modifications and variations are possible in view of the above teachings. The embodiments were chosen and described in order to best explain the principles of the various described embodiments and their practical applications, to thereby enable others skilled in the art to best utilize the various described embodiments with various modifications as are suited to the particular use contemplated.

What is claimed is:

1. A non-transitory computer readable storage medium storing one or more programs, the one or more programs comprising instructions, which when executed by an electronic device with a display, a touch-sensitive surface and one or more sensors to detect intensities of contacts with the touch-sensitive surface, cause the device to:
   detect a contact on the touch-sensitive surface;
   determine a location of the contact on the touch-sensitive surface;
   determine an intensity of the contact on the touch-sensitive surface; and
   display a response in accordance with the detected contact, the response being based at least in part on an input-output mapping of intensity to response at the location of the contact on the touch-sensitive surface, the input-output mapping including, for a respective location on the touch-sensitive surface:
      a first input-output relationship between intensity and response over a first range of intensity values, wherein the first input-output relationship is linear;
      a second input-output relationship between intensity and response over a second range of intensity values, the second range of intensity values being different from the first range of intensity values, wherein the second input-output relationship is non-linear; and
      a transitional intensity value where the first range of intensity values meets or overlaps the second range of intensity values, wherein, at the transitional intensity value:
         the first input-output relationship has a first rate of change of response with change in intensity;
         the second input-output relationship has a second rate of change of response with change in intensity; and
         the first rate of change is substantially the same as the second rate of change.

2. The computer readable storage medium of claim 1, wherein, the second input-output relationship and the first input-output relationship have a same output at the transitional intensity value.

3. The computer readable storage medium of claim 1, wherein the second input-output relationship asymptotically approaches a maximum output as intensity of the contact increases above the transitional intensity value.

4. The computer readable storage medium of claim 1, wherein the response includes changing a current value of a property from a first value to a second value in a predefined range of values.

5. The computer readable storage medium of claim 1, wherein the response includes adjusting one or more of: volume, brightness, user interface object spacing, user interface object size, user interface object opacity, content scrubbing, and animation progress.

6. A non-transitory computer readable storage medium storing one or more programs, the one or more programs comprising instructions, which when executed by an electronic device with a display, a touch-sensitive surface and one or more sensors to detect intensities of contacts with the touch-sensitive surface, cause the device to:
   detect a contact on the touch-sensitive surface;
   determine a location of the contact on the touch-sensitive surface;
   determine an intensity of the contact on the touch-sensitive surface;
   display a response in accordance with the detected contact, the response being based at least in part on an input-output mapping of intensity to response at the location of the contact on the touch-sensitive surface, the input-output mapping including, for a respective location on the touch-sensitive surface:
  a first input-output relationship between intensity and response over a first range of intensity values;
  a second input-output relationship between intensity and response over a second range of intensity values, the second range of intensity values being different from the first range of intensity values; and
  a transitional intensity value where the first range of intensity values meets or overlaps the second range of intensity values, wherein, at the transitional intensity value:
    the first input-output relationship has a first rate of change of response with change in intensity;
    the second input-output relationship has a second rate of change of response with change in intensity; and
    the first rate of change is substantially the same as the second rate of change; and
display a user interface that includes a plurality of user interface objects, wherein:
  the plurality of user interface objects respond to press inputs having intensity above corresponding activation intensity thresholds; and
  a respective activation intensity threshold for two or more of the user interface objects is the same as the transitional intensity value.

7. A non-transitory computer readable storage medium storing one or more programs, the one or more programs comprising instructions, which when executed by an electronic device with a display, a touch-sensitive surface and one or more sensors to detect intensities of contacts with the touch-sensitive surface, cause the device to:
  detect a contact on the touch-sensitive surface;
  determine a location of the contact on the touch-sensitive surface;
  determine an intensity of the contact on the touch-sensitive surface; and
  display a response in accordance with the detected contact, the response being based at least in part on an input-output mapping of intensity to response at the location of the contact on the touch-sensitive surface, the input-output mapping including, for a respective location on the touch-sensitive surface:
    a first input-output relationship between intensity and response over a first range of intensity values;
    a second input-output relationship between intensity and response over a second range of intensity values, the second range of intensity values being different from the first range of intensity values; and
    a transitional intensity value where the first range of intensity values meets or overlaps the second range of intensity values, wherein, at the transitional intensity value:
      the first input-output relationship has a first rate of change of response with change in intensity;
      the second input-output relationship has a second rate of change of response with change in intensity; and
      the first rate of change is substantially the same as the second rate of change;
wherein:
  a first property of the device varies at different locations on the touch-sensitive surface;

the first input-output relationship is the same at a first location and a second location on the touch-sensitive surface; and
the second input-output relationship is different at the first location than at the second location on the touch-sensitive surface.

8. An electronic device, comprising:
a display;
a touch-sensitive surface;
one or more sensors to detect intensities of contacts with the touch-sensitive surface;
one or more processors;
memory; and
one or more programs, wherein the one or more programs are stored in the memory and configured to be executed by the one or more processors, the one or more programs including instructions for:
  detecting a contact on the touch-sensitive surface;
  determining a location of the contact on the touch-sensitive surface;
  determining an intensity of the contact on the touch-sensitive surface; and
  displaying a response in accordance with the detected contact, the response being based at least in part on an input-output mapping of intensity to response at the location of the contact on the touch-sensitive surface, the input-output mapping including, for a respective location on the touch-sensitive surface:
    a first input-output relationship between intensity and response over a first range of intensity values, wherein the first input-output relationship is linear;
    a second input-output relationship between intensity and response over a second range of intensity values, the second range of intensity values being different from the first range of intensity values, wherein the second input-output relationship is non-linear; and
    a transitional intensity value where the first range of intensity values meets or overlaps the second range of intensity values, wherein, at the transitional intensity value:
      the first input-output relationship has a first rate of change of response with change in intensity;
      the second input-output relationship has a second rate of change of response with change in intensity; and
      the first rate of change is substantially the same as the second rate of change.

9. The electronic device of claim 8, wherein, the second input-output relationship and the first input-output relationship have a same output at the transitional intensity value.

10. The electronic device of claim 8, wherein the second input-output relationship asymptotically approaches a maximum output as intensity of the contact increases above the transitional intensity value.

11. The electronic device of claim 8, wherein the one or more programs include instructions for displaying a user interface that includes a plurality of user interface objects, wherein:
  the plurality of user interface objects respond to press inputs having intensity above corresponding activation intensity thresholds; and
  a respective activation intensity threshold for two or more of the user interface objects is the same as the transitional intensity value.

12. The electronic device of claim 8, wherein:

a first property of the device varies at different locations on the touch-sensitive surface;

the first input-output relationship is the same at a first location and a second location on the touch-sensitive surface; and the second input-output relationship is different at the first location than at the second location on the touch-sensitive surface.

13. The electronic device of claim 8, wherein the response includes changing a current value of a property from a first value to a second value in a predefined range of values.

14. The electronic device of claim 8, wherein the response includes adjusting one or more of: volume, brightness, user interface object spacing, user interface object size, user interface object opacity, content scrubbing, and animation progress.

15. A method, comprising:

at an electronic device with a touch-sensitive surface and a display, wherein the device includes one or more sensors to detect intensities of contacts with the touch-sensitive surface:

detecting a contact on the touch-sensitive surface;

determining a location of the contact on the touch-sensitive surface;

determining an intensity of the contact on the touch-sensitive surface; and displaying a response in accordance with the detected contact, the response being based at least in part on an input-output mapping of intensity to response at the location of the contact on the touch-sensitive surface, the input-output mapping including, for a respective location on the touch-sensitive surface:

a first input-output relationship between intensity and response over a first range of intensity values, wherein the first input-output relationship is linear;

a second input-output relationship between intensity and response over a second range of intensity values, the second range of intensity values being different from the first range of intensity values, wherein the second input-output relationship is non-linear; and a transitional intensity value where the first range of intensity values meets or overlaps the second range of intensity values, wherein, at the transitional intensity value:

the first input-output relationship has a first rate of change of response with change in intensity;

the second input-output relationship has a second rate of change of response with change in intensity; and the first rate of change is substantially the same as the second rate of change.

16. The method of claim 15, wherein, the second input-output relationship and the first input-output relationship have a same output at the transitional intensity value.

17. The method of claim 15, wherein the second input-output relationship asymptotically approaches a maximum output as intensity of the contact increases above the transitional intensity value.

18. The method of claim 15, including displaying a user interface that includes a plurality of user interface objects, wherein:

the plurality of user interface objects respond to press inputs having intensity above corresponding activation intensity thresholds; and a respective activation intensity threshold for two or more of the user interface objects is the same as the transitional intensity value.

19. The method of claim 15, wherein:

a first property of the device varies at different locations on the touch-sensitive surface;

the first input-output relationship is the same at a first location and a second location on the touch-sensitive surface; and the second input-output relationship is different at the first location than at the second location on the touch-sensitive surface.

20. The method of claim 15, wherein the response includes changing a current value of a property from a first value to a second value in a predefined range of values.

21. The method of claim 15, wherein the response includes adjusting one or more of: volume, brightness, user interface object spacing, user interface object size, user interface object opacity, content scrubbing, and animation progress.

* * * * *